US012208419B2

(12) United States Patent
Newman et al.

(10) Patent No.: US 12,208,419 B2
(45) Date of Patent: Jan. 28, 2025

(54) COMPRESSION APPARATUSES, SYSTEMS AND METHODS FOR SCREENING MATERIALS

(71) Applicant: Derrick Corporation, Buffalo, NY (US)

(72) Inventors: Christian Newman, Buffalo, NY (US); Michael Peresan, Strykersville, NY (US); Daniel P. Jenkins, West Seneca, NY (US); Keith Wojciechowski, Lakeview, NY (US); William H. Gross, Hamburg, NY (US)

(73) Assignee: DERRICK CORPORATION, Buffalo, NY (US)

(*) Notice: Subject to any disclaimer, the term of this patent is extended or adjusted under 35 U.S.C. 154(b) by 0 days.

(21) Appl. No.: 18/673,120

(22) Filed: May 23, 2024

(65) Prior Publication Data

US 2024/0375148 A1 Nov. 14, 2024

Related U.S. Application Data

(63) Continuation of application No. 18/493,533, filed on Oct. 24, 2023, which is a continuation of application (Continued)

(51) Int. Cl.
*B07B 1/46* (2006.01)

(52) U.S. Cl.
CPC ........ *B07B 1/4609* (2013.01); *B07B 2201/02* (2013.01)

(58) Field of Classification Search
CPC ...... B07B 1/46; B07B 1/4609; B07B 2201/02

(Continued)

(56) References Cited

U.S. PATENT DOCUMENTS 6,470,562 B1 10/2002 Simone
6,736,271 B1 * 5/2004 Hall ...................... B07B 1/4618 209/400

(Continued)

FOREIGN PATENT DOCUMENTS

AU 2020202183 A1 * 4/2020 ............... B07B 1/00
CA 3111521 A1 * 9/2021 ......... B01D 33/0376

(Continued)

OTHER PUBLICATIONS

International Search Report and Written Opinion issued in App. No. PCT/US2023/85908, mailing date Apr. 19, 2024, 7 pages.

*Primary Examiner* — Terrell H Matthews
(74) *Attorney, Agent, or Firm* — FisherBroyles, LLP; Jason P. Mueller

(57) ABSTRACT

A vibratory screening machine includes replaceable screen assemblies. Compression mechanisms are used to secure replaceable screen assemblies to the vibratory screening machine. Each compression mechanism applies a force to a replaceable screen assembly that includes both a horizontal component and a downward vertical component. Each replaceable screen assembly is typically substantially flat prior to installation on a vibratory screening machine. The force applied to a screen assembly by one or more compression mechanisms causes the screen assembly to be pushed into engagement with underlying concave support members such that the screen assembly itself assumes a concave shape with the center of the screen assembly being lower than the side edges. The vertical downward component of the force helps to secure the screen assembly to the screening machine.

30 Claims, 93 Drawing Sheets

Related U.S. Application Data

No. 18/347,245, filed on Jul. 5, 2023, now Pat. No. 11,890,647.

(60) Provisional application No. 63/464,982, filed on May 9, 2023.

(58) Field of Classification Search
USPC .......................................................... 209/363
See application file for complete search history.

(56) References Cited

U.S. PATENT DOCUMENTS

| | | | | |
|---|---|---|---|---|
| 11,890,647 | B1 | 2/2024 | Newman | |
| 11,958,077 | B1 | 4/2024 | Newman | |
| 2009/0321328 | A1 * | 12/2009 | Wojciechowski | B07B 1/28 209/275 |
| 2014/0000820 | A1 | 1/2014 | Diamond | |
| 2019/0366243 | A1 * | 12/2019 | Colgrove | B07B 1/4609 |
| 2020/0179980 | A1 * | 6/2020 | Wojciechowski | B07B 1/49 |

FOREIGN PATENT DOCUMENTS

| | | | | |
|---|---|---|---|---|
| CN | 209034530 | U * | 6/2019 | |
| WO | WO-2014011778 | A2 * | 1/2014 | B07B 1/28 |
| WO | 2014062177 | A1 | 4/2014 | |
| WO | WO-2018071902 | A1 * | 4/2018 | B07B 1/28 |

* cited by examiner (a)

(b)

(c)

COMPRESSION APPARATUSES, SYSTEMS AND METHODS FOR SCREENING MATERIALS

CROSS-REFERENCE TO RELATED APPLICATIONS

This application is a continuation of U.S. application Ser. No. 18/493,533, filed Oct. 24, 2023, which is a continuation of U.S. application Ser. No. 18/347,245, filed Jul. 5, 2023, now U.S. Pat. No. 11,890,647, which claims priority to U.S. Provisional Patent Application No. 63/464,982, filed May 9, 2023, the contents of both of which are incorporated herein by reference.

FIELD

The present disclosure relates generally to material screening. More particularly, the present disclosure relates to apparatuses and methods for compressing screening assemblies to screening machines.

BACKGROUND

Material screening includes the use of vibratory screening machines. Vibratory screening machines provide the capability to excite an installed screen such that materials placed upon the screen may be separated to a desired level. Oversized materials are separated from undersized materials. Over time, screens wear and require replacement. As such, screens are designed to be replaceable.

DETAILED DESCRIPTION

Figure 1A:
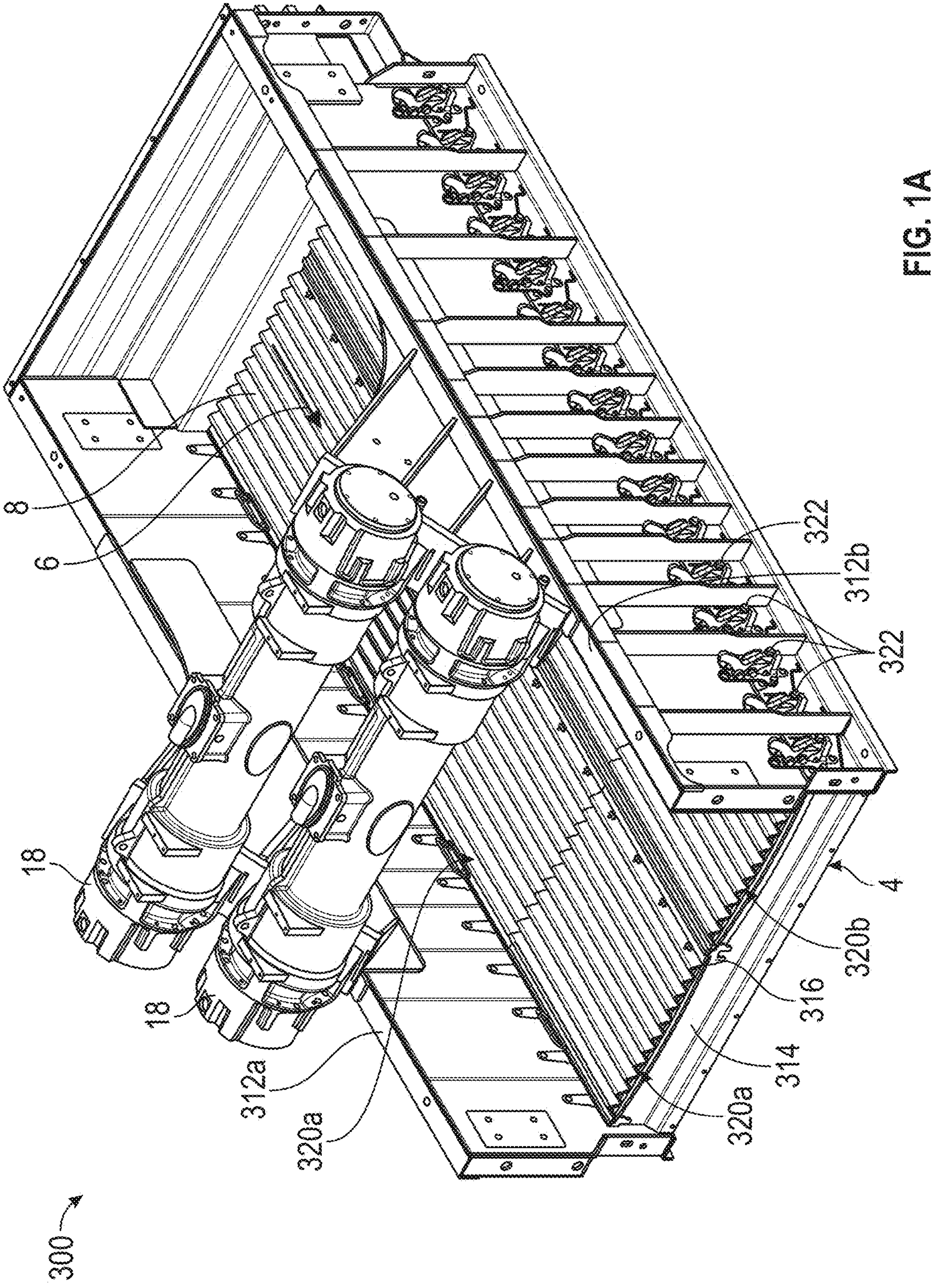
FIG. 1A shows a perspective view of a dual-trough vibratory screen machine with installed replaceable screen assemblies, in an embodiment.

Material screening includes the use of vibratory screening machines. Vibratory screening machines provide the capability to excite an installed screen such that materials placed upon the screen may be separated to a desired level. Oversized materials are separated from undersized materials. Over time, screens wear and require replacement. As such, screens are designed to be replaceable.

Vibratory screening machines are used in various industries and generally are under substantial vibratory forces and transfer the vibratory forces to screens and screen assemblies to shake them. One industrial application is oil and gas drilling where screens attached to shaker machines are subjected to 2-4 k psi compression forces to hold the screens stationary on the shaker machines. Drill cuttings, rock and drilling mud is then dumped on top of the screens at hot temperatures and the screens are vibrated at 3-9 G forces.

Embodiments of the present disclosure may be applied to various applications, including wet and dry applications and may be applied across various industries. The present disclosure is not limited to the oil and gas industry and the mining industry. Disclosed embodiments may also be utilized in any industry that requires separation of materials using vibratory screenings machines, including pulp and paper, chemical, pharmaceuticals and others. In various embodiments, screen assemblies in accordance with the present disclosure are designed to withstand high vibratory forces (e.g., accelerations in a range of 3-9G), abrasive materials (e.g., fluids having several percent to up to 65 percent abrasive solids) and high load demands (e.g., fluids having specific gravity up to 4). The disclosed screen assemblies are also designed to withstand up to 2000-4000 lb. compressive loading of screen assembly edges as described, for example, in U.S. Pat. Nos. 7,578,394 and 9,027,760, the entire disclosure of each of which is hereby incorporated by reference.

Vibratory screening machines are generally under substantial vibratory forces and transfer the vibratory forces to screens and screen assemblies to shake them. Screens and/or screen assemblies must be securely attached to the vibratory screening machines to ensure that the vibratory forces are transferred to the screens or screen assemblies and to ensure that the screen or screen assembly does not detach from the vibratory screening machine. Effective transmission of the vibratory forces from the machine to the attached screen assemblies is critical to screening performance. Screen assemblies that are not securely attached to the screening machine will not effectively perform the screening and/or dewatering function. Also, when screen assemblies are not securely held on the screening machine the screen assemblies and the screening machine itself are subject to increased wear and breakage.

Various approaches may be utilized to secure a screen or assembly to a vibratory screening machine, including clamping, tension mounting, etc. The disclosed compression apparatuses, systems and methods are designed so that screening assemblies are securely attached to screening machines under service conditions including the above-mentioned compressive loading, high vibratory forces, and in the presence of heavy fluids One approach to mounting a screen assembly to a screening machine is to place the screen or assembly under compression to hold the screen or the screen assembly in place. The screen or screen assembly may be placed into the vibratory screening machine such that one side abuts a portion of the vibratory screening machine, and an opposing side faces a compression assembly. The compression assembly may then be used to apply compression forces to the screen or assembly. Compression assemblies may be power driven or manual.

Embodiments of the present disclosure relate to systems, apparatuses, and methods of securing screen assemblies to a vibratory screening machine. In particular, and though non-limiting embodiments, the disclosure relates to systems, apparatuses, and methods of securing a screen assembly to a vibratory screening machine using a compression assembly that deflects a screen into a concave shape/profile.

Embodiments of the present disclosure provide a compression assembly that may be used to compression mount screens and/or screen assemblies to a vibratory screening machine. In some embodiments, the compression mounting mechanism may include compression pistons that bear against a side edge or side surface of a screen assembly and that apply both a horizontal and a vertical compression force. In other embodiments the compression mounting mechanism may include an arrangement where one or more hook members pass through a screen assembly and apply both a horizontal force to a side or edge surface of the screen assembly and a downward force to a top surface of the screen assembly. Such an embodiments may increase a vertical downward component of a compression force applied to the screen relative to known compression assemblies, which may provide improved attachment of the screen assembly to the screening machine and/or provide an improved seal between the screening assembly and the screening machine.

In an under-compression embodiment, a set of stationary hooks attached to the screening machine (e.g., a wall member or central member) extend through a corresponding set of pass-through compression points (e.g., apertures) extending through a screening assembly within an interior of the screening assembly (e.g., within a periphery of a support plate of a screening assembly and spaced from a first edge of the support plate). Such stationary hooks may extend through a screening assembly from a bottom surface to an upper surface.

A set of movable or actuated hooks of one or more compression assemblies disposed along an opposing wall member of the screening machine extend through a corresponding set of pass-through compression points within the interior of the screening assembly (e.g., spaced from a second edge of the screening assembly). Actuation of the compression assemblies moves the hooks from a first position (e.g., retracted) to a second position (extended) to apply a horizontal compressive force to the screen assembly (e.g., an inside edge of the pass-through compression point). Actuation of the compression assemblies may also apply a downward force to an upper surface of the screen assembly. The combined horizontal and downward vertical forces may deflect the screen assembly into a concave shape and secure the screen assembly to the screening machine.

Embodiments of the present disclosure may provide a separate compression assembly for each movable or actuated hook of the vibratory screening machine. Separate assemblies for each movable or actuated hook may allow the energy required to apply compression to be dispersed over multiple assemblies. In other embodiments, a single compression assembly may actuate two or more movable or actuated hooks.

The compression assembly may have a detachable handle. A single handle may be used to actuate multiple compression assemblies. Compression assemblies may be attached along a first and/or second wall of a vibratory screening machine. Compression assemblies may be attached to a vibratory screening machine such that multiple (e.g., two, three, four or more) compression assemblies are configured to engage each screen and/or screen assembly installed in the vibratory screening machine. By using multiple compression assemblies for a single screen or screen assembly, the combined clamping force applied by the multiple compression assemblies to the screen assembly is increased while the energy required to activate a single compression assembly remains the same.

Figure 1B:
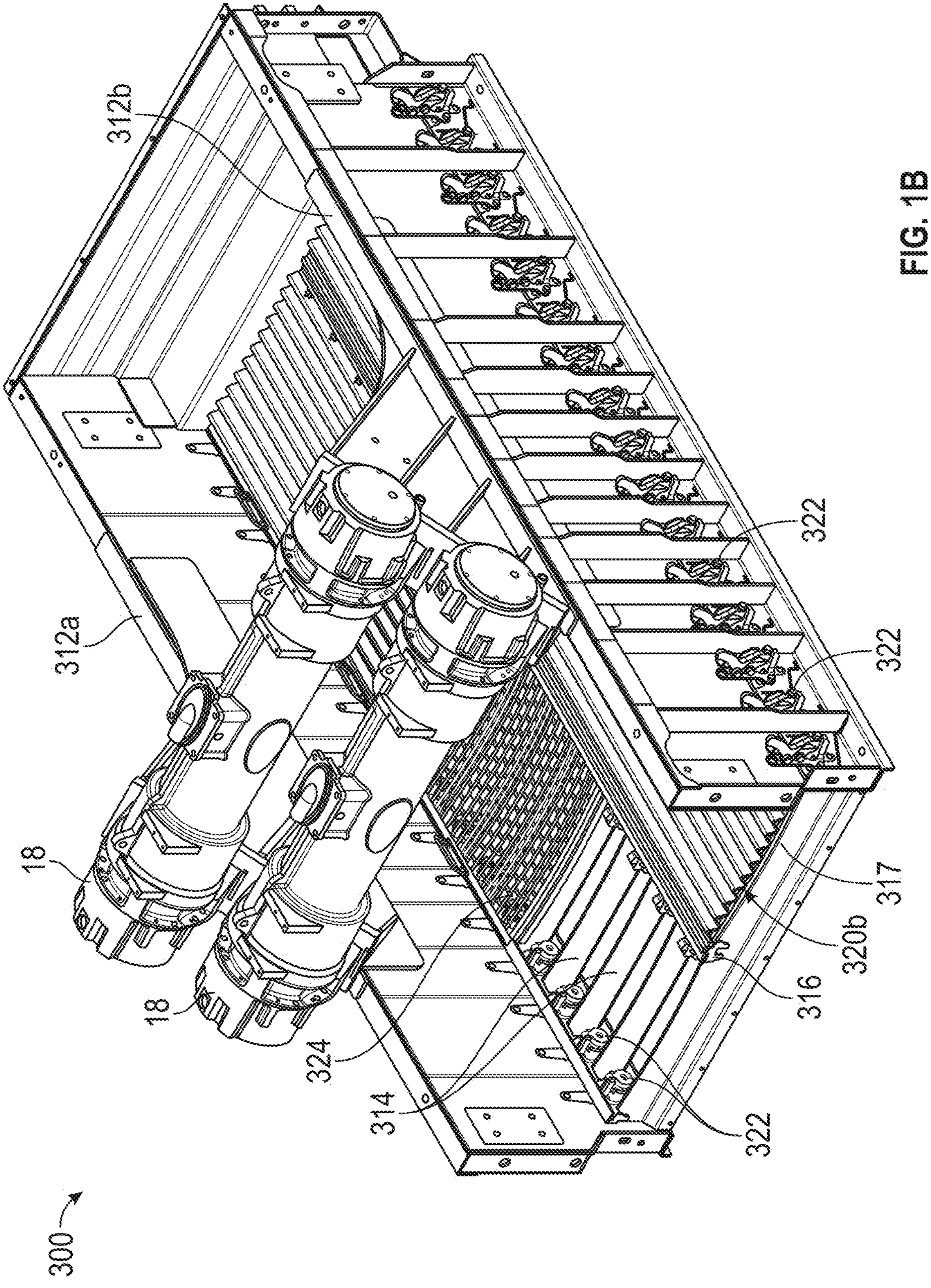
FIG. 1B shows a perspective view of the dual-trough vibratory screen machine of FIG. 1A with one of the replaceable screen assemblies removed, in an embodiment.
Figure 1C:
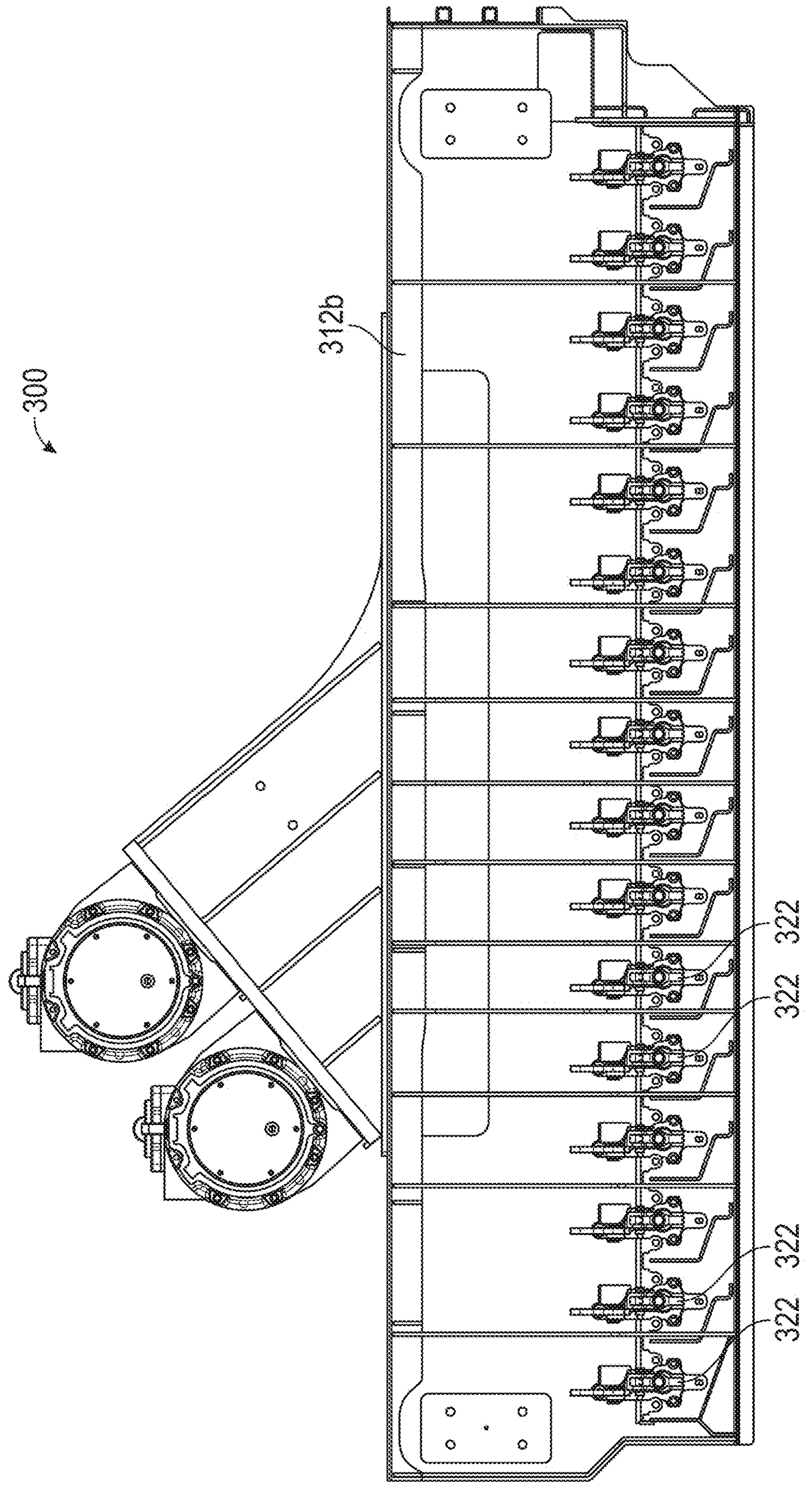
FIG. 1C shows a side view of the vibratory screen machine of FIG. 1A, in an embodiment.

FIGS. 1A, 1B and 1C illustrate one non-limiting embodiment of a vibratory screening machine 300 with installed replaceable screening assemblies. More specifically, FIG. 1A illustrates the screening machine 300 fully assembled with two parallel rows of replaceable screening assemblies 320*a*, 320*b*, FIG. 1B illustrates the screening machine 300 with one screen assembly removed to illustrate underlying components of the screening machine, and FIG. 1C illustrates a side view of the screening machine. In the illustrated embodiment, the screening machine 300 utilizes two sets of replaceable screening assemblies 320*a*, 320*b* disposed in parallel along the length of the screening machine 300. Each set of screen assemblies 320*a* and 320*b* includes four longitudinally aligned screen assemblies.

Material is fed into a feed hopper (not shown) and is then directed onto a top surface 8 of the two parallel sets of screen assemblies 320*a*, 320*b*. The material travels in flow direction 6 toward the vibratory screening machine 300 outlet end 4. The material flowing in direction 6 is contained within parallel concave troughs provided by the parallel sets of screen assemblies 320 and is prevented from exiting the sides of screen assemblies 320. Material that is undersized and/or fluid passes through the parallel screen assemblies 320*a*, 320*b* (hereafter 320 unless specifically referenced) onto a separate discharge material flow path for further processing. Materials that are oversized exit outlet end 4. The material screen may be dry, a slurry, etc. The screen assemblies 320 may be pitched downwardly from the hopper toward an opposite end in the direction 6 to assist with the feeding of the material. Alternatively, the screen assembly may be pitched upward to increase a pool depth and thereby increase contact between the screen and screened materials Vibratory screening machine 300 includes wall members 312*a*, 312*b* (hereafter 312 unless specifically referenced), concave support surfaces 314 (e.g., bulkheads or stringers), a central member 316, an acceleration arrangement 18 (e.g., one or more vibratory motors), multiple screen assemblies 320 and compression assemblies 322. A central member 316 divides the vibratory screening machine 300 into two concave screening areas (e.g., dual-trough).

Figure 1D:
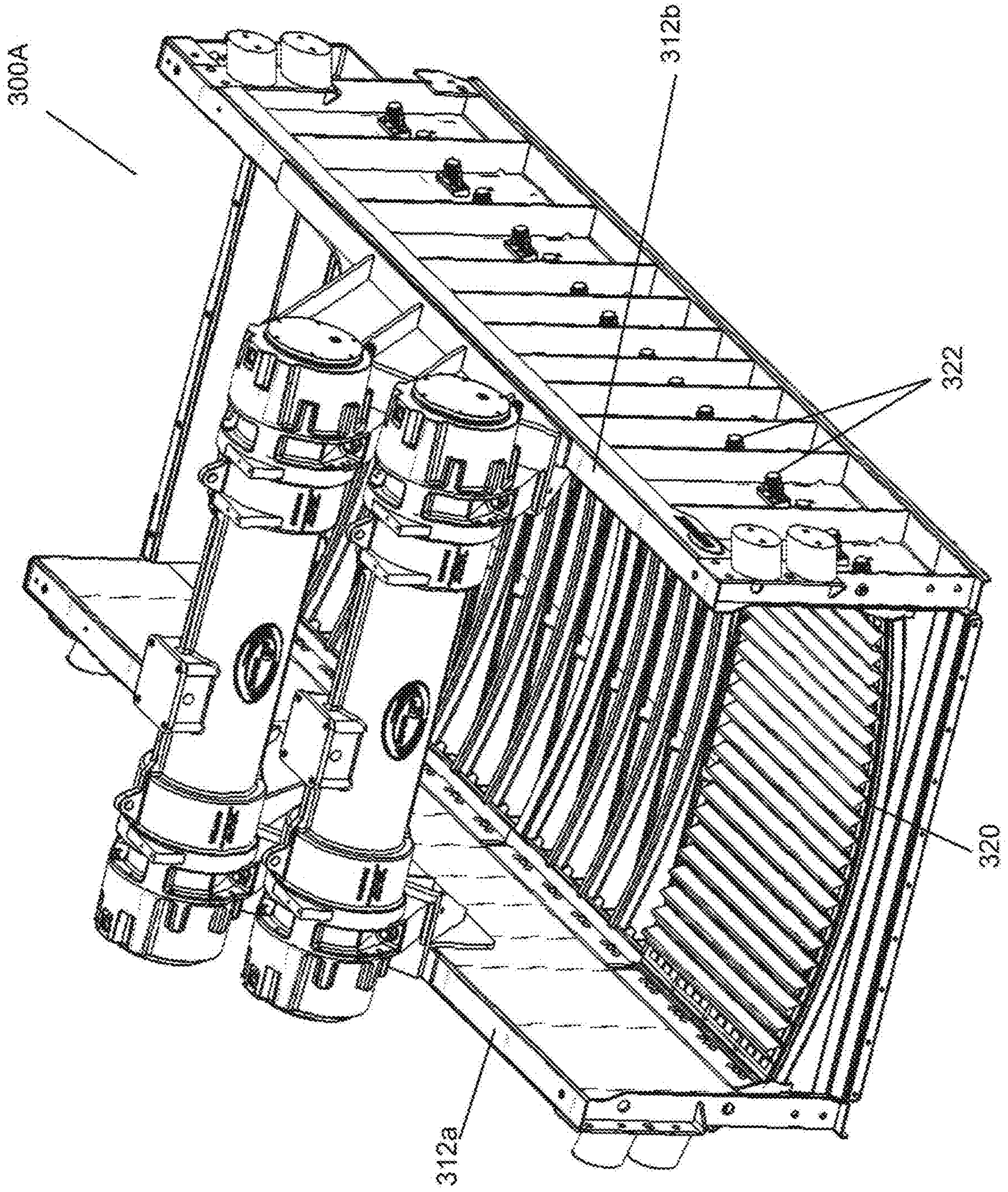
FIG. 1D shows a perspective view of a single-trough vibratory screening machine with an installed replaceable screen assembly, in an embodiment.

Compression assemblies 322 are attached to an exterior surface of each of the wall members 312. Vibratory screening machines may, however, have one concave screening area (e.g., single-trough) sized to receive one set of screening assemblies with compression assemblies arranged on one wall member. Such a single-trough machine 300A is illustrated in FIG. 1D, which utilizes like reference numbers to identify like elements. Such an arrangement may be desirable where space is limited, and maintenance and operational personnel only have access to one side of the vibratory screening machine. A single-trough machine may also be preferable if the screen assembly mounting arrangement benefits from having compression assemblies 322 on both sides of the machine. While the vibratory screening machine 300 is shown in FIGS. 1A-1C with multiple longitudinally oriented screen assemblies creating two parallel concave material pathways (e.g., double trough), the screen assemblies are not limited to such a configuration and may be otherwise oriented.

In the screening machine 300 illustrated in FIGS. 1A-1C, the central member 316 is disposed between the wall members 312 such that the screening machine has two parallel flow paths (e.g., a double-trough design). As illustrated, each screen assembly 320 includes a first edge disposed proximate to the first or second wall member 312*a* or 312*b* and a second edge disposed proximate to the central member 316, which forms an abutment surface for the screen assemblies. In a single-trough embodiment, utilizing a single screen assembly, the central member is omitted such that a single set of screening assemblies would extend between the first and second wall of the screening machine 300A. In such an arrangement, one wall may include compression assemblies and the other wall may form an abutment surface. In an alternate embodiment, compression assemblies are provided on both walls. In either arrangement, the compression assemblies 322 compress the screen assemblies 320 against the concave supports 314 to deflect the screen assemblies 320 into a concave profile.

FIG. 1B illustrates the screening machine 300 with one screening assembly removed and a screening surface removed from another screening assembly to expose an underlying perforated support plate 324. The configuration of the screening assemblies 320 and their support plates 324 are more fully discussed in the description which follows. As illustrated in FIG. 1B, a plurality of concave support surfaces 314 extend between first wall 312*a* and the central support 316. Although not illustrated, a plurality of concave support surfaces also extend between the second wall 312*b* and the central support 316. Single-trough machines (e.g., FIG. 1D) may utilize similar concave supports extending between first and second walls. As shown, the concave supports 314 each have a first end attached to the wall member and a second end attached to the central support 316. As illustrated, the concave supports 314 are evenly spaced and parallel. However, other spacing may be utilized.

Figure 2A:
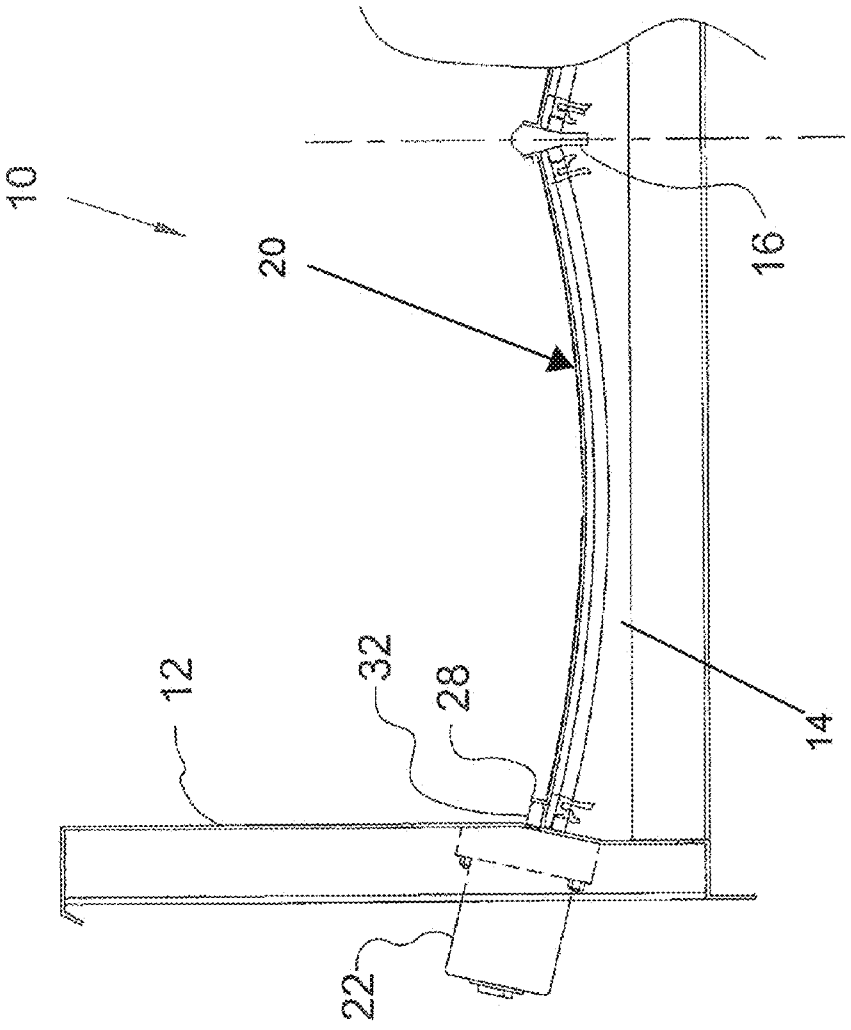
FIG. 2A shows an end view of a portion of an exemplary dual-trough vibratory screen machine, in an embodiment.

Compression assemblies of vibratory screening machines are typically attached to an exterior surface of wall members and include a retractable member that extends and contracts to apply compression to screen assemblies supported on a bed of the screening machine. The retractable members may advance and contract in response to manually applied forces, pneumatic, hydraulic, electrically generated and spring forces. FIG. 2A illustrates a partial end view of a prior art dual-trough screening machine 10 that utilizes a compression assembly 22 attached to a first wall 12 of the machine 10 to compress a screen assembly 20 disposed between the first wall 12 and a central member 16 of the machine. The compression assembly 20 utilizes a retractable member 32, which is illustrated as a pin, to exert a compressive force against a vertical flange 28 extending above a top surface of the screen assembly 20. Compression on the vertical flange 28, near a first edge of the screen assembly, urges a second edge of the screen assembly against the central member 16 (or a second wall of a single-trough screening machine) and deforms the screen assembly 20 into a concave profile against one or more underlying concave support surfaces 14. That is, the screen assembly 20 deforms from an undeflected generally flat profile (not shown) to the deflected concave profile illustrated in FIG. 2A.

Figures 2B, 2C:
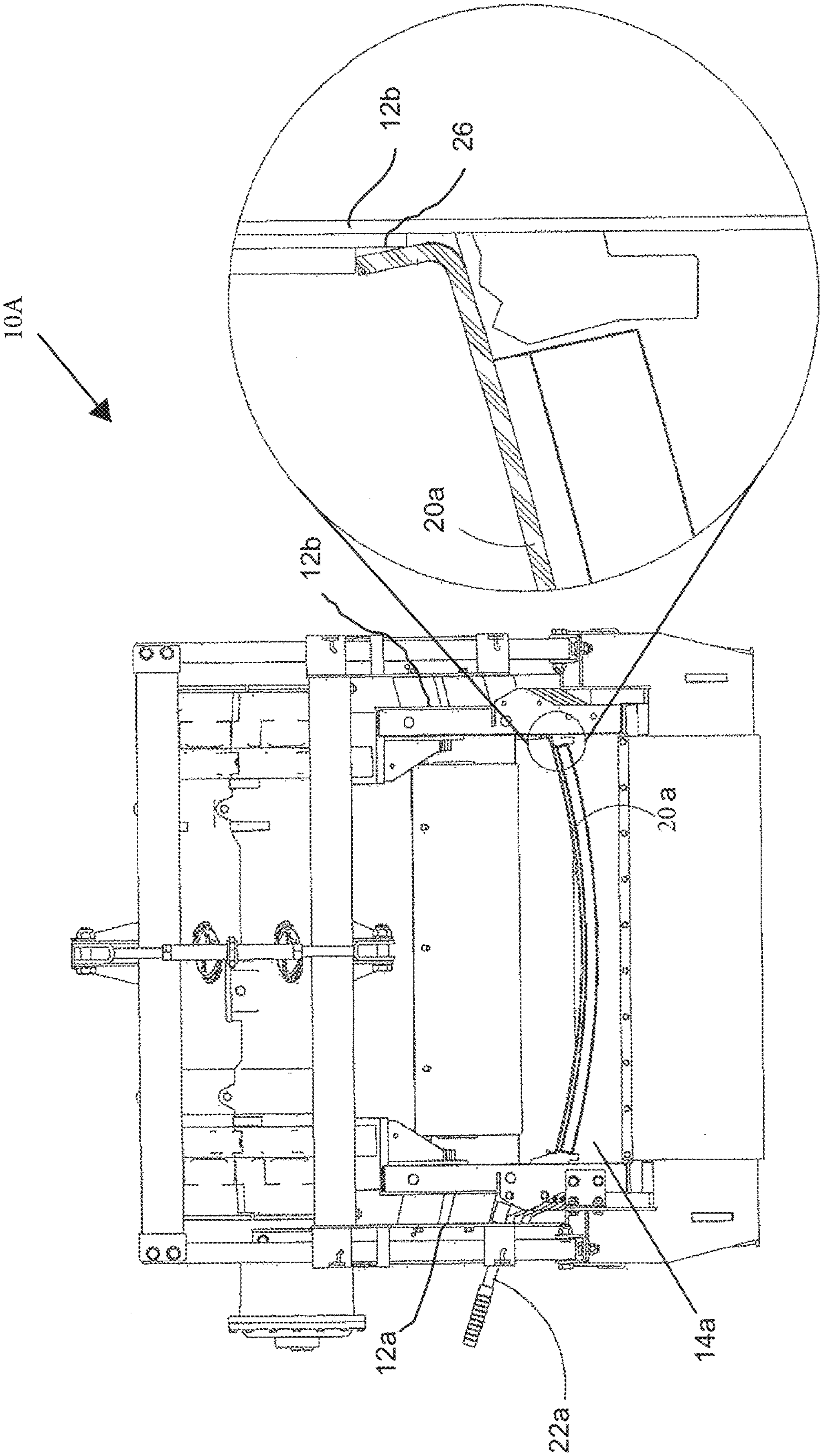
FIG. 2B shows an end view of an exemplary single-trough vibratory screen machine, in an embodiment.
FIG. 2C shows a close-up of a portion of the vibratory screen machine of FIG. 2B, in an embodiment.

FIGS. 2B and 2C illustrate an end view of prior art single-trough screening machine 10A. As illustrated, a compression assembly **22*a* attached to a first wall 12*a* compresses a screen assembly 20*a* against an abutment surface 26 located on a second wall 12*b* of the machine 10A. Though illustrated as a generally flat surface, it will be appreciated that the abutment surface 26 may have other configurations such as, without limitation, a channel. The compression force applied to the screen assembly 20*a* by the compression assembly 22*a* deflects the screen assembly 20*a* into a concave profile against one or more underlying concave support surfaces 14*a*. Screening machines and compression assemblies in accordance with FIGS. 2A-2**C are set forth in U.S. Pat. No. 9,027,760, the entire contents of which is incorporated herein by reference.

Aspects of the present disclosure are based, in part, on the realization that compression forces applied to a vertical flange extending above the edge of the screen assembly does not provide an ideal hold-down force for the screen assembly. That is, a moment about such a vertical flange and/or deflection of the vertical flange, when compressed, provides only a limited downward force (i.e., vertical component of a hold-down force) applied to the screening assembly. Further, the compression force applied to the vertical flange by the compression assembly **22*a* tends to cause the side edge of the support plate to curl upward away from the wall member and away from the underlying support surfaces 14*a***. As a result, fluid and aggregate material often builds up at the screen edges behind the flange causing maintenance and contamination problems.

The small vertical downward component of the hold-down force can also result in poor sealing between peripheral edges of the screen assemblies and the screening machine, potentially leading to contamination of screened materials. That is, unscreened oversized materials may leak around peripheral edges of the screen assembly, falling into the area designed to collect undersized material. Moreover, the small vertical downward component of the hold-down force may allow for some movement (e.g., flapping) of the screen assembly relative to the screening machine, increasing wear of the screen assemblies and/or underlying rubber sealing beds (e.g., gaskets) and decreasing screening efficiency and/or performance.

The above-described issues, as well as additional benefits, are addressed by the hold-down compression assemblies, screen assemblies and associated methods disclosed herein. Broadly, the disclosed compression mounting assemblies and screen assemblies allow for increasing a vertical component of a hold-down force applied to the screen assembly in conjunction with deflecting the screen into a concave profile. This results in improved sealing of the screen assemblies and/or reduced movement of the screening assemblies relative to the underlying support members and sealing gaskets of the screening machine, among other benefits.

As mentioned above, a screen assembly that is mounted on a vibratory screening machine typically includes a support plate and a screening surface attached to the top of the support plate. Each of the screening assemblies illustrated in FIG. 1A include a corrugated screening surface attached to a top surface of support plate. FIG. 1B shows one of the screen assemblies where the corrugated screening surface has been removed to expose the underlying support plate 324. As depicted in FIG. 1B, the support plate includes a plurality of apertures that allow materials that have passed through the screening surface to fall easily through the support plate 324. FIGS. 2A-2C show that in prior art screen assemblies, a vertical flange 28 extends upward from the side edges of the support plate. As explained above, the compression mechanism of prior art screening machines bears against the upwardly extending vertical flange 28 to apply a compressive force used to mount the screen assembly to the screening machine.

The following description discloses multiple different embodiments of a new type of screen assembly and corresponding mounting mechanisms used to mount screen assemblies to a vibratory screening machine. One embodiment of the new mounting mechanisms apply compressive force directly to a side edge of the support plate underlying a screening surface of a screen assembly. Because the compressive force is applied to the side edges of the support plate, the compressive force does not tend to rotate the side edges of the support plate up and away from the underlying support elements of the screening machine.

Also, the compression pistons that contact the side edges of the support plate can do so in a way that applies a greater vertical downward force to the edges of the support plate. Indeed, the compression surfaces of the compression pistons bear against the side edges of the support plate of a screen assembly in such a way that the compression pistons provide a vertical constraint that prevents the side edge of the support plate from moving upward, even under high vibrational acceleration forces. All of these factors help to keep the screen assembly firmly attached to supporting elements of the vibratory screening machine and help to ensure that the bottom surface of the support plate makes a good seal with underlying gaskets or flanges on the screening machine to help prevent any material from bypassing the screening surface and contaminating the materials that already have been screened.

Figure 3A:
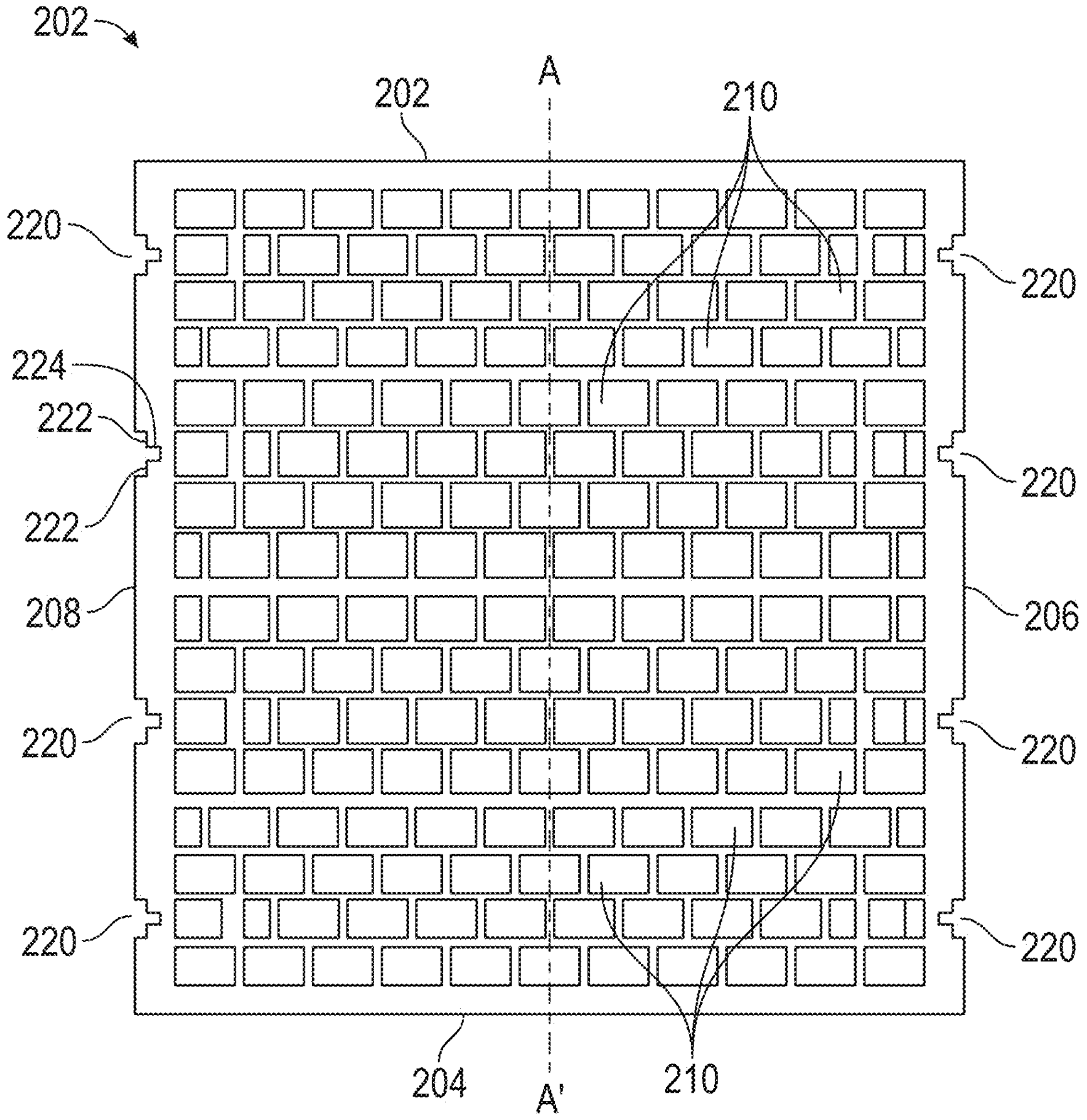
FIG. 3A shows a first embodiment of a support plate of a screen assembly.

FIG. 3A illustrates a support plate 202 of a new screen assembly. A screening surface would be mounted on top of the support plate 202 to form a screen assembly. The support plate 202 includes a plurality of flow through apertures 210. As a result, any material that passes through a screening surface mounted on top of the support plate 202 is able to fall downward through the flow through apertures 210.

The support plate includes a front edge 202, a rear edge 204, a first side edge 206 and a second side edge 208. A plurality of mounting apertures 220 are formed on the first and second side edges 206, 208. Each mounting aperture 220 includes compression surfaces 222 located on opposite sides of an alignment slot 224.

Figure 3B:
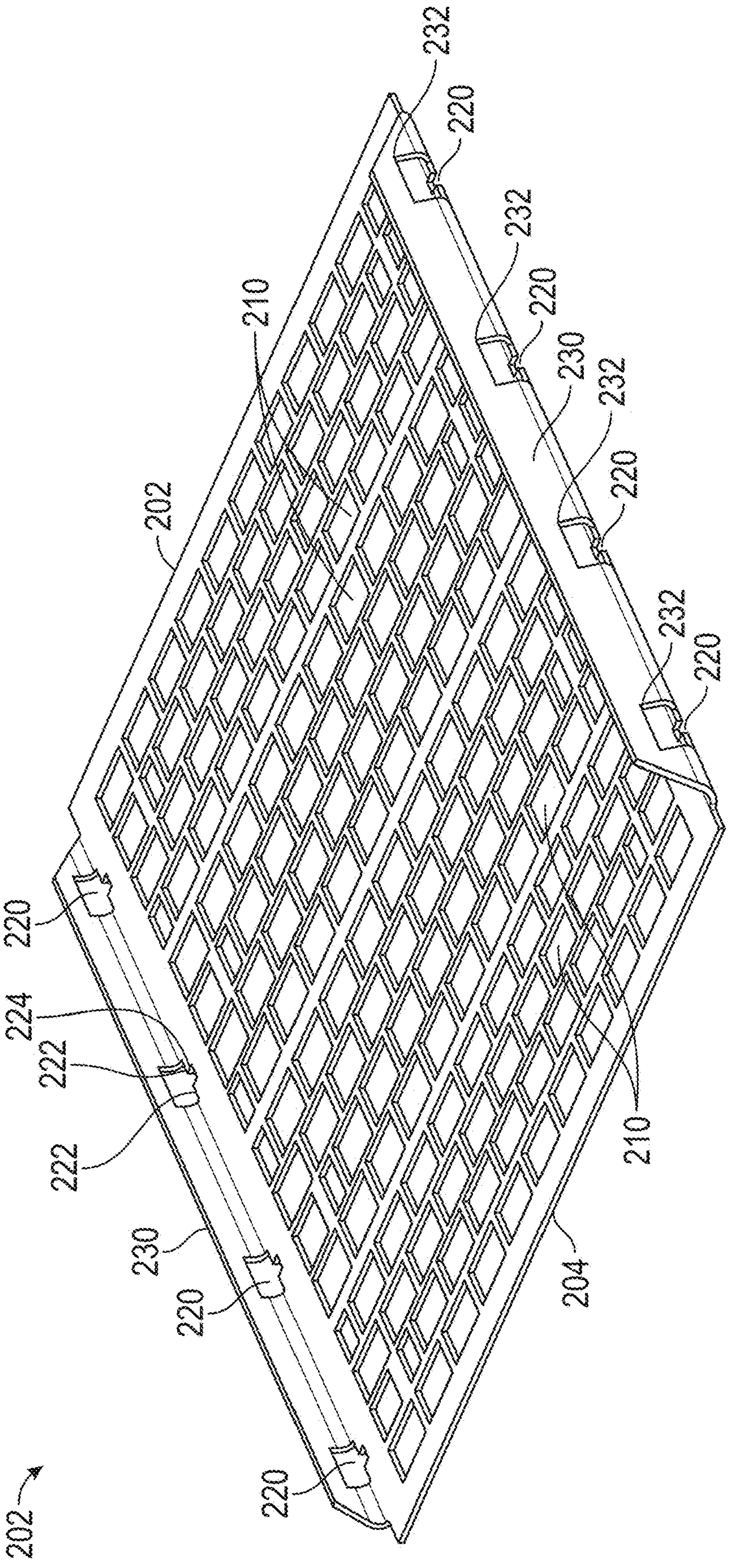
FIG. 3B shows a second embodiment of a support plate of a screen assembly.

FIG. 3B shows an alternate embodiment of a support plate 202 that includes upwardly extending flanges 230 on the sides of the support plate 202. Access apertures 232 are formed in the upwardly extending flanges 230 to allow compression pistons to move inward and engage with the mounting apertures 220. Upwardly extending flanges 230 may provide benefits discussed below.

Figure 3C:
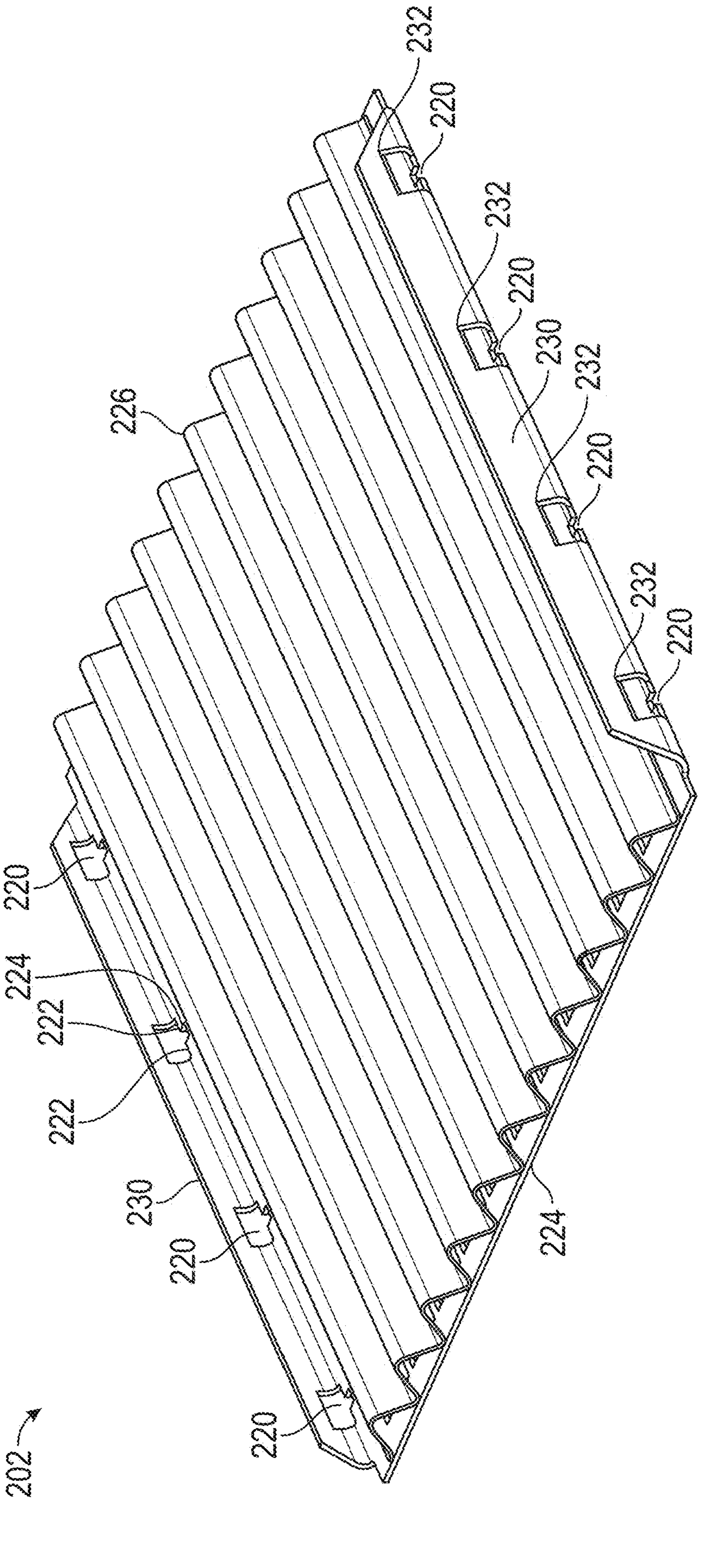
FIG. 3C shows a screen assembly that includes a support plate as depicted in FIG. 3B.

FIG. 3C shows a screen assembly that includes a screening surface 326 mounted on the top of a support 202 as depicted in FIG. 3B. In this embodiment, the screening surface 326 has a corrugated configuration. However, in alternate embodiments the screening surface could be substantially flat or have other configurations.

The number and distribution of the mounting apertures 220 can be varied to achieve various ends. The mounting apertures 220 are typically provided at regular intervals along the side edges 206, 208, and the locations of the mounting apertures 220 correspond to the locations of compression assemblies of a vibratory screening machine.

Figure 4A:
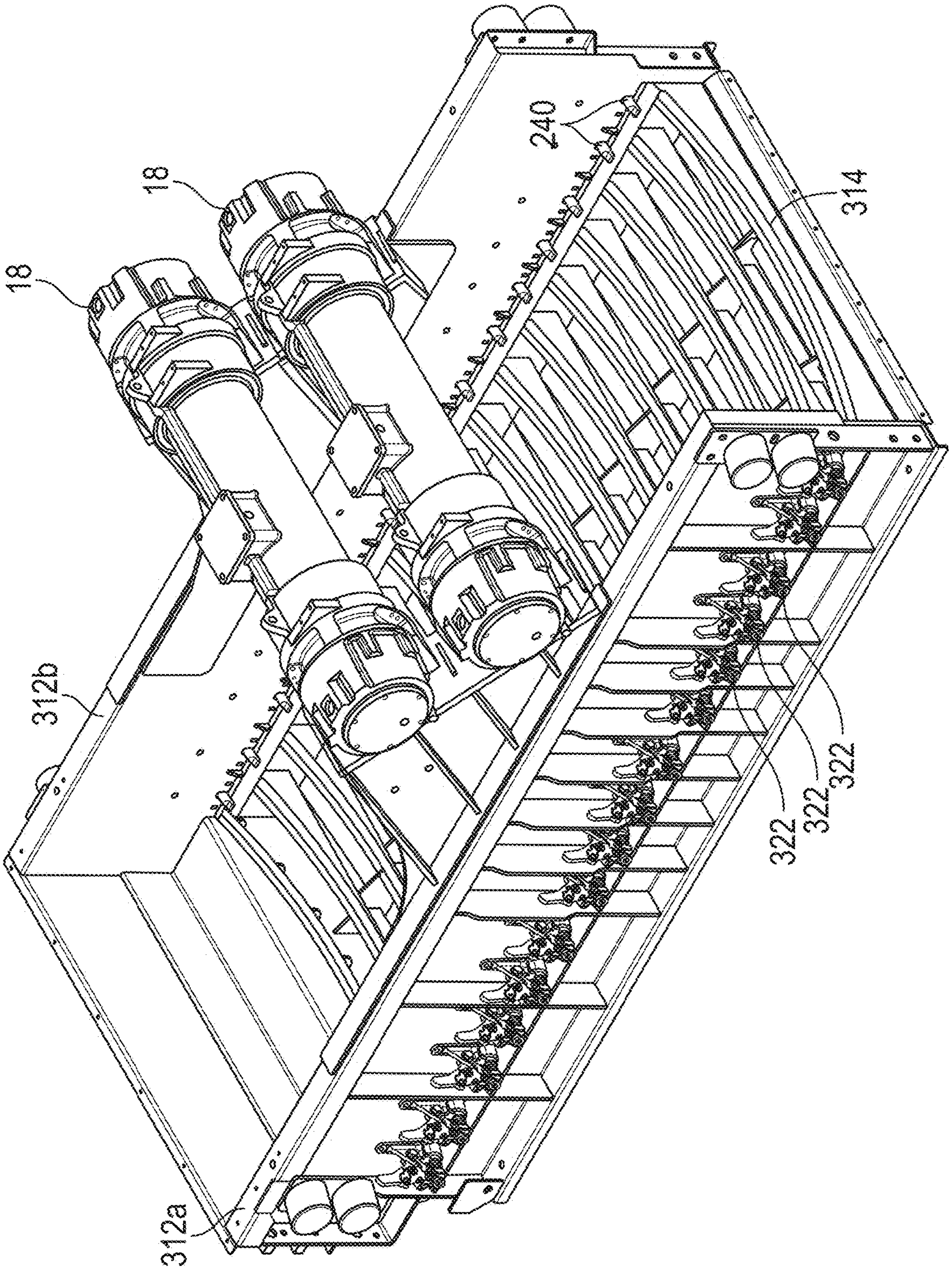
FIG. 4A is a top perspective view of a single-trough vibratory screening machine that includes a side compression mounting mechanism for securing screening assemblies to the machine.
Figure 4B:
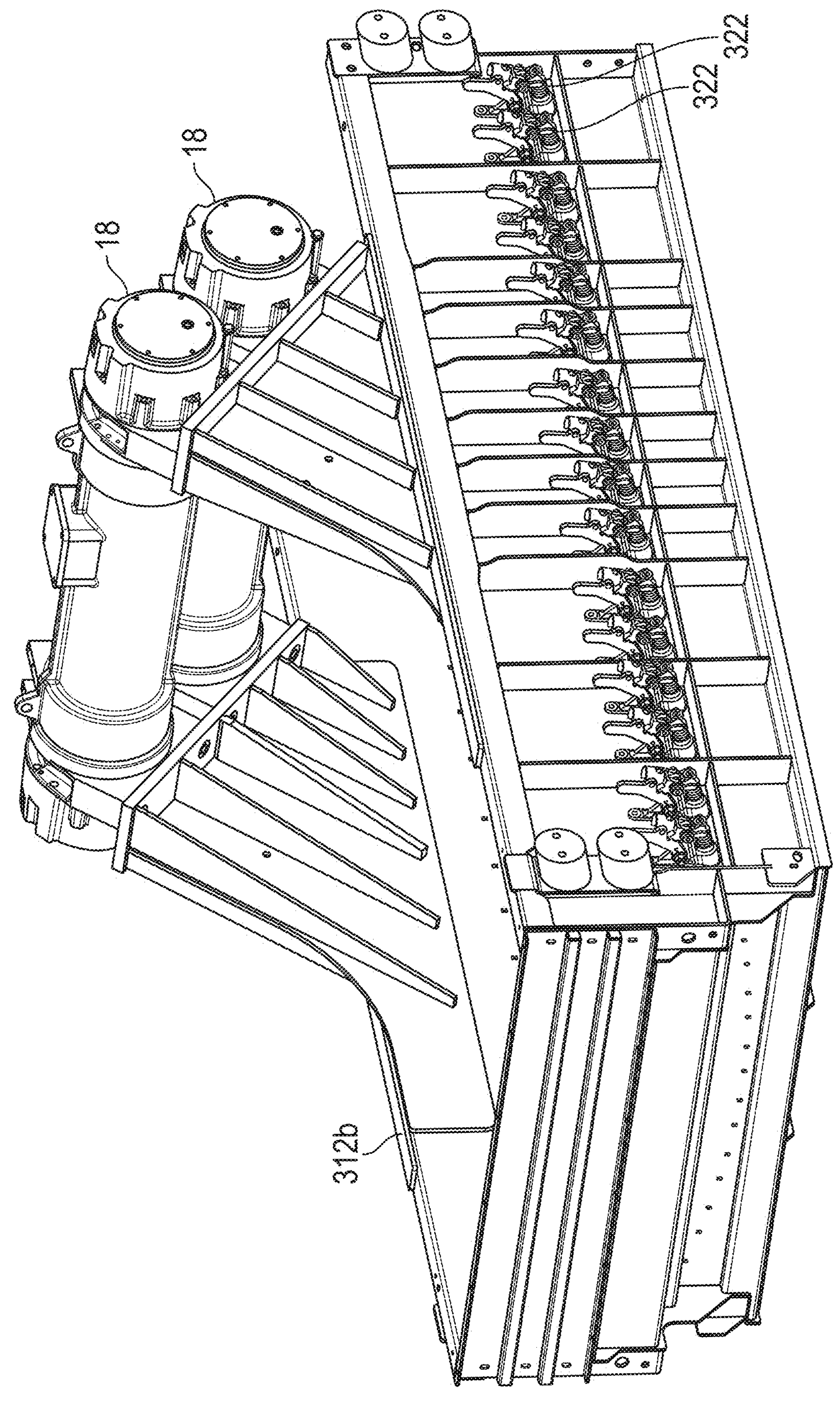
FIG. 4B is another perspective view of the vibratory screening machine illustrated in FIG. 4A.
Figure 4C:
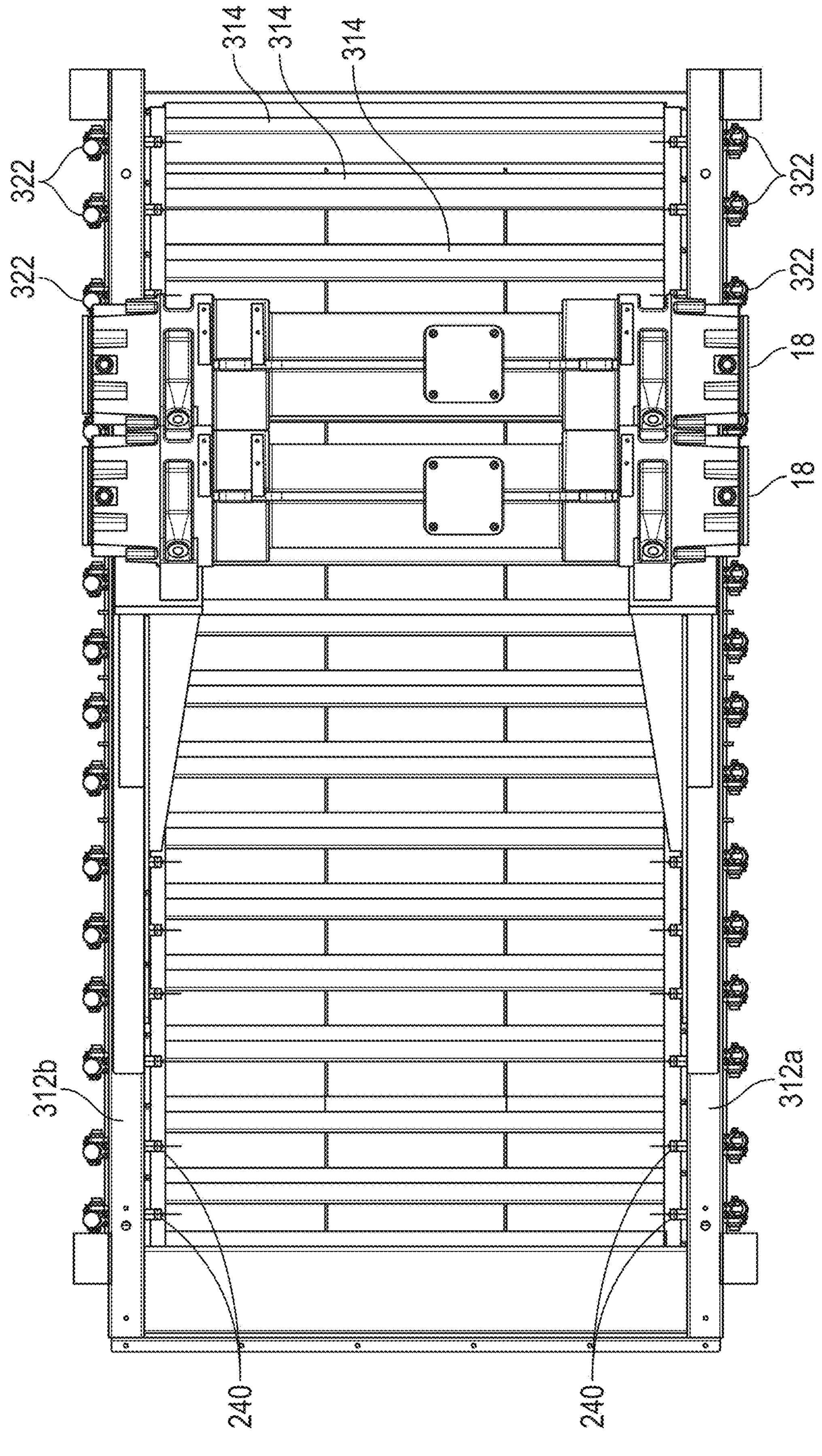
FIG. 4C is a top view of the vibratory screening machine illustrated in FIG. 4A.
Figure 4D:
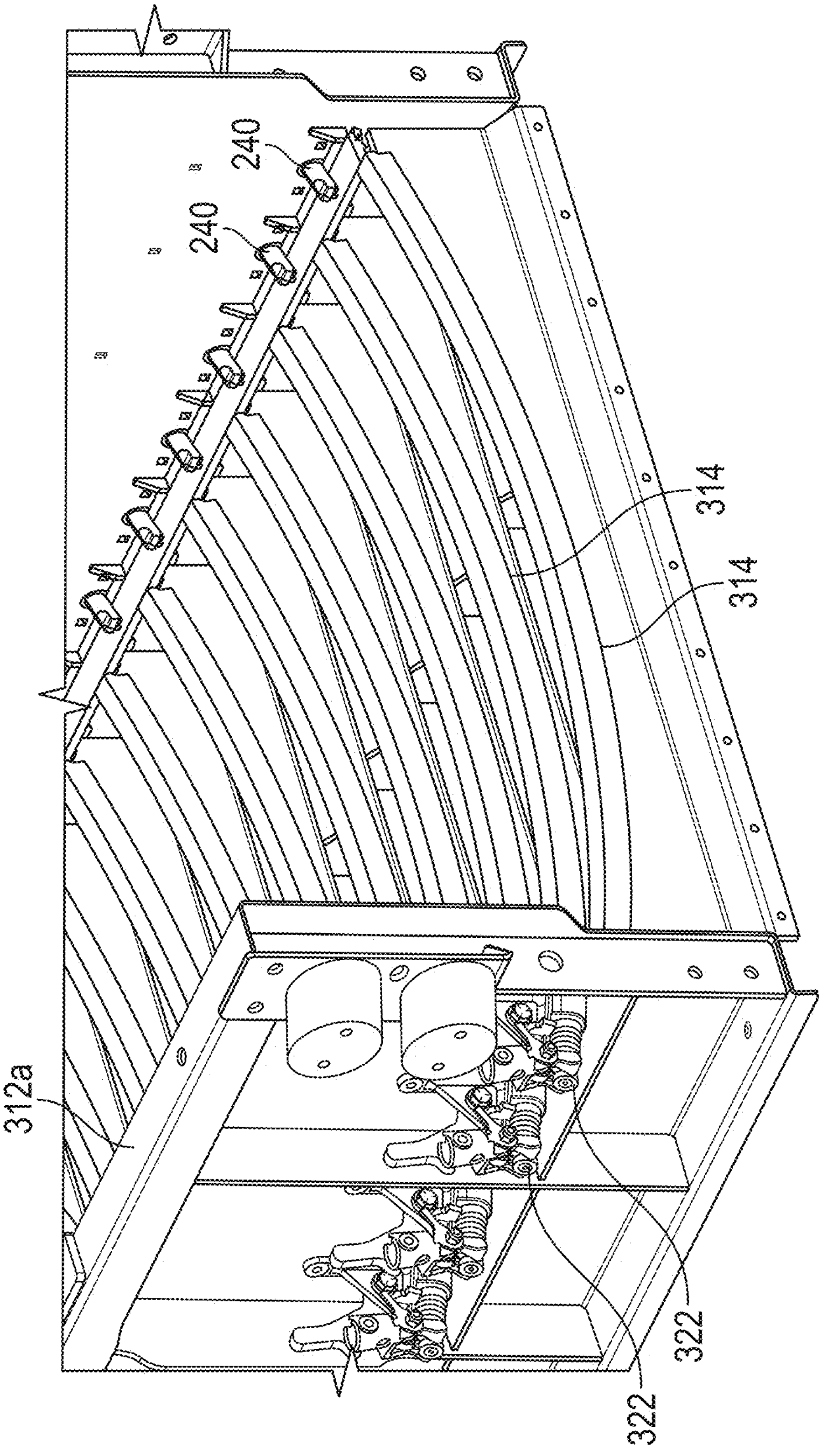
FIG. 4D is an enlarged perspective view of a portion of the vibratory screening machine illustrated in FIG. 4A.

FIGS. 4A-4D illustrate a single-trough vibratory screening machine that includes a first embodiment of a compression mounting mechanism used to secure screen assemblies to the screening machine. FIG. 4A provides a first perspective view that shows a plurality of concave support surfaces 314 that each extend from a first side member 312*a* to a second side member 312*b*. The concave support surfaces are arrayed from an input end 311 to an output end 313. One or more vibratory motors 18 are mounted to the machine to apply vibratory forces to the machine and ultimately to screen assemblies mounted on the machine.

A plurality of screen assemblies would be mounted along the length of the vibratory screening machine. Each screen assembly would span the width of the screening machine, extending most of the way between the first side member 312*a* and the second side member 312*b*. A plurality of compression assemblies 322 that are used to secure the screen assemblies of the screening machine are mounted along the length of the screening machine. In some embodiments, compression assemblies 322 are mounted on the outside of both of the first and second side members 312*a*, 312*b*. In other embodiments, compression assemblies 322 may be mounted on the outside of only one of the first and second side members 312*a*, 312*b*. Aspects of these two different configurations are discussed below.

Each compression assembly includes a compression piston 240 that extends through the side member 312*a*/312*b* to which the compression assembly is mounted. A compression assembly 322 is capable of causing the compression piston 240 to extend inwards toward the center of the screen machine and to retract backwards away from the center of the screening machine.

Figure 4E:
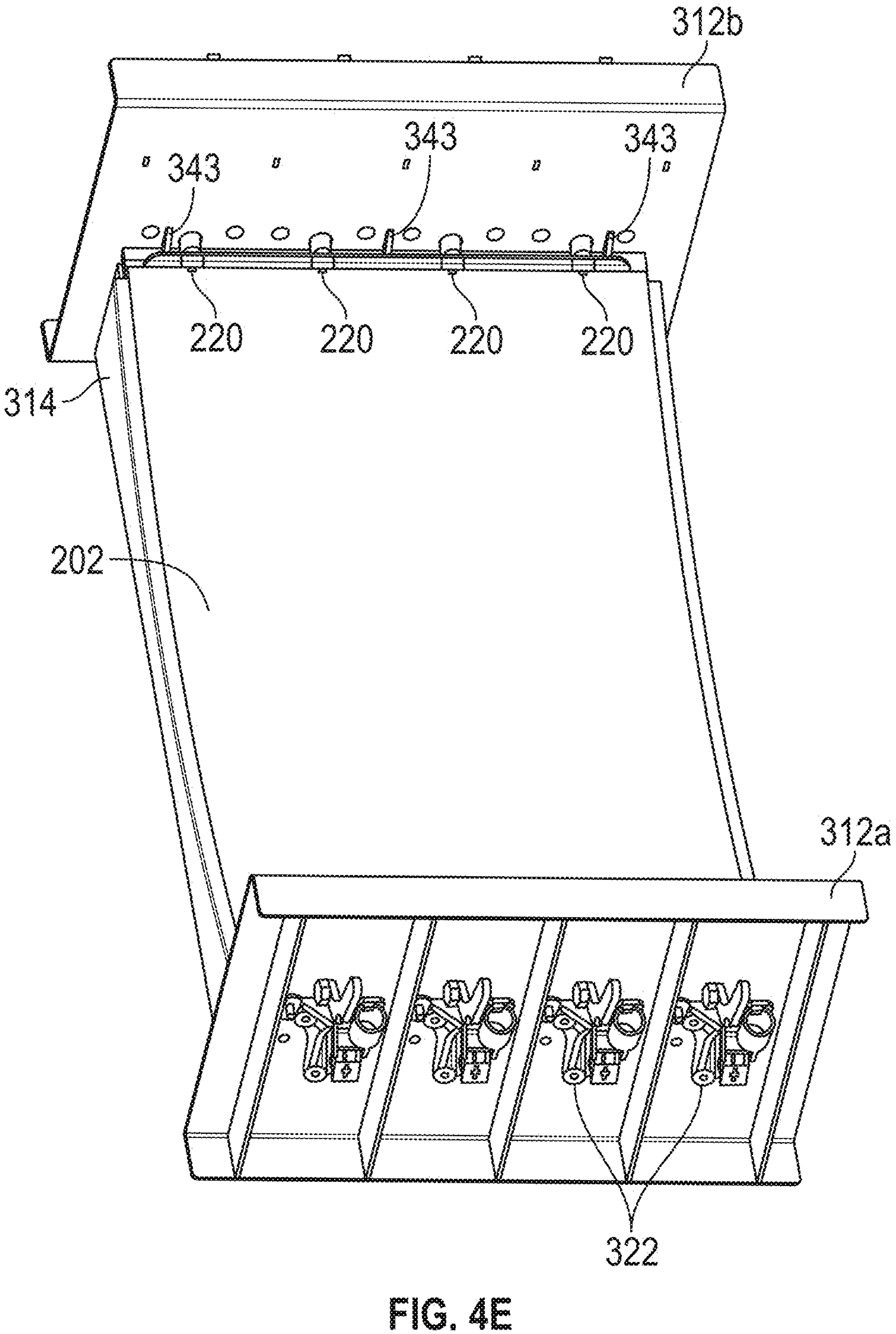
FIG. 4E is a perspective view of a portion of a single-trough vibratory screening machine like the one illustrated in FIG. 4A with a support plate of a screen assembly resting therein.
Figure 4F:
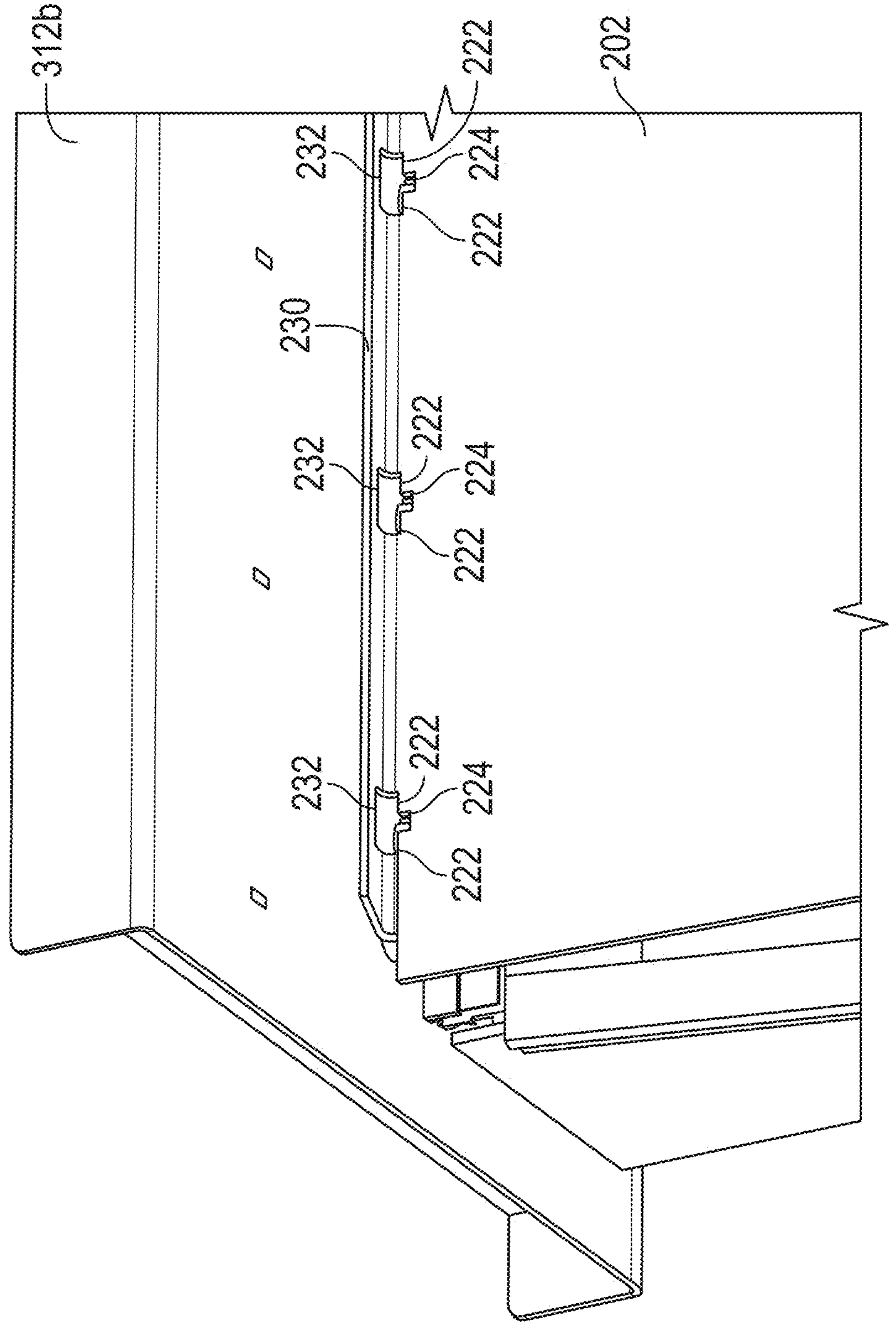
FIG. 4F is an enlarged perspective view of a portion of a single-trough vibratory screening machine like the one shown in FIG. 4A with a support plate of a screen assembly resting therein.

FIGS. 4E and 4F illustrate only one section of the larger vibratory screening machine depicted in FIGS. 4A-4D. FIGS. 4E and 4F help to illustrate how a screen assembly would be mounted to the vibratory screening machine. In FIG. 4A, a support plate 202 of a screen assembly is shown after it has been lowered down onto the concave support surfaces. Note, a full screen assembly would include a screening surface attached to the top of the support plate 202. The screening surface has been removed so that only the support plate 202 remains to help aid in an explanation of how the screen assembly is mounted to the vibratory screening machine. In addition, no flow through apertures 210 are shown in the support plate 202.

As is apparent in FIG. 4E, the side edges of the support plate 202 align with four compression assemblies 322 on the sidewalls 312*a*, 312*b* of the screening machine. As a result, each of the four compression assemblies on each sidewall will cause compression pistons to extend inward toward the center of the screening machine to mount and secure the support plate 202 of the screen assembly to the screening machine. The four compression pistons will interact with corresponding mounting apertures 220 of the support plate (as depicted in FIG. 3).

FIG. 4F is an enlarged view that provide greater detail of the support plate 202. As can be seen in FIG. 4F, in this embodiment, upwardly extending flanges 230 are provided on the side edges of the support plate 202. However, access apertures 232 that coincide with the mounting apertures 220 of the support plate 202 are provided in the upwardly extending flange 230. The access apertures 232 allow the compression pistons of compression assemblies 322 to advance inward such that they can bear directly against the compression surfaces 222 of the mounting apertures 220, as will be explained in greater detail below. As a result, the compression pistons of the compression assemblies 322 do not bear against the upwardly extending flange 230 as in the mechanism depicted in FIGS. 2A-C. FIG. 4F illustrates the support plate 202 in an interim position before it is pushed downward into registration with the compression pistons of the compression assemblies 322 during a mounting operation.

Figure 5A:
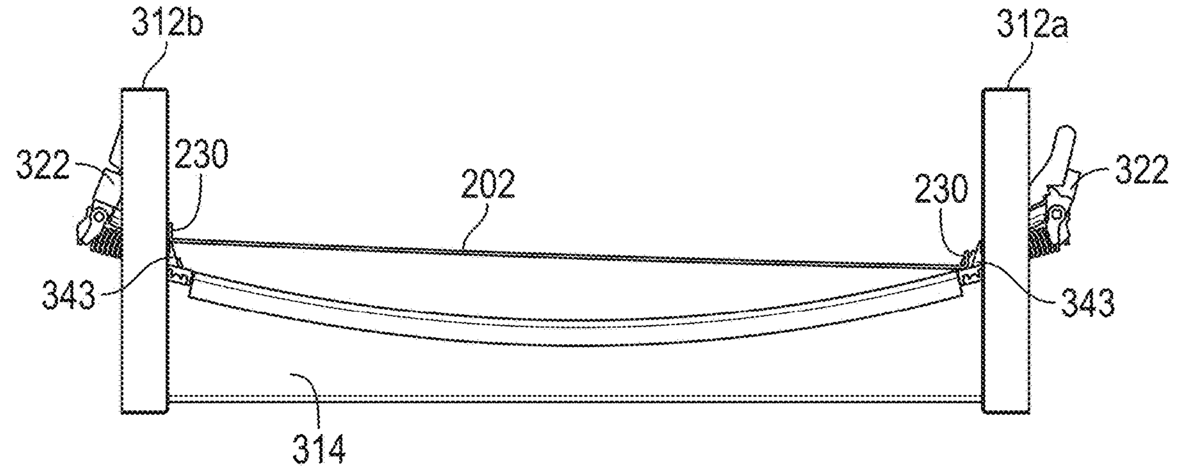
FIGS. 5A-5C illustrates steps of a process of mounting a support plate of a screen assembly to a single-trough vibratory screening machine, in an embodiment.
Figure 5B:
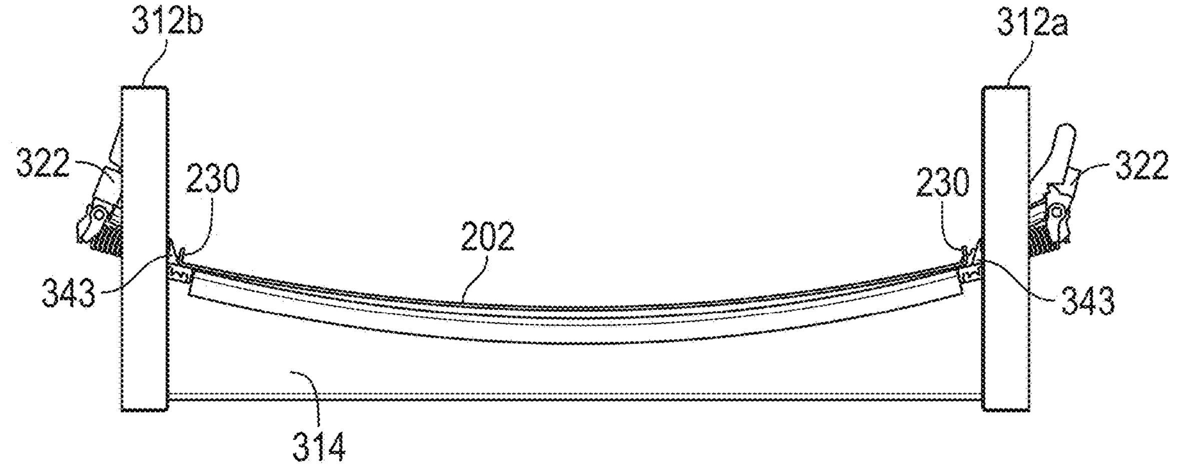
Figure 5C:
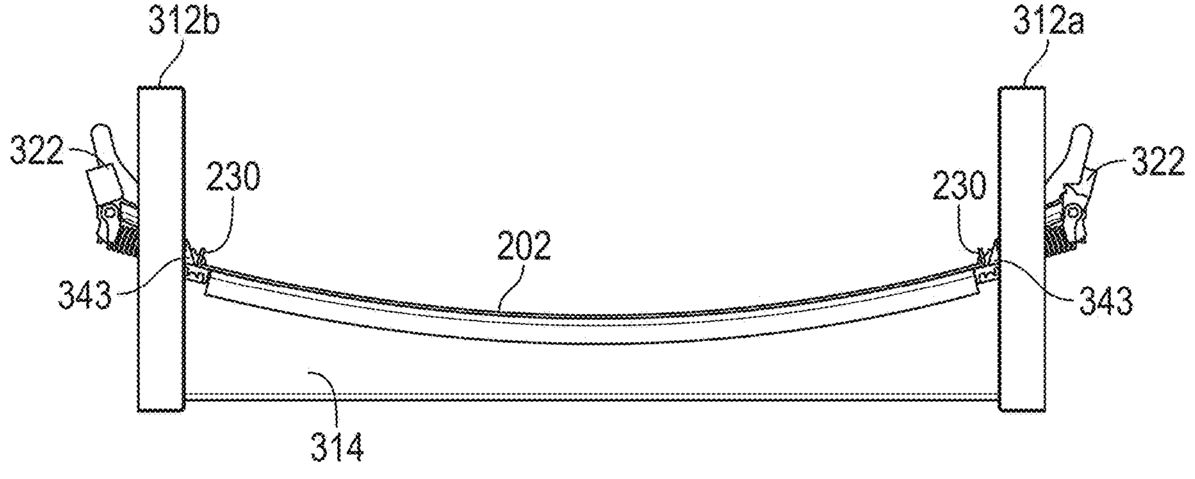

FIGS. 5A-5C illustrate a screen assembly mounting operation. To help illustrate the mounting operation, only the support plate 202 of a screen assembly is illustrated in FIGS. 5A-5B. It is to be understood that an actual screen assembly would include a screening surface fixed to the top of the support plate 202.

Triangular shaped mounting ramps 343, which can be seen in FIG. 4E and FIGS. 5A-5C are provided on the sidewalls 312*a*, 312*b* of the vibratory screening machine. When a screen assembly is mounted on the vibratory screening machine, the mounting ramps bear 343 against the exterior of upwardly extending flanges 230 on the side edges of the support plate 220, when such upwardly extending flanges 230 are provided. If no upwardly extending flanges 230 are provided on the support plate 202, then the mounting ramps 343 simply bear against the side edges 206, 208 of the support plate 202. The mounting ramps 343 serve to push the sides 206, 208 of the support plate inward so that the mounting apertures 220 are positioned inward of the ends of the compression pistons of the compression assemblies 322. The inward movement of the side edges of the support plate 202 caused by the mounting ramps 343 also results in the support plate 202 flexing into a concave shape. Once the support plate 202 has assumed a concave shape, it can be easier for the compression pistons to cause further flexing of the support plate 202 to press the support plate 202 into the mounted position. Pre-flexing of the support plate 202 also ensures that when the compression pistons engage the side edges of the support plate the support plate will continue to flex in the concave direction. In other words, pre-flexing the support plate 202 into a concave shape eliminates the possibility of the compression pistons causing the support plate to bend into a convex shape where the center of the support plate moves away from the vibratory screening machine.

Figure 7A:
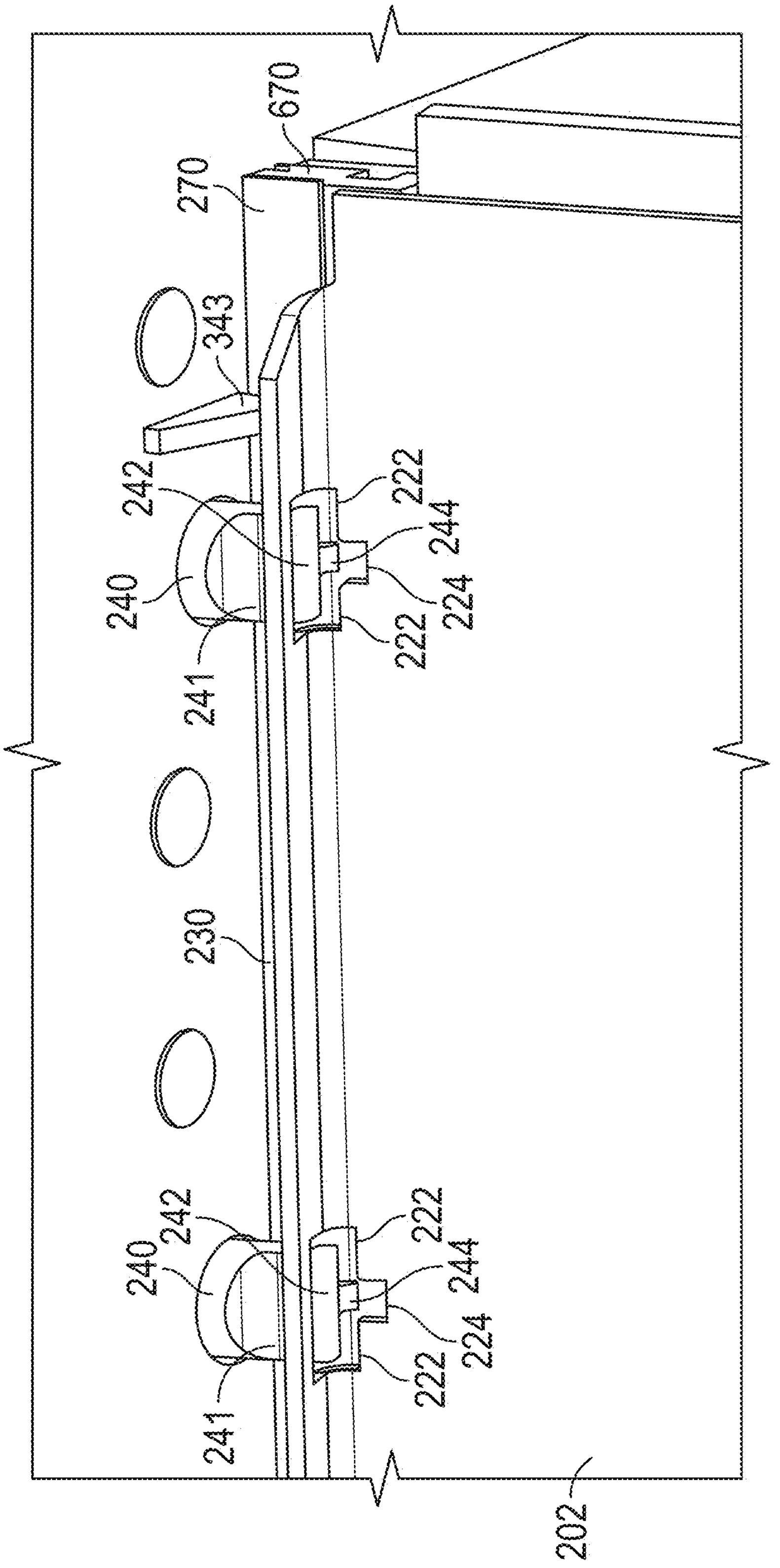
FIG. 7A is a perspective view illustrating a support plate of a screen assembly resting in a bed of a vibratory screening machine while the compression pistons of the mounting assembly are in a retracted position.

The mounting operation begins as illustrated in FIG. 5A, where the right side edge of the support plate 202 has been lowered down over the compression pistons of the compression assemblies 322 located in the first sidewall 312*a* of the vibratory screening machine. FIG. 7A is a partial perspective view of what a corner of the right side of the support plate 202 would look like when the support plate 202 is positioned as illustrated in FIG. 5A. As shown in FIG. 7A, the mounting ramps 343 bearing against the exterior surface of an upwardly extending flange 230 on the side edge of the support plate 202 have pushed the side edge of the support plate 202 inward so that the support plate 202 can be lowered into a position where the mounting apertures 220 are aligned with and in registration with the compression pistons 240 of the compression assemblies 322.

As illustrated in FIG. 5B, the left side of the screen assembly is then pushed down so that the left edge of the support plate 202 also is lowered down such that the mounting apertures 220 on the left side of the support plate 202 are aligned with and in registration with the compression pistons 240 of the compression assemblies 322 on the left sidewall 312*b* of the vibratory screening machine. This involves causing the upwardly extending flange 230 on the left side edge of the support plate 202 to ride down the mounting ramps 343 on the left sidewall 312*b* of the vibratory screening machine. As a result, the support plate 202 changes from a substantially planer shape as illustrated in FIG. 5A to a curved shape as illustrated in FIG. 5B.

FIGS. 5A and 5B show the right side of the support plate 202 being lowered into position, as illustrated in FIG. 5A, followed by the left side of the support plate 202 being lowered into position, as illustrated in FIG. 5B. However, the order in which the two sides are lowered could be switched. Thus, the foregoing description should not be considered limiting.

Figure 7B:
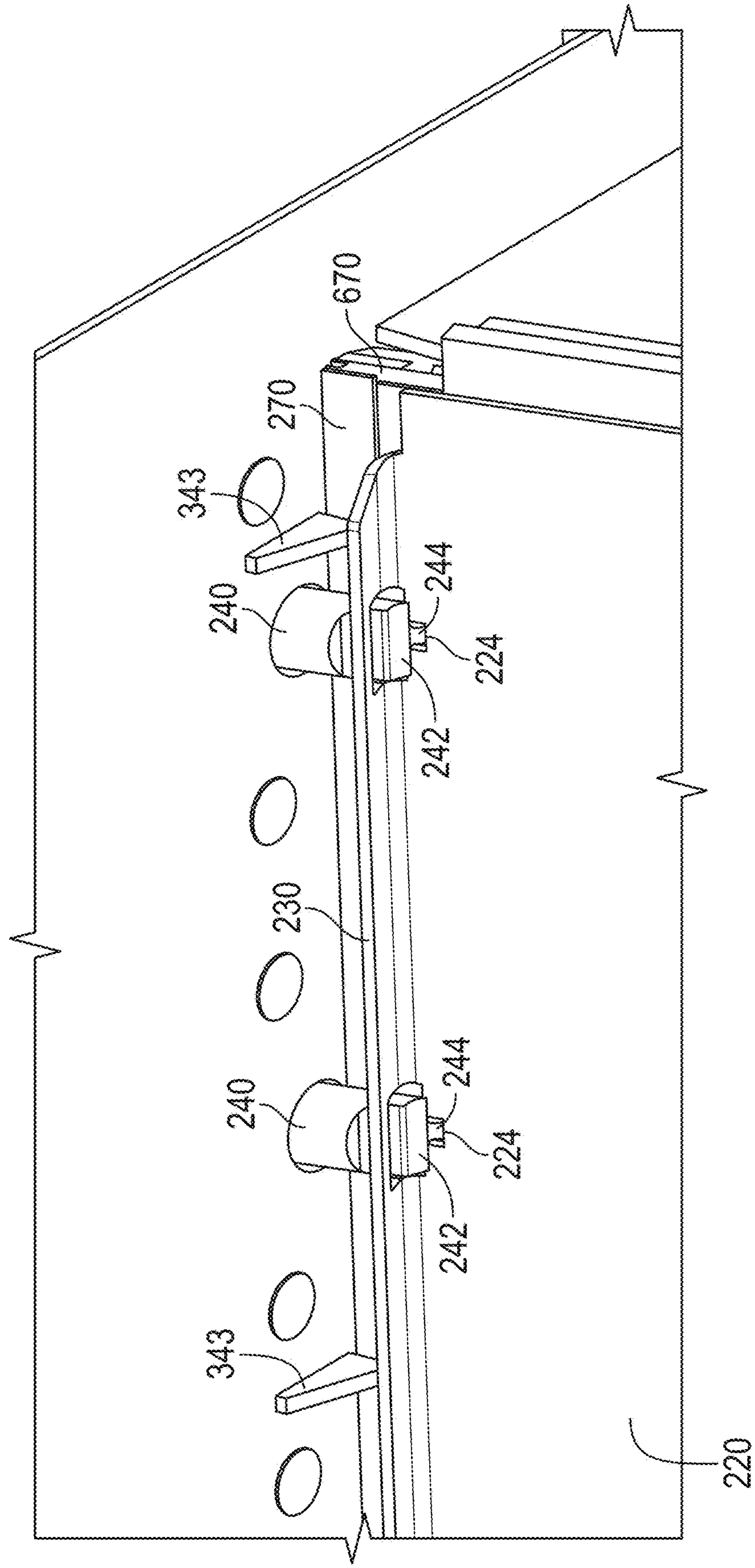
FIG. 7B is a perspective view illustrating a support plate of a screen assembly resting in a bed of a vibratory screening machine when the compression pistons of the mounting assembly are in an extended position.

In the final mounting step, the compression pistons 240 of the compression assemblies 322 are moved inward. Inward movement of the compression pistons 240 brings compression surfaces 246 of the compression pistons 240 into engagement with the compression surfaces 222 of the mounting apertures 220 on the support plate 202. Further inward movement of the compression pistons 240 applies a force to the compression surfaces 222 of the mounting apertures 220 that causes the support plate 202 to further bend and to be pushed into engagement with the underlying concave support surface 314 of the vibratory screening machine, as illustrated in FIG. 5C. FIG. 7B illustrates the compression pistons 240 after they have moved inward and been brought into engagement with the compression surfaces 222 of the mounting apertures 220 on the support plate 202. FIG. 7B also illustrates that an alignment finger 244 on the end of each compression piston 240 moves into the alignment slot 224 of a corresponding mounting aperture 220 on the support plate 202.

Figure 6A:
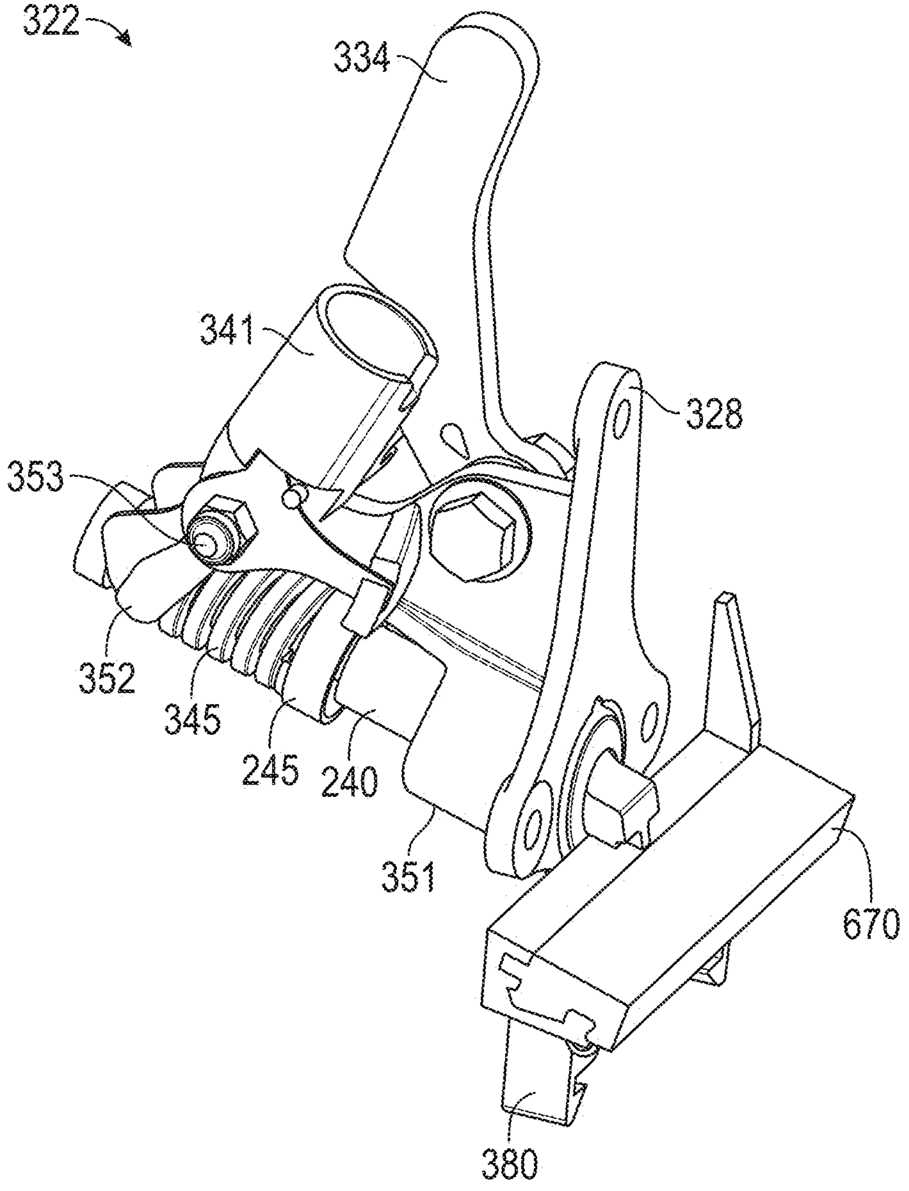
FIG. 6A is a perspective view of an embodiment of a compression mounting assembly.

FIG. 6A illustrates a perspective view of some elements of one embodiment of a compression assembly 322 that is used to mount a screen assembly to a vibratory screening machine. Also shown in FIG. 6A are portions of the underlying support structure of the vibratory screening machine that support side edges of a screen assembly.

The compression assembly 322 includes a compression piston 240 that is slidably mounted in a housing 351. A pivoting arm 352 attached to a sleeve 341 is pivotally mounted to the housing 351 via an axle bolt 353. A spring 345 surrounds the rear portion of the compression piston 240 and is trapped between the pivoting arm 352 and a shoulder 245 on the compression piston 240.

The housing 351 includes a mounting bracket 328 that is configured to bolt to a sidewall of a vibratory screening machine, as illustrated in FIGS. 4A-4D. The sidewall of the vibratory screening machine is not shown in FIG. 6 so that the elements of the compression assembly 322 can be clearly depicted.

The end of the compression piston is configured to protrude through the sidewall (not shown) of the vibratory screening machine and to extend over top of a gasket 670 that is mounted on a bed support 380. This allows the end of the compression piston 240 to bear against a mounting aperture on a side edge of a support plate of a screen assembly. The side edge of the support plate of the screen assembly would rest on the gasket 670. One of the functions of the compression assembly 322 is to press the support plate of the screen assembly against the top surface of the gasket 670 so that a seal is formed between the bottom surface of the support plate and the top surface of the gasket 670.

To actuate the compression assembly 322, one would insert a bar into the sleeve 341 and cause the sleeve 341 and the attached pivoting arm 352 to pivot around the axle bolt 353. This causes the rear end of the spring 245 to move inward, which in turn causes the front end of the spring 245 to apply an inward force to a shoulder 245 of the compression piston 240, urging the compression piston inward. This results in the end of the compression piston 240 bearing against a mounting aperture of a support plate of a screen assembly, as described in more detail below, and applying a compressive force to the support plate. Once the pivoting arm 352 and sleeve 341 have been rotated a sufficient amount around the axle bolt 353, a locking lever 334 can be rotated downward to rest in a latching groove on the pivoting arm 352 to prevent the pivoting arm 352 from reverse rotating and releasing the pressure applied to the compression piston 240. This arrangement results in the end of the compression piston 240 applying a compressive force to the support plate. However, the end of the compression piston 240 can come to rest at a variety of different positions relative to the housing 351, and the sidewall to which the housing 351 is attached.

The pivoting arm 352 applies a force to the rear end of the spring 345. The front end of the spring 345 applies a force to the collar 245 of the compression piston 240.

Figure 6B:
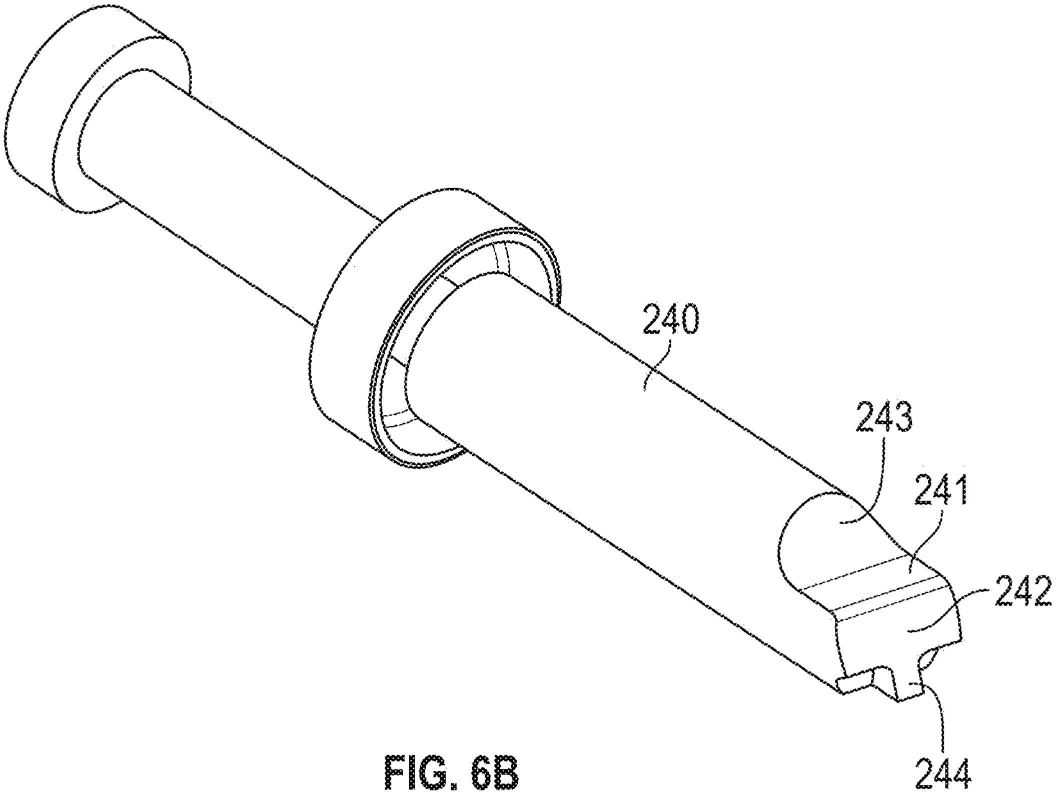
FIG. 6B is a top perspective view of one embodiment of a compression piston of the compression mounting assembly depicted in FIG. 6A.
Figure 6C:
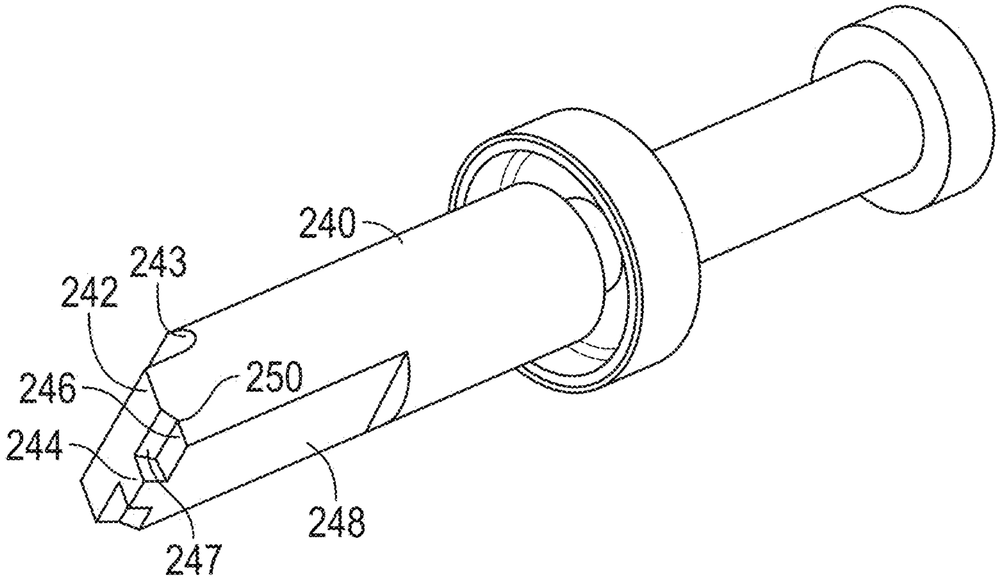
FIG. 6C is a bottom perspective view of the compression piston illustrated in FIG. 6A.

FIG. 6B is a top perspective view of one embodiment of a compression piston 240. FIG. 6C is a bottom perspective view of the compression piston 240. As shown in these figures, a sloped upper surface 243 on the top of the compression piston 240 leads to a flat top surface 241. The flat top surface 241 terminates at the end face 242 of the compression piston 240, which is angled with respect to the longitudinal centerline of the compression piston 240.

A flat bottom surface 248 is provided on the bottom surface of the compression piston 240, as illustrated in FIG. 6C. Two portions of material are removed from the bottom of the end face 242 to form a central alignment finger 244. Each of the removed portions on either side of the alignment finger 244 includes a side compression surface 246 and an upper compression surface 247 that meet at a compression corner 250. In some embodiments, the side compression surfaces 246 do not form a perpendicular angle with respect to the central longitudinal axis of the compression piston 240, and instead slope downward and forward to an end of the compression piston. Likewise, in some embodiments the upper compression surfaces 247 are not parallel to the longitudinal centerline of the compression piston 240. As a result, the angle formed at the compression corner 250 may be an obtuse angle.

When the end of a compression piston 240 is brought into engagement with a mounting aperture 220 on a side edge of a support plate 202 of a screen assembly, the alignment finger 244 extends into the alignment slot 224 of the mounting aperture 220. The compression surfaces 222 of the mounting aperture 240 may initially contact the side compression surfaces 246 or the upper compression surfaces 247. As the compression piston 240 continues to move inward, the compression surfaces 222 of the mounting apertures 220 will ride along whatever surface they initially engage until the compression surfaces 222 are resting in the compression corner 250. Further inward movement of the compression piston 240 then causes the support plate to bend into a concave shape and be pushed into engagement with the underlying support structures on the vibratory screening machine.

By trapping the compression surfaces of the mounting apertures 220 of the support plate 202 in the compression corners 250 on the ends of the compression piston 240 it is possible to apply a compressive force to the mounting aperture 220 that includes both a horizontal inward component and a vertical downward component. If the compression piston 240 is mounted on the sidewall 312 of the vibratory screening machine such that its central longitudinal axis is angled downward and inward relative to the support plate 202, inward movement of the compression piston 240 generates a downward component to the compressive force. However, even if the compression piston were mounted such that it moves horizontally inward, the angled upper compression surfaces 247 on the end of the compression piston would still generate a downward component to the compressive force. As mentioned above, this vertical downward force pushes the support plate 202 into engagement with the underlying sealing gasket 670 on the vibratory screening machine. This vertical downward force also serves to keep the screen assembly firmly attached to the vibratory screening machine during screening operations when the screen assembly is subjected to significant acceleration forces.

Moreover, the upper compression surfaces 247 on the compression piston 240 acting on the upper edges of the compression surfaces 222 of the mounting apertures 220 prevent the side edges of the support plate 202 from moving upward relative to the vibratory screening machine. This ensures that the side edges 206, 208 of the support plate remain in engagement with the underlying sealing gaskets 670 on the vibratory screening machine, regardless of how much vibration or acceleration forces are applied to the support plate 202.

The inward movement of the compression piston 240 also exerts a compression force on the compression surfaces 222 of a mounting aperture 220 that includes a significant horizontal inward component. This inward compression force causes the support plate 202 to bend into a concave shape. As a result, the bottom surface of the support plate 202 is pressed into engagement with the concave support elements on the vibratory screening machine. Because the inward compressive force is oriented substantially in the plane of the support plate 202 at the side edges, the inward compressive force also does not tend to cause the side edges 206, 208 of the support plate 202 to rotate upward away from the underlying sealing gaskets 270. This is one of the problems with prior art compression mounting mechanisms where the compressive force is applied to an upwardly extending flange located on the side of the support plate 202.

In the prior compression mounting schemes, where a compressive force is applied to an upwardly extending flange, the upwardly extending flanges on the side edges of the support plate of the screen assembly did not include any apertures. As a result, when material to be screened ended up behind the flange—basically between the exterior surface of the flange and the sidewall of the screening machine—it was not possible for that material to re-enter the screening area.

In contrast, with the design described above, where access apertures 232 are provided in the flanges 230, any material that has ended up between the exterior side of the flange and the sidewall of the screening machine can pass through the access apertures 232 and re-enter the screening area. In addition, in some embodiments the upwardly extending flange 230 does not extend the full length of the support plate or the screen assembly. This means that are locations at the front and rear edges of the upwardly extending flange 230 where material that has become trapped behind the upwardly extending flange 230 can re-enter the screening area. An example of this can be seen in FIG. 7A, where the upwardly extending flange 230 does not extend the full length of the side edge of the support plate 202, stopping short of the front edge of the support plate 202. These design features help to ensure that substantially all of the materials deposited onto the screen assemblies are screened, and it helps to prevent a buildup of material between the flange 230 and the sidewall of the screening machine.

FIGS. 7A and 7B show one side edge of a support plate 202 of a screen assembly resting against a sealing gasket 670 that is itself mounted on the sidewall of a vibratory screening machine via a gasket mount 270 As explained above, compression pistons 240 apply compression forces to mounting apertures on the side edges of the support plate 202. The compression forces can include both a horizontal inward component and a vertical downward component. The vertical downward component pushes the bottom surface of the support plate 202 into engagement with the top surfaces of the sealing gaskets 670. This helps to prevent any material being screened from traveling around the side edges of the screening assembly and bypassing the screening assembly to contaminate the materials that have passed through the screen assembly.

FIG. 7A illustrates a condition where the compression pistons 240 are in a retracted state such that the support plate 202 can be lowered into place on the vibratory screening machine, with the side edges of the support plate 202 resting on the sealing gasket 670. Note, triangular shaped mounting ramps 343 on the sidewall of the vibratory screening machine will push the side edge of the support plate 202 inward as the support plate 202 is lowered into position.

FIG. 7B illustrates a condition where the compression pistons 240 have moved inward to apply a compression force to the mounting apertures on the side edge of the support plate 202. Alignment fingers 244 on the ends of the compression pistons 240 protrude into corresponding alignment grooves 224 on the mounting apertures.

Figure 8A:
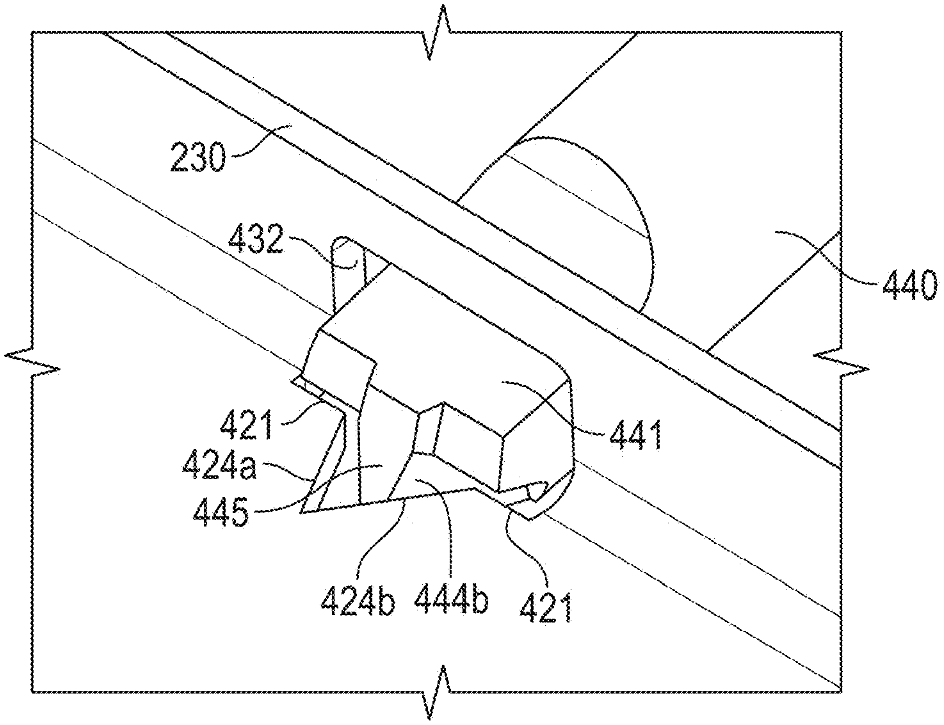
FIG. 8A is a top perspective view illustrating another embodiment of a compression piston and a corresponding mounting aperture of a support plate.
Figure 8B:
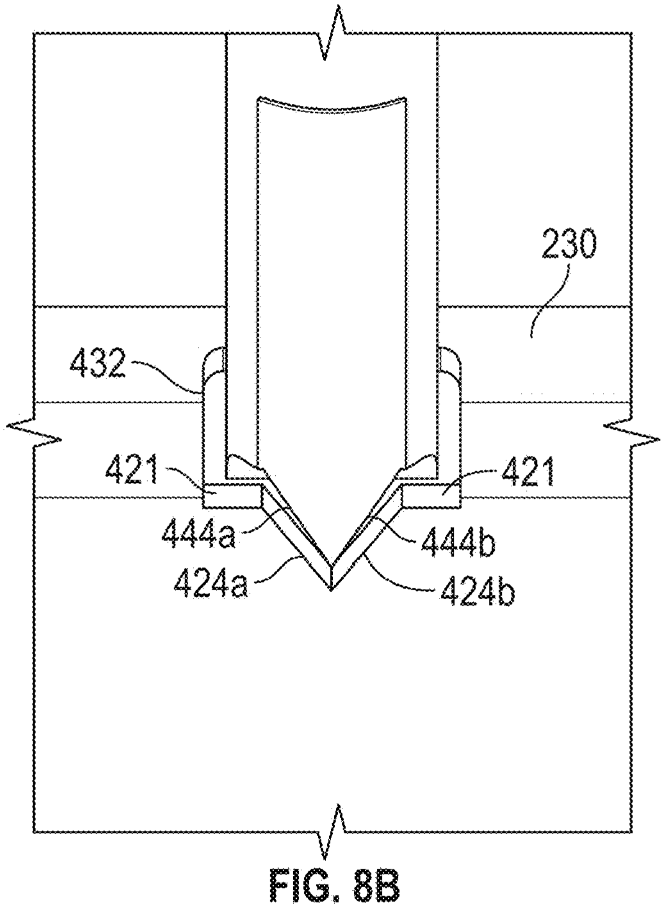
FIG. 8B is a bottom view of the compression piston and mounting aperture illustrated in FIG. 8A.

FIGS. 8A and 8B illustrate an alternate embodiment of a compression piston 440 and the corresponding mounting aperture of a support plate. In this embodiment, the compression piston 440 includes a triangular shaped alignment finger that includes a first angled side surface **444*a* and a second angled side surface 444*b* that extends from the end face 445. The mounting aperture in the support plate includes a triangular shaped alignment slot formed from first and second angled side edges 424*a*, 424*b*. When the compression piston 440** moves inward, the triangular shaped alignment finger is received in the triangular shaped alignment slot.

The remainder of the structure of the compression piston 440 and the mounting aperture are quite similar to the foregoing examples. The mounting aperture on the support plate includes two compression surfaces 421 on opposite sides of the triangular shaped alignment slot. Compression surfaces on the end of the compression piston 440 bear against the compression surfaces 421 on the mounting aperture to secure the screen assembly to the vibratory screening machine. The access aperture 432 on the upwardly extending side flange 230 is similar in nature to the access apertures of the foregoing embodiments.

Figure 8C:
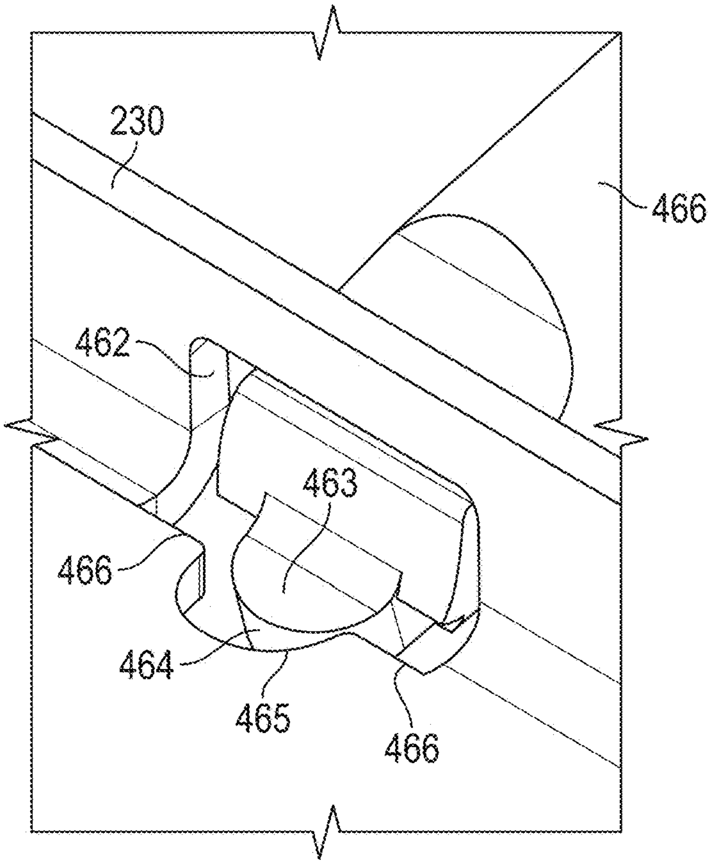
FIG. 8C is a top perspective view of another embodiment of a compression piston and a corresponding mounting aperture of a support plate.
Figure 8D:
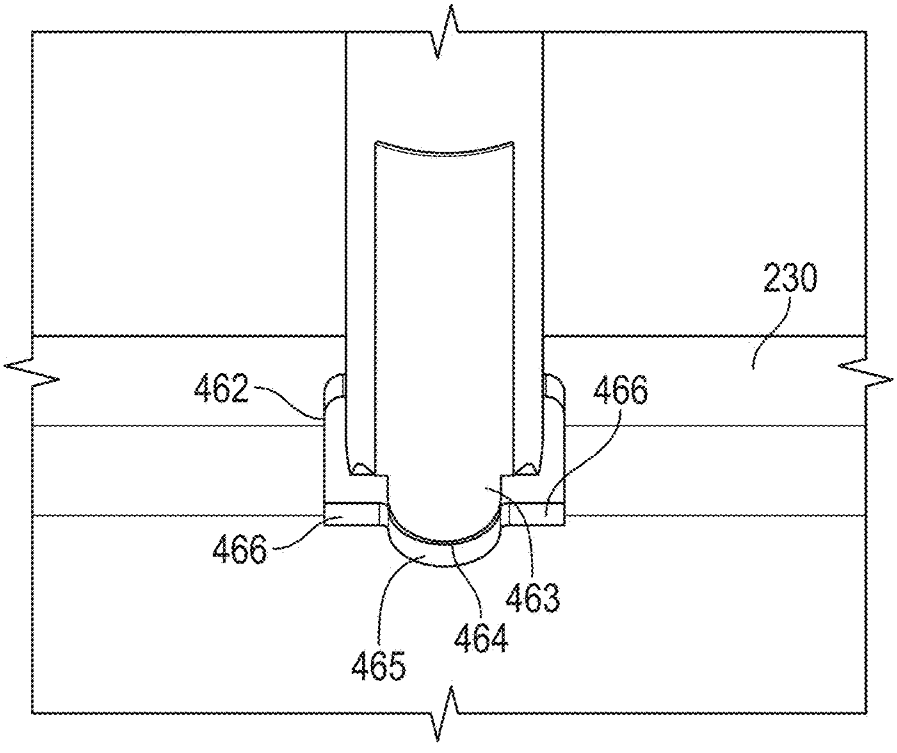
FIG. 8D is a bottom view of the compression piston and mounting aperture illustrated in FIG. 8C.

FIGS. 8C and 8D illustrate another embodiment of a compression piston 460 and a corresponding mounting aperture on a support plate of a screen assembly. In this embodiment, the compression piston 460 has a rounded alignment finger 463 on the distal end of the compression piston 460. An rounded engagement surface 464 on the rounded alignment finger 463 is received in and abuts a rounded alignment slot 465 of the mounting aperture.

The remainder of the structure of the compression piston 460 and the mounting aperture is quite similar to the foregoing examples. The mounting aperture on the support plate includes two compression surfaces 466 on opposite sides of the rounded alignment slot 465. Compression surfaces on the end of the compression piston 460 bear against the compression surfaces 466 on the mounting aperture to secure the screen assembly to the vibratory screening machine. The access aperture 462 on the upwardly extending side flange 230 is similar in nature to the access apertures of the foregoing embodiments.

Figure 8E:
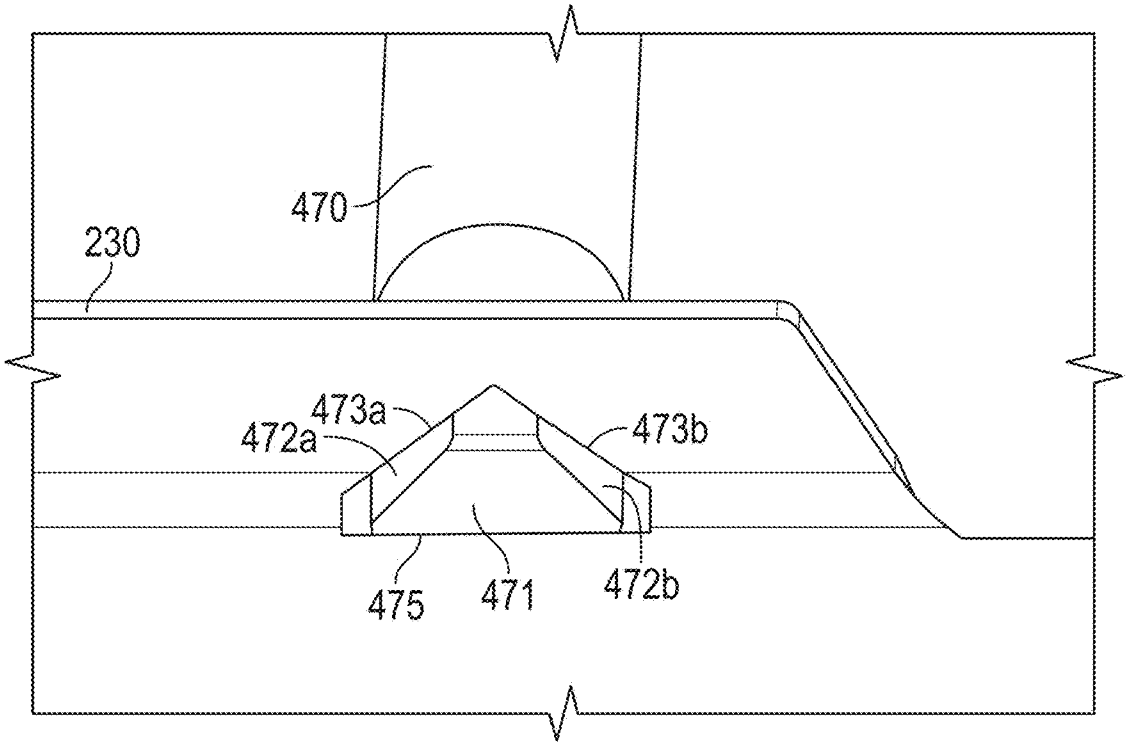
FIG. 8E is a top perspective view of another embodiment of a compression piston, a corresponding mounting aperture and an access aperture of a support plate.
Figure 8F:
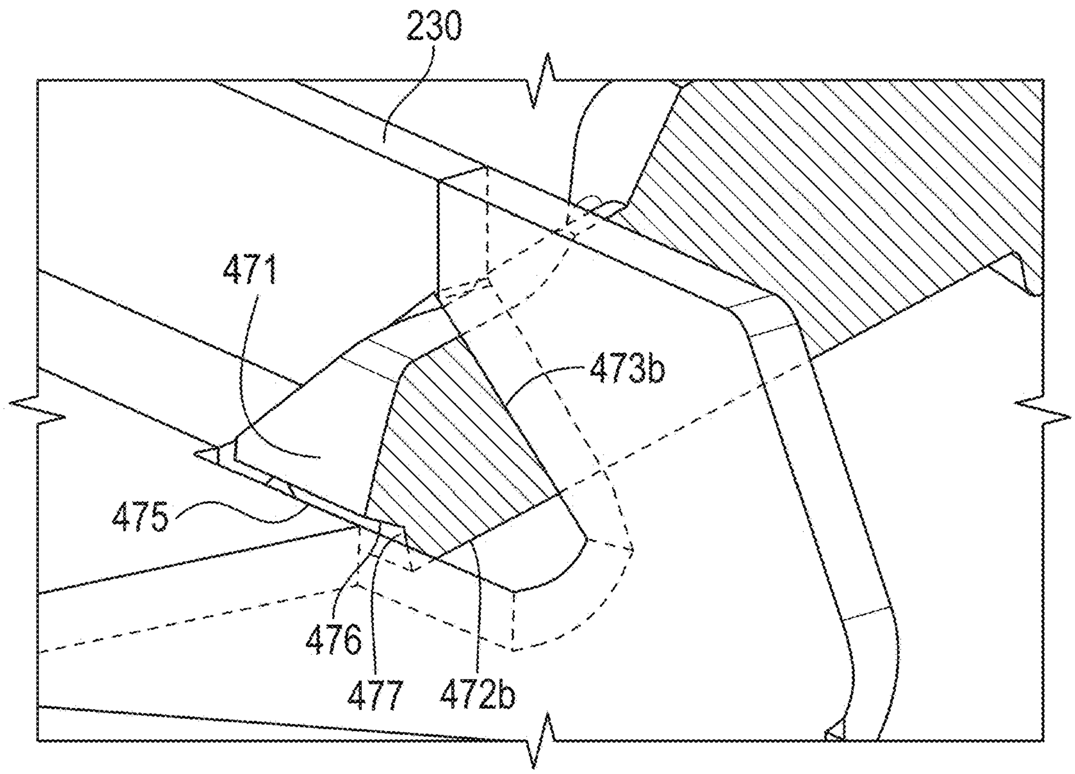
FIG. 8F is a side perspective view of the compression piston and mounting aperture illustrated in FIG. 8E.

FIGS. 8E and 8F illustrate another embodiment of a compression piston 470 and a mounting aperture of a support plate of a screen assembly. In this embodiment, the access aperture in the upwardly extending side flange 230 is formed by two angled side surfaces 473*a*, 473*b*. The portion of the compression piston that passes through the access aperture in the upwardly extending side flange 230 has a generally triangular shaped cross-section. Angled side surfaces 472*a*, 472*b* on the end of the compression piston 470 generally mirror the shape and angles of the two angled side surfaces 473*a*, 473*b* of the access aperture in the upwardly extending flange 230. Interaction between the angled side surfaces 473*a*, 473*b* of the access aperture and the angled sides 472*a*, 472*b* of the compression piston 470 can provide an alignment function that results in the screen assembly being correctly positioned on the vibratory screening machine.

Because the alignment function can be provided as discussed above, the mounting aperture on the support plate of the screen assembly can include a single, straight compression surface 475. In other words, in some embodiments there is no need to form a separate alignment slot 224 in the mounting apertures 220 of the support plate 202. Corresponding compression surfaces 476, 477 on the end of the compression piston 470 bear against the single compression surface 475 of the mounting aperture to secure the screen assembly to a vibratory screening machine.

Figure 8G:
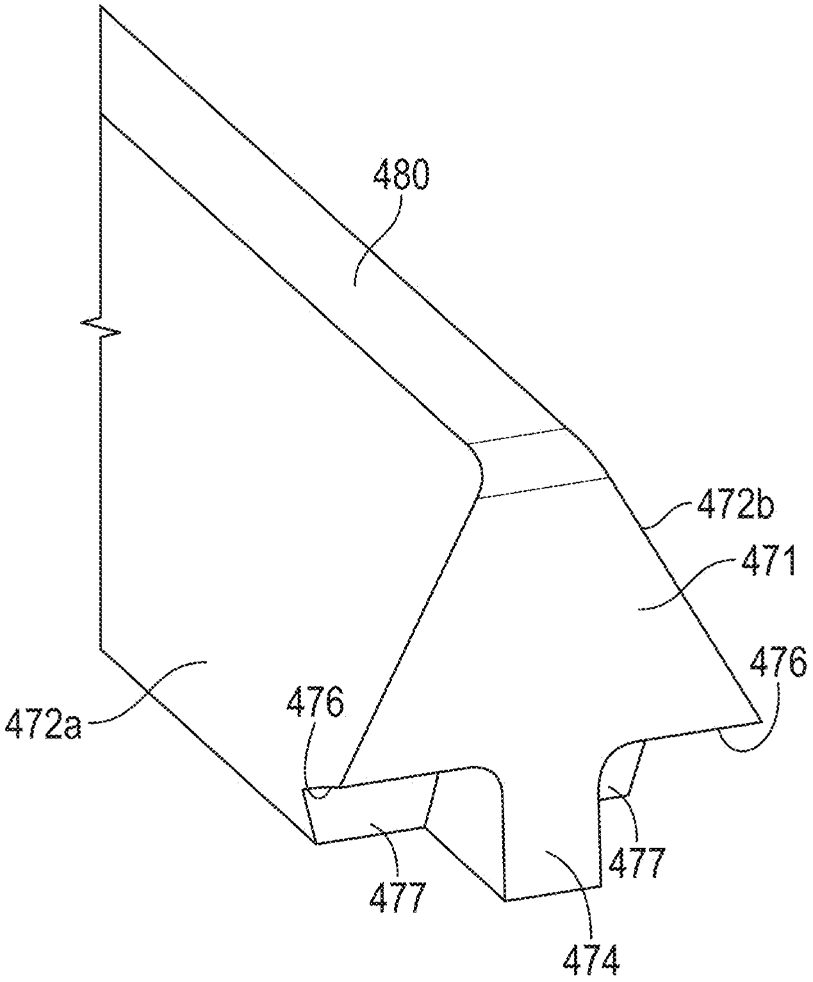
FIG. 8G is a perspective view of the end of a compression piston similar to the one illustrated in FIGS. 8E and 8F and which further includes an alignment finger on its distal end.

FIG. 8G shows the end of an alternate embodiment of a compression piston 480 having a triangular shaped profile similar to the one depicted in FIGS. 8E and 8F. In this embodiment, however, the end of the compression piston 480 includes an alignment finger 474. Compression surfaces 476, 477 are formed on both sides of the alignment finger 474. The alignment finger 474 is configured to be received in an alignment slot 224 of a mounting aperture 220 of a support plate 202 like the one shown in FIG. 3.

Figure 8H:
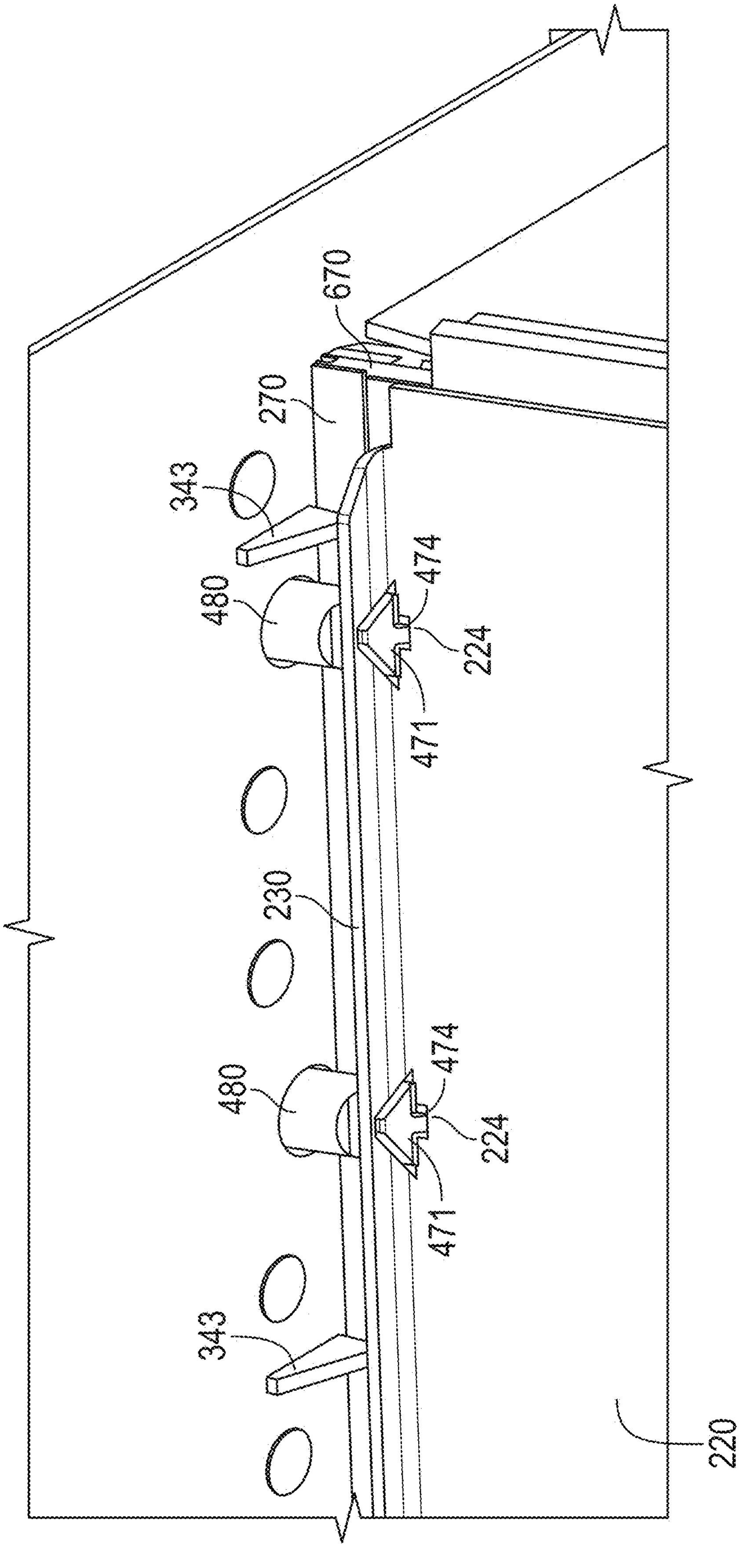
FIG. 8H a perspective view illustrating a portion of a support plate of a screen assembly resting in a bed of a vibratory screening machine when compression pistons similar to the one illustrated in FIG. 8G are used to mount the support plate to the vibratory screening machine.

FIG. 8H shows how a compression piston 480 as depicted in FIG. 8G would interface with a support plate to mount a screening assembly to a vibratory screening machine. As shown in FIG. 8H, each of the access apertures on the upwardly extending side flange 230 include two angled side surfaces. The compression pistons 480 with angled sides extend through the access apertures. The alignment fingers 474 on the ends of the compression pistons 480 are received in the alignment slots 224 of the mounting apertures on the support plate. The two compression surfaces on opposite sides of the alignment finger 474 bear against the compression surfaces of the mounting apertures to secure the support plate and the screen assembly to the vibratory screening machine.

In the embodiment depicted in FIG. 8H, the alignment function could be jointly performed by: (1) the angled sides 472*a*, 472*b* of the compression piston 480 interacting with the angled side surfaces 473*a*, 473*b* of the access apertures; and (2) engagement between the alignment finger 474 on the compression piston 480 and the alignment slot 224 of the mounting aperture on the support plate of the screen assembly.

In some embodiments, the access apertures on the upwardly extending side flange 230 could be configured to be large enough that there is some clearance between the angled side surfaces 473*a*, 473*b* of the access apertures and the angled sides 472*a*, 472*b* of the compression piston 480. However, even with considerable clearance, interaction between the compression pistons 480 and the access apertures would provide a gross alignment function that ensure that the screening assembly has been mounted in nearly the correct position on the vibratory screening machine. Then, as the compression pistons 480 are advanced inwards the engagement between the alignment fingers 474 on the compression pistons 480 and the alignment slots 224 on the support plate would provide a fine adjustment to the position on the screening assembly on the vibratory screening machine.

In prior art machines such as the one illustrated in FIGS. 2A-2C, where a compression piston bears against an upwardly extending flange on a side edge of a support plate of a screen assembly, it was possible for the screen assemblies to be mounted in the wrong positions on the vibratory screening machine with respect to the length direction or the material feed direction. Screens could also be skewed or slightly improperly rotated, which could result in some of the compression pistons applying little or no compression force to the upwardly extending flange, weakening the holding force. Further, when a screen assembly was mounted in a skewed or slightly rotated fashion, the screen assembly would not assume the proper concave shape and the bottom of the screen assembly was not likely to form an effective seal with underlying gaskets on the vibratory screening machine.

In contrast, with the mounting mechanisms discussed above and illustrated in FIGS. 3-8H, the way in which the ends of the compression pistons engage the mounting apertures on the side edges of the support plate ensure that the support plate, and thus the screen assembly, is properly located on the vibratory screening machine in the length direction or material feed direction. Also, the engagement between the ends of the compression pistons and the mounting apertures prevents a screen assembly from being mounted in a skewed or slightly rotated fashion and ensures that each compression piston actually applies the correct type of compression forces to the support plate. All of these factors help to ensure that a screen assembly is properly located on the vibratory screening machine and that the support plate of the screen assembly is securely pressed into engagement with underlying gaskets of the vibratory screening machine.

Also, in the prior art machines as illustrated in FIGS. 2A-2C, the engagement between the compression pistons and the upwardly extending flange could permanently deform the flange of a screen assembly. This can result in the holding force being applied by the compression piston being less than intended. Also, if a permanently deformed screen assembly is removed and later remounted on a vibratory screening machine, it would be difficult for a maintenance person to notice the deformation. As a result, the reinstalled the screen assembly will likely be held with less force than intended. In contrast, with the compression assemblies discussed above and illustrated in FIGS. 3-8H, no such permanent deformation is likely to ever occur.

Moreover, a screen assembly used with the mounting mechanisms discussed above and illustrated in FIGS. 3-8H do not require the upwardly extending flange that is required by prior art mounting systems like the one illustrated in FIGS. 2A-2C. This reduces costs of manufacture, speeds the assembly process and results in lighter screen assemblies, which can reduce shipping costs. Further, the lack of side flanges eliminates issues with materials being trapped behind the side flanges, making screening operations more effective.

In the vibratory screening machine embodiment depicted in FIGS. 4A-4D, the screening machine has a single trough with compression assemblies 322 located on both sidewalls of the screening machine. In this type of a screening machine, a single screen assembly spans the width of the screening area, and a single row of screen assemblies are arrayed down the length of the screening machine. This configuration can be advantageous because makes it possible to mount a screen assembly to such a screening machine using the compression assemblies 322 on only one side of the screening machine.

For example, the compression assemblies on a first side of the screening machine can be left in the locked position where the compression pistons are extended. The compression assemblies on the second side of the screening machine are opened so that the compression pistons on the second side of the screening machine are in the retracted position. A new screen assembly can then be mounted to the machine by pushing the first side of the screen assembly down into the bed of the screening machine such that the mounting apertures on the first side edge of the support plate of the screening assembly are pushed into engagement with the extended compression pistons on the first side of the screening machine. The second side of the screen assembly is then be pushed down into the bed of the screening machine. The compression assemblies on the second side of the screening machine are then actuated so that the compression pistons on the second side of the screening machine extend inward, which pushes the screening assembly into engagement with the concave support surfaces of the screening machine and secures the screen assembly to the screening machine.

With this type of a screening machine configuration, operators only need to access to one side of the screening machine to mount screen assemblies. And because compression assemblies are provided on both sides of the screening machine, operators can mount screen assemblies to the screening machine from either side of the screening machine. On the other hand, configuring a screening machine in this fashion means that compression assemblies must be provided on both sides of the screening machine, which increases the cost and complexity of the machine.

Instead of putting compression assemblies 322 on both sidewalls of the screening machine, the compression assemblies could be provided on only a first sidewall of the screening machine. The second sidewall could incorporate stationary abutment elements that have a configuration that matches the end of the compression pistons of the compression assemblies that are installed on the first sidewall. With this configuration, operators would mount screen assemblies from the first side of the screening machine where the compression assemblies are provided.

To mount a screen assembly on this type of machine, the screen assembly would be placed on the machine and the second side of the screen assembly would be pushed down into place such that the stationary abutment elements on a second sidewall of the screening machine are aligned with the mounting apertures 220 on a second side edge of the support plate 202 of the screen assembly. The first side of the screen assembly is then pushed down so that the mounting apertures 220 on the first side of the support plate 202 of the screen assembly are aligned with the ends of the movable compression pistons 240 of the compression assemblies 322 on the first sidewall of the screening machine. The compression assemblies 322 on the first sidewall of the screening machine are then actuated. Actuation of the compression assemblies on the first side of the screening machine causes the compression pistons to be pushed into engagement with the compression surfaces 222 of the mounting apertures 220 on the first side of the support plate 202. Further inward movement of the compression pistons also causes the compression surfaces 222 of the mounting apertures 220 on the second side of the support plate 202 to be pushed into engagement with the stationary abutment surfaces. Further advancement of the compression pistons will cause the support plate 202 to bend and to be pressed into engagement with the support surfaces of the screening machine.

The stationary abutment surfaces could be rigidly mounted to a sidewall of a screening machine. Alternatively, the stationary abutment surfaces could be configured to provide some degree of compliance. When a stationary abutment surface provides a degree of compliance, the element that mimics the end of a movable compression piston is capable of moving elastically relative to the sidewall of the vibratory screening machine. As example of a stationary abutment element that provide compliance is illustrated in FIGS. 9A and 9B.

Figure 9A:
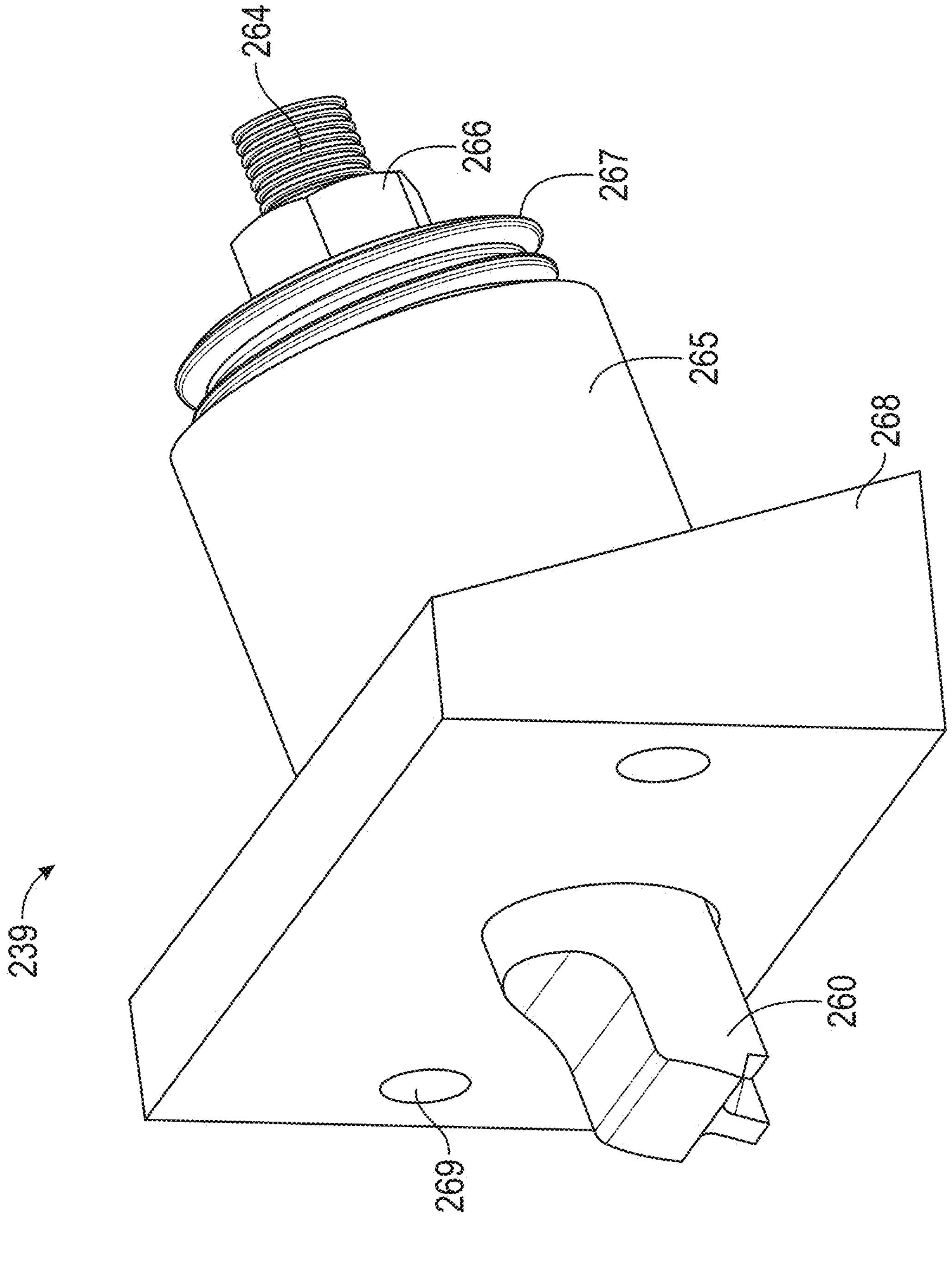
FIG. 9A is a perspective view of a stationary compression piston assembly.

FIG. 9A illustrates a stationary compression piston assembly 239 that can be mounted on an exterior of a sidewall of a vibratory screening machine. Bolt holes 269 in the housing 268 of the stationary compression piston assembly 239 can be used to attach the assembly to a sidewall of a vibratory screening machine. The stationary compression piston assembly 239 includes an elastically mounted compression piston 260 that extends through a circular bore of a housing 268. When the stationary compression piston assembly 239 is mounted on the exterior of the sidewall of a vibratory screening machine, the end of the compression piston 260 would extend though an aperture in the sidewall into the interior of the vibratory screening machine.

Figure 9B:
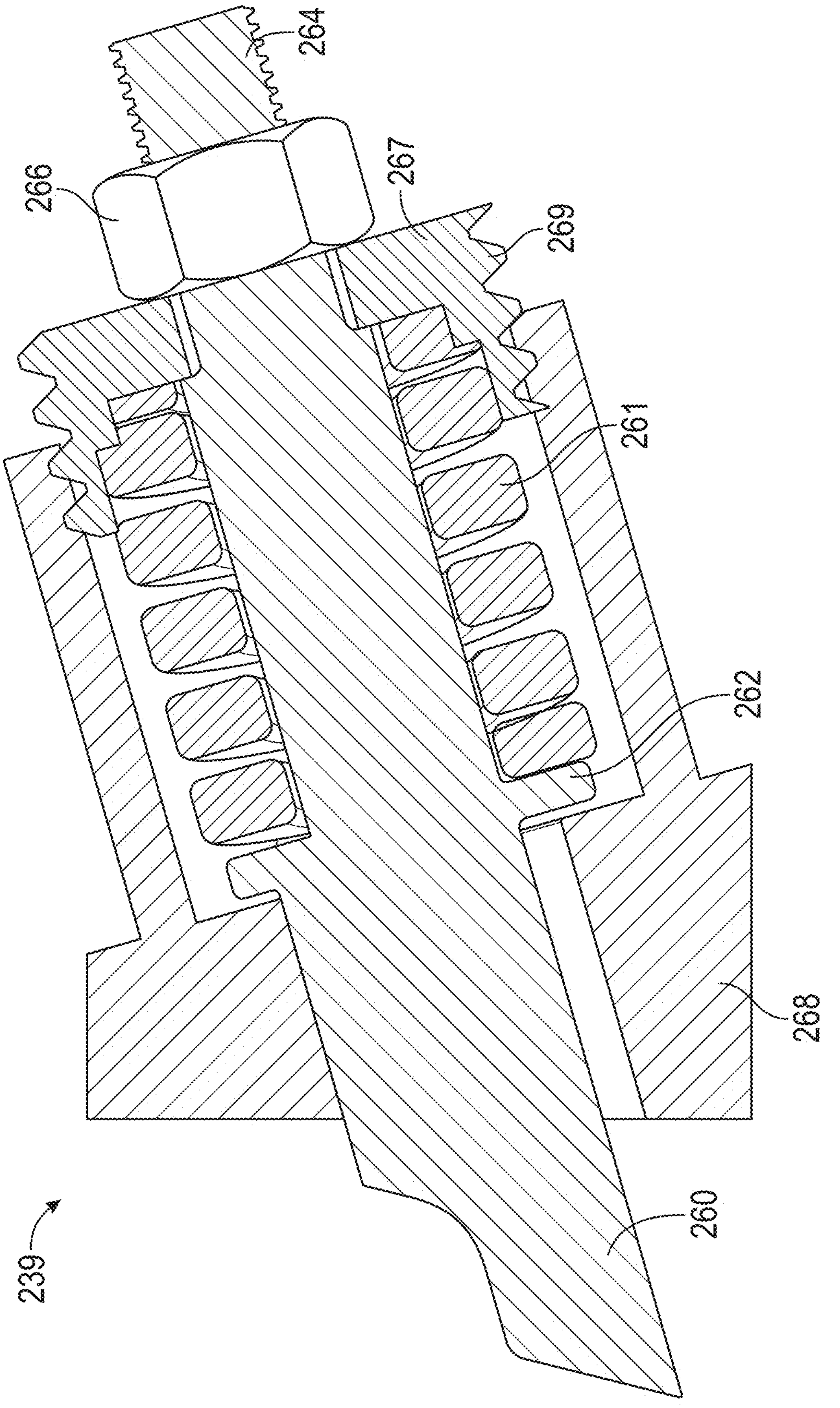
FIG. 9B is a cross-sectional view of the stationary compression piston assembly illustrated in FIG. 9A.

As shown in FIG. 9B, a compression spring 261 is mounted around the rear portion of the compression piston 260. A first end of the spring 261 bears against a collar 262 of the compression piston. The second, opposite end of the spring bears against a flange assembly 267. The flange assembly 267 includes external threads 269 that engage with internal threads on an interior bore of a cylindrical portion 265 of the housing 268. This traps the compression spring 261 inside the cylindrical portion 265 of the housing.

The compression piston 260 can slide inward into the housing 268, which causes the spring 261 to be compressed. Depending on how the stationary compression piston assembly 239 is adjusted, when no force is acting on the end of the compression piston 260 the compression spring 261 acting on the collar 262 can push the compression piston 260 outward until the collar 262 is resting against the end of the cylindrical portion 265 of the housing 268.

A nut 266 is screwed onto a threaded rear end of the compression piston 260. The nut 266 can be turned to adjust the position of the compression piston 260 in the housing 268. As a result, when no forces are applied to the end of the compression piston 260, the collar 262 may be spaced away from the end of the cylindrical portion 265 of the housing.

A single trough vibratory screening machine like the one illustrated in FIGS. 4A-4D can include a plurality of compression assemblies 322 on a first sidewall and a plurality of stationary compression piston assemblies as depicted in FIGS. 9A and 9B on a second opposite sidewall. A dual trough vibratory screening machine Like the one illustrated in FIGS. 1A and 1B could include a plurality of compression assemblies mounted to the first and second outer sidewalls of the screening machine, with stationary compression piston assemblies mounted along either side of a central abutment 316.

In the foregoing examples, compression assemblies 322 with compression pistons are used to mount screen assemblies that include a support plate and screening elements mounted on top of the support plate. The same basic compression assemblies could also be used to mount different types of screen assemblies to a vibratory screening machine.

One alternate type of screen assembly is one formed from a plurality of individual screen units that are attached to one another to form a complete screen assembly. Each individual screen unit can include a support structure and one or more screen elements that are mounted to the support structure. Each support structure can include attachment elements that are used to couple to other support structures so that multiple screen units can be attached to one another to form the complete screen assembly. Both the support structure and the screen elements can be formed by injection molding a plastic or synthetic material. Examples of such screen assemblies are disclosed in U.S. Pat. Nos. 9,409,209, 9,884,344, 10,046,363, 10,259,013, 10,576,502, 10,835,926, 10,843,230, 10,981,197, 10,994,306, 10,960,438, 10,974,281, 10,933,444, 10,967,401, 11,413,656, 11,161,150, 11,000,882, 11,426,766, 11,638,933, 11,417,913, 11,446,704 and 11,471,914, the contents of which are incorporated herein by reference.

Figure 10A:
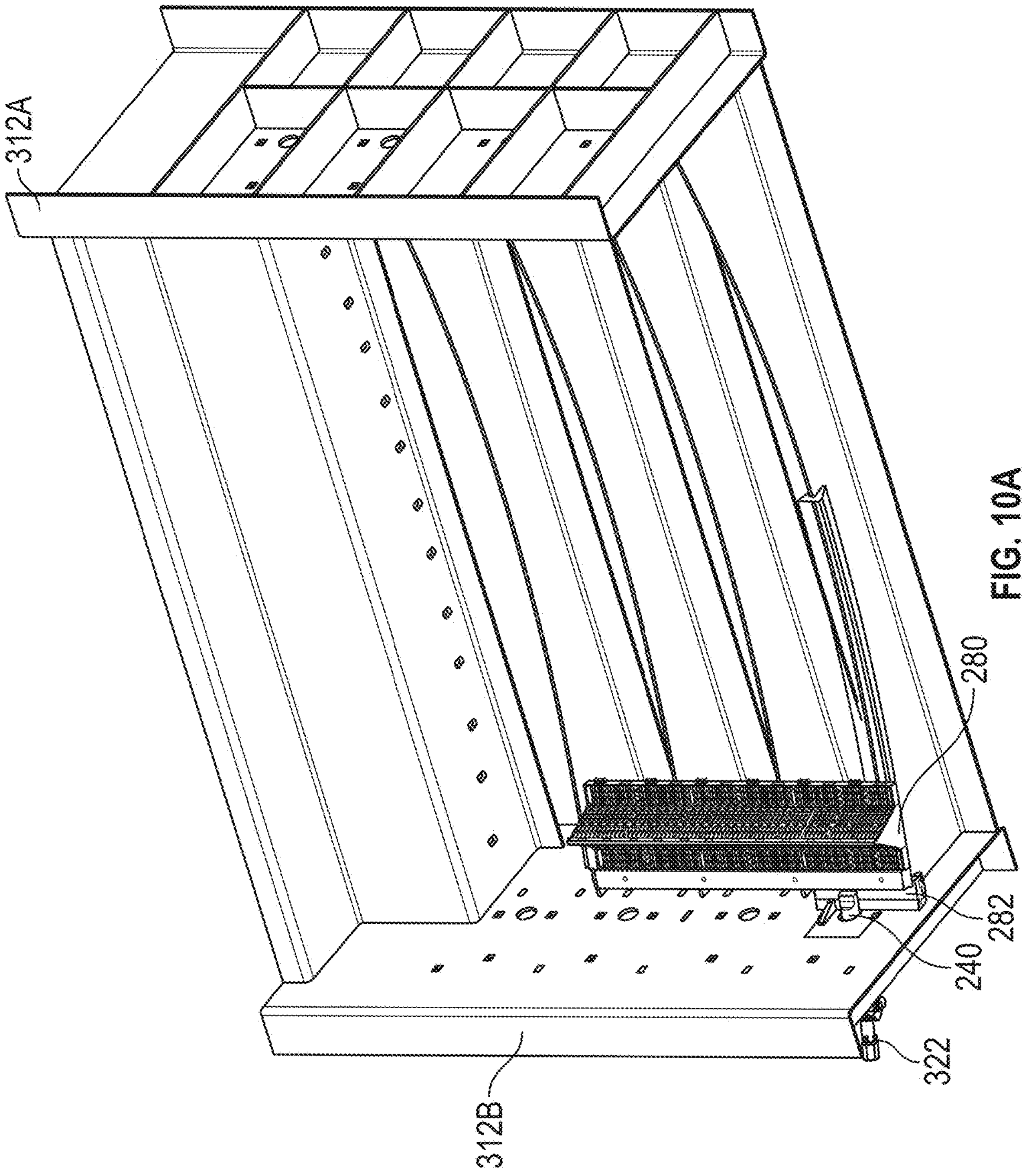
FIGS. 10A-10C illustrate how a compression assembly with a compression piston can be used to mount an injection molded screen assembly in a vibratory screening machine.
Figure 10B:
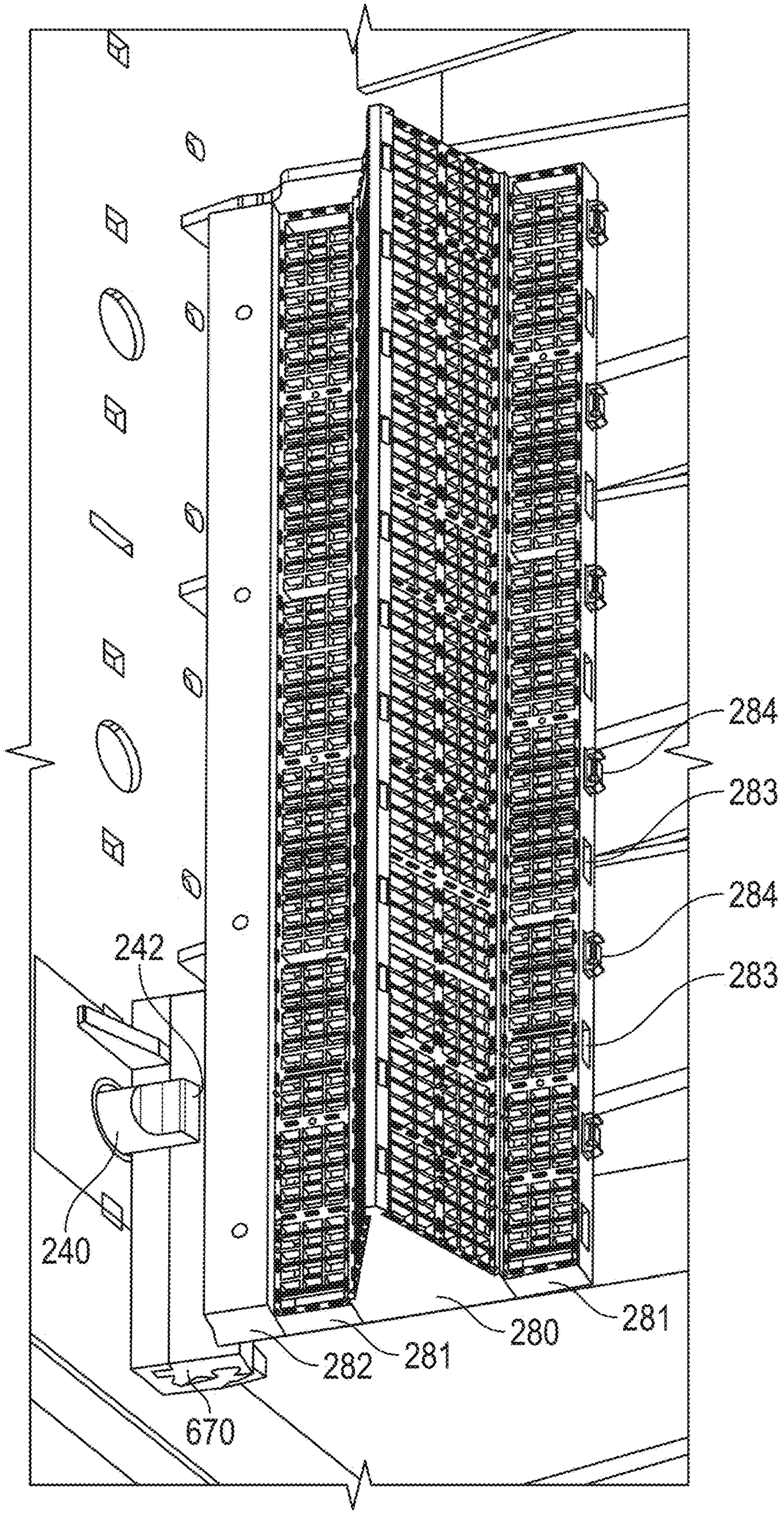
Figure 10C:
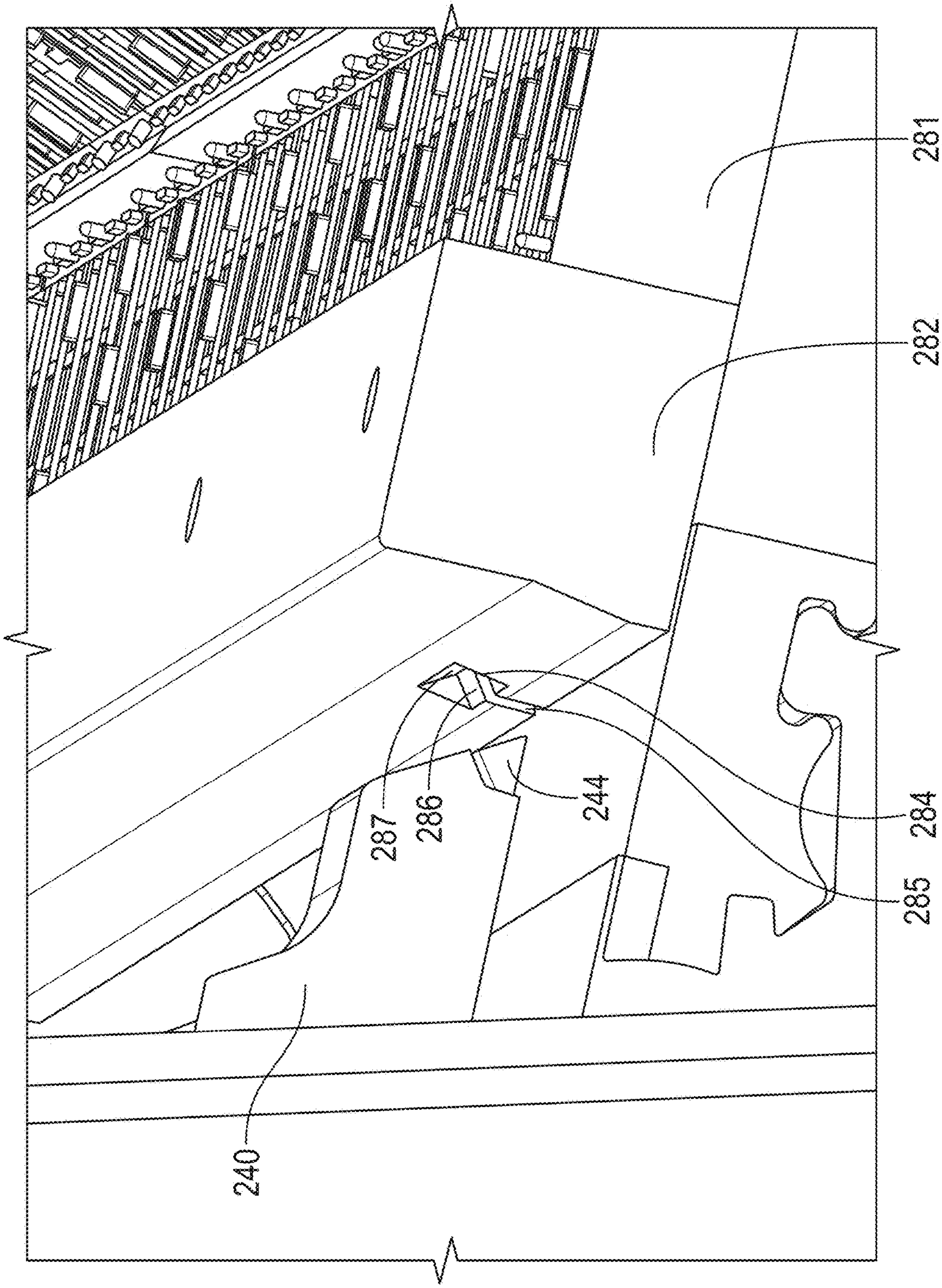

FIGS. 10A-10C illustrate how an alternate screen assembly formed by joining together screen units formed from injection molded support structures and injection molded screen elements can be mounted on a vibratory screening machine using a compression assembly 322 that includes a compression piston 240. FIGS. 10A-10C show only a portion of an entire screen assembly to aid in clarity and in describing how the mounting process occurs. In FIGS. 10A-10C, only the supporting elements of a portion of an entire screen assembly are depicted. Screen elements would be mounted on top of the support elements illustrated in FIGS. 10A-10C.

FIG. 10B shows that a portion of an entire screen assembly is formed by joining together multiple flat support elements 281 and multiple pyramid shaped support elements 280. As perhaps best seen in FIG. 10B, each support element 280/281 includes attachment members that allow individual support elements to be attached to one another. The attachment members include protruding clips 284 and clip apertures 283. The clip apertures 283 on a first support element receive the clips 284 of a second adjacent support element to join the support elements together. FIGS. 10A-10C illustrate multiple flat support elements 282 joined together, end to end, to form two elongated strips of flat support elements 282. Multiple pyramid shaped support elements 280 are joined together, end to end, to form an elongated strip of pyramid shaped support elements 280. The sides of the elongated strip of pyramid shaped support elements 280 is then joined the sides of the two elongated strips of flat support elements 281 to form a portion of a complete screen assembly. As noted above, screen elements (not shown) would be mounted on top of the support elements.

FIGS. 10A-10C also illustrate that the left side edge of the screen assembly includes a binder bar 282. The binder bar 282 includes protruding clips and clip apertures just like the support elements 280, 281. As a result, the clips and clip apertures on the binder bar 282 can attach to corresponding clips and clip apertures on the elongated strip of flat support elements 281 that form the left side of the screen assembly. A complete screen assembly would include another binder bar mounted along the opposite side edge of the screen assembly.

A plurality of support elements that are attached to one another can form a "support member" of a screen assembly. In some embodiments, the support member can also include binder bars that are attached to sides of the assembled support elements. As explained above, screen elements are attached to the top surfaces of the joined support elements to form the complete screen assembly.

A plurality of support elements that are attached together, and possibly also binder bars, are roughly equivalent to a support plate of a screen assembly in the previous examples. In the following description, the terms "support plate" and "support member" are used interchangeably to refer to the portion of a screen assembly that interacts with a mounting mechanism to secure the screen assembly to a vibratory screening machine.

As depicted in FIG. 10C, mounting apertures 284 are formed on the outer side edge of the binder bar 282. The mounting apertures 284 are configured to receive the end of the compression pistons 240 of compression assemblies 322 of the vibratory screening machine. To mount such a screen assembly on a vibratory screening machine, a complete screen assembly with binder bars on opposite side edges is placed on the machine such that the mounting apertures 284 on the binder bars are aligned with the compression pistons 240 of the compression assemblies. The compression pistons are then moved inward into the mounting aperture 284 of the binder bars 282. The end elements of the compression pistons engage with surfaces within the mounting apertures in much the same ways as described above in connection with the first type of screen assembly. This can include an alignment finger 244 on the compression piston 240 being received in an alignment slot 285 of the mounting aperture 284. End faces of the compression piston can bear against either or both of a lower compression surface 286 and an upper compression surface 287 of the mounting apertures 284. This allows the compression piston 240 to apply both a horizontal inward force and a vertical downward force to the binder bar 282 and the remainder of the screen assembly. Those forces push the bottom surface of the screen assembly into engagement with the supporting structures of the vibratory screening machine under the screen assembly.

Of course, compression assemblies 322 with movable compression pistons 240 could be provided on opposite sides of the vibratory screening machine such that movable compression pistons 240 engage the binder bars on both opposite sides of the screen assembly. Alternatively, such a screen assembly could be used on a vibratory screening machine in which stationary compression piston assemblies as depicted in FIGS. 9A and 9B are used on one side of the screen assembly.

In some embodiments, the binder bar 282 could also be formed from a synthetic or plastic material by injection molding or other formation techniques. In alternate embodiments, the binder bar could be a composite structure that includes some injection molded plastic or synthetic elements as well as stiffening members made of metal of glass fiber. The stiffening elements would be configured to help spread the compression forces applied by the compression pistons across the entire side of the screen assembly. Further, the binder bar could be formed of a metal material.

In some embodiments, the mounting apertures 284 could be configured to receive the same sort of compression pistons as are used with other types of screen assemblies, such as the ones discussed above which include a metal support plate. In alternate embodiments the mounting apertures 284 could be configured to receive different sized and/or shaped ends of compression pistons. For example, the mounting apertures 284 of a binder bar 282 may include larger compression surfaces 286, 287 to allow a certain amount of compression force to be distributed over a larger area. This could require that compression pistons with a different larger face be used to mount such screen assemblies on a vibratory screening machine. Alternatively, it may be possible to mount an end cap with larger compression surfaces on the end of a compression piston designed to work with the first type of screen assemblies described above. Here again, the end caps mounted on the ends of the compression pistons would be configured to distribute a certain compression force over a larger area than the is done with the first embodiments described above.

In some embodiments, the binder bars 282 may be constructed so that the mounting apertures 284 are made of a material with a higher strength than other parts of the binder bar 282. This could be accomplished by mounting hard plastic or metallic inserts into apertures on the binder bars to form the mounting apertures 284, or the entire binder bar 282 could be formed of metal.

Figure 11A:
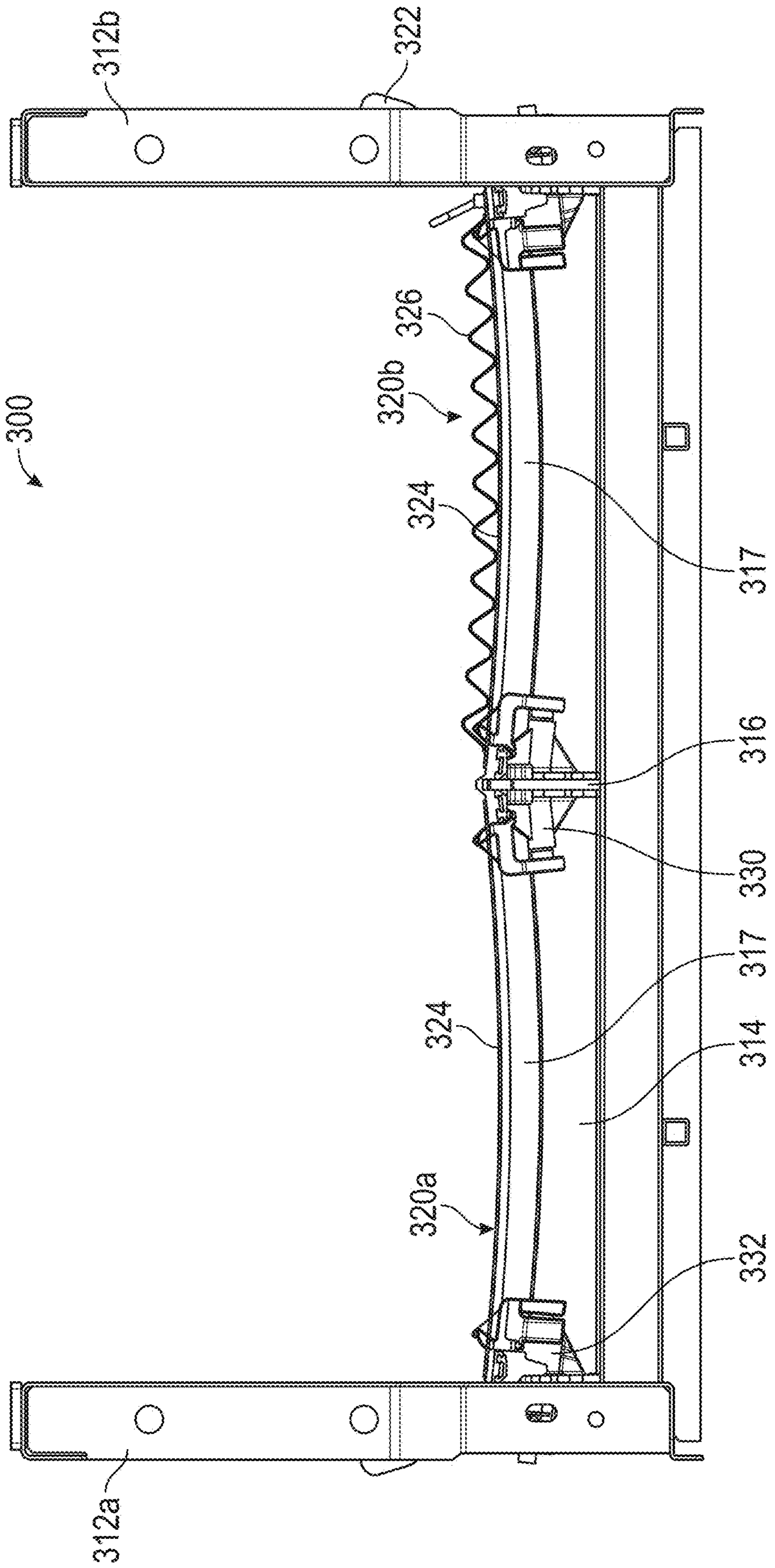
FIG. 11A shows an end view of the vibratory screen machine, in an embodiment.

A second type of screen assembly and compression mounting mechanism makes use of compression mechanisms that pass through mounting apertures of a support plate from the lower side of the screen element. FIGS. 11A and 1 illustrate an end view and a partial end view of a dual-trough screening machine 300 that includes this second type of compression mounting mechanism As previously noted, a dual-trough screening machine 300 includes two parallel screen assemblies 320*a*, 320*b* (hereafter 320 unless specifically referenced) disposed between interior surfaces of spaced wall members 312*a*, 312*b* (hereafter 312 unless specifically referenced). A central member 316 divides the screening machine 300 into two parallel screening areas. Each screen assembly 320 includes a first edge disposed proximate to a wall member 312 and a second edge disposed proximate to the central member 316. Compression assemblies 322 compress each of the screen assemblies against the underlying concave supports 314. A gasket 317 (e.g., rubberized or otherwise compressible materials) may be disposed on the concave upper surface of each support 314. Accordingly, when the compression assemblies 322 compress the screen assemblies 320 into a concave profile, the bottom surface of the screen assembly (e.g., bottom surface of support plate 324) may be compressed against the gasket 317 on the upper surface of the concave supports 314 forming a seal between the screening assembly and the screening machine. The gaskets may have a width that allows sealing an interface between two longitudinally disposed screen assemblies.

As illustrated in FIG. 11A, one of the screen assemblies 320*b* is illustrated with a screening surface 326 overlaying an underlying perforated support plate 324 while the other screening assembly 320*a* is illustrated without the screening surface. In use, each screen assembly will include a screening surface. Though illustrated as an undulating or corrugated surface, it will be appreciated that the screening surface may have other configurations (e.g., substantially flat). The screening surface may be made of, without limitation, woven mesh materials, metals and/or synthetic materials such as a polyurethane, thermoplastic polymers (e.g., polyurethane) and thermosetting polymers. Each screening assembly also includes an underling perforated support plate 324.

The embodiment of the screening machine 300 of FIGS. 1A-1C, 11A and 11B utilizes what may be termed an "under-compression" arrangement to compress each screen assembly horizontally (e.g., against the central support or a second wall) and vertically downward against the concave supports. In the illustrated embodiment of the under-compression assembly, compression assemblies 322 on wall member 312*a* include movable/actuated pawls 336, which extend through a corresponding set of pass-through compression points 350*a* (see., e.g., FIGS. 12B-12C) disposed proximate to a first edge 340 of the support plate 324. Each pawl 336 will typically include one or more hooks for engaging the support plate 324 of the screen assembly. More specifically, the pawls 336 and their hoods engage pass-through compression points 350*a* disposed within an interior of the periphery of the underlying support plate 324 of the screening assembly. The pass-through compression points 350*a* are spaced from a first edge 340 of the support plate 324. When the screen assembly is installed on the screening machine, the pawls 336 extend through pass-through compression points 350*a* of the support plate 324 from the bottom surface of the support plate 324 to the upper surface of the support plate 324. Actuation of the compression assemblies 322 moves the pawls 336 between a first position (e.g., retracted) and a second position (e.g., extended). In the extended position, hooks supported by the pawls 336 apply a compression force having both a horizontal component applied to an edge surface of the pass-through compression points 350*a* and a vertical downward component applied to the upper surface of the support plate 324. See also FIGS. 15A and 15B. These forces may deflect the screen assembly into a concave shape while securing the screen assembly to the screening machine.

Figure 15A:
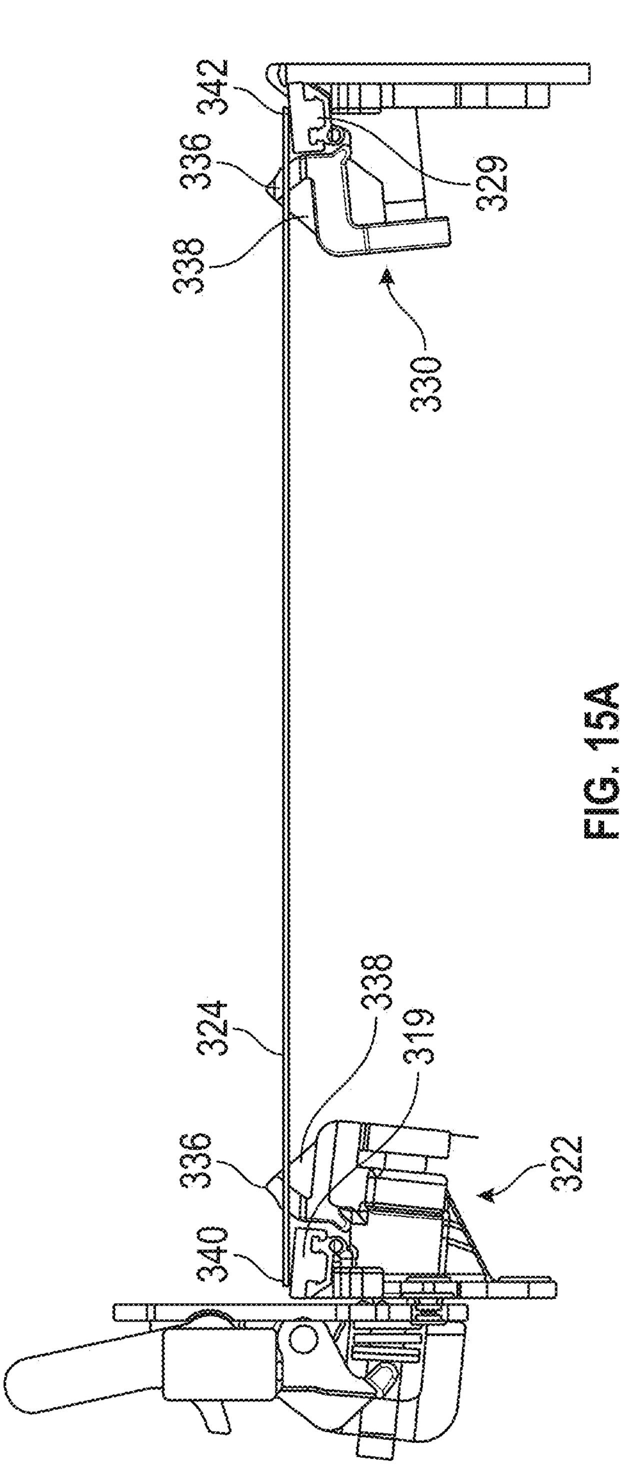
FIG. 15A illustrates a compression assembly, stationary hook assembly and a plate assembly of a vibratory screening machine in an embodiment where the plate assembly is not compressed.

Of note, the pawls 336 apply the downward component of the compression force to the top surface of the support plate 324, which, prior to compression, is supported between its side edges 340, 342 (see, e.g., FIG. 15A). Application of such force between the supported side edges of the plate provides a multiplier effect for the downward force in comparison to prior systems that applied a compression force to the edges of such a screen assembly and required the plate to "buckle" to deflect into the concave profile. That is, a distance between the plate edges 340 and 342 and the location where the pawls 336 engage the plate 324 provides a moment arm for the downward applied force.

Referring again to FIGS. 11A and 11B, a set of stationary hook assemblies 330 (only one shown) are attached to the central member 316 and each have a stationary pawl 336 having one or more hooks that extend through a corresponding set of pass-through compression points 350*b* disposed proximate to an opposing edge 342 of the support plate 324. See also FIG. 4C. The stationary pawls 336 extend through the pass-through compression points 350*b* of the support plate 324 from the bottom surface to the upper surface of the support plate 324. Though discussed herein as utilizing the stationary pawls on the central member 316 (or second wall in other embodiments), it will be appreciated that in various embodiments, the second edge 342 of the support plate 324 may engage an abutment or abutment surface (e.g., channel) on the central member/second wall and the screening machine, thereby omitting the stationary pawls and/or hooks.

Figure 12A:
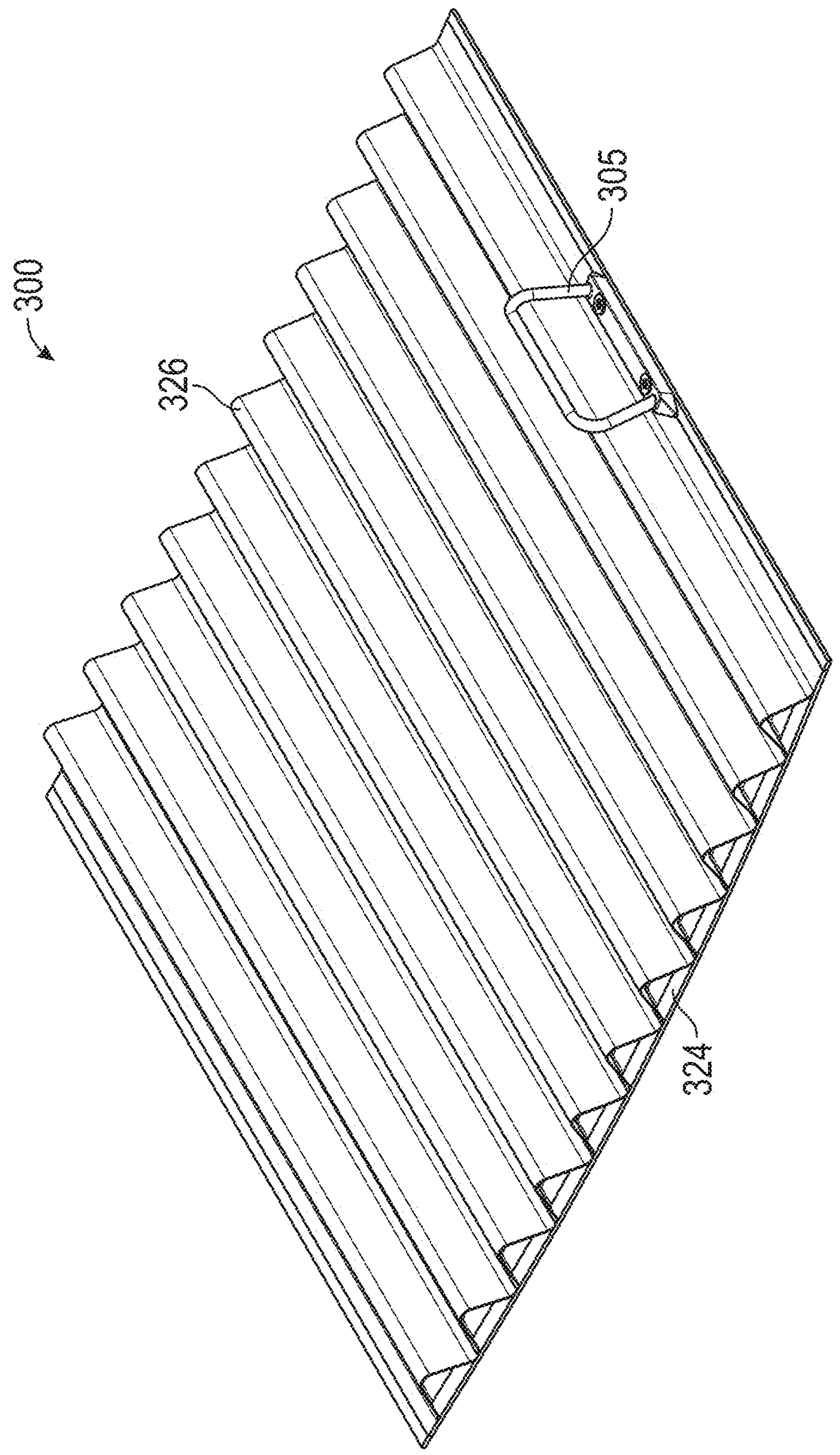
FIG. 12A shows a perspective view of a screen assembly, in an embodiment.
Figure 12B:
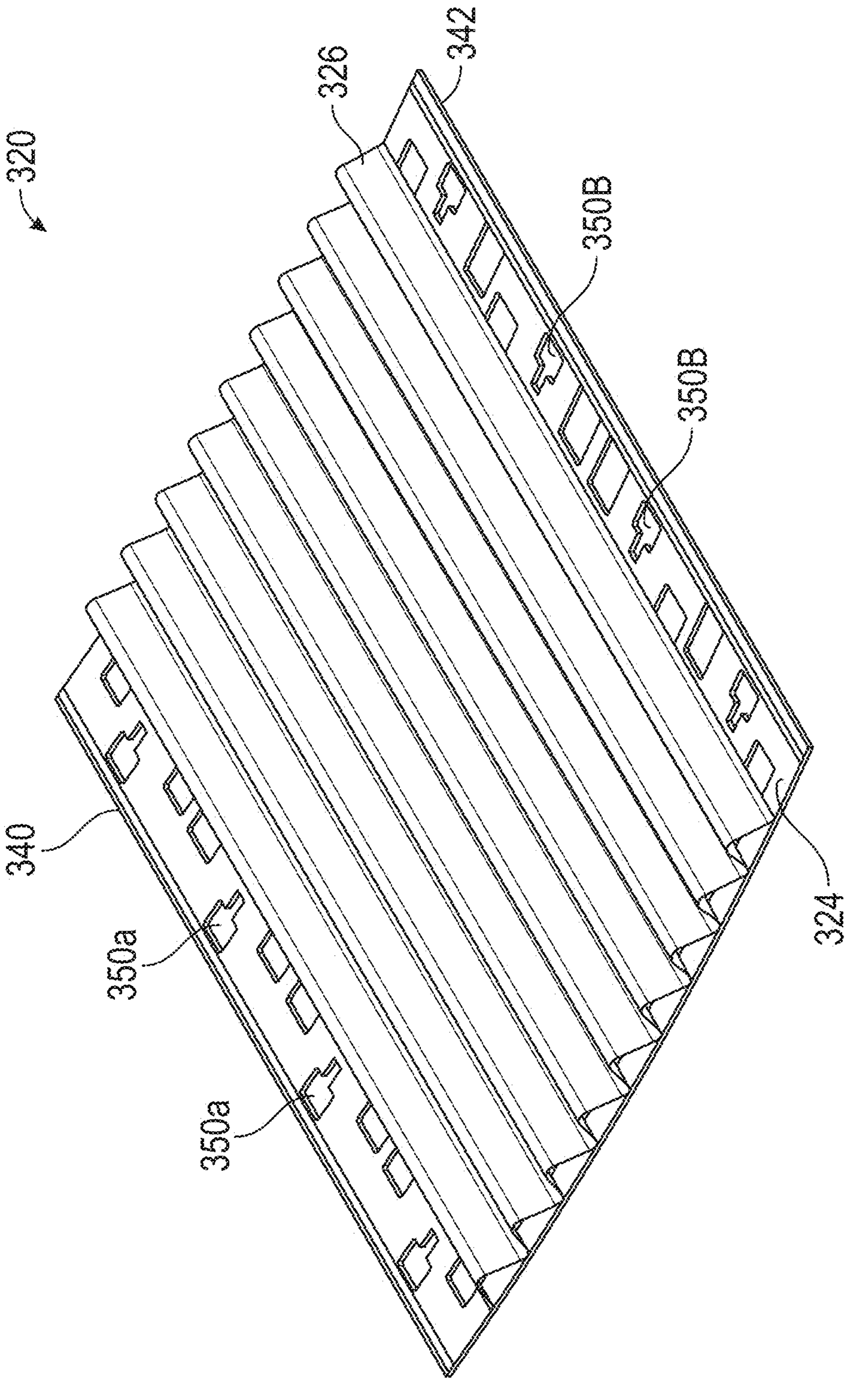
FIG. 12B shows the perspective of the screen assembly of FIG. 12A with a portion of the screening surface removed, in an embodiment.
Figure 12C:
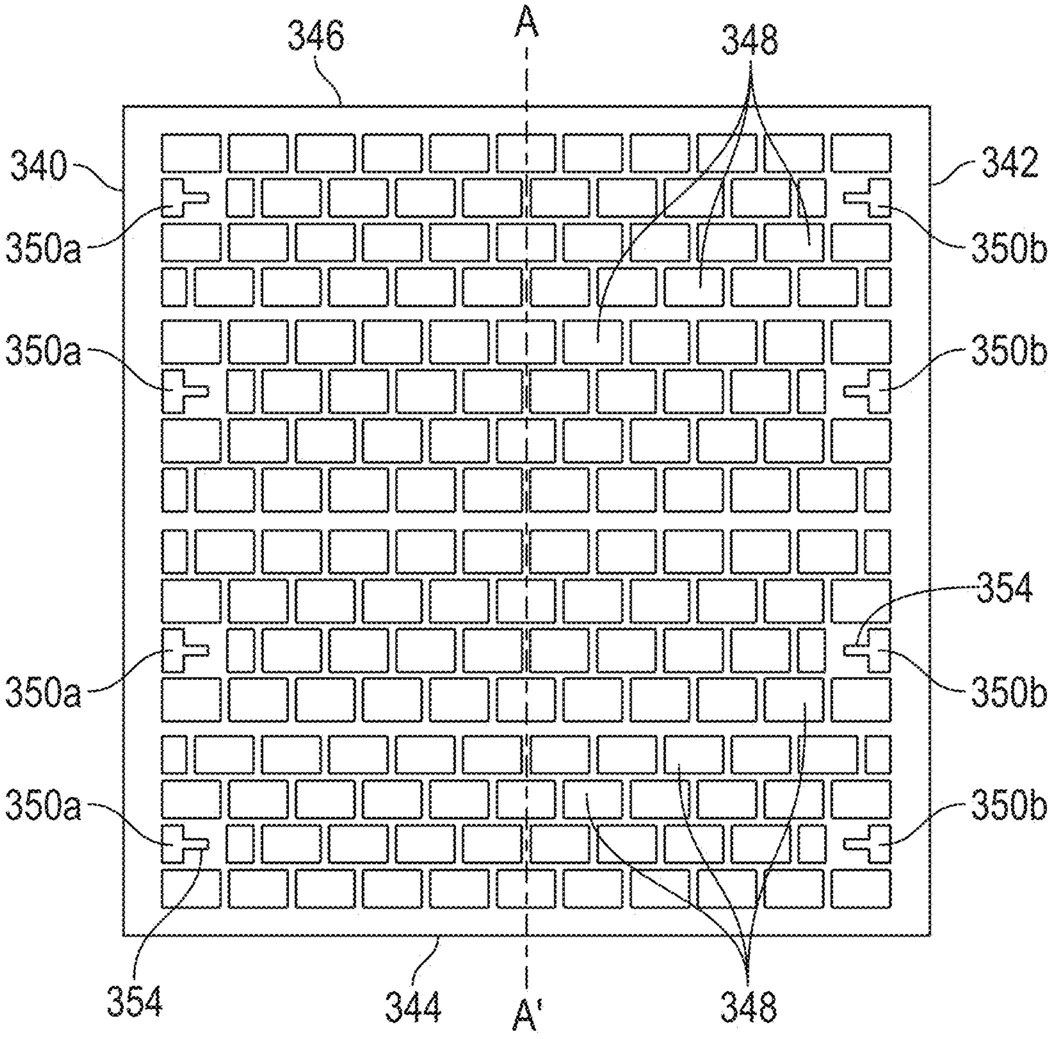
FIG. 12C shows a top view of a support plate of a screen assembly, in an embodiment.

FIGS. 12A, 12B and 12C illustrate a screening assembly 320, a screening assembly 320 with a portion of a screening surface 326 removed, and a top view of a support plate 324, respectively, in an embodiment. In an embodiment, a top surface of the screening assembly 320 may include an optional handle 305 for use in installing the screening assembly in a screening machine. As illustrated, the support plate 324 of the screening assembly 320 is generally rectangular having a first edge 340, a second edge 342, a first end 344 and a second end 346. These edges and ends collectively define a periphery of the plate. The plate 324 is typically formed from a sheet of metal, though other materials are possible. The support plate 324 includes a plurality of flow-through apertures 348 extending through a body of the plate within its interior (e.g., within its periphery) as defined by the edges and ends. The flow-through apertures 348 are configured to allow undersized materials passing through a supported screen surface to pass through the support plate 324. Though illustrated as having rectangular flow-through apertures 348, it will be appreciated that the size, shape, and distribution of the flow-through apertures across the support plate 324 may be varied. A plurality of pass-through compression points 350*a*, 350*b* (hereafter 350 unless specifically referenced) are disposed along and spaced from the first and second edges 340, 342 of the support plate 324. As discussed above and herein, the pass-through compression points 350 are used to affix the screen assembly to a screening machine. More specifically, an inward edge of each pass-through compression point 350 (e.g., relative to the centerline A-A' of the support plate 324) provides a contact or compression surface against which a horizontal and/or vertical force may be applied to the plate within its interior. This contact or compression surface may be substantially vertical (e.g., perpendicular to the upper surface of the support plate 324) or disposed at a predetermined angle. See, e.g., FIG. 17G.

As shown in FIGS. 12A and 12B, the screen surface 326 is illustrated as an undulating or corrugated surface. However, it will be appreciated that the screen surface 326 may have other configurations (e.g., substantially flat). The screen surface 326 may be made of, without limitation, woven mesh materials, metals and/or synthetic materials such as a polyurethane, thermoplastic polymers (e.g., polyurethane) and thermosetting polymers. When utilizing a woven mesh material, the screen surface 326 may include one or multiple layers of woven mesh material. Such woven mesh material may be attached to the support plate 324 by means of gluing, welding, and mechanical fastening. Discussion of such a multi-layer woven mesh screen is provided below in connection with a discussion of FIGS. 25A-25E. Molded polyurethane screens are described, for example, in U.S. Pat. Nos. 8,584,866; 9,010,539; 9,375,756; 9,403,192; and 9,908,150; the disclosure of each of which is incorporated herein by reference in its entirety. Thermosetting and thermoplastic polymer screens are described, for example, in the U.S. Pat. Nos. 9,884,344; 9,409,209; 10,046,363; 10,259,013; and 10,576,502; and in U.S. patent application Ser. Nos. 15/965,363; 16/269,646; 16/269,656; 16/359,773; 16/359,830; 16/743,516; 16/743,581, 16/743,609, 16/743,626; 16/743,662; 16/837,716; and Ser. No. 16/904,819; the disclosure of each of which is incorporated herein by reference in its entirety.

Figure 12D:
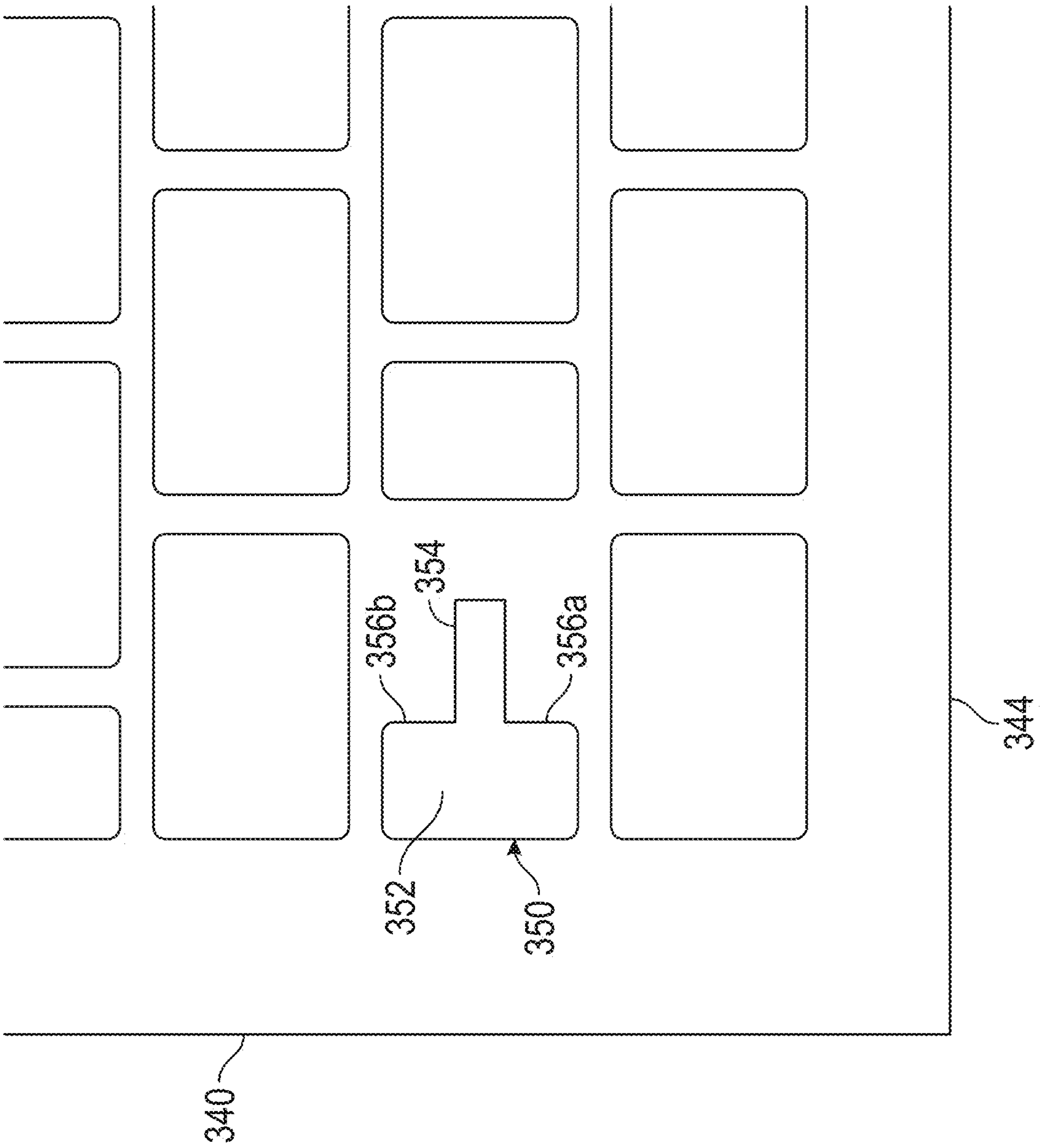
FIG. 12D shows a close-up view of a portion of the support plate of FIG. 12C, in an embodiment.

In the illustrated embodiment, the pass-through compression points 350 are generally T-shaped, each having a generally rectangular opening (e.g., first aperture portion) with an alignment slot 354 (e.g., second aperture portion) extending from a center of the interior edge (e.g., relative to a centerline A-A of the support plate 324). See FIGS. 12B, 12C and 12D. The alignment slot 354 is configured to receive an alignment element or knuckle of the pawls 336 of the compression assemblies or the stationary hook assemblies.

Figure 11B:
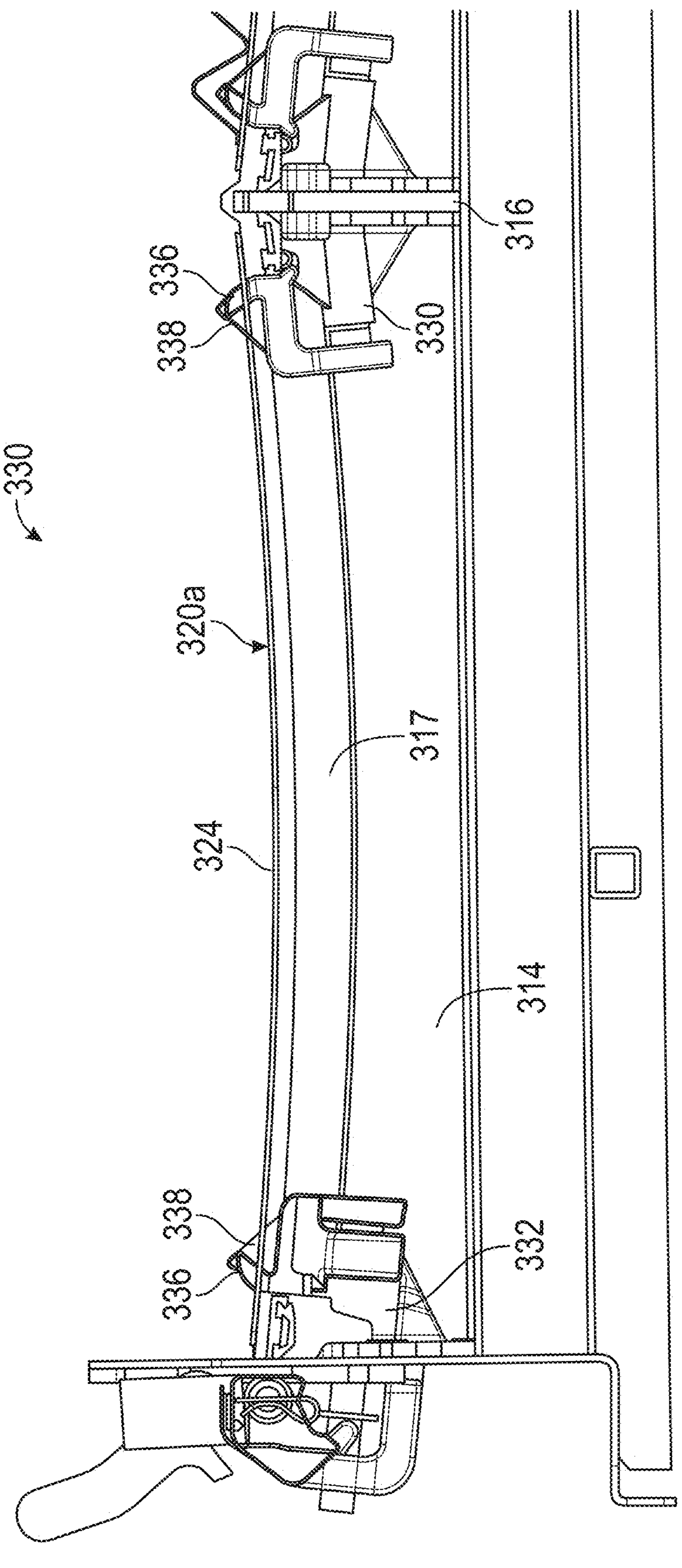
FIG. 11B shows a partial end view of the vibratory screen machine of FIG. 11A, in an embodiment.
Figure 12E:
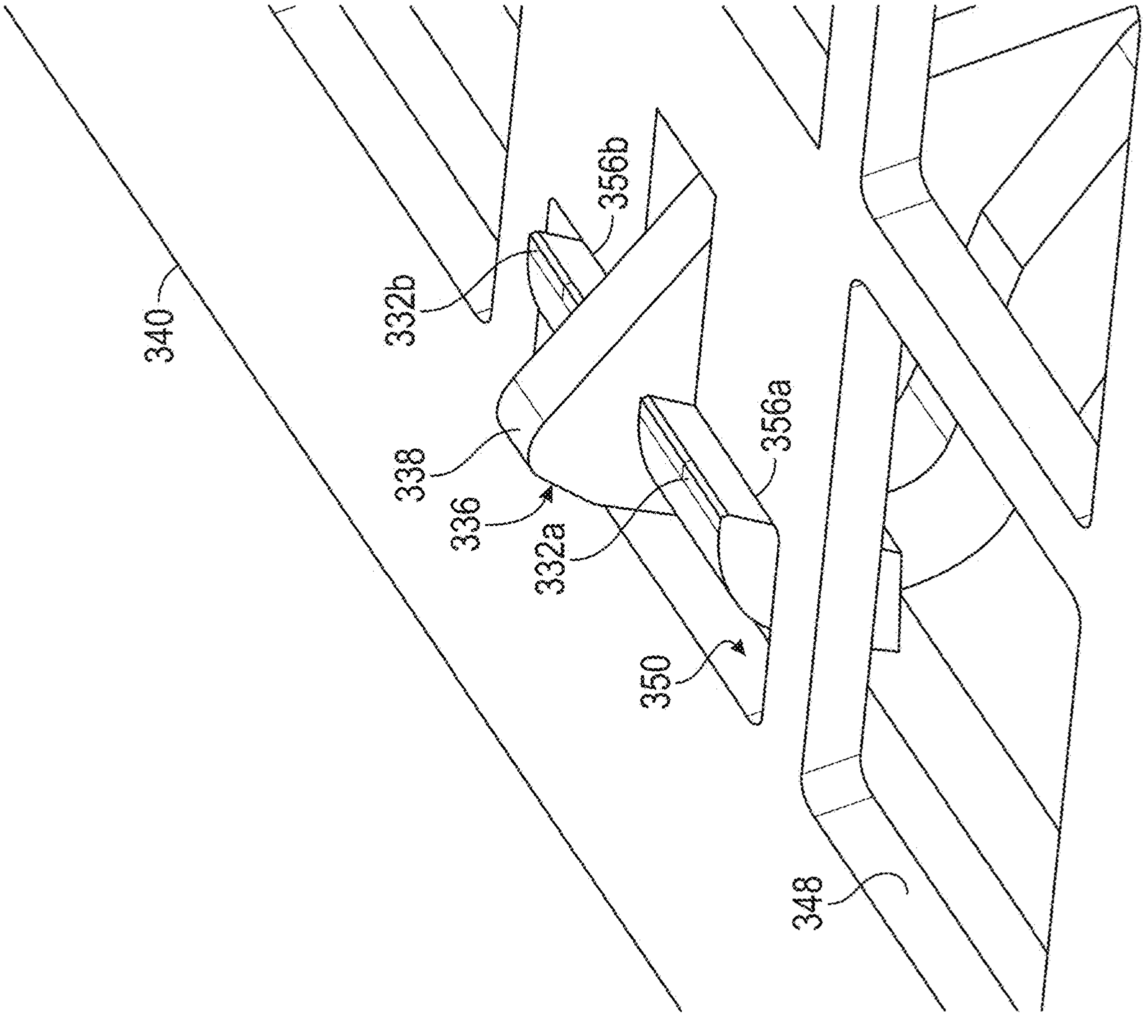
FIG. 12E shows of perspective view of a portion of the support plate of FIG. 12C as engaged by hooks of an actuator assembly, in an embodiment.

The engagement of the pass-through compression points 350 in relation to a movable pawl 336 of a compression assembly is illustrated in FIG. 12E, in an embodiment. The operation of the stationary hook assemblies is substantially identical and is omitted for brevity. Referring to FIGS. 11B and 12B-12E, the alignment slot 354 receives an alignment knuckle 338 disposed between two hooks 332*a*, 332*b* of the pawl 336. As illustrated, the support plate 324 may include a plurality of pass-through compression points 350, each including an alignment slot 354. In the illustrated embodiment, each side of the support plate 324 includes four pass-through compression points 350, each having an alignment slot 354. When the support plate 324 is positioned in the screening machine, the alignment knuckle 338 of the pawls 336 of the compression assemblies 322 are located in the alignment slots 354 of the pass-through compression points 350 disposed along the first edge 340 of the support plate 324, while alignment knuckles 338 of the pawls 336 of the stationary hook assemblies 330 are located in the alignment slots 354 of the pass-through compression points 350 disposed along the second edge 342 of the support plate 324.

The knuckle alignment slots 354 and alignment knuckles 338 provide a positive positioning system for the screen assembly 320. That is, once the knuckles 338 are positioned through the alignment slots 354 in a screen assembly, the position of the screen assembly 320 along the longitudinal length of the screening machine (i.e., along a length of the walls) is necessarily correct, eliminating the need to manually position screen assemblies along the length of the screening machine as was previously required. The correct positioning of the screen assemblies due to the alignment arrangement, prevents adjacent screen assemblies from jamming together during use or from separating from one another, leaving a gap. Correct positioning also ensures that the screen assemblies will not be improperly compressed, which could lead to damage. Further, the correct positioning better aligns the screen assemblies with underlying gaskets providing improved sealing. Yet further, reduction of the need to fully manually position the screen assemblies as afforded by the alignment arrangement reduces the time needed to install a set of screen assemblies.

The T-shaped pass-through compression points 350 further provide first and second contact or compression surfaces 356*a*, 356*b* disposed on either side of the of the alignment slot 354. In use, this allow the dual hooks 332*a*, 332*b* of the movable pawl 336 of the compression assembly or dual hooks of a stationary pawl of a stationary hook assembly to engage on either side of the alignment slot. Such an arrangement may provide good contact between the screening assembly and the hooks/pawls, thereby allowing for strong hold-down forces to be applied.

Though each pass-through compression point 350 is illustrated as having an alignment slot 354, it will be appreciated that a first subset of the pass-through compression points 350 may include an alignment slot 354 while a second subset of pass-through compression points 350 are free of an alignment slot. The alignment slots 354 are illustrated as extending inward from the inner edge of the pass-through compression points 350. Though illustrated as being disposed in the center of the pass-through compression points 350, it will be yet further appreciated that the position of the alignment slot 354 may be varied along a length of the pass-through compression points 350. Further, it will be appreciated that the alignment slots 354 may extend from the outward edges of the pass-through compression points 350 and/or the upper and lower ends of the pass-through compression points 350. In this regard, the pass-through compression points 350 may have different shapes (e.g., other than T-shaped). In any configuration, a first portion of the pass-through compression point 350 will have first portion (e.g., first aperture portion) having one or more inner edges (e.g., relative to a centerline A-A of the support plate 324) that allows for applying a horizontal and/or vertical compression force to the support plate 324 and a second portion (e.g., second aperture portion) that allows for receiving an alignment element. The second portion of the pass-through compression point (e.g., second aperture portion) typically will have one or more sidewalls that are transverse to the inner edge of the first aperture portion. Along these lines, other shapes such L-shaped or cruciform shaped pass-through points, to name a few, may be utilized.

Figure 13A:
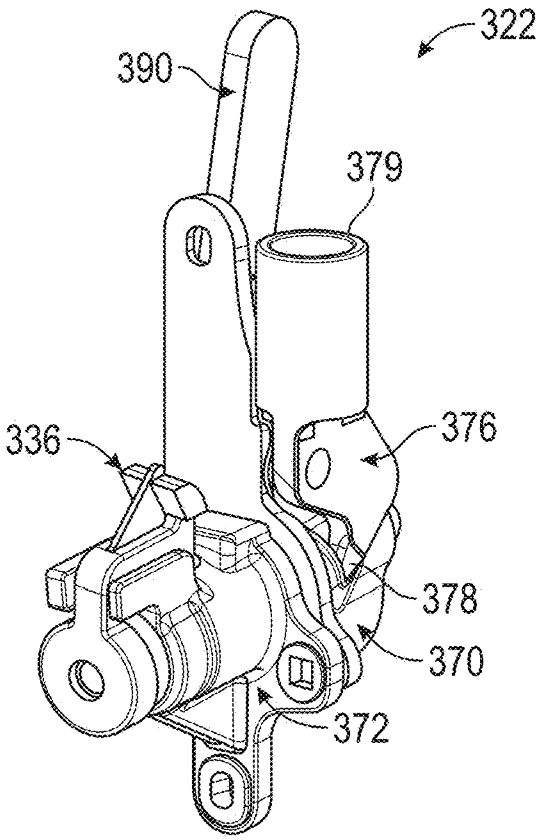
FIGS. 13A and 13B illustrate first and second perspective views of a compression assembly, in an embodiment.
Figure 13B:
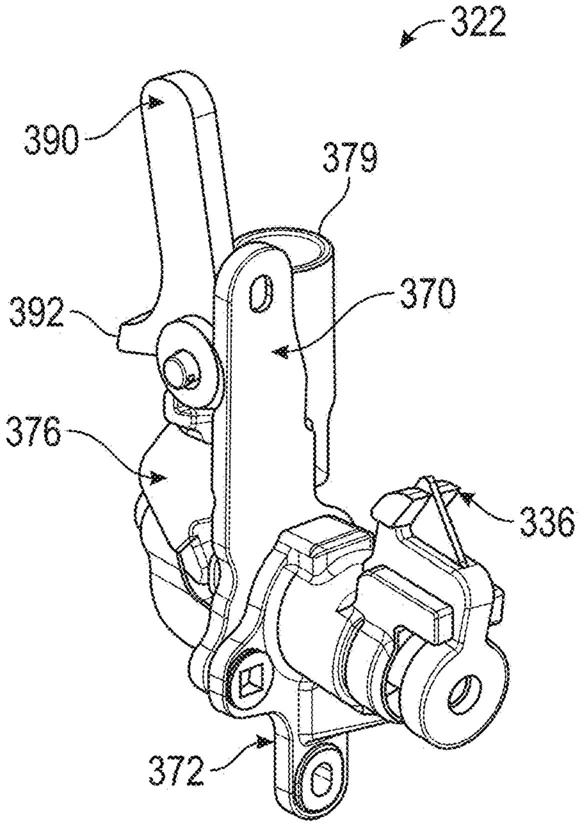
Figure 13C:
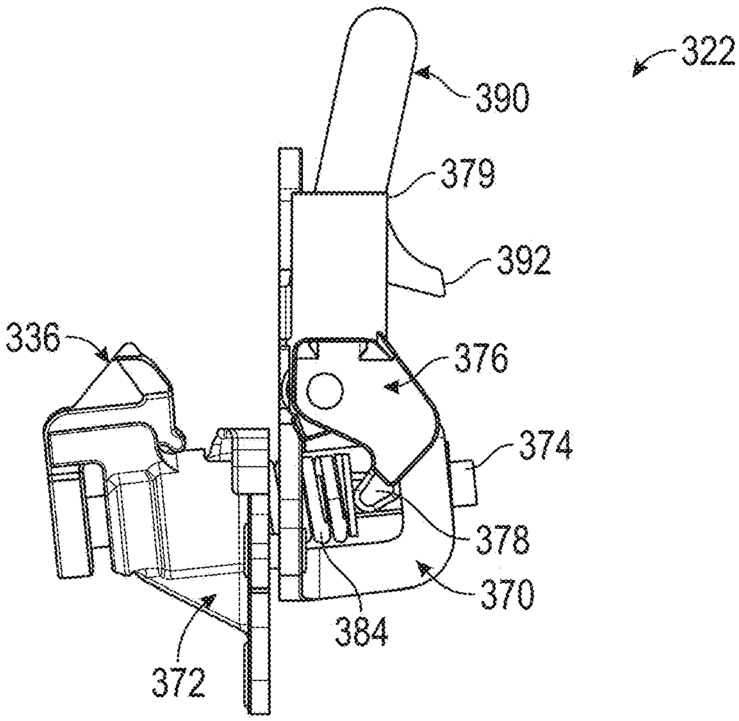
FIGS. 13C and 13D illustrate first and second side views of the compression assembly of FIGS. 13A and 13B in retracted and extended configurations, respectively, in an embodiment.
Figure 13D:
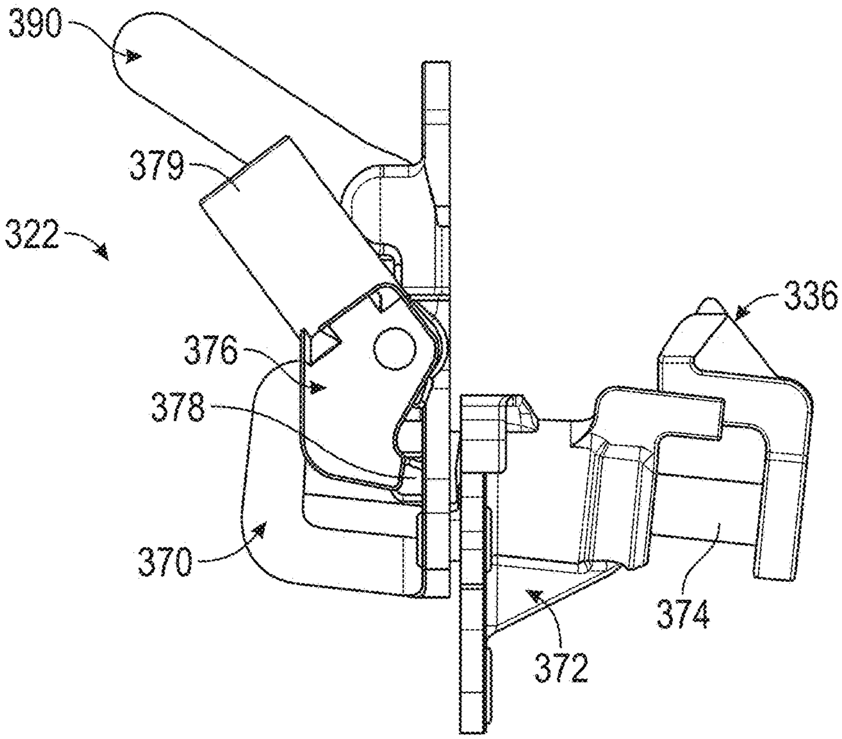
Figure 13E:
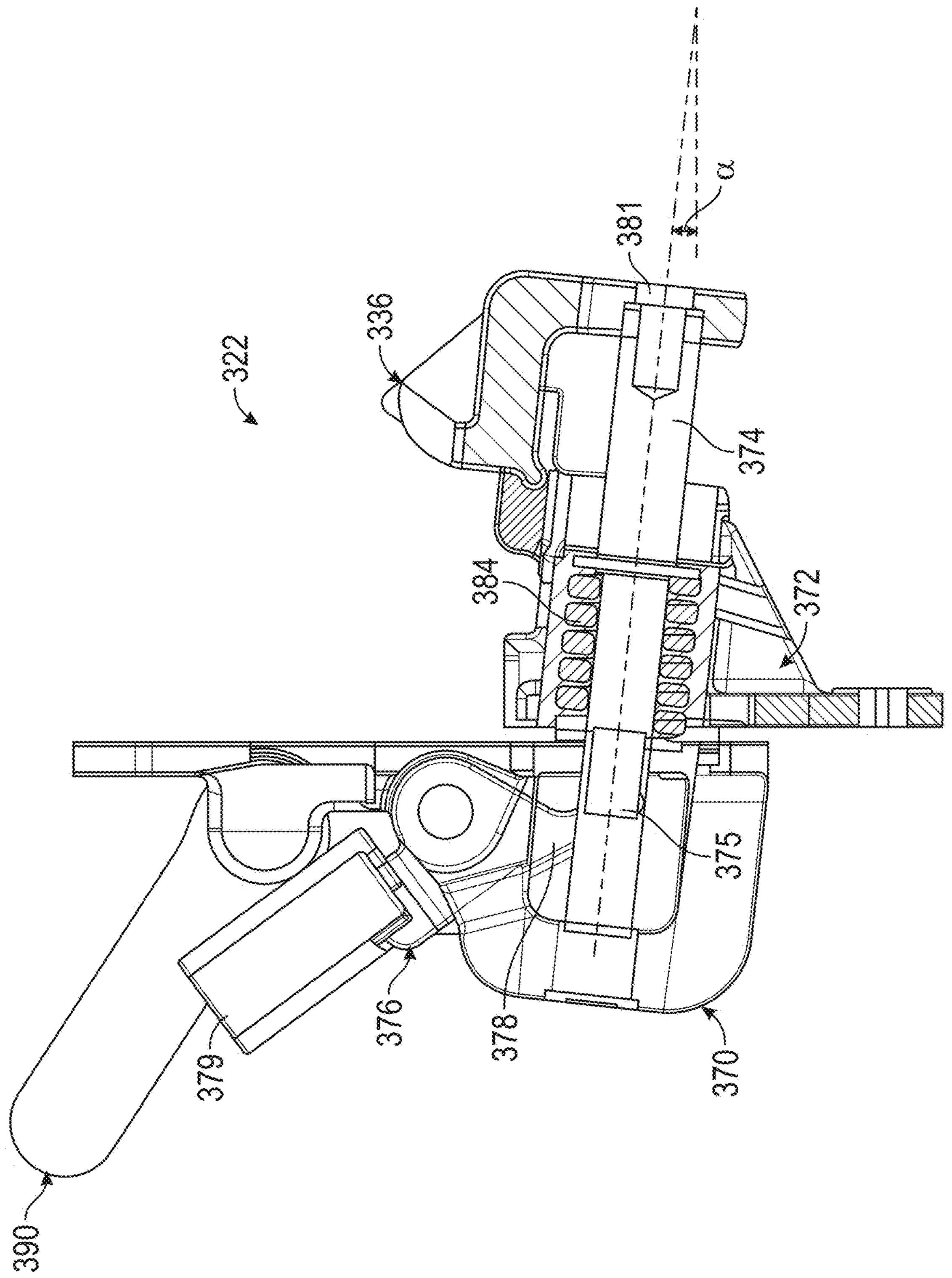
FIG. 13E illustrates a cross-section view of the compression assembly of FIGS. 13A and 13B, in an embodiment.
Figure 13F:
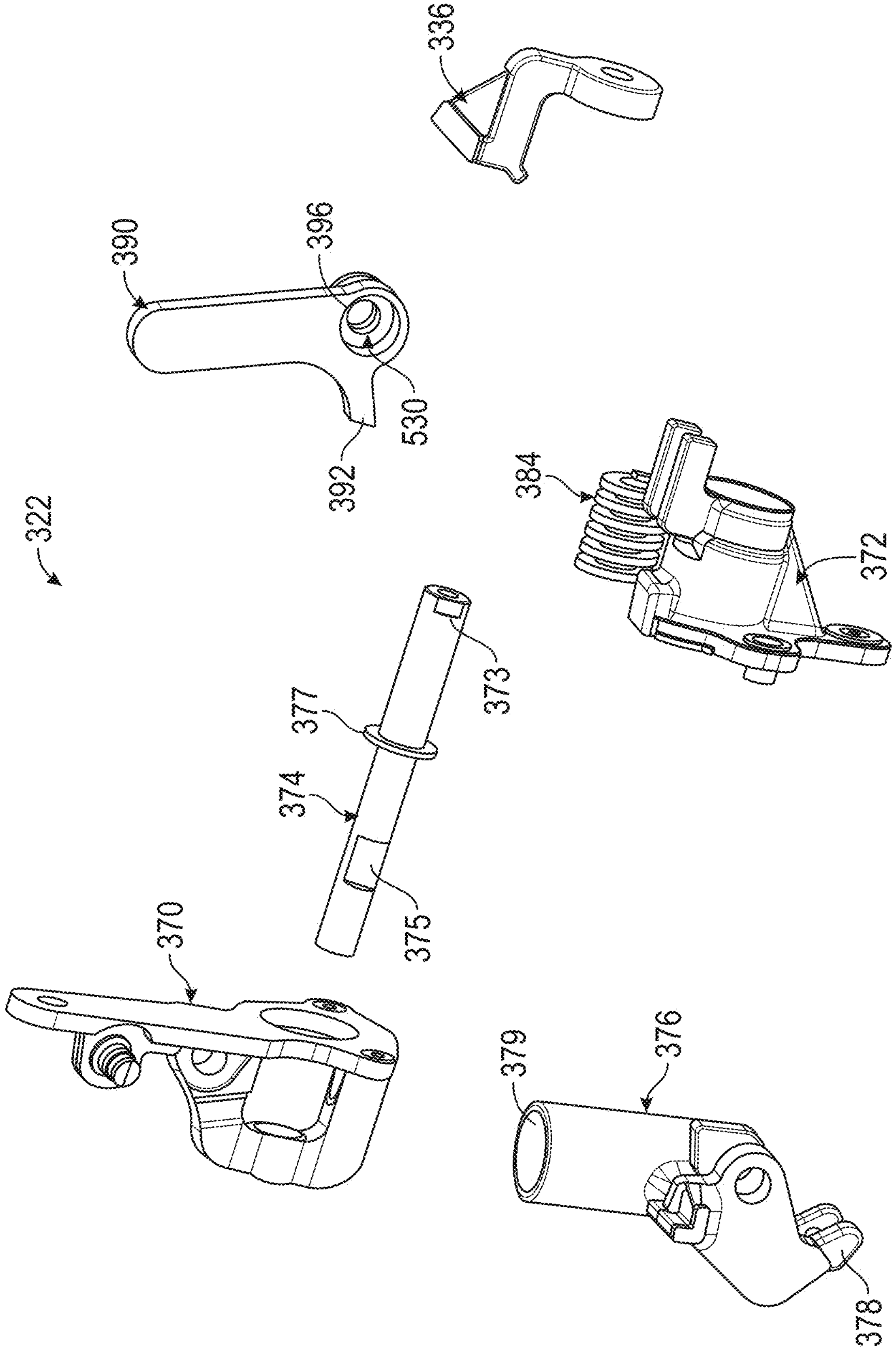
FIG. 13F illustrates an exploded view of the compression assembly of FIGS. 13A and 13B, in an embodiment.

FIGS. 13A-13F illustrate an embodiment of an under-compression compression assembly 322 configured to have an engaging member (e.g., pawl and/or hook) and aligning member (knuckle) pass through a bottom of a screen assembly to align the screen assembly with a screening machine and to apply both a horizontal force to a side or edge surface of the screen assembly and a downward force to a top surface of the screen assembly. More specifically, FIGS. 13A and 13B illustrate first and second perspective views of the compression assembly 322, in an embodiment; FIGS. 13C and 13D illustrate first and second side views of the compression assembly 322 in retracted and extended configurations, respectively, in an embodiment; FIG. 13E illustrates a cross-section view of the compression assembly 322, in an embodiment; and FIG. 13F illustrates an exploded view of the compression assembly 322, in an embodiment.

As variously illustrated in FIGS. 13A-13F, the compression assembly 322 has an outer compression mounting bracket 370 configured to attach to an outer surface of a wall member of a vibratory screening machine. The compression assembly 322 also includes an inner compression mounting bracket 372 configured to attach to an inner surface of the wall member of the vibratory screening machine. The brackets 370, 372 are designed to be mounted face-to-face with the wall member disposed therebetween (not shown). The brackets 370, 372 may be bolted together through the wall member. As further discussed below, the compression mounting brackets 370, 372 collectively define an interior actuator rod journal that houses an actuator pin or rod 374, which passes through an aperture in the wall member (not shown). The pawl 336 attaches to a forward or distal end of the actuator rod 374. As illustrated, the actuator rod 374 is disposed at a downward angle 'a' relative to the horizontal (e.g., angle of inclination) when the assembly 322 is mounted to a vibratory screening machine (See. e.g., FIG. 13E). This angle of inclination facilitates application of a downward force to the screen assembly when extending the pawl 336 of the compression assembly. In some embodiments, the angle of inclination a is between about 0° and 20° degrees. In some embodiments, the angle of inclination a is between about 1° and about 10°.

The actuator pin or rod 374 is shown as a cylindrical pin or rod in FIGS. 13A-13F. However, in alternate embodiments the actuator pin or rod could have other cross-sectional shapes. For example, the actuator pin or rod could have a square or rectangular cross-sectional shape or a hexagonal cross-sectional shape, as well as various other cross-sectional shapes. Also, a diameter of the actuator pin or rod 374 could vary along the length of the actuator pin or rod. Thus, the depiction of the actuator pin or rod provided herein should in no way be considered limiting.

An actuator bracket 376 is attached to the outer wall compression mounting bracket 370. Attachment of actuator bracket 376 may be via a bolt, pin or other axle (not shown) that extends through aligned apertures in the actuator bracket 376 and outer compression mounting bracket 370. Accordingly, the actuator bracket 376 may rotate relative to the outer compression bracket 370 about the axis formed by the bolt connection. The actuator bracket 376 attaches to a rearward end of the actuator rod 374 via extension arms 378 that pivotally engage the rod 374 via first and second pins 371, which fit within side notches 375 in the rod 374. A compression spring 384 is disposed within the journal defined by the compression mounting bracket and around the actuator rod 374. More specifically, the spring 384, is configured to expand between extension arms 378 of the actuator bracket 376 and a collar 377 disposed about the actuator rod 374. The spring 384 is configured to maintain the actuator rod and attached pawl in a retracted position, when in an uncompressed state.

Figure 21A:
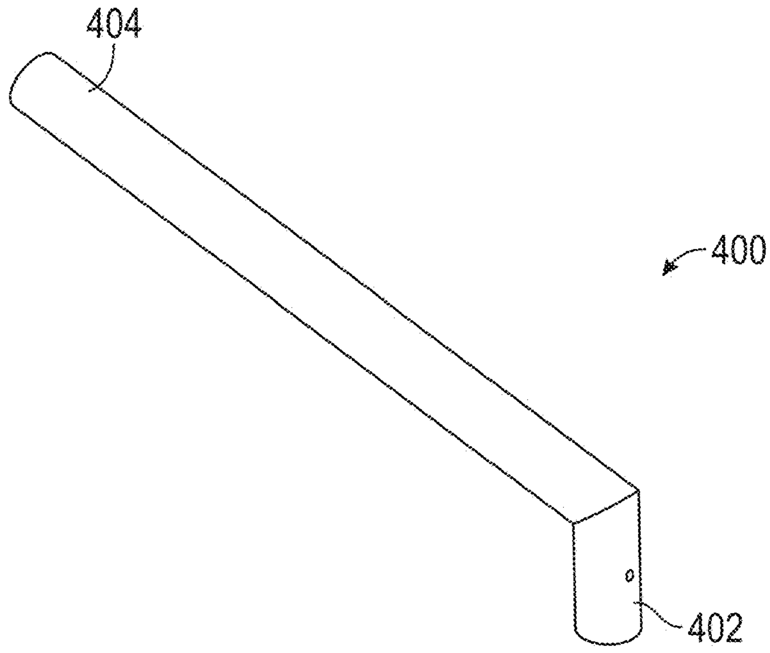
FIG. 21A illustrates a detachable handle that can be used to actuate a compression assembly, in an embodiment.

The actuator bracket 376 further includes a sleeve 379, which is configured to receive a first end of a handle (see. e.g., FIG. 21A). Downward and rotational force may be applied to such a handle to compress the compression spring 384 via extension arms 378 and advance the actuator rod 374 inward and thereby move the pawl 336, which may be fixedly attached to a forward end of the actuator rod 374, from a retracted position to a compression position or extended position (see FIG. 13D). Compression assembly 322 may be locked in the compression position by engaging a locking tab 392 of a locking latch 390 with a latch stop 394 formed in the actuator bracket 376. See also FIG. 14E. That is, when the actuator bracket 376 is in a compressed configuration, the locking latch 390 may be rotated downward to engage the locking tab 392 with the latch stop 394 of the actuator bracket 376. The compression assembly 322 may be released or unlocked by application of downward force on the handle (not shown) until locking tab 392 of the latch 390 can freely rotate away from the latch stop 394 of the actuator bracket 376, allowing retraction of the compression pawl 336.

Figure 14A:
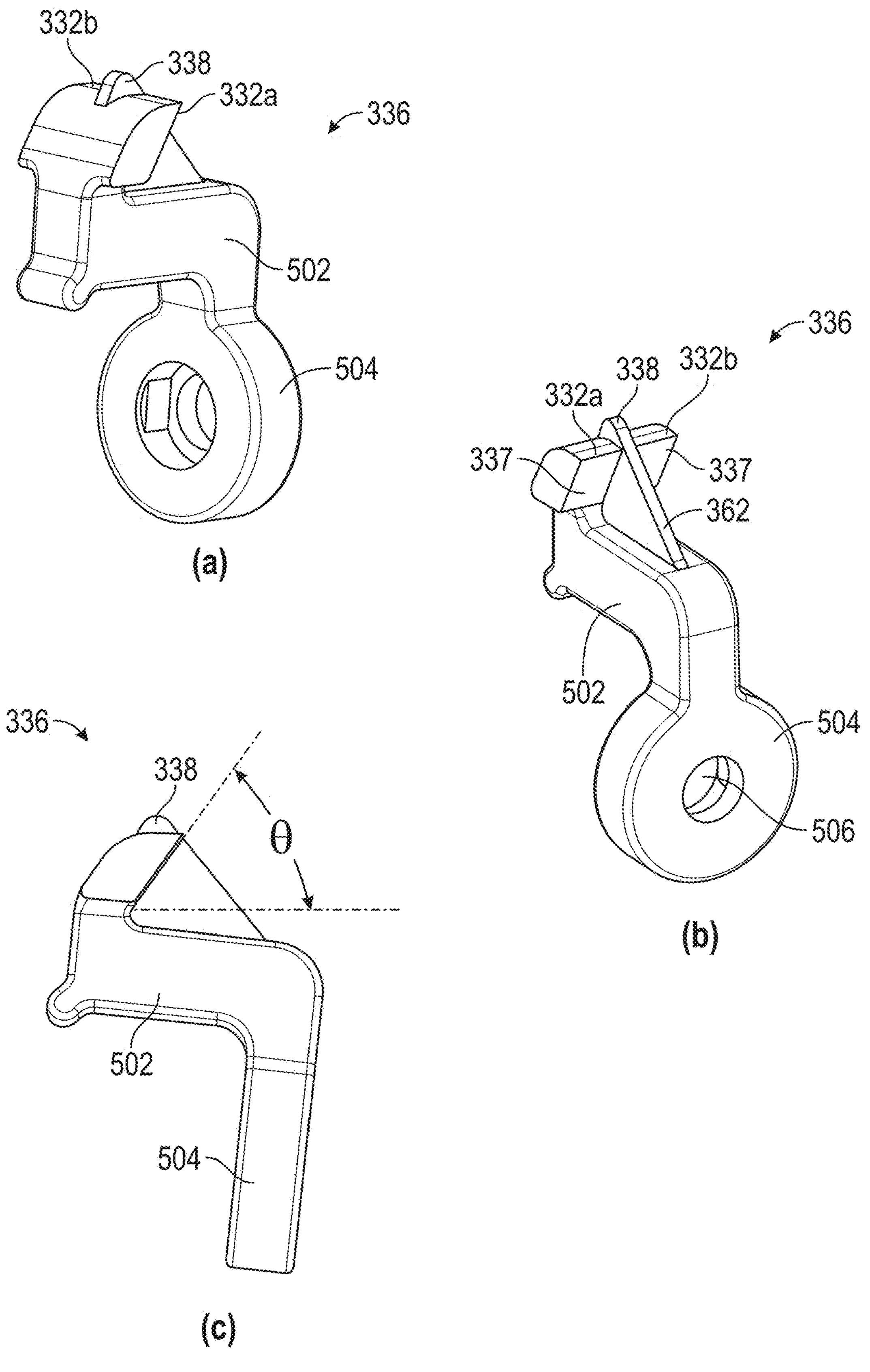
FIG. 14A illustrates three views of a pawl including: (a) a rear perspective view; (b) a front perspective view; and (c) a side view, in an embodiment.

FIG. 14A illustrates three views of the pawl 336 including: (a) a rear perspective view; (b) a front perspective view; and (c) a side view, in an embodiment. The pawl 336 is configured for use with the screening assembly of FIGS. 12A-12C having pass-through compression points 350 with an alignment slot 354 configured to receive an alignment knuckle. The pawl 336 includes first and second hooks 332*a*, 332*b* and an alignment knuckle 338. In the illustrated embodiment, the alignment knuckle 338 is integrally formed with and disposed between the first and second hooks 332*a*, 332*b*.

A contact surface (e.g., hook face) 337 of each hook 332*a*, 332*b* is disposed at an included acute angle Θ relative to the generally planar upper surface of the screen assembly (e.g., prior to compression). The contact surface 337 could include two or more planar surfaces, each oriented at a different angle relative to the planar upper surface of the of the screen assembly. The contact surface 337 could also be curved or arced. In an embodiment, the included angle Θ is between about 5° and 85° degrees. In a further embodiment, the included angle Θ is between about 15° and 75°. It yet a further embodiment, the included angle Θ is between about 50° and 60°. The acute angle of the contact surfaces 337 of the pawls 336 facilitates application of a downward force on the screen assembly when the pawls 336 are advanced.

The first and second hooks 332*a*, 332*b* and knuckle 338, in the illustrated embodiment, are mounted on a first leg of an L-shaped bracket 502 having a second end attached to a mounting element 504. The shape of the bracket 502 allows the contact face(s) 337 of the hooks 332*a*, 332*b* to extend above the compression assembly and extend through and engage an overlying support plate. The bracket 502 also allows for engaging pass-through compression points 350 that are located closer to the edges of the support plate 324. While beneficial to engage within the interior of the support plate 324, it has been found that excessive spacing of the pass-through compression points 350 from the edges 340, 342 of the support plate 324 can result in reduced compression forces along the edges 340, 342 of the support plate 324.

The mounting element 504 includes an aperture 506 for use in attaching the pawl 336 to the distal end of the actuator rod 374 via an attachment element 381 such as a bolt. See, e.g., FIG. 13E. Such attachment allows for readily replacing the pawl 336, which is a component that wears during machine operation. Further, as the compression assembly and the pawl 336 are located below the screen assembly, these components are removed from the fluid pool on the top of the screen assemblies, which serves to further reduce wear on these components.

In the illustrated embodiment, the knuckle 338 extends vertically above the dual hooks 332*a*, 332*b*. Further, the top inner edge of the knuckle 338 forms an angled or sloped surface 362. As noted above, the knuckles 338, when engaged with the alignment slots 354 in a screen assembly ensure the longitudinal position of the screen assembly is correct along the length of the sidewall of the screening machine. The use of the sloped surface 362 on the compression assembly knuckles 338 and corresponding sloped surfaces on the knuckles 338 of the opposing stationary hook assemblies ensure correct lateral positioning between the sidewalls (or a sidewall and central member) of a screening machine. More specifically, the support plate 324 may settle onto the compression assembly knuckles 338 and slide down the sloped surface 362. The same process occurs with the engagement of the knuckles 338 of the stationary hooks 336. Accordingly, the positioning of the support plate 324 between the wall members or between a side wall and a central member is necessarily correct. This may allow the edges 340, 342 of the support plate 324 to be correctly positioned on gaskets 319, 329 covering support surfaces that support the edge surfaces 340, 342 of the support plate 324. See FIGS. 15A and 15B. Such positioning may provide an improved seal between the screen assembly and the screening machine. Further, positioning of the screen assemblies afforded by the alignment arrangement reduces the time needed to install a set of screen assemblies.

Figure 14B:
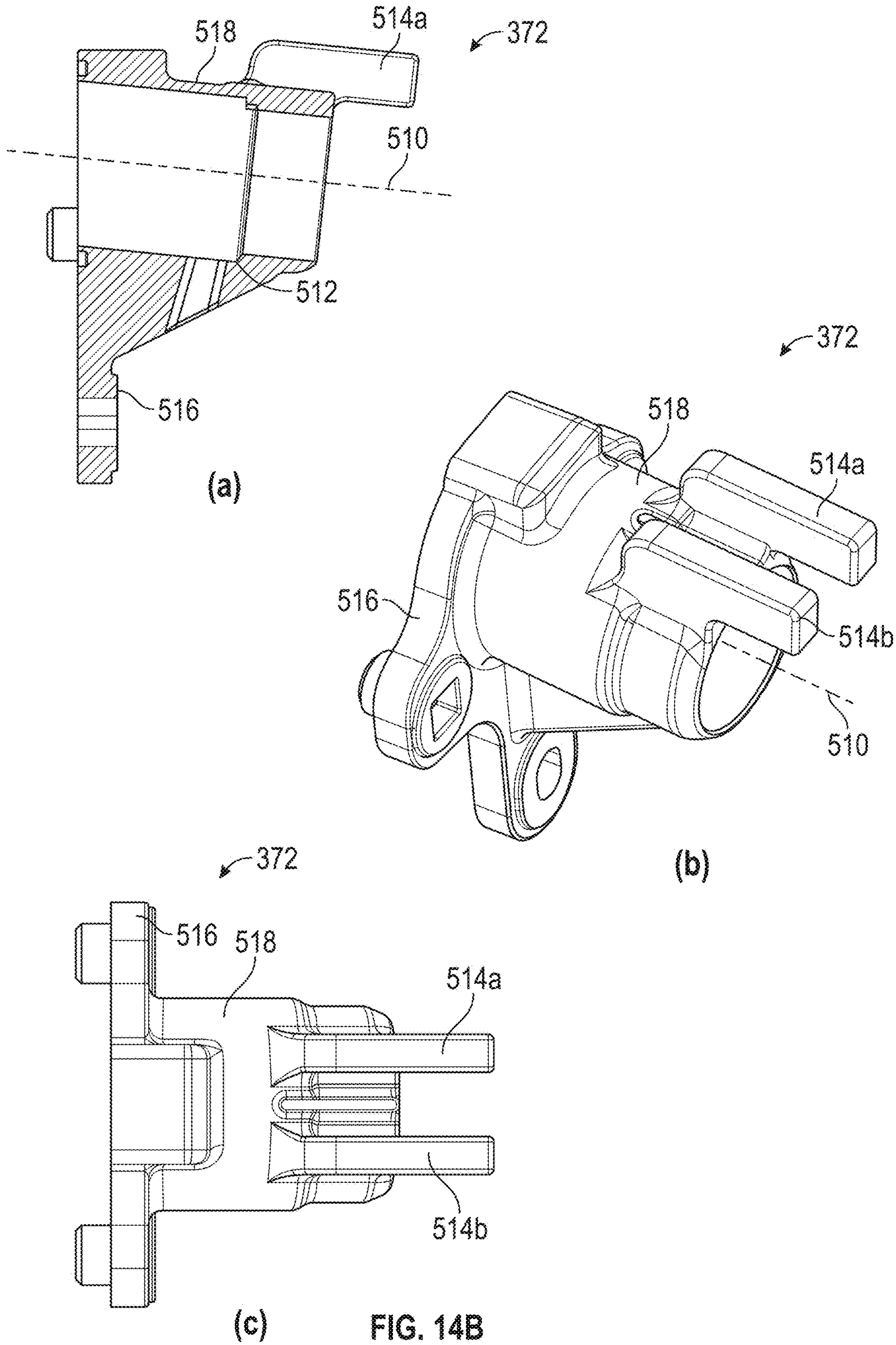
FIG. 14B illustrates three views of an inner compression mounting bracket including: (a) a cross-sectional side view; (b) a front perspective view; and (c) a top view, in an embodiment.

FIG. 14B illustrates three views of the inner compression mounting bracket 372 including: (a) a cross-sectional side view; (b) a front perspective view; and (c) a top view, in an embodiment. The inner compression mounting bracket 372 includes a base plate 516 configured for attachment to an inner wall of the screening machine. A hollow journal housing 518 extends from the base plate 516. The hollow interior 510 of the journal housing 518 is sized to receive the actuator rod 374 and the surrounding spring 384. See also FIG. 13E. The hollow interior 510 of the journal housing 518 includes a step 512 having a reduced diameter. When the actuator assembly is assembled, the collar 377 disposed about the actuator rod 374 is disposed against the step 512.

In an embodiment, the inner compression mounting bracket 372 includes first and second alignment guides 514*a*, 514*b* affixed to an upper surface of the journal housing 518. These guides 514*a*, 514*b* are disposed on opposing sides of the L-shaped bracket 502 of the pawl 336 (see, e.g., FIG. 14A), when the compression assembly is assembled (see, e.g., FIGS. 13A and 13B). The guides 514*a*, 514*b* provide stability to the pawl 336 as it moves between retracted and extended positions. Of further note, the use of the L-shaped bracket 502 and guides 514*a*, 514*b* allows the pawl 336 to engage a screen assembly nearer to its peripheral edge while the interior portion of the compression assembly is disposed below the pawl 336 and screen assembly.

Figure 14C:
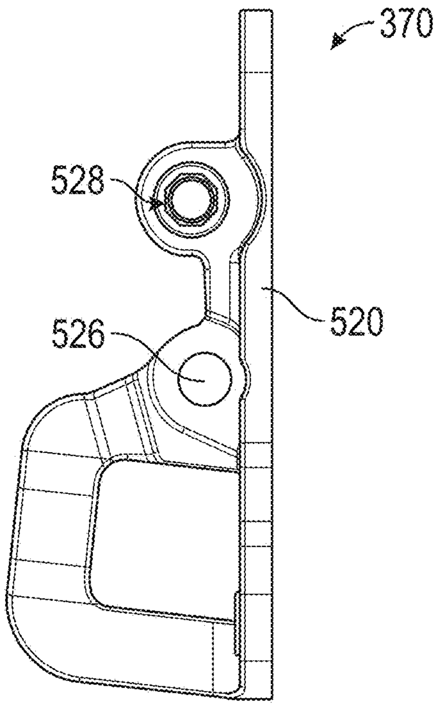
FIG. 14C illustrates three views of an outer compression mounting bracket including: (a) a side view; (b) a perspective view; and (c) a bottom view, in an embodiment.
Figure 14C:
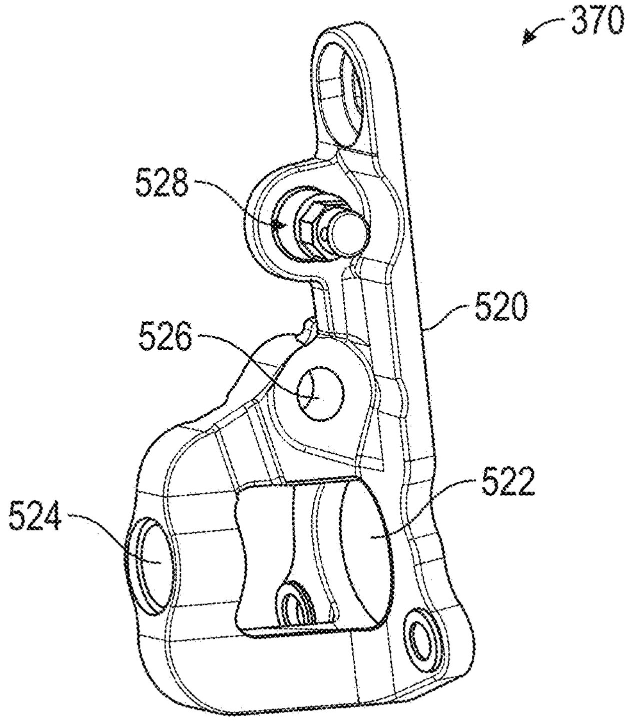
Figure 14C:
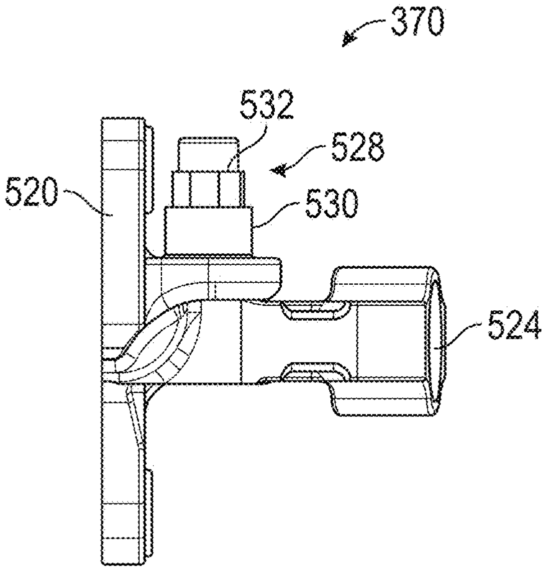

FIG. 14C illustrates three views of the outer compression mounting bracket 370 including: (a) a side view; (b) a perspective view; and (c) a bottom view, in an embodiment. The outer compression mounting bracket 370 includes a base plate 520 configured for attachment to an outer wall of the screening machine and, in an embodiment, to the inner compression mounting bracket 372. The base plate 520 includes a base plate aperture 522 through which the actuator rod 374 and the surrounding spring 384 may pass. A journal or rearward bearing 524 receives a rearward end of the actuator rod 374 when the compression assembly is assembled. See also FIG. 5E. The outer bracket 370 also includes a mounting aperture 526 that is transverse to the base plate aperture 522 and rearward bearing 524. The mounting aperture 526 provides a location to pivotally attach the actuator bracket 376 to the outer compression mounting bracket 370. Additionally, the outer compression mounting bracket 370 includes a stud 528 for mounting the locking latch 390 to the outer bracket 376. The stud 528 includes a round base section 530 and a hexagonal section 532. The stud 528 engages an eccentric nut to which the locking latch 390 is attached as further discussed below. Of note, the addition of the rearward bearing 524 provides additional support for the actuator rod 374 when the compression assembly is assembled. That is, a forward end of the actuator rod 374 is supported within the interior of the inner compression mounting bracket 372 while the rearward end of the actuator rod 374 is supported by the rearward bearing 524. This reduces non-linear movement of the actuator rod 374 thereby reducing wear and extending the life of the actuator rod 374.

Figure 14D:
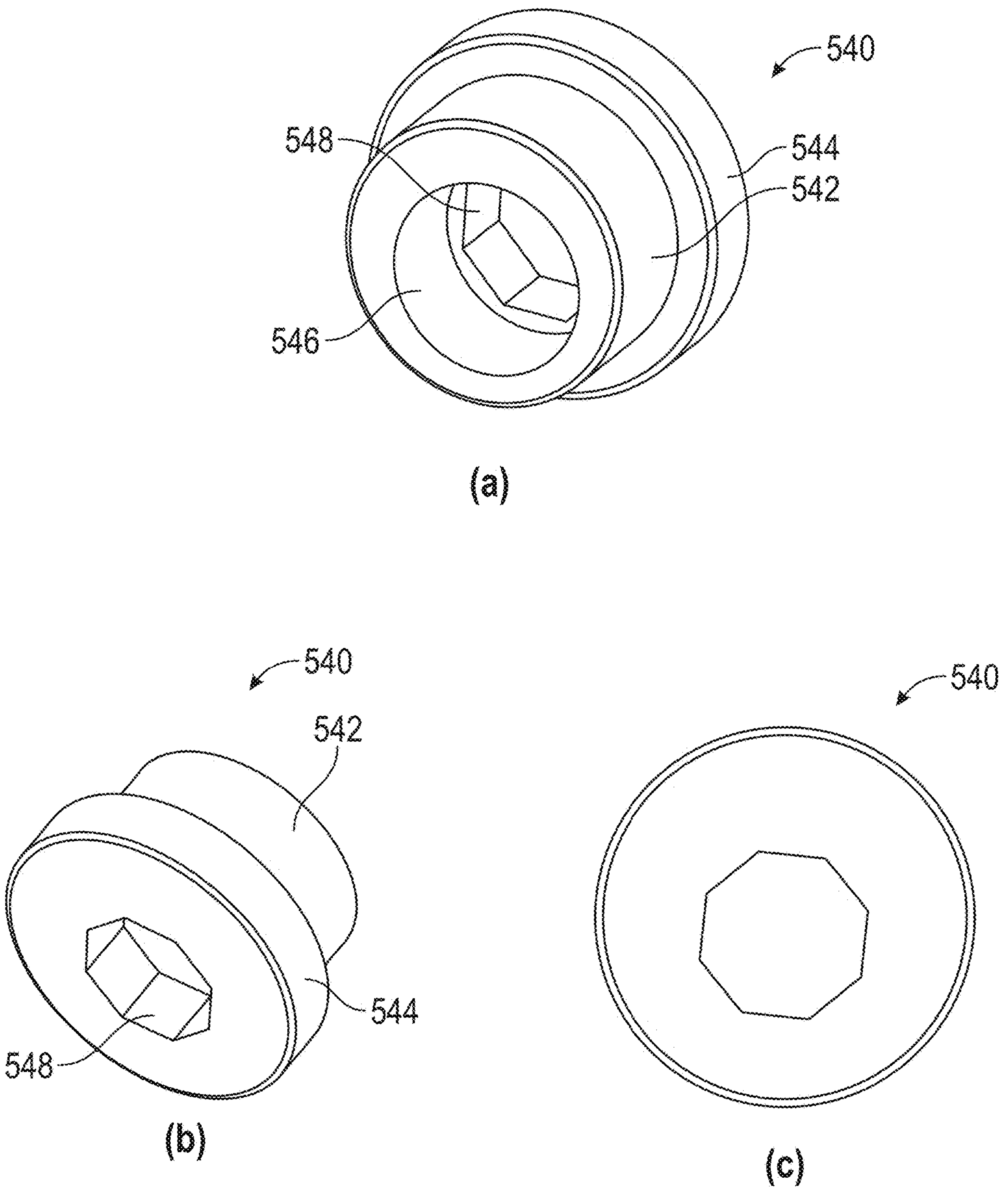
FIG. 14D illustrates three views of an eccentric nut including: (a) a first perspective view; (b) a second perspective view; and (c) a rear view, in an embodiment.

FIG. 14D illustrates three views of an eccentric nut 540 including: (a) a first perspective view; (b) a second perspective view; and (c) a rear view, in an embodiment. The eccentric nut 540 is configured to attach the locking latch 390 on the stud 528 of the outer compression mounting bracket 370. The eccentric nut 540 includes a first cylindrical outer surface 542 sized for receipt within a corresponding aperture 396 of the locking latch. See also FIG. 13F. The locking latch 390 rotates about this outer surface when assembled. The eccentric nut 540 also includes a second cylindrical outer surface 544 that forms a retaining lip around the first cylindrical surface 542. This retaining lip holds the locking latch 390 in place when the eccentric nut 540 is affixed to the outer bracket stud 528. The eccentric nut 540 includes two hollow interior portions, a round portion 546 and a hexagonal portion 548. The round portion 546 of the nut 540 is configured to fit over and around the round portion 530 of the outer bracket stud 528 and the hexagonal portion 548 of the eccentric nut 540 is configured to fit over and around the hexagonal portion 532 of the outer bracket stud 528. The hollow inner portions of the eccentric nut 540 are offset from the central axis of the outer cylindrical surfaces of the nut 540. When the eccentric nut 540 is engaged with the stud 528 (see also FIG. 14C) the mating hexagonal portions prevent the eccentric nut 540 from turning. Further, by selecting the orientation of the eccentric nut 540 relative to the stud 528, the position of the outer surface 542 on which the locking latch 390 rotates may be adjusted. Such adjustment may allow for fine tuning the latch and/or spring compression.

Figure 14E:
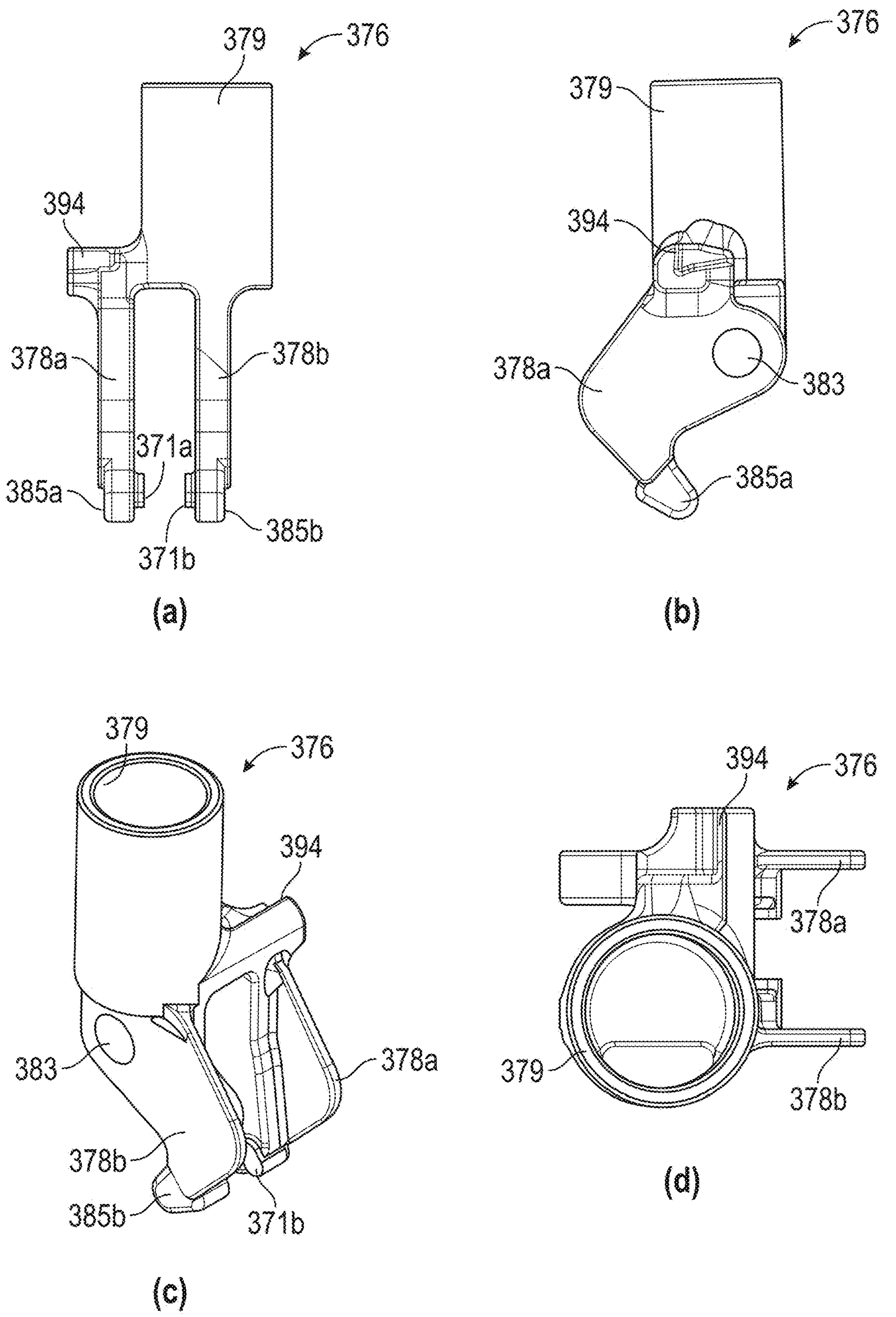
FIG. 14E illustrates four views of an actuator bracket including: (a) a first side view; (b) a second side view; (c) a perspective view; and (d) a top view, in an embodiment.

FIG. 14E illustrates four views of the actuator bracket 376 including: (a) a first side view; (b) a second side view; (c) a perspective view; and (d) a top view, in an embodiment. The actuator bracket 376 attaches to the outer compression mounting bracket 370 via a bolt or pin that passes through an aperture 383 that passes through the first and second extension arms 378*a*, 378*b*. As noted above, the inner surfaces of the extension arms 378*a*, 378*b* include first and second pins 371*a*, 371*b*, respectively, that are configured to pivotally engage the side notches 375 in the actuator rod 374. See also FIGS. 13E and 13F. Distal tips 385*a*, 385*b* of the forked extension arms 378*a*, 378*b* are configured to engage a rearward end of the spring 384 when the compression assembly is assembled.

Figure 14F:
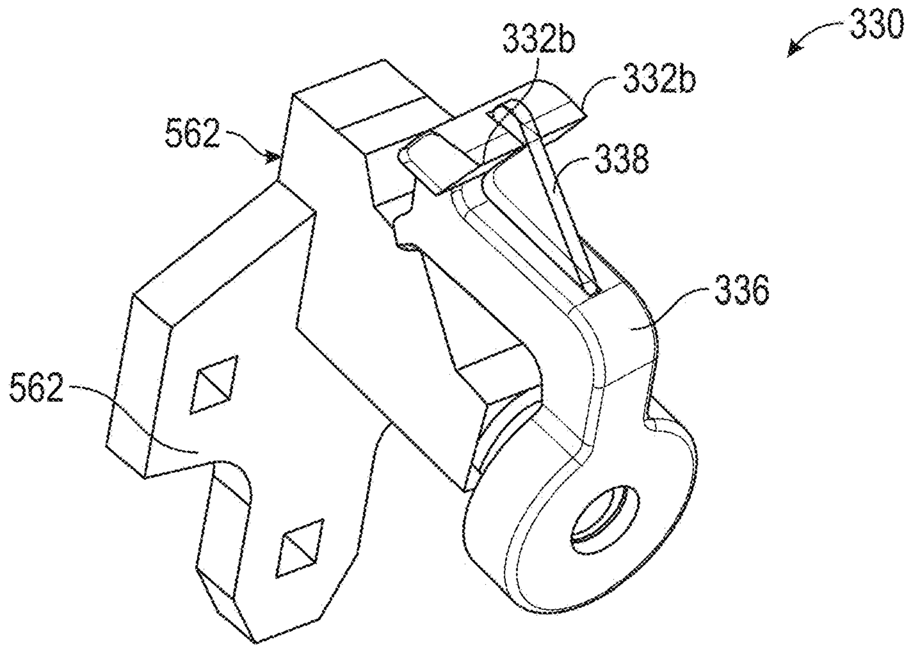
FIGS. 14F and 14G and illustrate perspective and exploded views, respectively, of a stationary hook assembly, in an embodiment.
Figure 14G:
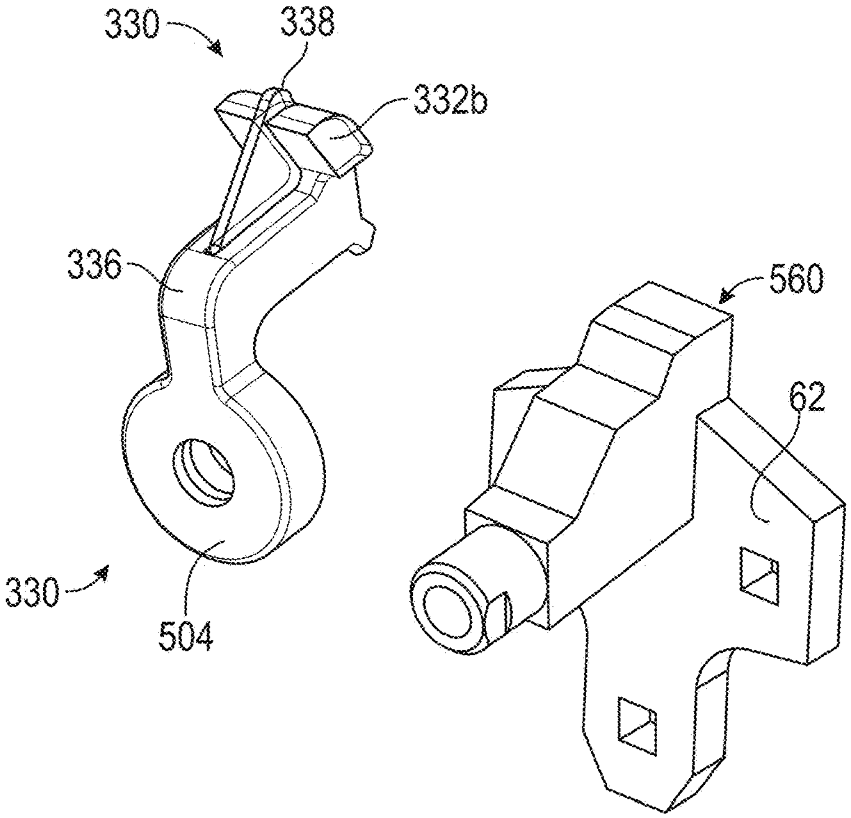

FIGS. 14F and 14G and illustrate a perspective and exploded view of a stationary hook assembly 330 for attachment to a wall member or central member of a screening machine, in an embodiment. The stationary hook assembly 330 utilizes the same pawl 336 that is utilized with the compression assembly as discussed above in relation to FIG. 14A, including a knuckle 338 disposed between two hooks 332*a*, 332*b*. Further discussion of the pawl 336 is omitted for brevity. When utilized with the stationary hook assembly 330, the mounting element 504 of the pawl is bolted to a mounting bracket 560, which has a plate 562 configured for attachment (e.g., bolted or welded) to a wall or central member of the screening machine.

In some embodiments, the stationary hook assembly 330 could include a biasing element, such as a spring, similar to the stationary compression piston assemblies illustrated in FIGS. 9A and 9B. This would allow the stationary hooks 332*a*, 332*b* to move slightly when a screen assembly is mounted. This may also allow the at rest positions of the stationary hooks 332*a*, 332*b* to be slightly adjusted.

Figure 15B:
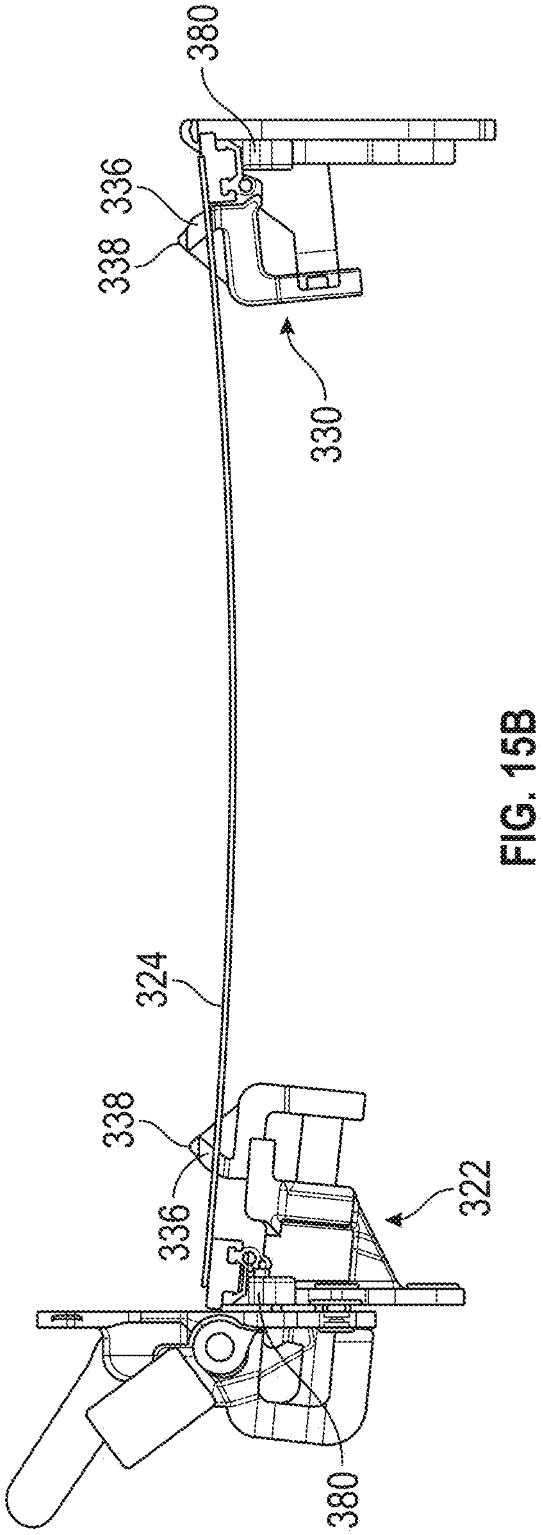
FIG. 15B illustrates the compression assembly, stationary hook assembly and plate assembly of FIG. 15A in an embodiment where the plate assembly is compressed.

FIGS. 15A and 15B illustrate the movable pawl 336 of the compression assembly 322 in conjunction with the stationary pawl 336 of the stationary hook assembly 330 compressing a support plate 324 of a screen assembly from a generally planar profile (FIG. 15A) to a generally concave profile (FIG. 15B). Once the screen assembly is correctly positioned with the hooks of the pawls 336 extending through the pass-through compression points 350 and the alignment knuckles 338 disposed through their corresponding alignment slots 354, the compression assemblies 322 may be actuated to move the movable pawls 336 from a retracted position to an extended position. As illustrated in FIG. 15A the support plate 324 may be substantially planar prior to actuation. Upon actuation, the movable pawl 336 of the compression assembly 322 may be advanced to apply a compressive force having a horizontal component applied to an edge of the pass-through compression point 350 and a vertical downward component that is applied to the top surface of the support plate 324. See FIG. 15B. This results in the support plate 324 being pushed against the stationary pawls 336 of the stationary hook assemblies 330 that extend through the pass-through compression points 350 proximate to the second edge 342 of the support plate 324. Continued advancement of the movable pawls 336 results in deflection of the support plate 324 into a concave profile against the concave support surfaces. See FIG. 15B.

Figure 15C:
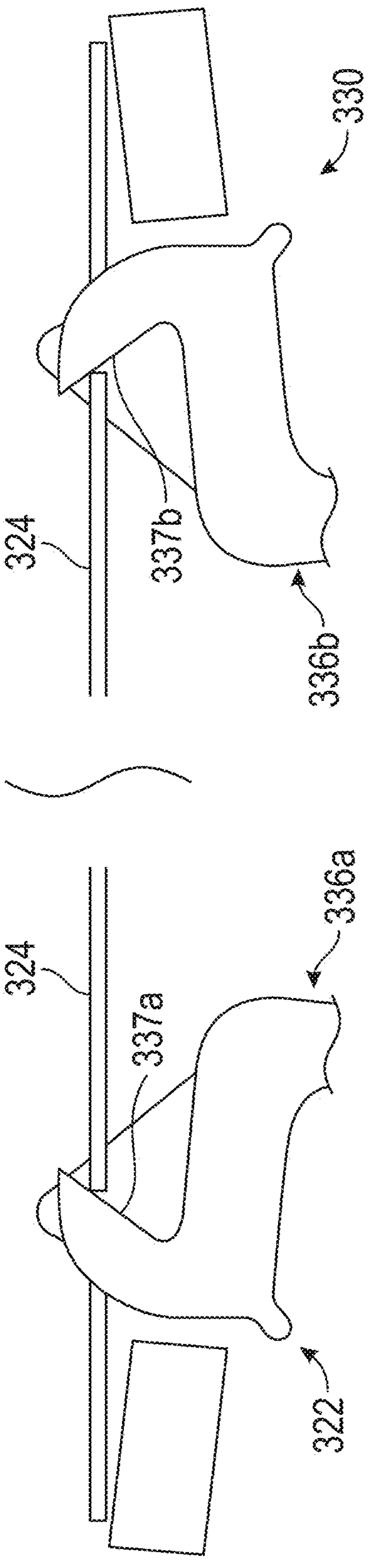
FIG. 15C illustrates a partial close-up view of the compression assembly and stationary hook assembly of FIGS. 15A and 15B in an embodiment where the plate assembly is not compressed.
Figure 15D:
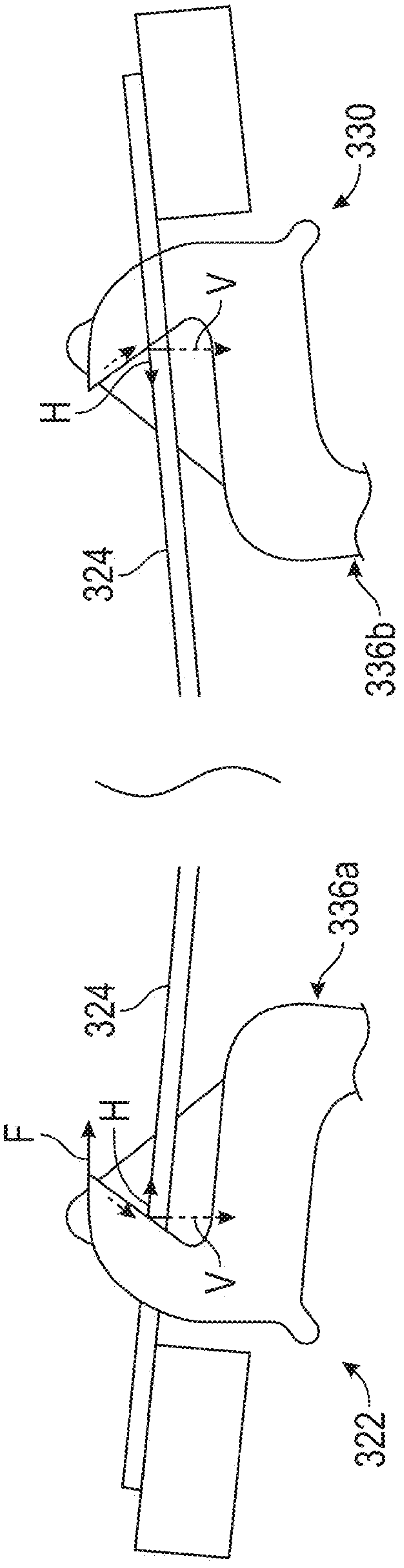
FIG. 15D illustrates a partial close-up view of the compression assembly and stationary hook assembly of FIGS. 15A and 15B compressing a plate assembly of a screen assembly, in an embodiment.

FIGS. 15C and 15D illustrate partial close-up views of the pawls 336*a*, 336*b* of the compression assembly 322 and stationary hook assembly 330 engaging the support plate 324 of a screen assembly. The movable or actuated pawl of the compression assembly is referred to as pawl 336*a* while the stationary pawl of the stationary hook assembly 330 is referred to as pawl 336*b*. Initially, the movable pawl 336*a* of the compression assembly 322 is advanced to a location such that the hook contact face 337*a* of the movable pawl 336*a* engages the inside edge (e.g., as measured from a centerline of the support plate 324) of the pass-through compression point 350*a*. See also FIG. 12E. Advancement of the movable pawl 336*a* pushes the support plate 324 until the inner edge of the opposing pass-through compression point 350*b* engages the contact face 337*b* of the stationary pawl 336*b*. At this point, the support plate 324 is undeflected while being secured between the opposing pawls 336*a*, 336*b*. See FIG. 15C. After the plate is secured between the pawls 336*a*, 336*b*, continued advancement of the moveable pawl 336*a* shown by the force vector 'F' results in the support plate 324 sliding down the angled contact surfaces 337*a*, 337*b* of the pawls 336*a*, 336*b* as illustrated by the movement arrow down the face of the pawl. Further inward movement of the movable pawl 336*a* applies gradually greater force to the support plate. Movement down these opposing angled contact faces 337*a*, 337*b* results in the vertical component of the force vector 'V' increasing more than the horizontal component of the force vector 'H' applied to the support plate 324. The result is that the support plate 324 is compressed into a concave profile against underlying supports (not shown) with a large vertical downward force component.

Of note, as the inner edges of the pass-through compression points 540 engage and slide down the contact faces 337*a*, 337*b* of the pawls, the support plate 324 should not bind on the contact faces 337*a*, 337*b* of the pawls. Along these lines, it has been found that increasing the hardness of the hooks/pawls 336 and/or the contact faces 337*a*, 337*b* relative to the hardness of the support plate 324 can prevent such binding. This is, if at least the contact faces 337*a*, 337*b* have a hardness that is greater than a hardness of the support plate 324, the support plate 324 will not gouge the contact surfaces 337*a*, 337*b*, which can result in the support plate 324 binding on the contact surfaces 337*a*, 337*b* and not sliding down the contact surfaces 337*a*, 337*b*. In an embodiment, the contact surfaces 337*a*, 337*b* have a hardness of Rockwell C45. In a further embodiment the contact surfaces 337*a*, 337*b* have a hardness greater than Rockwell B 100 (HRB 100), or Rockwell C 20 (HRC 20).

In some instances, it may be beneficial to tailor the amount of the downward vertical component V of the force applied to the support plate 324. See. FIG. 15D. That is, if the support plate 324 slides too far down the contact surfaces 337 of the pawls 336, the vertical force V may be multiplied while excessively reducing the horizontal force H. Potentially, this could result in too little horizontal force being applied to the plate, thereby reducing the concave buckling of the plate and reducing the support plate's engagement with underlying supports and/or gaskets in its inner regions (e.g., near its centerline axis).

Figure 15E:
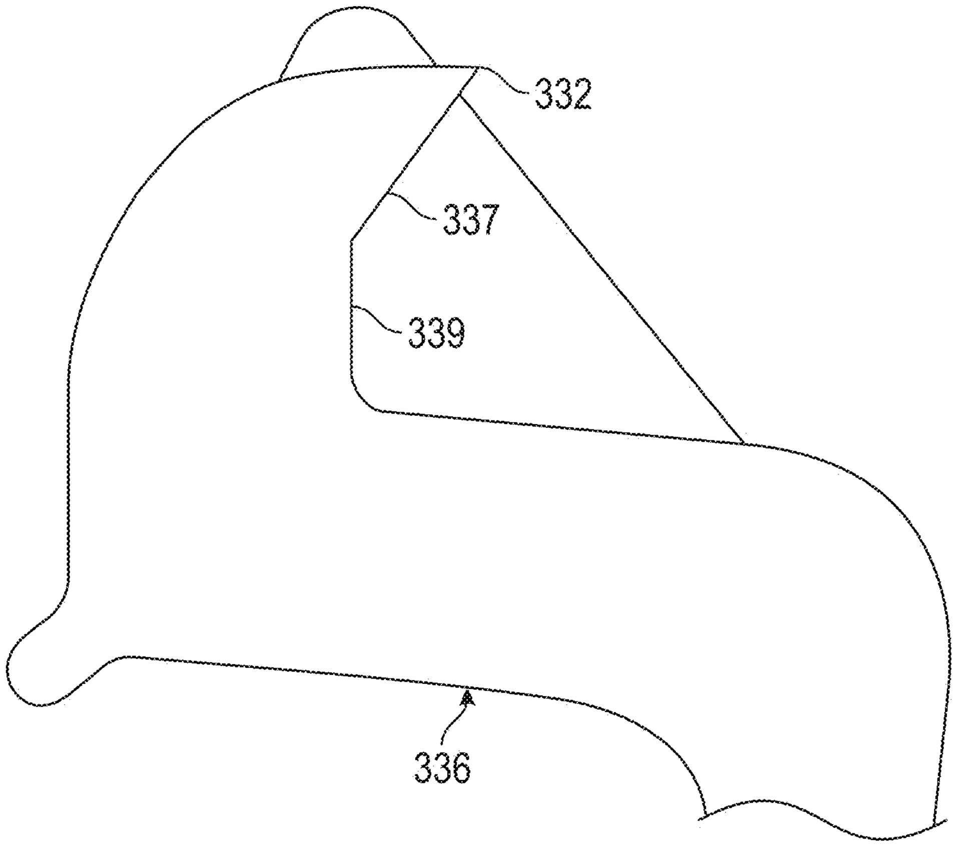
FIG. 15E illustrates an alternate pawl for use with the compression assembly and/or stationary hook assembly, in an embodiment.

FIG. 15E shows a partial view of a pawl 336 that having two contact surfaces that alter or limit movement of a support plate 324 down the contact surfaces 337, 339 of the hook 332. As shown, a first contact surface 337 has an included angle of between about 5° and about 85° degrees (see also FIG. 14A). In addition, the pawl 336 includes a second contact surface 339 that is disposed at an angle that is different than the angle of the first contact surface 337. The different angles of the first and second contract surfaces may allow for altering, limiting or eliminating continued movement of the plate down the pawl 336. In an embodiment, the first contact surface 337 may have a first angle that initially applies a primarily downward vertical force component to the support plate. Once the support plate engages the intersection between the first and second contract surfaces 337, 339, additional downward vertical force may be reduced while more horizontal force is applied to the plate. In another embodiment, the second contact surface 339 may be substantially vertical (e.g., perpendicular to a horizontal reference plane defined by an overlying undeflected support plate 324; see., e.g., FIG. 15A). Alternatively, the second contact surface 339 may form a lip or step (e.g., a surface substantially parallel to a horizontal reference plane defined by an overlying undeflected support plate 324). In such an embodiment, the second contact surface 339 limits or eliminates movement of a support plate 324 beyond the first contact surface 337. After the support plate 324 moves down the contact surface 337 and engages the substantially vertical second contact surface 339, continued sliding of the support plate 324 is mostly or entirely prevented. Accordingly, any additional movement of the pawl 336 results primarily in application of additional horizontal force to the support plate 324. As will be appreciated, the angles, length and/or locations of the first contact surface 337 and the second contact surface 339 may be selected to apply horizontal and vertical forces of desired magnitudes to the support plate 324. Further, it will be appreciated that a contact surface may be an arcuate surface where vertical and horizontal applied forces vary over the length of the arcuate or otherwise irregular surface.

Referring again to FIGS. 15A and 15B, the movable pawls 322 of multiple ones of the compression assemblies adjacent the first side edge 340 of the support plate 324 are designed to engage with corresponding ones of the pass-through compression points 350*a* along the first side edge 340 of the support plate 324. Likewise, multiple ones of the stationary pawls 330 mounted on a central abutment or an opposite sidewall of a vibratory screening machine are configured to engage with corresponding ones of the pass-through compression points 350*b* on the second side edge 342 of the support plate 324. Ideally, the movable pawls 322 would all be aligned with one another and the stationary pawls 330 would all be aligned with one another. However, if the sidewall upon which the compression assemblies are mounted is not strictly parallel to opposite sidewall or abutment upon which the stationary pawls are mounted, the distance between each pair of movable and stationary pawls may be different. Similarly, if either the compression assemblies or the stationary pawls become altered or bent over time, the distance between each pair of movable and stationary pawls may be different. The differences in the spacing between each pair of movable and stationary pawl can result in undesirable warping or buckling of the support plate when the compression assemblies are actuated to mount a screen assembly to the vibratory screening machine.

One way to account for small differences in the spacing between each pair of movable and stationary pawl is to build in some compliance in the compression assemblies. For example, each compression assembly could be configured such that the compression piston or the movable pawl in each compression assembly need not be advanced the exact same distance inward before the compression assembly is latched. This could be accomplished by spring mounting the compression piston or the movable pawls such that their final locked positions could vary slightly.

Another way to account for small differences in the spacing between each pair of movable and stationary pawls is to build in some compliance in the stationary pawls 330. For example, the mounting bracket 560 for the stationary pawls (see FIGS. 14F and 14G) could include a spring element that allows the stationary pawls to move slightly in the inward/outward direction relative to the sidewall or abutment to which the stationary pawl is mounted. This will allow the stationary pawls to move slightly in the inward/outward direction when a screen assembly is being mounted to a vibratory screening machine to account for small differences in the spacing between pairs of the movable and fixed pawls.

Figure 15F:
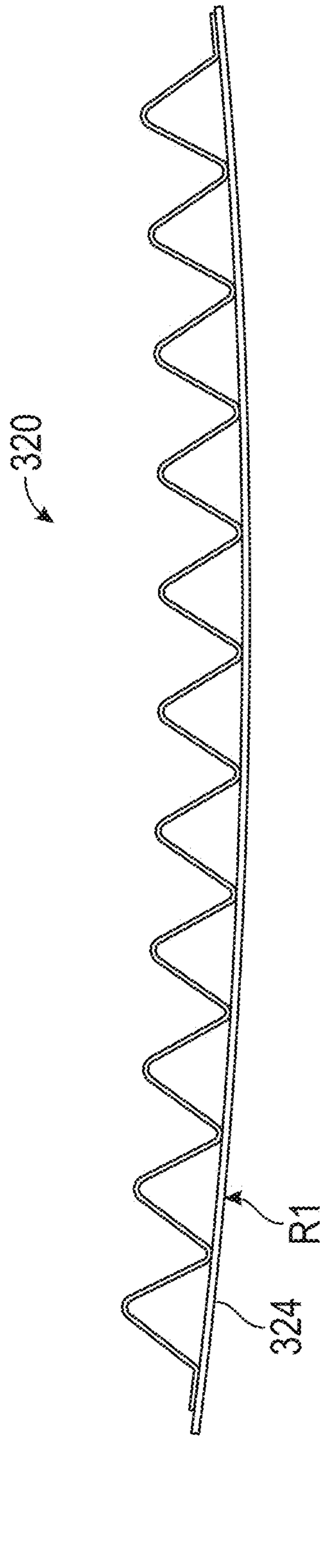
FIGS. 15F and 15G illustrate radius of curvature of an under-compression screening assembly and a prior art screening assembly, respectively, in an embodiment.
Figure 15G:
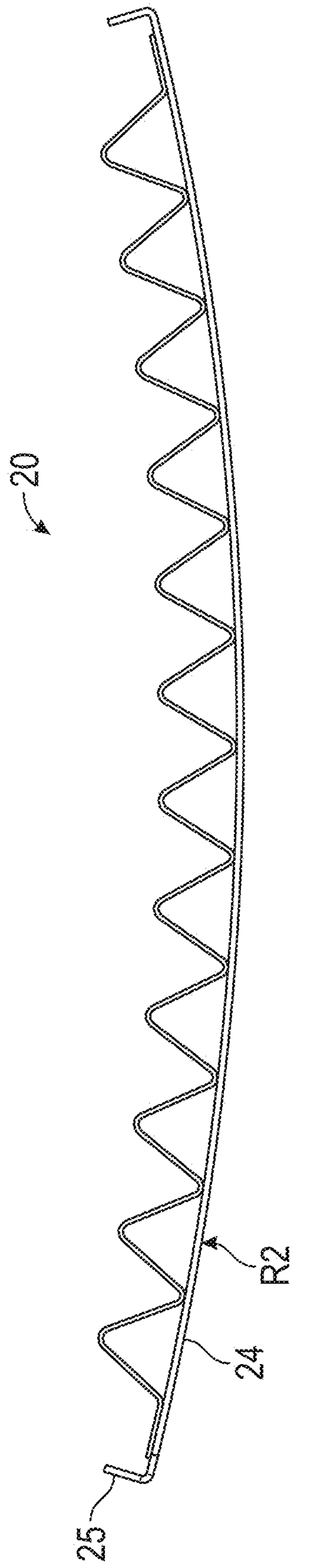
FIG. 15G (Prior Art)

A further benefit of the under-compression arrangement is that the screening assemblies 320 may be installed in a flatter (e.g., less concave) configuration. That is, the ability to engage the panels through the support plate between their edges and apply an increased downward force to the support plate 324 allows for sufficiently holding the screening assemblies 320 relative to a screening machine while the screening assemblies 320 are held flatter. FIG. 15F illustrates a radius of curvature R1 of a screening assembly 320 configured to be engaged by an under-compression arrangement in accordance with one or more embodiments of the present disclosure. FIG. 15G illustrates a radius of curvature R2 of a prior art screening assembly 20 configured to be engaged via an edge surface such as an upward flange 25 extending above a top surface of the support plate 24. In the prior art screening assembly 20 configuration, a radius of curvature R2 (e.g., in inches) was in a range of between about 40 and 60, with a screening assembly 20 having a 50 inch radius of curvature being illustrated in FIG. 15G. That is, a high degree of concavity was required to permit the screening assembly 20 to sufficiently buckle and seal with underlying gaskets.

In contrast, screening assemblies 320 configured for use with the under-compression arrangement disclosed herein may be formed with larger radii of curvature while still sufficiently sealing with underlying gaskets. As illustrated in FIG. 15F, the screening assembly 320 has a radius of curvature of 100 inches, resulting in a significantly flatter screening assembly in comparison to prior art screening assemblies. Further, screening assemblies 320 used with the under-compression arrangements disclosed herein could have radii of curvature R1 in the range of about 60 inches to about 140 inches. The ability to provide flatter screening assemblies results in a significant benefit for a screening machine. Specifically, as material (e.g., fluid pool) passes over the length of the screening assemblies, the fluid pool spreads over a greater portion of the width of the concave screen assembly (between its opposing edge surfaces). This results in the fluid pool being in contact with a larger portion of the screening surface, thereby increasing the screening capacity of each screening assembly.

Figure 15H:
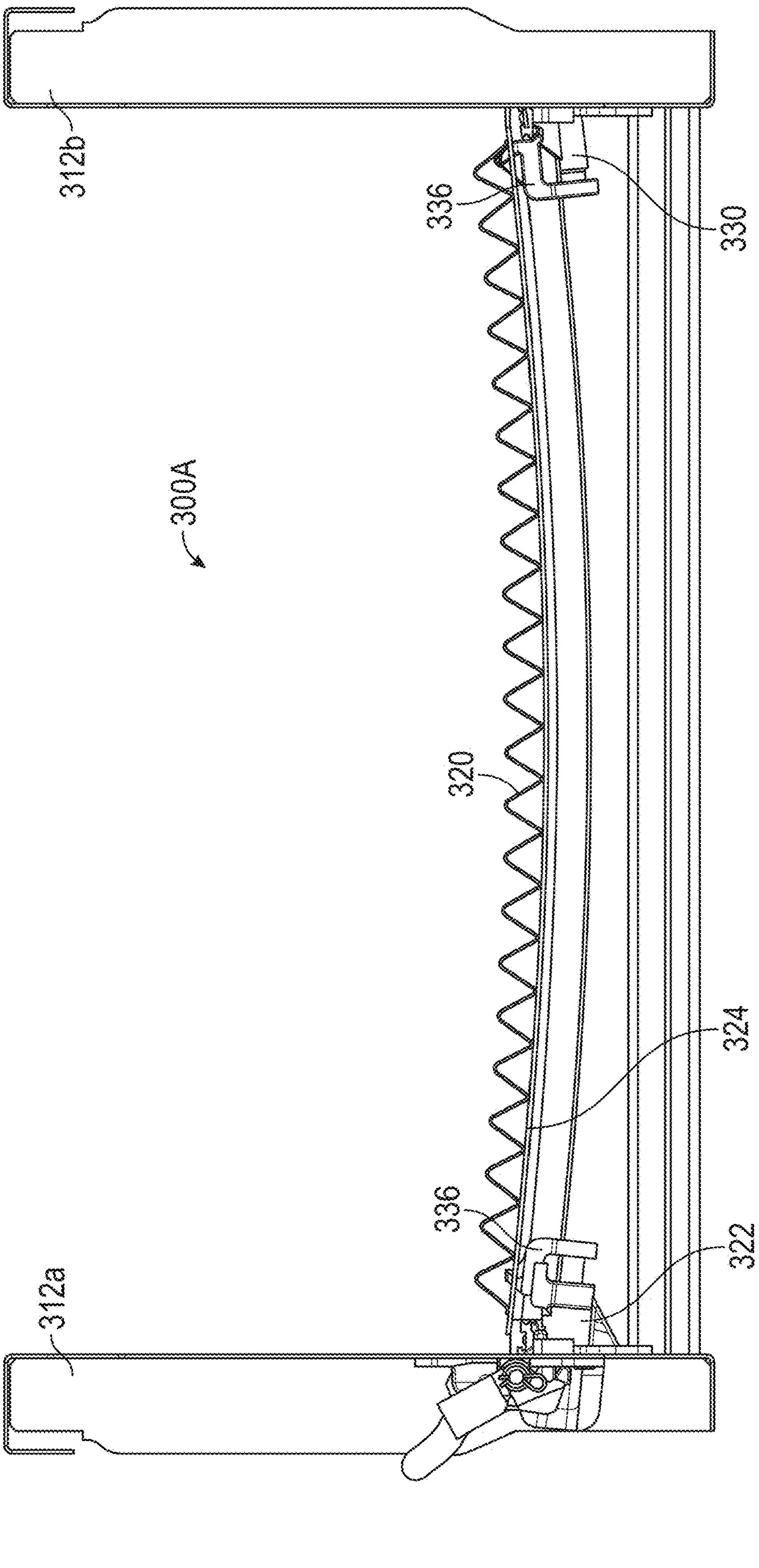
FIG. 15H illustrates an end view of the screening assembly of FIG. 15F compressed against a bed of an under-compression screening machine, in an embodiment.
Figure 15I:
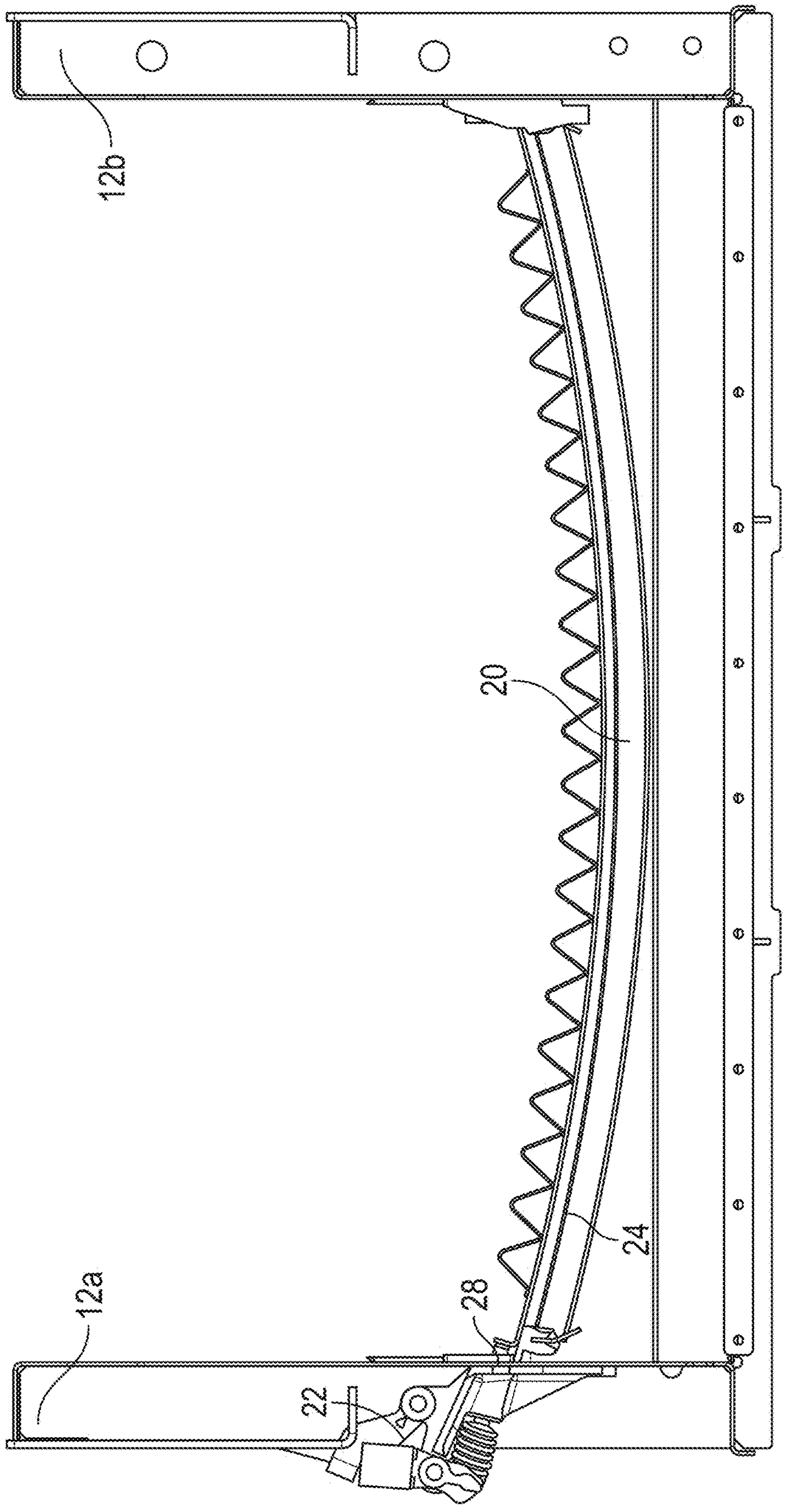
FIG. 15I illustrates an end view of the screening assembly of FIG. 15G compressed against the bed of a prior art screening machine, in an embodiment.

FIG. 15H illustrates an end view of the screening assembly of FIG. 15F compressed against a bed of an under-compression screening machine 300A in accordance with the present disclosure (see also FIG. 1D). FIG. 15I illustrates an end view of the prior art screening assembly 20 of FIG. 15G compressed against the bed of a prior art screening machine 10A (see also FIG. 2B). As shown in FIG. 15H, the compression assembly 322 and stationary hook assembly 330 each have a pawl 336 that extends through the pass-through compression points in the support plate 324 of the screening assembly 320, which is disposed between first and second sidewalls 312*a*, 312*b* of the illustrated single-trough screening machine 300A.

In contrast, as illustrated in FIG. 15I, the screening machine utilizes a compression assembly 22 disposed on a first wall 12*a* of the machine to engage a vertical flange 28 extending above the edge surface of a plate 24 of a screen assembly to force a second edge surface of the screening assembly 20 against a second wall 12*b* (e.g., abutment surface) of the machine. In the under-compression machine 300A of FIG. 15H, the pawls 336 engage the screening assembly 320 at locations within an interior of the support plate 324 (e.g., between the edges of the plate) and spaced a distance from the sidewalls 312*a*, 312*b*. As discussed above, the location of the pawls within the interior of the screen assembly and/or the shape of the hooks of the pawls (e.g., the contact surface or hook face), permit the under-compression assembly to apply a larger downward force to the screening assembly compared to the compression assembly 22 illustrated in FIG. 15I. In the screening machine of FIG. 15I the compression assembly 22 applies a force to the edge of the screening assembly resulting in much of the downward force being used to buckle the plate 24 the screening assembly 20. Further, the machine of FIG. 15I does not benefit from the shape of the pawls/hooks contacting the plate, which act as a force multiplier.

The ability to engage the screen assembly 320 through a bottom surface to a top surface of the support plate 320 also allows for lowering the position of each compression assembly 322 on the outer surface of the wall member(s) of the screening machine 300A. That is, the compression assemblies 322 of the screening machine of FIGS. 1D and 15H may be positioned lower than the compression assemblies 22 of the screening machine 10A of FIGS. 2B and 15I, which engage an upper surface or vertical flange extending above the screening assembly. Lowering the position of the compression assemblies may eliminate interference between the compression assemblies and bracing on the outer walls of the screening machine. This may also allow more even spacing of the compression assemblies along the length of the screening machine, providing more uniform compression of the screening assemblies. Though discussed as lowering the compression assemblies on a single-trough machine of FIGS. 1D and 15H, it will be appreciated that use of an under-compression arrangement on the dual-trough machine 300 of FIGS. 1A-1C may likewise allow for lowering the compression assemblies on the outer wall of the machine.

In use, the screen assembly 320 may be fitted to a screening machine 300. More specifically, the screening assembly 320 may be disposed between the first wall 312*a* and the central member 316 of the screening machine 300 (e.g., in a dual-trough screening machine). Alternatively, such a screening assembly 320 may be disposed between first and second walls in a single-trough screening machine. Once disposed between the wall 312*a* and the central member, the screening assembly may be moved along the length of the screening machine 300 until the pawl(s) 336 and knuckle(s) 338 on a first wall 312*a* are disposed through the pass-through compression points 350*a* near a first edge 340 of the support plate 324 and the pawl(s) 336 and knuckle(s) 338 on the central member 316 (or second wall of a single-trough machine) are disposed through the pass-through compression points 350*b* near a second edge 342 of the support plate 324. More specifically, the knuckles 338 will be disposed through the alignment slots 354 of the various pass-through compression points 350, thereby correctly positioning the screening assembly relative to the screening machine. At this time, the actuator(s) may be activated to move the movable pawls 336 between a retracted position and an extended position. In the extended position, the pawls 336 apply a compressive force having both a horizontal component and vertical downward component to the pass-through compression points 350*a* near the first edge 340 of the support plate 324. The horizontal component of the force pushes the support plate 324 against the stationary pawls 336 of the stationary hook assemblies 330 extending through the pass-through compression points 350*b* near the second edge of the support plate 324. Continued advancement results in the vertical component of the force applied by the movable pawls 336 and the stationary pawls 336 compressing the plate into a concave shape (e.g., against the underlying stringers 314). See. FIG. 11A.

FIGS. 11B, 15A and 15B also illustrate the compression of the plate 324 of the screen assembly 320 against various gaskets extending about a periphery of the support plate 324. That is, a first gasket 319 may be disposed between the first edge 340 of the support plate 324 and an underlying support surface, a second gasket 329 may be disposed between the second edge 342 of the support plate 324 and an underlying support surface and third and fourth gaskets 317 (only one shown) may be disposed on the upper surfaces of the concave support surfaces 314 below the first and second ends 344, 346 of the support plate 324 (See also FIG. 12C). Due to the increased hold-down force afforded by the higher vertical component (i.e., downward force component) provided by the compression assembly, the compression force applied to the screen assembly against all of the underlying gaskets of the screening machine may be increased. The increased force/pressure against the gaskets not only provides an improved seal between the screening assembly and screening machine but also improves the life of the gaskets as there is less movement (e.g., flapping) of the screening assemblies relative to the gaskets. Accordingly, less material can penetrate between the support plate and the gaskets. Reduced movement of the screening assembly relative to the screening machine also results in improved screening. That is, as each screening assembly is held tighter against the screening machine, vibration provided by the screening machine is better transmitted to the material on top of the screening assemblies.

Another benefit of the disclosed embodiments is that the screening assemblies may omit an upward flange located near one or both edges of the screen assemblies, which were previously used to apply a compressive force to the screen assemblies. Removal of this flange eliminates the potential for material becoming trapped behind such a flange. The removal of such flanges or channels in conjunction with the increased hold-down forces, reduces or eliminates material running down the edges of the screen assemblies.

The under-compression arrangement of FIG. 1A-15B also allows for producing support plates and screen assemblies that are free of channels and/or flanges on their edges. That is, the support plates may be formed from a flat plate. Because no specialized edge channels need be attached to the edges of the support plates, the plates may be stamped or laser cut. Further, the screening assemblies may be thinner, as they do not include channels along their edges. This may allow for packaging more screen assemblies in a package of a given size. Additionally, the elimination of channels or flanges from the edges of the support plate provides additional usable surface area compared to a support plate of the same width having flanges or channels for attaching the support plate to a screening machine. This additional usable surface area permits covering the upper surface of the support plate with additional screening surface, thereby increasing the capacity of each screen assembly. Referring to FIG. 12A, is it noted that the screening surface 326 includes eleven corrugation peaks across its width. Prior screen assemblies of the same width and including attachment channels and/or flanges utilized screening surfaces having ten corrugation peaks of the same size. The addition of an extra screening surface corrugation peak on the top surface of the support plate results in a screening area increase of between about 5% and 12%. Accordingly, the capacity of each screening assembly is increased by a similar percentage. Stated otherwise, the use of the under-compression arrangement disclosed herein to attach screening panels to a screening machine results in an increase in screening area and screening capacity for a screening machine.

A further benefit of the under-compression systems disclosed herein is that the components of the compression assembly, with the exception of a small portion of the pawl 336, are positioned below the screening assembly. Further, all interior components of the compression assembly are positioned below the screening assembly. This reduces wear on these components (e.g., the actuator rod) and reduces the maintenance requirements of the screening machine. Stated otherwise, by moving these components below the screening surface, these components are not exposed to materials and fluids (e.g., the pool) above the screening surface.

Figure 16A:
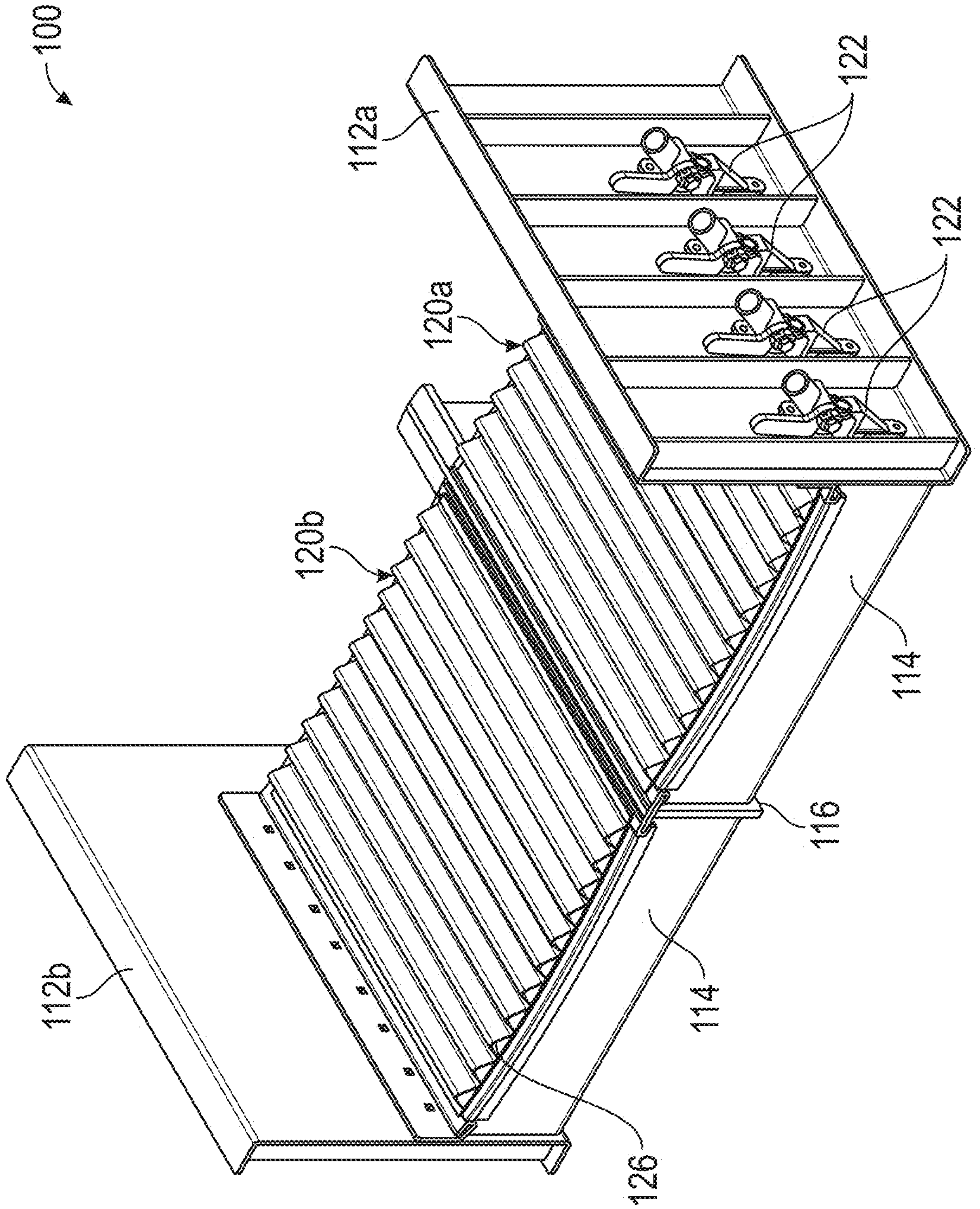
FIG. 16A shows a perspective view of a portion of a vibratory machine, in an embodiment.
Figure 16B:
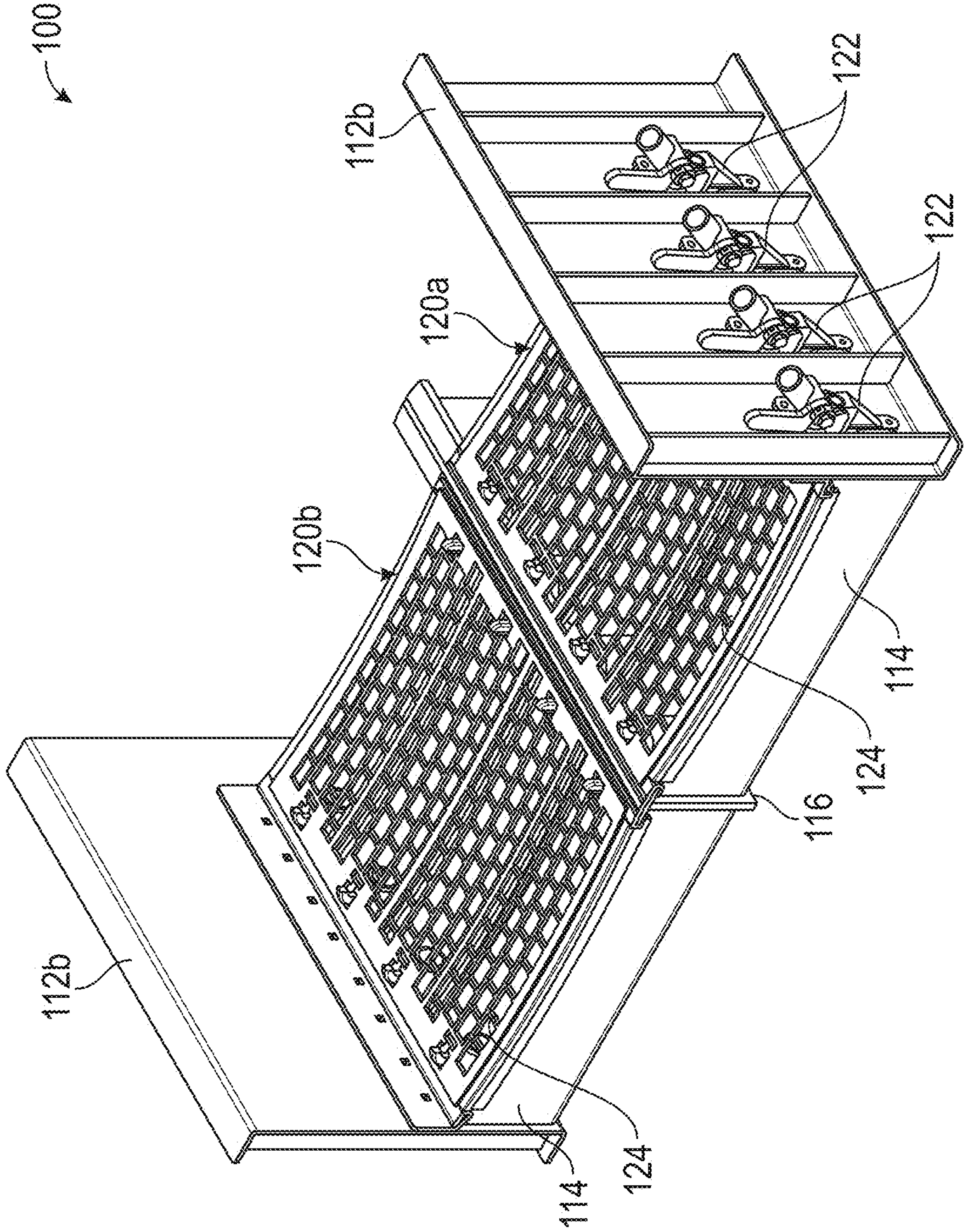
FIG. 16B shows the portion of the vibratory machine of FIG. 16A with a screen surface removed, in an embodiment.
Figure 16C:
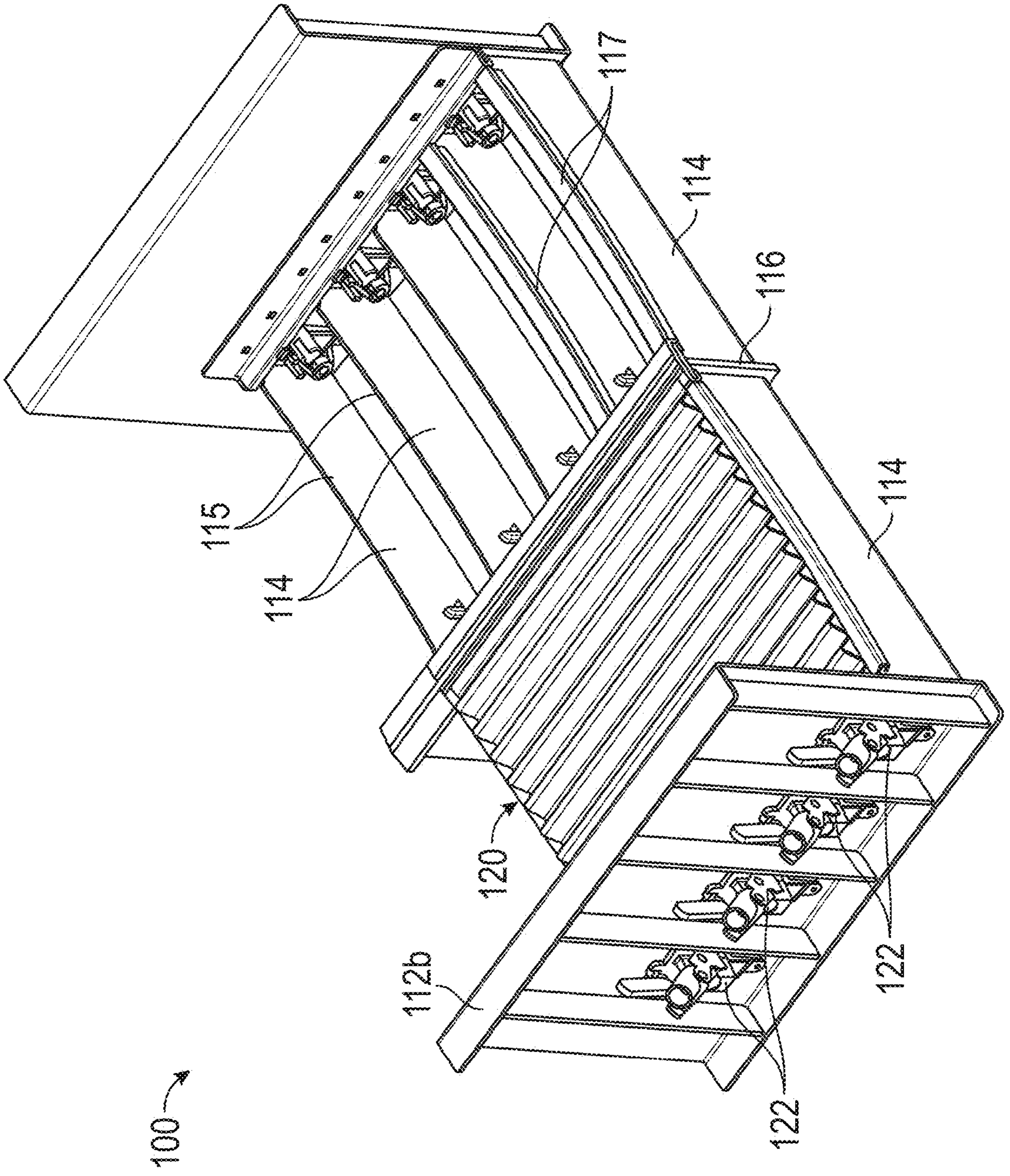
FIG. 16C shows the portion of the vibratory machine of FIG. 16A with a screen assembly removed, in an embodiment.

FIGS. 16A-16C illustrate an embodiment of a cutaway of a portion of a screening machine, which for purpose of discussion is referred to as screening machine 100. The cutaway portion may be a portion of a screening machine similar to screening machine 300 of FIGS. 1A-1C, though variations are possible. As illustrated, the screening machine 100 includes two screen assemblies 120*a*, 120*b* (hereafter 120 unless specifically referenced) disposed between interior surfaces of spaced wall members 112*a*, 112*b* (hereafter 112 unless specifically referenced). A central member 116 divides the screening machine 100 into two screening areas. That is, each screen assembly 120 includes a first edge disposed proximate to a wall member 112 and a second edge disposed proximate to the central member 116. While the screening machine 100 is illustrated as having two screen assemblies engaging a central member 116, which define two concave screening areas when the screens are compressed, the screening machine may have one screen assembly defining a single concave screen area between the first and second walls 312. See, e.g., FIG. 1D.

Compression assemblies 122 are attached to exterior surfaces of the wall members 112*a*, 112*b*. The compression assemblies 122 each include a retractable member that extends and contracts. The compression assemblies may be similar to the compression assemblies discussed above in relation to FIGS. 13A and 13B. However, the configuration of the pawl may be varied. In use, the compression assemblies 122 engage a first side of the adjacent screen assembly 120, and urge a second side of the screen assembly 120 against the central member 116 (or a second wall of a single-trough screening machine) while deforming the screen assembly 120 into a concave profile against one or more underlying concave support surfaces 114 (e.g., stringers). As discussed below, the central member 116 or second wall may, in an embodiment, have hooks that engage the second side of the screen assembly 120.

FIG. 16A illustrates the screen assembly 120 having a screen surface 126 while FIG. 16B illustrates the screening machine 100 with the screening surfaces 126 removed from the screening assemblies 120 to expose an underlying perforated support plate 124 of the screening assemblies 120. The configuration of the screening assembly 120 and the support plate 124 are more fully discussed in the description of FIGS. 19A-19C. FIG. 16C illustrates the screening machine 100 with one of the screening assemblies 120 removed to expose the concave support surfaces 114 extending between first wall 112*a* and the central support 116. Single-trough machines (e.g., FIG. 1D) may utilize similar concave supports extending between first and second walls. As shown, the concave supports 114 each have a first end attached to the wall member and a second end attached to the central support 116. As illustrated, the concave supports 114 are evenly spaced and parallel. However, other spacing may be utilized. Each support 114 has a concave upper surface 115. A gasket 117 (e.g., rubberized or otherwise compressible materials) may be disposed on the concave upper surface 115 of each support 114. Accordingly, when the compression assemblies 122 compress the screen assemblies 120 into a concave profile, the bottom surface of the screen assembly (e.g., bottom surface of support plate 124) may be compressed against the gasket 117 on the upper surface of the concave supports 114 forming a seal between the screening assembly and the screening machine. The gaskets may have a width that allows sealing an interface between two longitudinally disposed screen assemblies (not shown).

The embodiment of the screening machine 100 of FIGS. 16A-16C show an "under-compression" arrangement that compresses the screen assembly horizontally (e.g., against the central support or second wall) and vertically downward against the concave supports. In the under-compression embodiment, compression assemblies 122 on the wall member 112 include movable/actuated hooks or pawls 136, which extend through a set of hold-down or pass-through compression points 152 disposed along an edge 142 of the support plate 124. See FIGS. 19B and 19C. The pawls 136, which each define a hook in an embodiment, extend through the support plate 124 from the bottom surface of the plate to the upper surface of the plate. Actuation of the compression assemblies 122 moves the pawls 136 between a first position (e.g., retracted) and a second position (e.g., extended) where the pawls contact a compression surface of the support plate 124.

In an embodiment, a set of stationary fingers or hooks 130 are attached to the central support 116 (or second wall member in a single-trough machine 10A) and extend through a corresponding set of hold-down/pass-through compression points 150 disposed along an opposing edge 140 of the support plate 124. See FIGS. 17A, 17B and 19C. The stationary hooks 130 extend through support plate 124 from the bottom surface to the upper surface of the support plate 124. The stationary hooks could be mounted to the central support 116 with a mounting mechanism that includes a biasing element, such as a spring, similar to the stationary compression piston assemblies illustrated in FIGS. 9A and 9B. This would allow the stationary fingers or hooks 130 to move slightly when a screen assembly is mounted. This may also allow the at rest positions of the stationary fingers or hooks 130 to be slightly adjusted.

When moved to the extended position, the pawls 136 apply a compressive force 'F' having both a horizontal component 'H' and a vertical downward component 'V'. See, e.g., FIG. 17D. The compressive force is applied to a compression surface 162 of the support plate 124. The vertical component V of the force F provides a downward force to the support plate 124 while the horizontal component H of the force F urges the plate 124 away from the wall member and against the stationary hooks attached to the central member (or second wall member in a single-trough machine). The applied compressive force may deflect the screen assembly into a concave shape while securing the screen assembly to the screening machine. Though discussed herein as utilizing the stationary hooks on the central wall (or second wall member in a single-trough machine), it will be appreciated that in various embodiments, the opposing edge 140 of the plate may engage an abutment or abutment surface 26 (e.g., channel) on the central member/second wall and may omit the stationary hooks. Each of these components is further discussed herein.

In the embodiments discussed above, the support plate of the screen assembly is configured to interact with either a movable piston that contacts a mounting aperture on a side edge of the support plate, as illustrated in FIGS. 3-8B, or pawls that extend though pass-through compression points of the support plate, as illustrated in FIGS. 11-17G. In alternate embodiments, a support plate of a screen assembly could be configured to interact with both types of mounting arrangements.

Figure 17A:
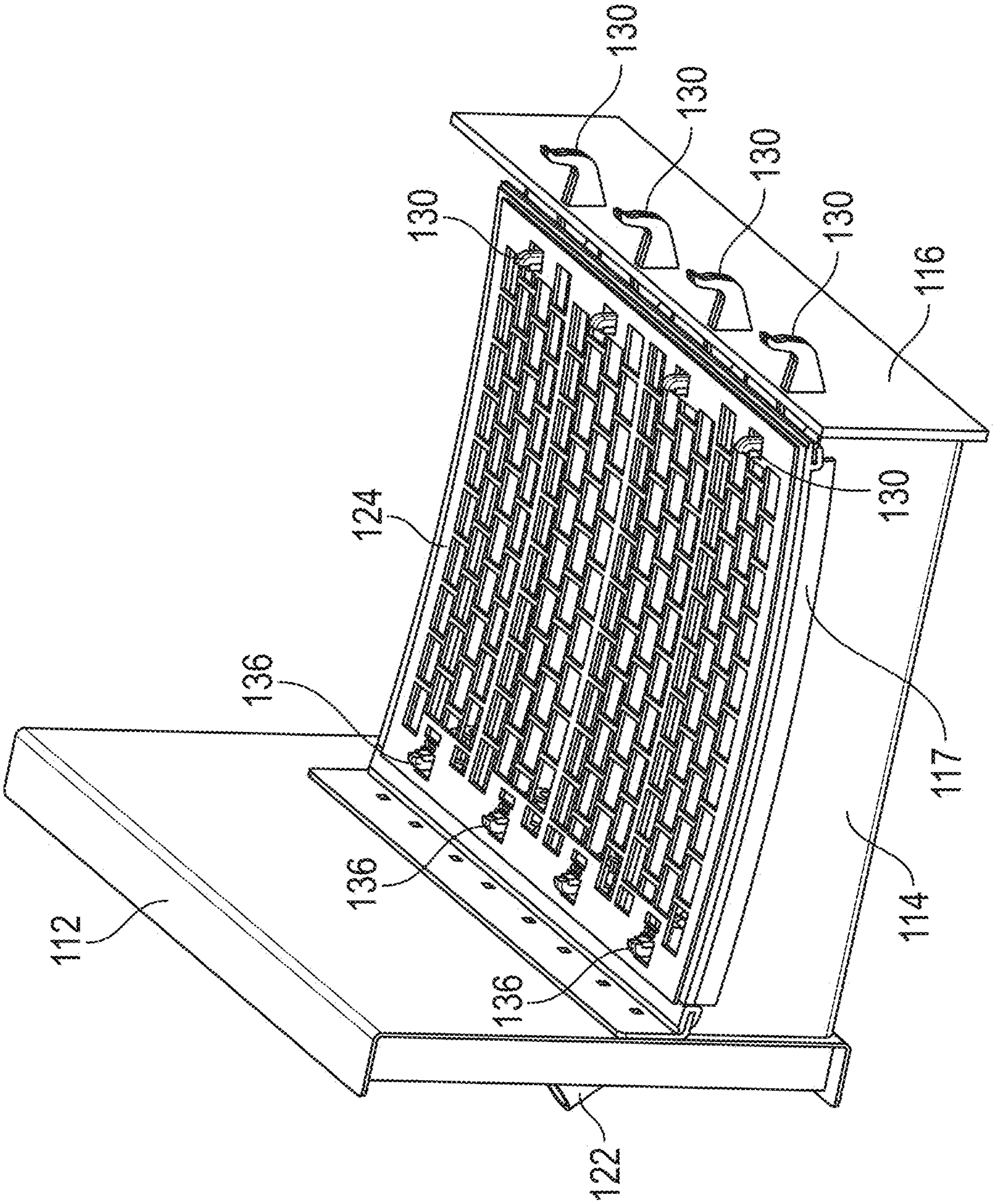
FIG. 17A shows a perspective view of a portion of the vibratory machine of FIG. 16A in an embodiment.
Figure 17B:
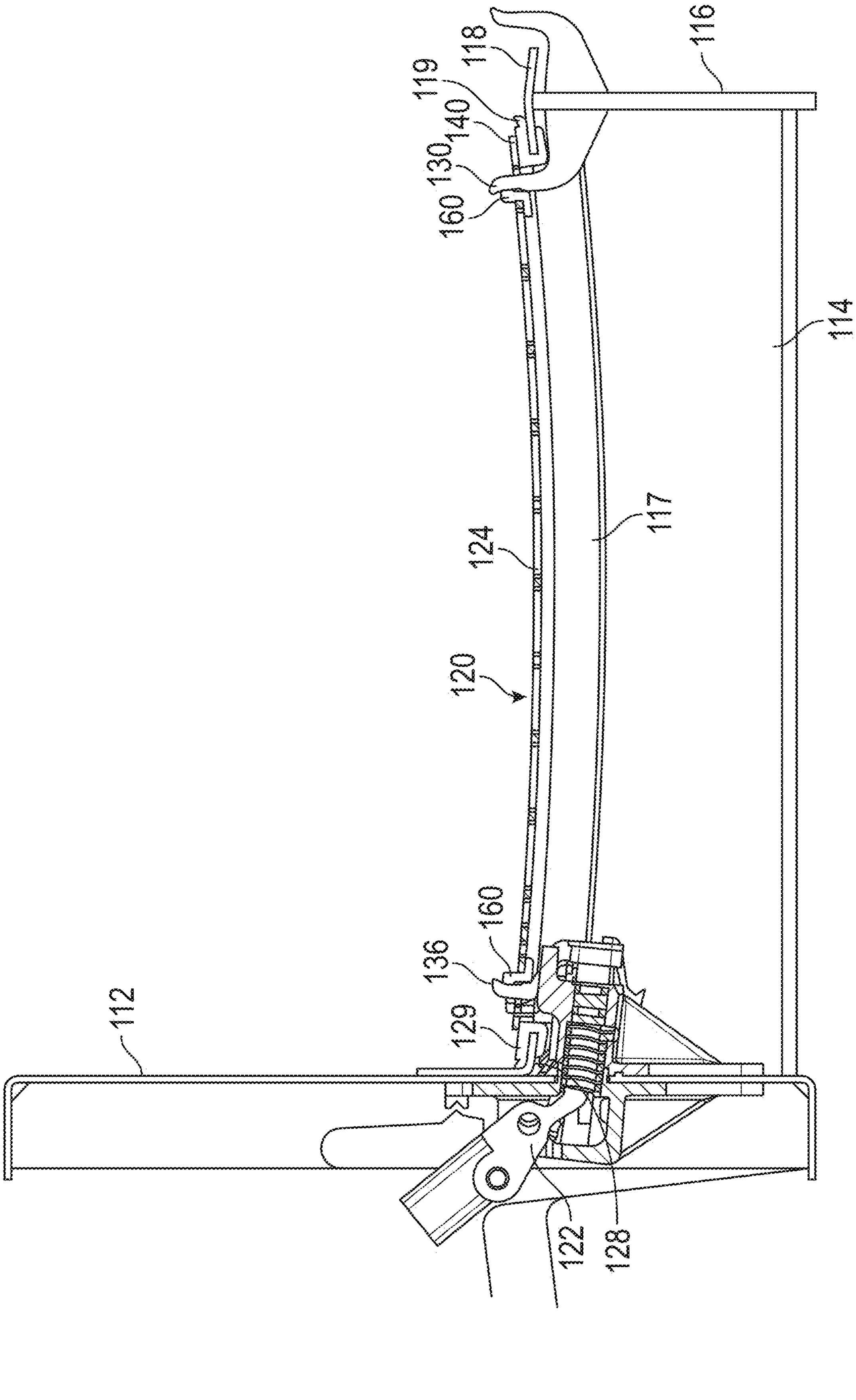
FIG. 17B shows a cross-section view of the portion of the vibratory machine illustrated in FIG. 17A in an embodiment.
Figure 17C:
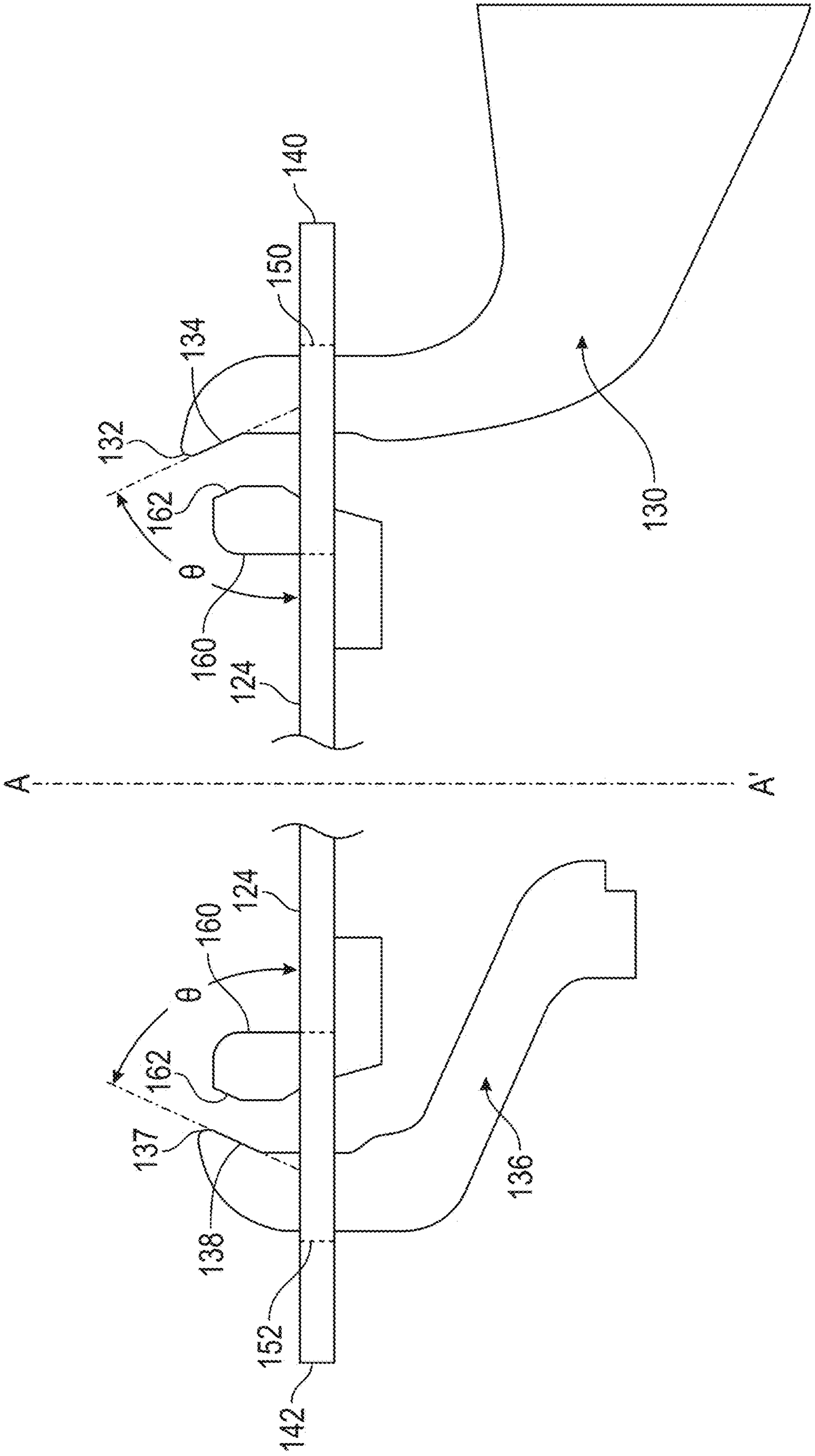
FIG. 17C shows a pawl and hook of the portion of the vibratory machine illustrated in FIG. 17A prior to compression, in an embodiment.
Figure 17D:
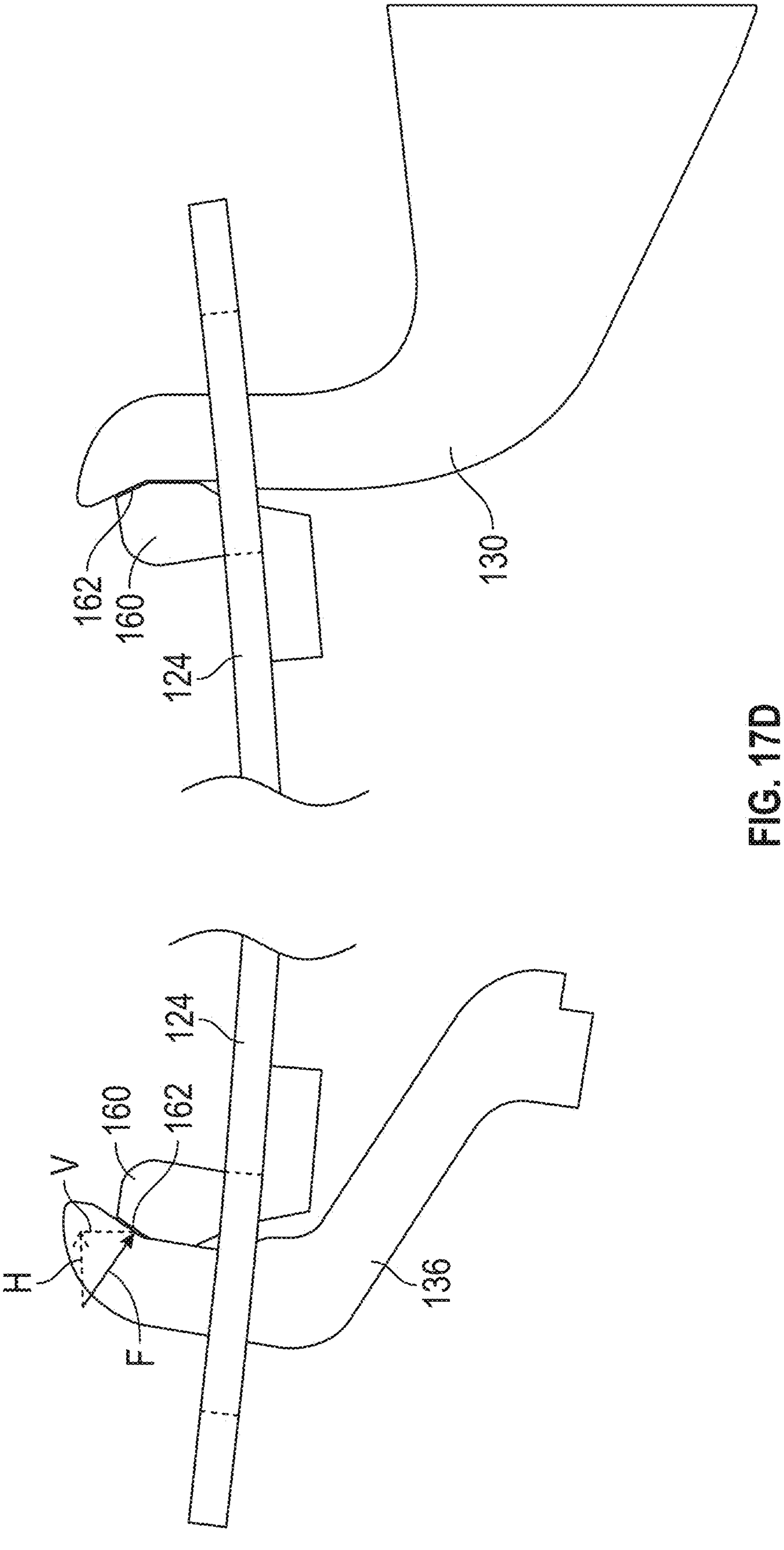
FIG. 17D shows a pawl and hook of the portion of the vibratory machine illustrated in FIG. 17A after compression, in an embodiment.
Figure 17E:
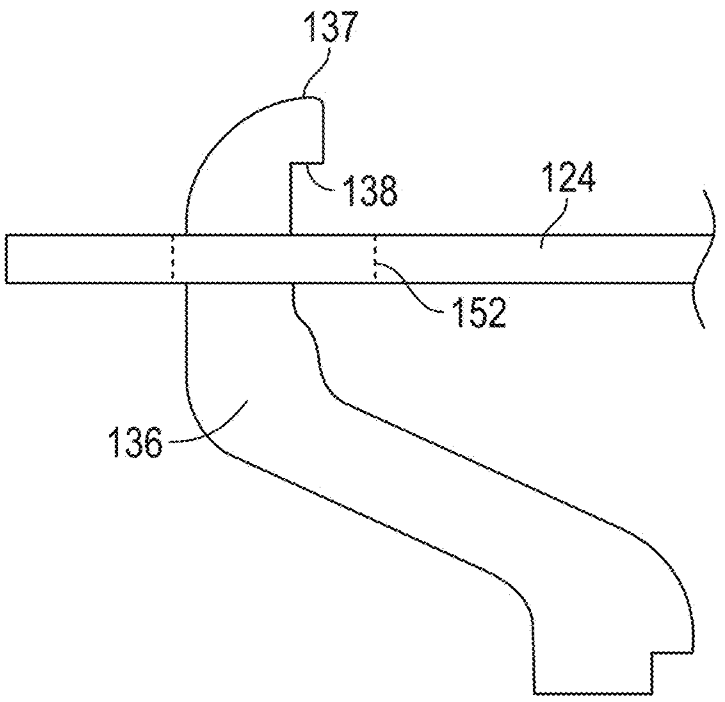
FIGS. 17E and 17F show a pawl in an uncompressed and compressed position, respectively, in an embodiment.
Figure 17F:
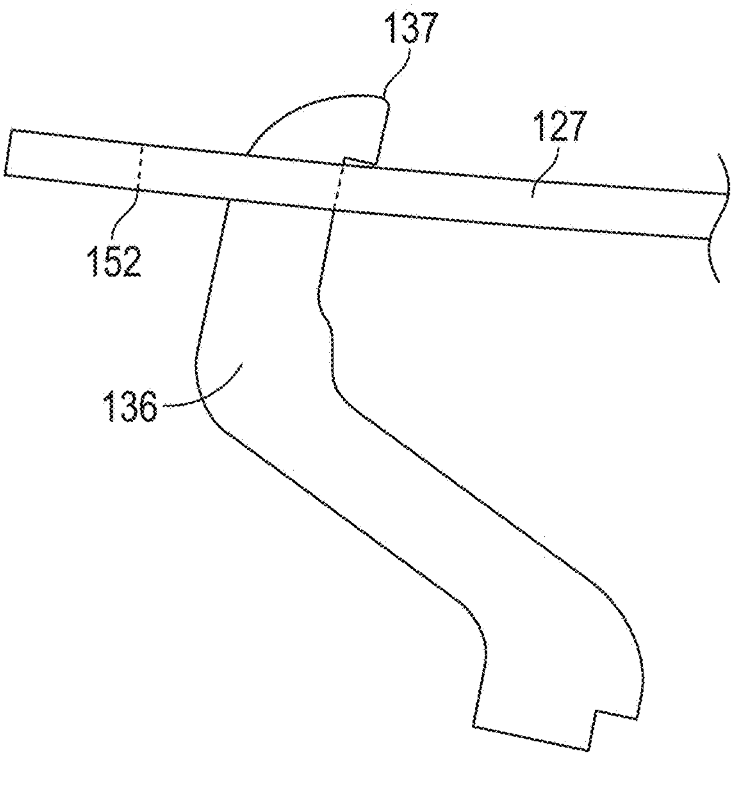
Figure 17G:
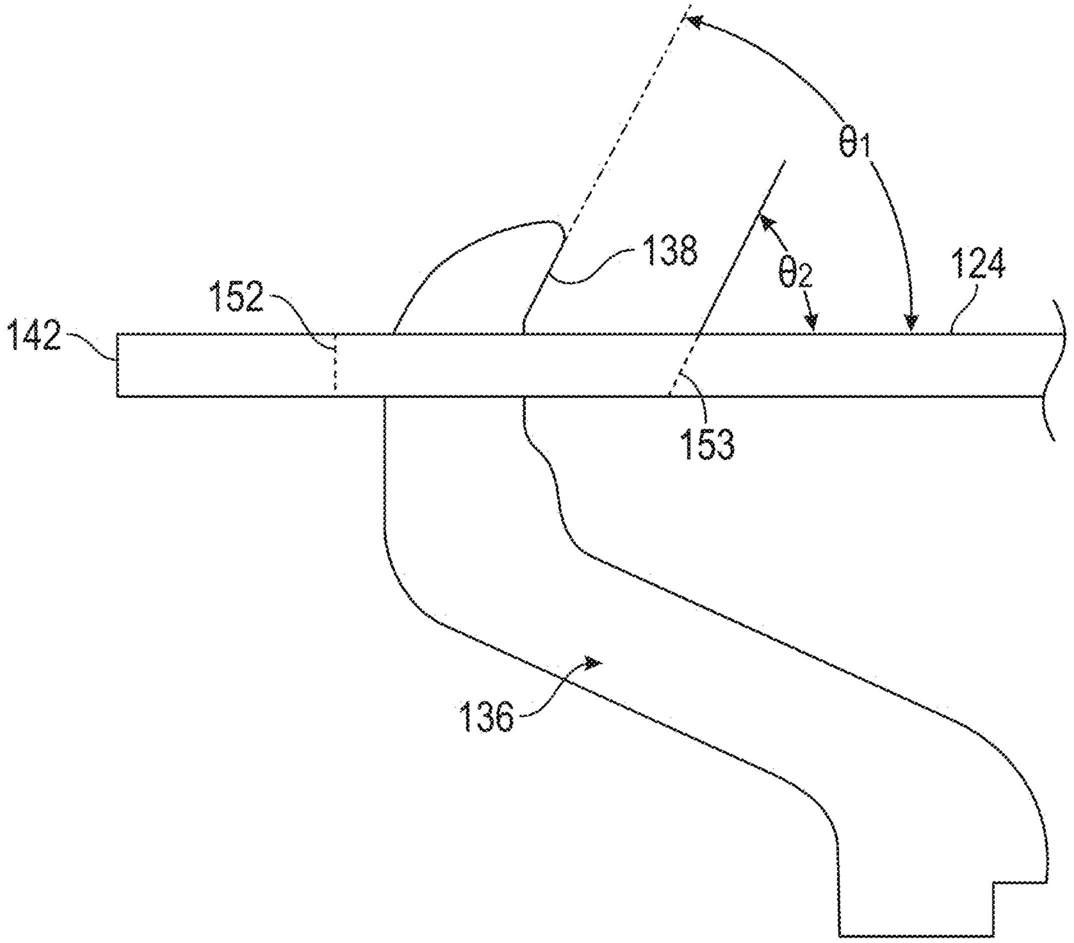
FIG. 17G shows another pawl and support plate, in an embodiment.
Figure 18:
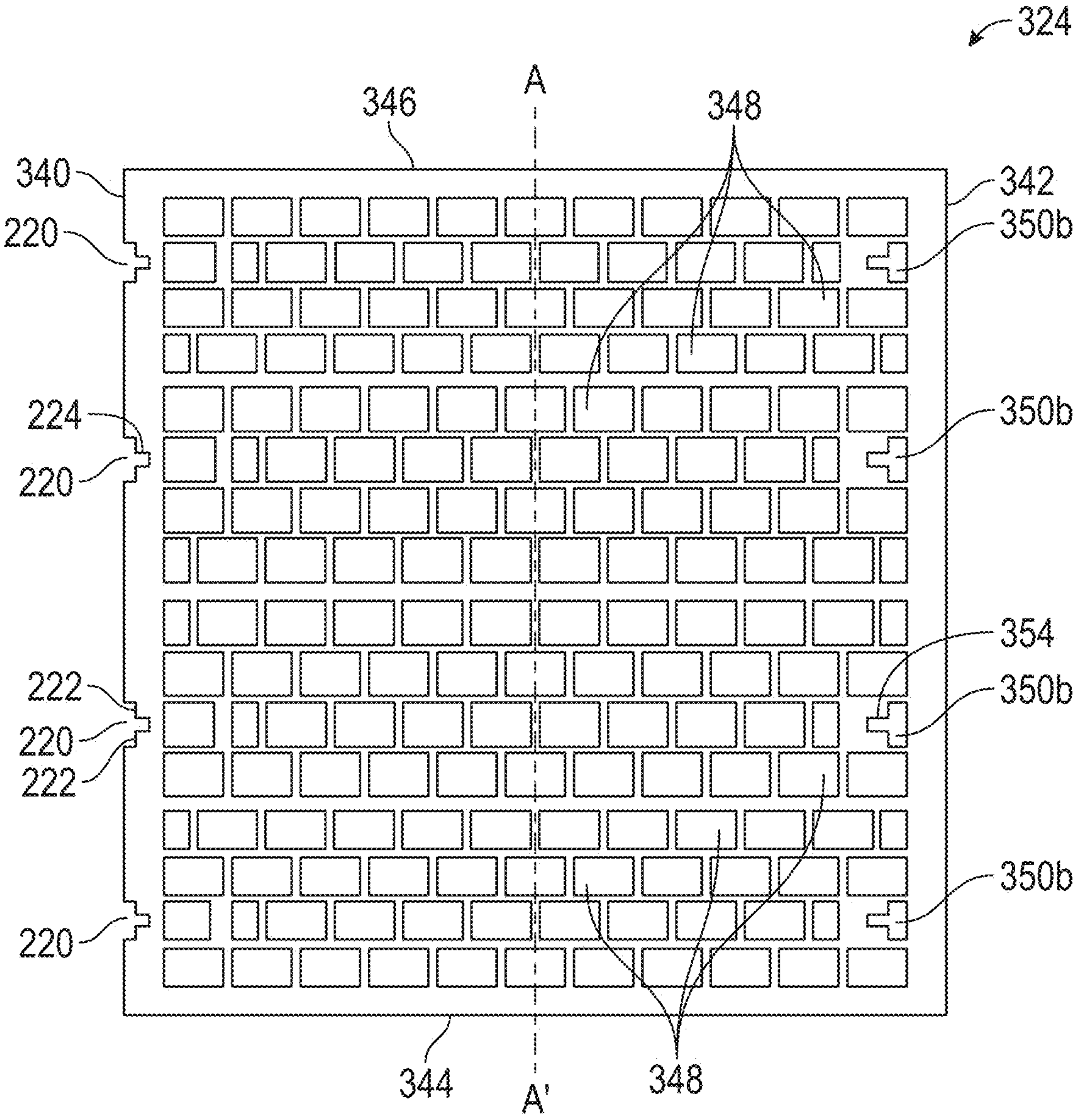
FIG. 18 illustrates a support plate of a screen assembly that could be used in connection with two different types of mounting assemblies.

FIG. 18 illustrates a support plate 324 that includes mounting apertures 220 on the first side edge 340 that are configured to receive a movable piston of the mounting arrangement depicted in FIGS. 3-8B. The support plate 324 also includes a plurality of pass-through compression points 350*b* located inward of the second side edge 342, which are configured to receive movable or stationary pawls of a mounting arrangement as depicted in FIGS. 11-17G. The support plate illustrated in FIG. 18 could be used on a vibratory screening machine that includes compression assemblies with movable pistons as depicted in FIGS. 3-8B on one sidewall, and stationary pawls 330 as depicted in FIGS. 6F and 6G mounted on a second sidewall or a central abutment of a dual-trough machine. Conversely, the same support plate could be used in connection with a vibratory screening machine that includes compression assemblies with movable pawls as depicted in FIGS. 11-17G and that includes stationary compression pistons as depicted in FIGS. 3-8B on an opposite sidewall or a central abutment of the screening machine.

Figure 19A:
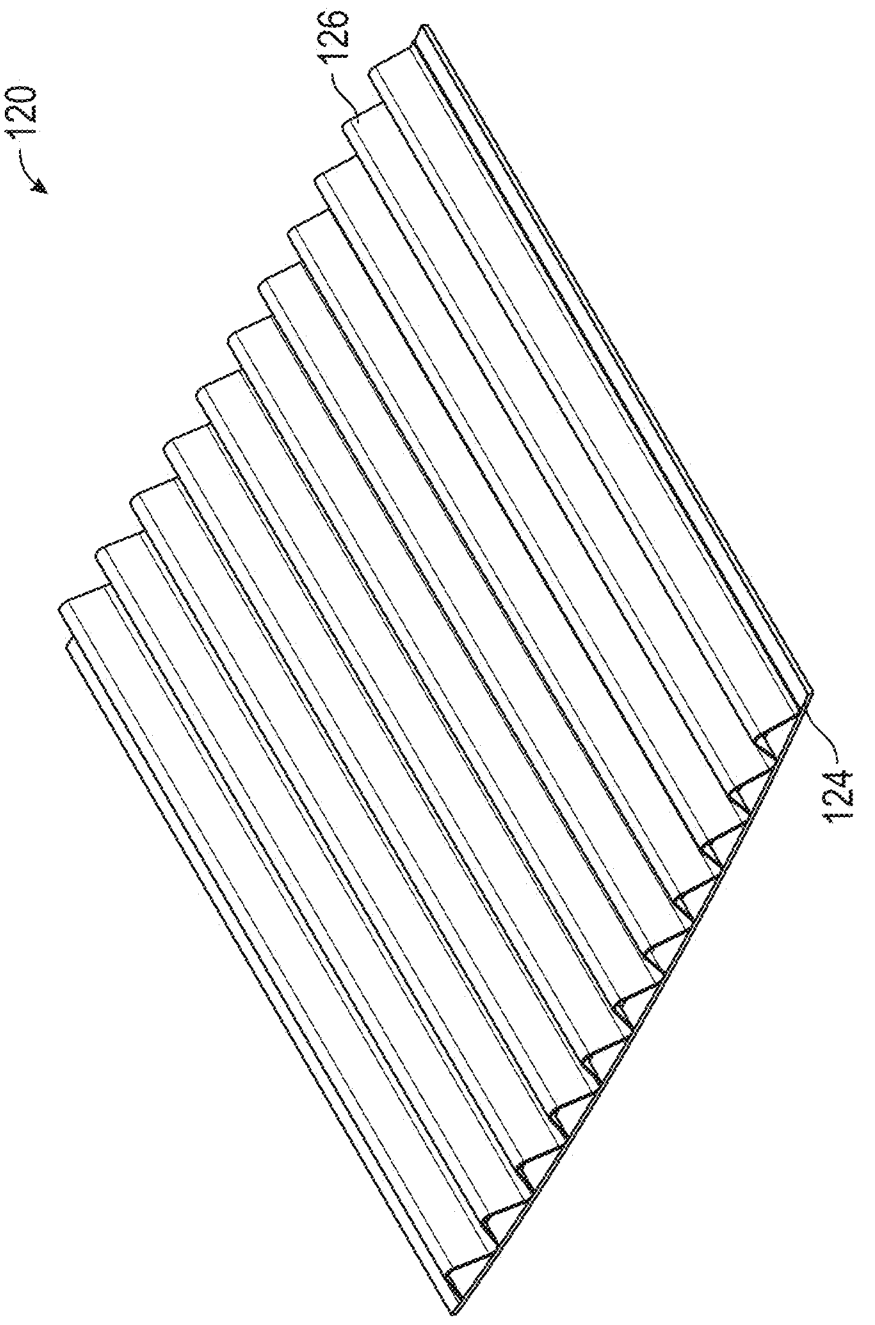
FIG. 19A shows a perspective view of a screen assembly, in an embodiment.
Figure 19B:
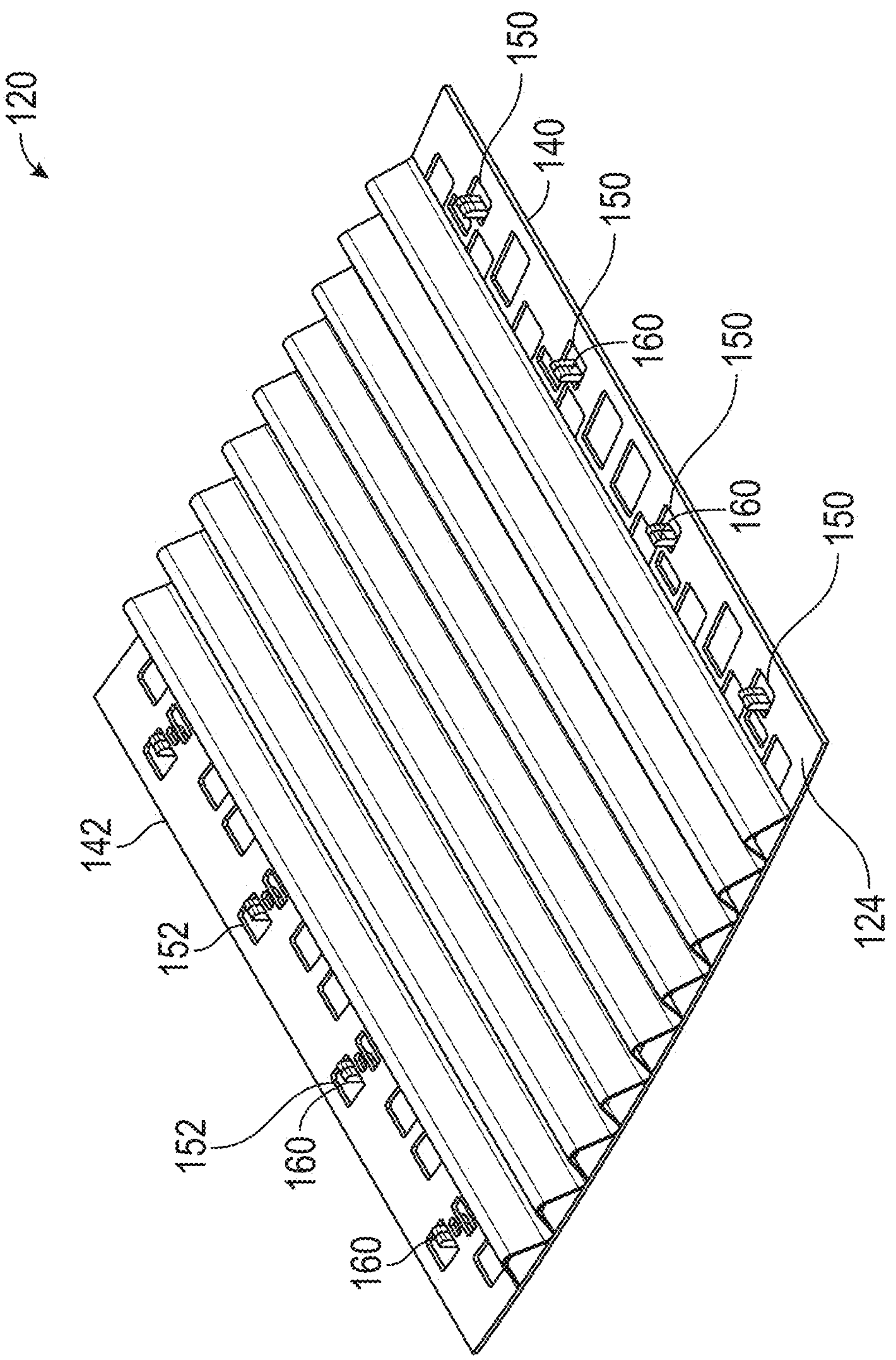
FIG. 19B shows the perspective of the screen assembly of FIG. 19A with a portion of the screening surface removed, in an embodiment.
Figure 19C:
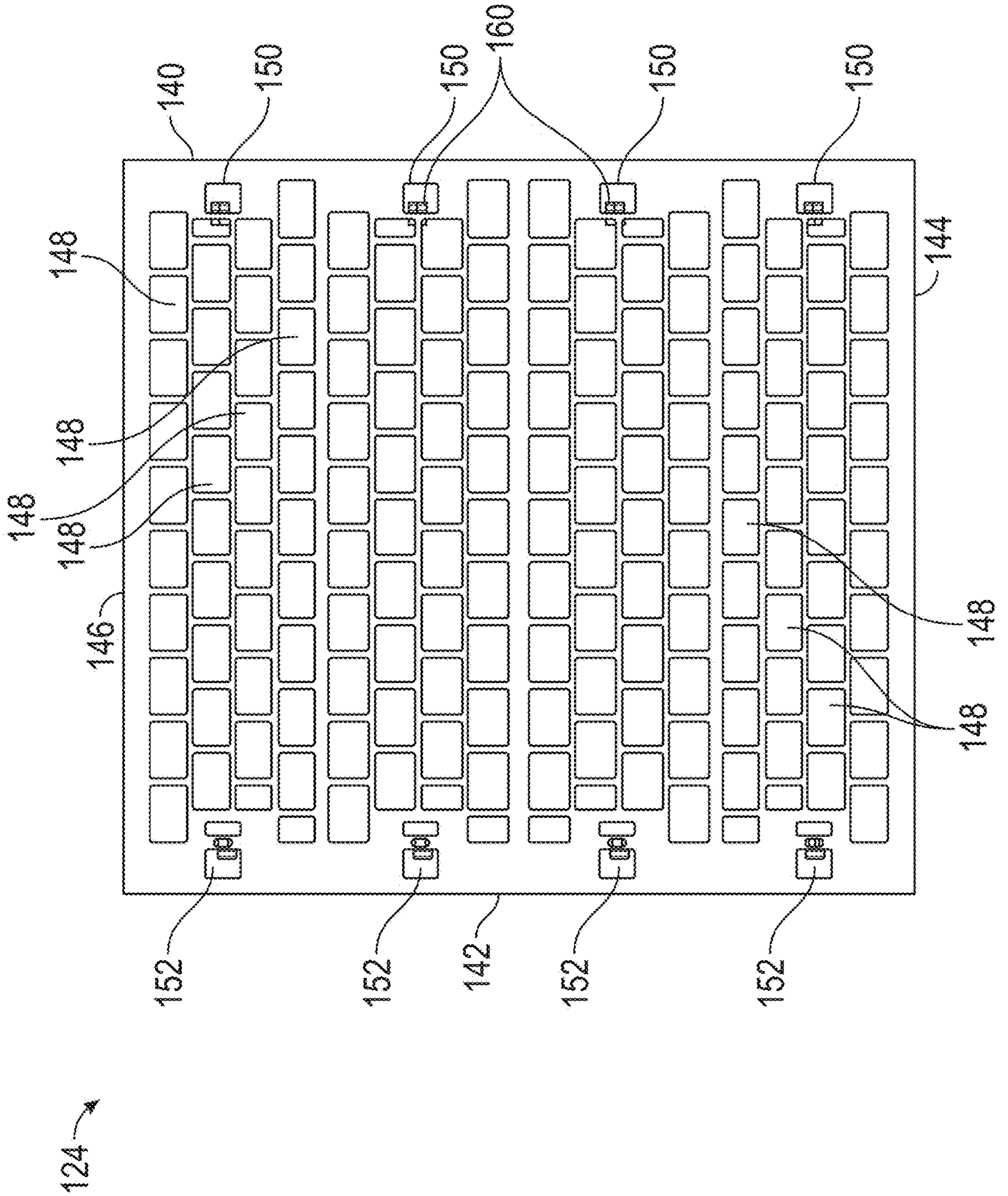
FIG. 19C shows a top view of a support plate of a screen assembly, in an embodiment.

FIGS. 19A, 19B and 19C illustrate the screening assembly 120, the screening assembly 120 with a portion of the screening surface 126 removed, and a top view of a support plate 124, respectively, in an embodiment. As illustrated, the screening surface 126 is attached to an upper surface of the support plate 124. The support plate 124 is generally rectangular having a first edge 140, a second edge 142, a first end 144 and a second end 146. The support plate 124 is typically formed from a sheet of metal, though other materials are possible. The support plate 124 includes a plurality of flow-through apertures 148 extending through a body of the support plate 124 within its interior as defined by the edges and ends. As noted above, the support plate 124 supports a screening surface on its upper surface. Such a screening surface may be attached to the support plate 124 in any appropriate manner. The flow-through apertures 148 are configured to allow materials passing through a supported screening surface to pass through the support plate 124. Though illustrated as having rectangular flow-through apertures 148, it will be appreciated that the size, shape, and distribution of the flow-through apertures across the support plate 124 may be varied. As previously noted, a plurality of hold-down or pass-through compression points 150, 152 are disposed along the first and second edges 140, 142 of the support plate 124. In an embodiment, the pass-through compression points 150, 152 may be disposed outward of the flow through apertures 148 (e.g., relative to a centerline of the plate). In the illustrated embodiment, the pass-through compression points 150, 152 each include a cleat 160, as further discussed below.

As illustrated in FIGS. 17A and 17B, where half of the screening machine is removed for clarity, the stationary hooks 130 are attached to the central member 116 below a support surface 118 disposed on the upper end of the central member 116. The support surface 118 supports the first edge 140 of the support plate 124. A gasket 119 or other compressible seal may be disposed between the first edge 140 of the support plate 124 and the support surface 118. A first end of the stationary hook 130 is attached to the central member 116 and extends away (e.g., cantilevers from) the support surface 118. A free end of each hook 130 extends upwardly such that it may extend through the pass-through compression points proximate to the first edge 140 of the screening assembly 120, when the first edge of the support plate 124 rests on the support surface 118. During installation, the screen assembly 120 may be placed on the machine such that the stationary hooks 130 of the central member 116 (or second wall) pass through the pass-through compression points 150 on the first edge 140 of the support plate 124. Alternatively, if the central member/second wall omits the stationary hooks, the first edge 140 of the support plate 124 may be placed against an abutment or abutment surface. The screen assembly 120 may then be lowered allowing the movable hooks/pawls 136 disposed proximate to the wall member 112 to pass through the pass-through compression points 152 on the second edge 142 of the support plate 124. Of note, use of the pass-through compression points in conjunction with the pawls on at least the wall member and/or stationary hooks on the central member (or second wall member in a single-trough machine) provides an improved positioning of the screen assembly along the length of a screening machine. That is, once the hooks 130, 136 are positioned through the screen assembly, the position of the screen assembly along the length of the screening machine is necessarily correct, eliminating the need to manually position screen panels along the length of the machine as was previously required.

Once the screen assembly 120 is correctly positioned with the hooks and pawls extending through the pass-through compression points, the compression assemblies 122 may be actuated to move the movable pawls 136 from a retracted position to an extended position. This is illustrated in FIGS. 17C and 17D. As illustrated in FIG. 17C, each stationary hook 130 may be disposed through a pass-through compression point 150 (shown in dashed line) on a first edge 140 of the support plate 124 while each movable pawl 136 may initially be disposed through a pass-through compression point 152 (shown in dashed lines) on a second edge 142 of the support plate 124. At this time, the support plate 124 may be substantially planar. Upon actuation, the movable pawl 136 may be advanced and/or rotated to apply a horizontal force to the support plate 124 (e.g., a side edge of the pass-through compression point 152) and a downward force to the top surface of the support plate 124. See FIG. 17D. This results in the inside edges of the pass-through compression points 150 along the first edge 140 of the support plate 124 being pushed against the stationary hooks 130 extending through the pass-through compression points 150. Continued advancement and/or rotation of the hooks/pawls 136 results in deflection of the support plate 124 into a concave profile against the concave support surfaces. See FIGS. 17B and 19B. The deflection of the support plate 124 into a concave profile is facilitated by a downward angle of the compression rod of the compression assembly 122 in conjunction with the angled surface of the pawls 136 and hooks 130.

To improve engagement of the hooks 130 and pawls 136 with the upper surface of the support plate 124, each of these members may include a recessed contact surface. That is, a contact surface of the hooks 130 and pawls 136 may be recessed relative to the free tip of these members (e.g., as measured from a centerline axis A-A' of the plate 124). See, e.g., FIG. 17C. Specifically, the free tip 132 of the hook 130 extends over a contact surface 134 of the hook 130 (i.e., relative to the centerline axis A-A'). Likewise, a free tip 137 of the pawl 136 extends over a contact surface 138 of the pawl 136 (i.e., relative to the centerline axis A-A'). The resulting undercut of the hooks 130 and pawls 136 (e.g., hook surface) allows each of these members to better engage a top surface of the support plate 124.

In the embodiment illustrated in FIGS. 17A-17D and 19A-19C, the support plate 124 further includes cleats 160 attached proximate to an inside edge (e.g., as measured form the centerline axis A-A') of each of the pass-through compression points 150, 152. In this embodiment, the cleats 160 extend above the upper surface of the support plate 124 and are shaped to matingly engage the pawls 136 and/or hooks 130. The cleats 160 may be attached to the support plate 124 in any appropriate manner (e.g., adhered, bolted, riveted, welded etc.). Alternatively, the cleats 160 may be integrally formed with the support plate 124 (e.g., in a sheet metal bending and forming process or a molding process). As illustrated in FIGS. 17C and 17D, the contact surfaces 132, 138, of the hooks 130 and pawls 136, respectively, are angled and configured to contact a correspondingly angled contact or compression surface 162 of their respective cleat 160 (i.e., once the pawl 136 is advanced to contact its cleat 160). The use of the mating angled surfaces on the hooks 130 and pawls 130 with the cleats 160 allow for increasing the compression force transmitted to the plate 124.

In an embodiment, the contact surfaces 132 and/or 138 are disposed at an included acute angle Θ relative to the generally planar upper surface (i.e., prior to compression) of the support plate 124. In an embodiment, the included angle Θ is between about 5° and 85° degrees. In a further embodiment, the included angle Θ is between about 150 and 75°.

Though illustrated in the various figures as utilizing the cleat 160 to improve contact between the hooks 130 and pawls 136, it will be appreciated that the cleats 160 may be omitted in other embodiments. In such embodiments, the hooks 130 and pawls 136 may directly contact an upper surface of the support plate 124. FIGS. 17E and 17F illustrate an alternate embodiment of the movable pawl 136 where the pawl 136 includes a contact surface 138 that is formed as an inside corner below the free tip 137. In such an embodiment, the inside corner contact surface 138 may directly engage the inside edge of the hold down aperture 152. The hooks (not shown) may be similarly configured. It will be appreciated that multiple variations of the contact surface 138 may be utilized while still providing a horizontal force to a side surface of the screening assembly and a downward force to the top surface of the screening assembly and/or support plate.

FIG. 17G illustrates a further alternate embodiment where the movable pawl 136 engages a matingly angled contact or compression surface 153 formed on the support plate 124. More specifically, an inner edge surface of the support plate 124 (e.g., inside edge surface of pass-through compression point 152 as measured from a centerline of the plate) may be formed at an angle $\Theta_2$ which corresponds to an angle $\Theta_1$ of the contact surface 138 of the pawl 136. In an embodiment, these angles are equal. In other embodiments, these angles may be different.

Figure 20:
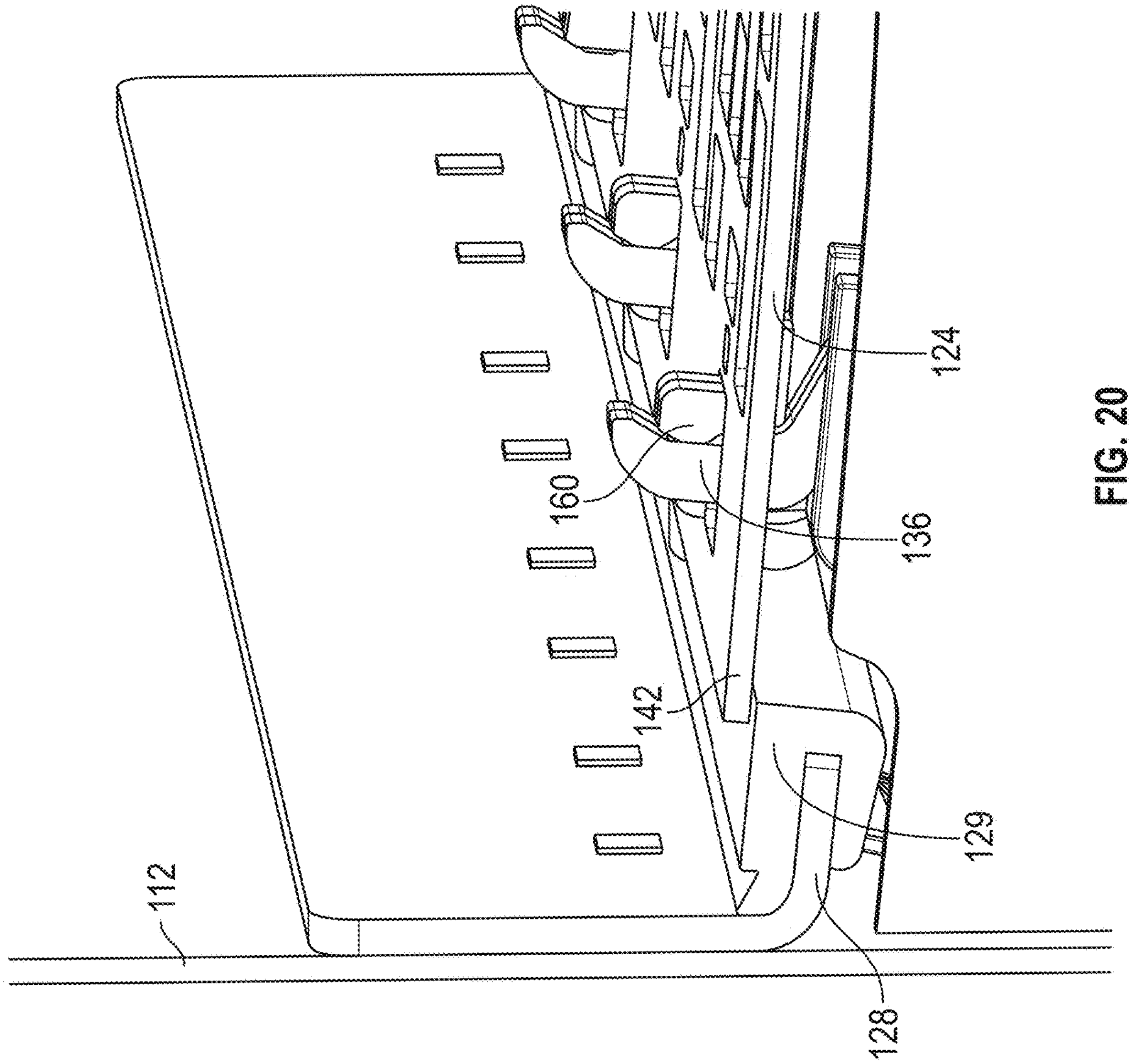
FIG. 20 shows a partial perspective view of a portion of a vibratory machine, in an embodiment.

FIG. 20 illustrates the second edge 142 of a support plate 124 as disposed proximate to the wall member 112 of a screening machine. As shown, the second edge 142 of the support plate 124 is supported on top of a support surface 128 attached to the inside surface of the wall member 112. In the illustrated embodiment, the support surface 128 is a horizontal flange of an angle bracket having a vertical member attached to the inside surface of the wall member 112. Other support surface configurations are possible. A gasket or other compressible seal 129 may be disposed between the second edge 142 of the support plate 124 and the horizontal support surface 128. In this regard, gaskets/compressible seals (hereafter gaskets) may be disposed about the entire periphery of the support plate 124 of the screening assembly. That is, a first gasket 119 may be disposed between the first edge 140 of the support plate 124 and the support surface 118 (see, e.g., FIG. 17A), a second gasket 129 may be disposed between the second edge 142 of the support plate 124 and the wall member support surface 128 and third and fourth gaskets 117 may be disposed be disposed on the upper surfaces of the concave support surfaces 114 below the first and second ends 144, 146 of the support plate 124 (see. e.g., FIGS. 16C and 17A). Due to the increased hold-down force applied to the support plate 124, compression against all of the gaskets may be increased. The increased pressure against the gaskets not only provides an improved seal but also improves the life of the gaskets as there is less movement of the screening assemblies relative to the gaskets and less material can penetrate between the support plate 124 and the gaskets.

Another benefit of the presented embodiments is that the screening assemblies may omit the upward flange that was previously used to apply a compressive force to the screening assembly. Accordingly, removal of this flange eliminates the potential for material becoming trapped behind such a flange. A further benefit of the present embodiment provided by engaging the screening assemblies from below is that the screening area on the upper surface of the screening assembly may be increased. Yet further, by moving the hooks and pawls below the panel and below the screening surface, these elements are not exposed to materials and fluids above the screening surface. This arrangement reduces wear on these compression system components.

As previously noted, the compression assemblies may be actuated by various means including manual, hydraulic and pneumatic, without limitation. Illustrated herein are various means for manually actuating the compression assemblies. More specifically, FIGS. 21A and 21B illustrate a compression assembly embodiment that utilizes a single detachable handle to actuate individual compression assemblies, FIGS.

Figure 21B:
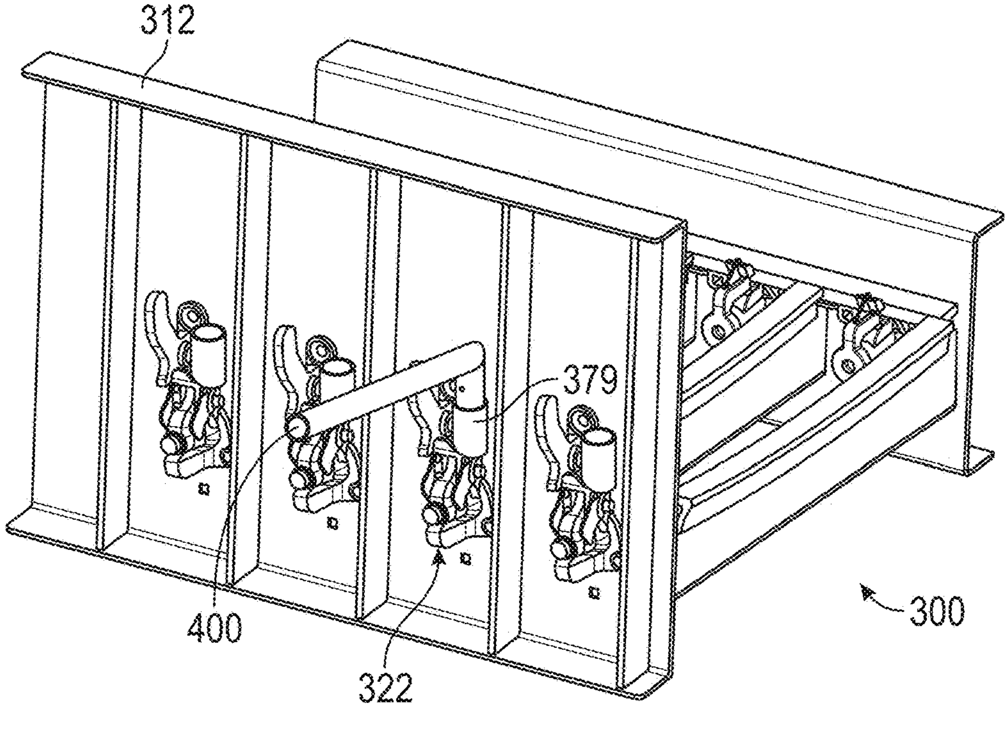
FIG. 21B illustrates how the detachable handle illustrated in FIG. 21A interfaces with a compression assembly to actuate the compression assembly, in an embodiment.
Figure 21C:
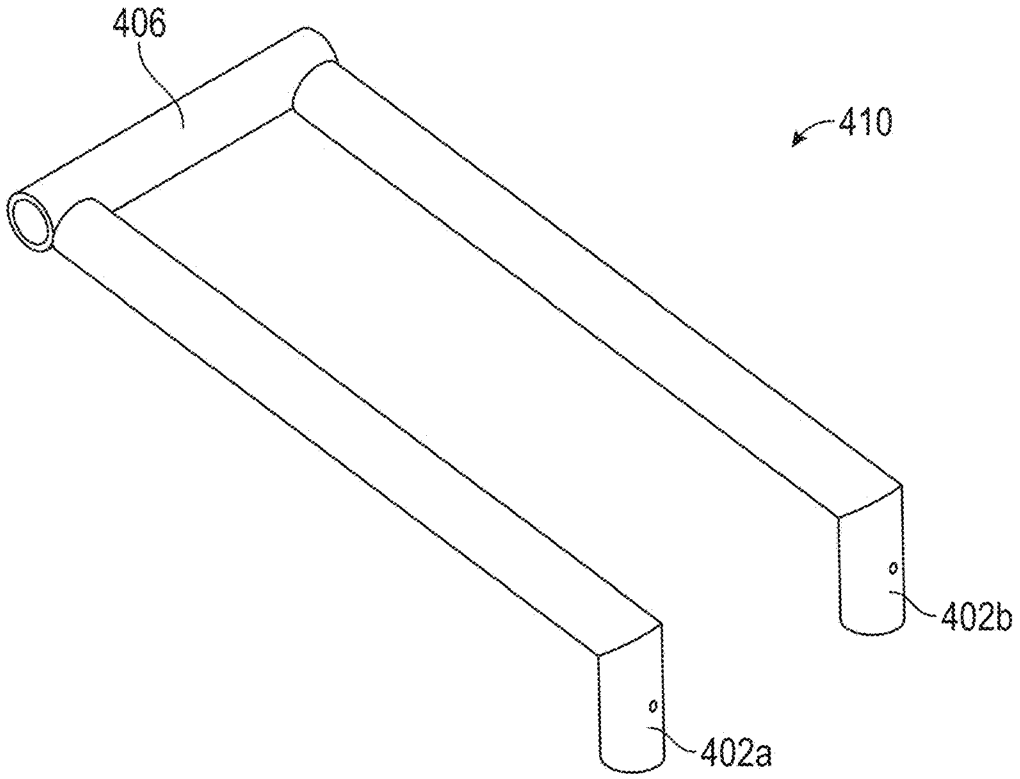
FIG. 21C illustrates a detachable handle that can be used to simultaneously actuate two adjacent compression assemblies, in an embodiment.
Figure 21D:
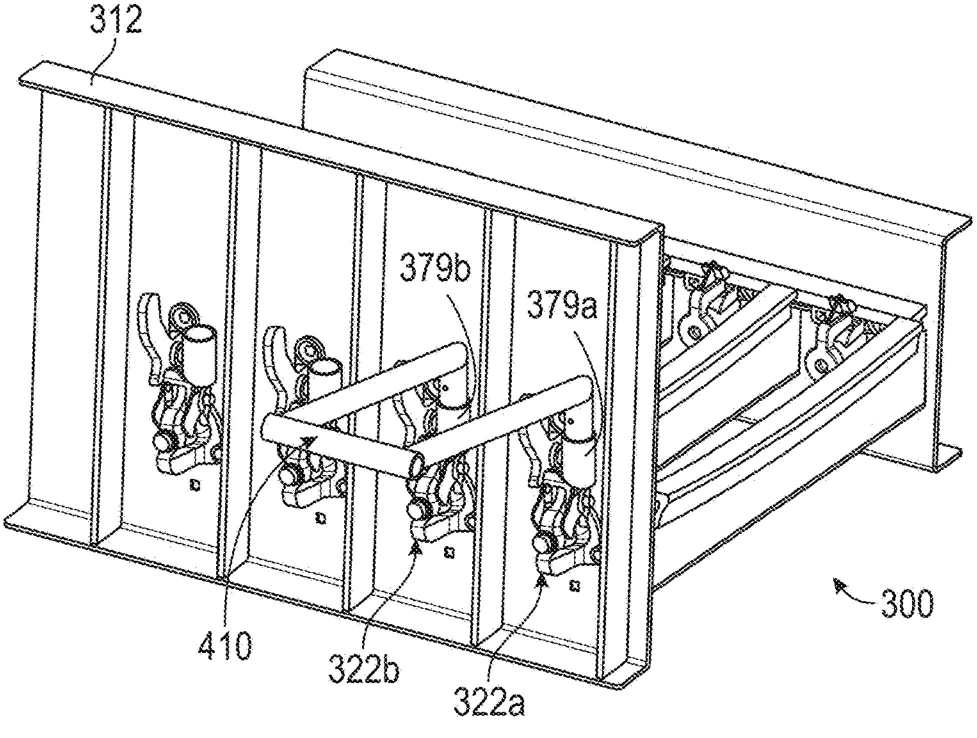
FIG. 21D illustrates how the detachable handle illustrated in FIG. 21C interfaces with two adjacent compression assemblies to actuate both compression assemblies, in an embodiment.
Figure 21E:
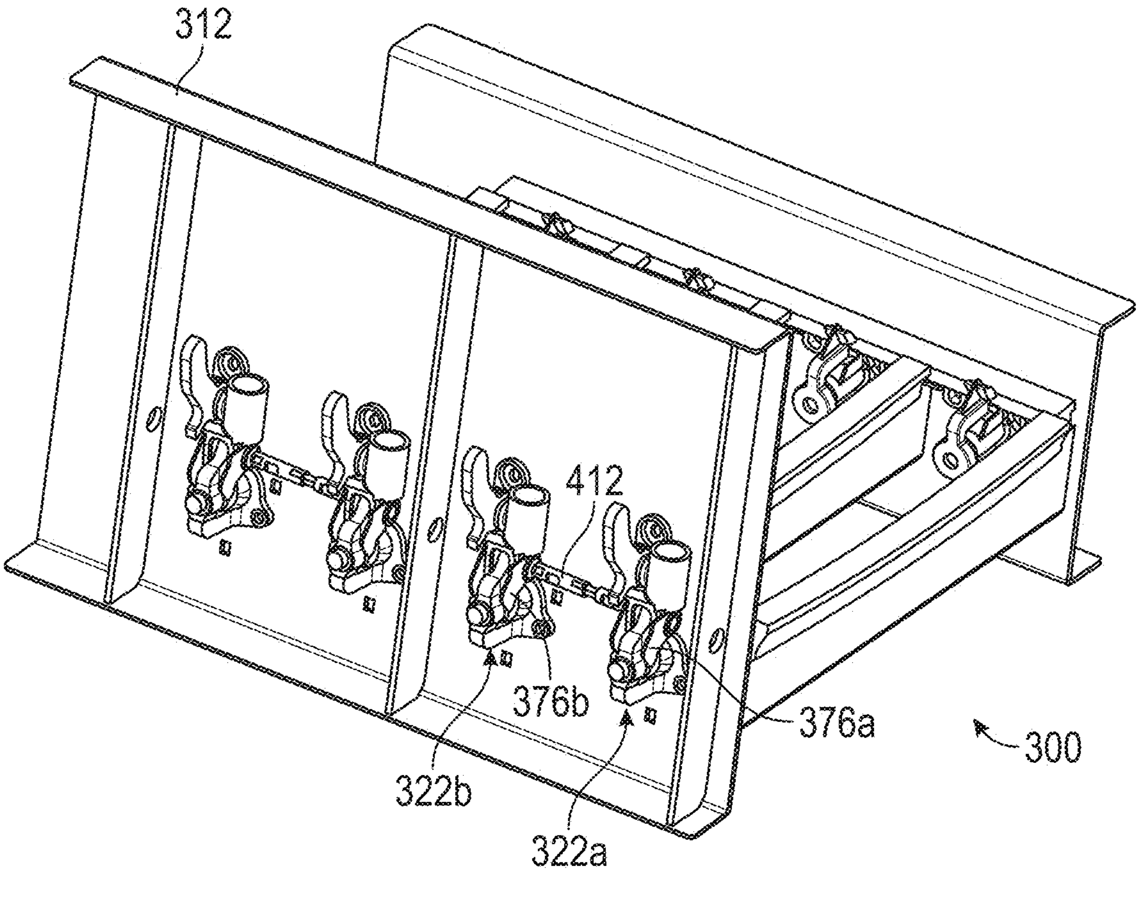
FIG. 21E illustrates how two adjacent compression assemblies can be connected to allow dual actuation with a single handle, in an embodiment.

21C and 21D illustrate a compression assembly embodiment that utilizes a single detachable handle to actuate two adjacent compression assemblies and FIG. 21E illustrates connection of adjacent compression assemblies to allow dual actuation with a single handle. FIG. 21A-21E utilize reference numbers consistent with components of the screening machine of FIGS. 1A-1C. However, it will be appreciated that these means for actuating the compression assemblies may be utilized with any of the disclosed screening machines.

As illustrated in FIGS. 21A and 21B, a detachable handle 400 may be formed with a first engagement end 402 configured to engage (e.g., for receipt within) the sleeve 379 of the actuator bracket of the compression assemblies 322 and an elongated second end 404. A user may grasp the elongated second end 404 of the handle once the first end 402 is inserted within the actuator bracket sleeve 379 and use the handle 400, which has a bend between its first and second ends, to rotate the actuator bracket and thereby activate or deactivate a single compression assembly 322. The single handle 400 may be used to activate and/or deactivate multiple compression assemblies.

FIGS. 21C and 21D illustrate a dual handle 410 that may be used to activate or deactivate adjacent compression assemblies 322*a*, 322*b* on the outer wall 312 of a screening machine 300. As noted above, by lowering the compression assemblies below the screening assemblies, it has been found that the compression assemblies may be more evenly spaced along the outside wall of a screening machine. Accordingly, due to such even spacing a single handle may be configured to engage two (or more) adjacent compression assemblies for the purpose of activation or deactivating those adjacent assemblies. As shown, the handle 410 has two engagement ends 402*a*, 402*b* each configured for receipt within the sleeve 379*a* or 379*b* of one of the two adjacent compression assemblies 322*a*, 322*b*. A user may grasp a second end 406 of the handle, which may again be bent along its length, to rotate the adjacent actuator brackets and thereby activate or deactivate two adjacent compression assemblies 322*a*, 322*b*.

FIG. 21E illustrates the interconnection of two adjacent compression assemblies 322*a*, 322*b* via a connecting rod 412. In this embodiment, the connecting rod 412 extends between and physically couples the actuator brackets 376*a*, 376*b* of two adjacent compression assemblies 322*a*, 322*b*. Accordingly, rotation of one of the brackets 376*a* or 376*b* will result in rotation of the other bracket. Along these lines, two compression assemblies may be actuation by a single handle (e.g., See FIG. 21D). Although FIG. 21E illustrates using a single connecting rod 412 to attach two adjacent brackets, it will be appreciated that two connecting rods could be used to couple three brackets. Further, other means of connecting the compression assemblies for joint operation are possible and within the scope of the present disclosure.

Figure 21F:
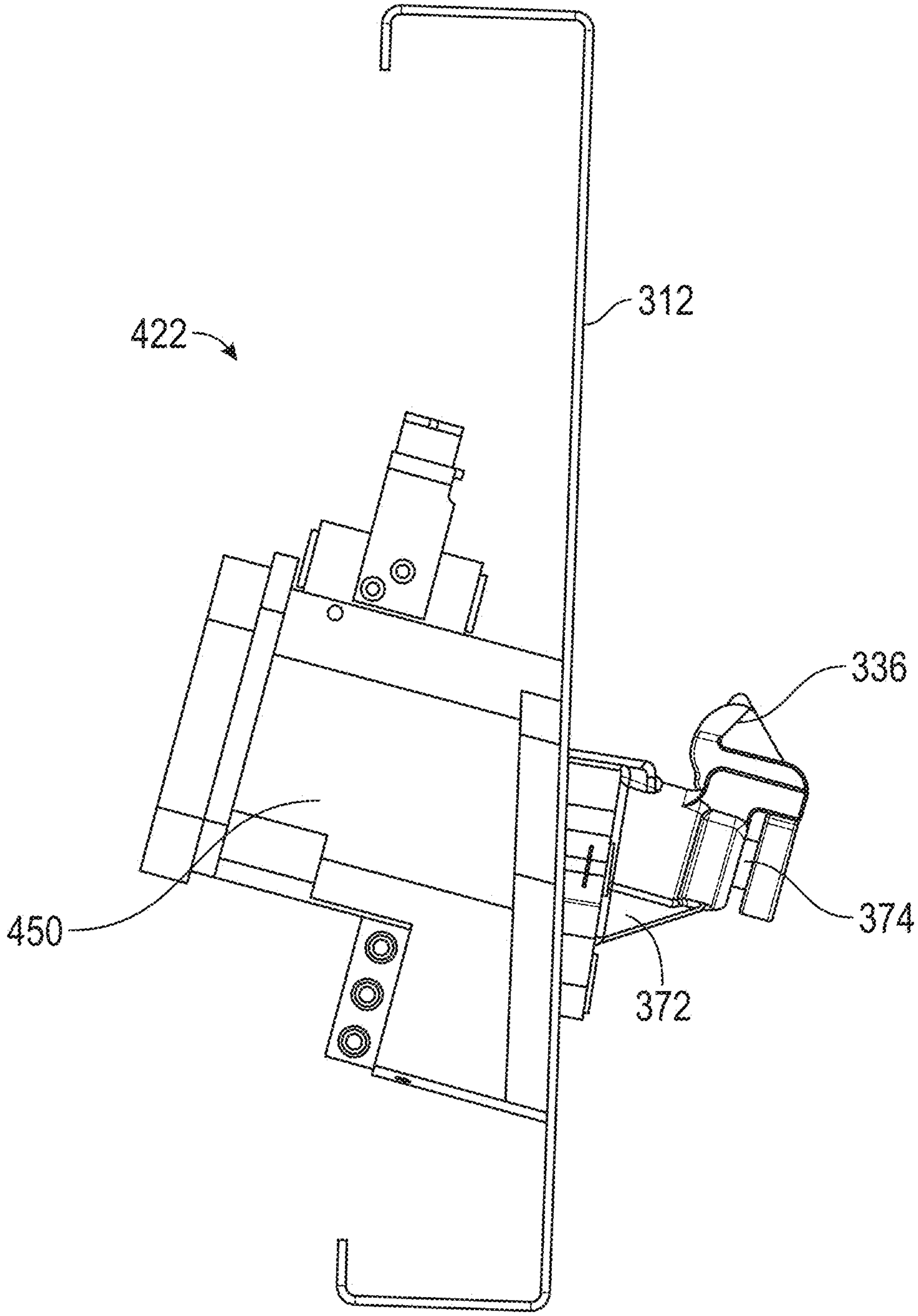
FIG. 21F illustrates a pneumatic compression assembly, in an embodiment.
Figure 21G:
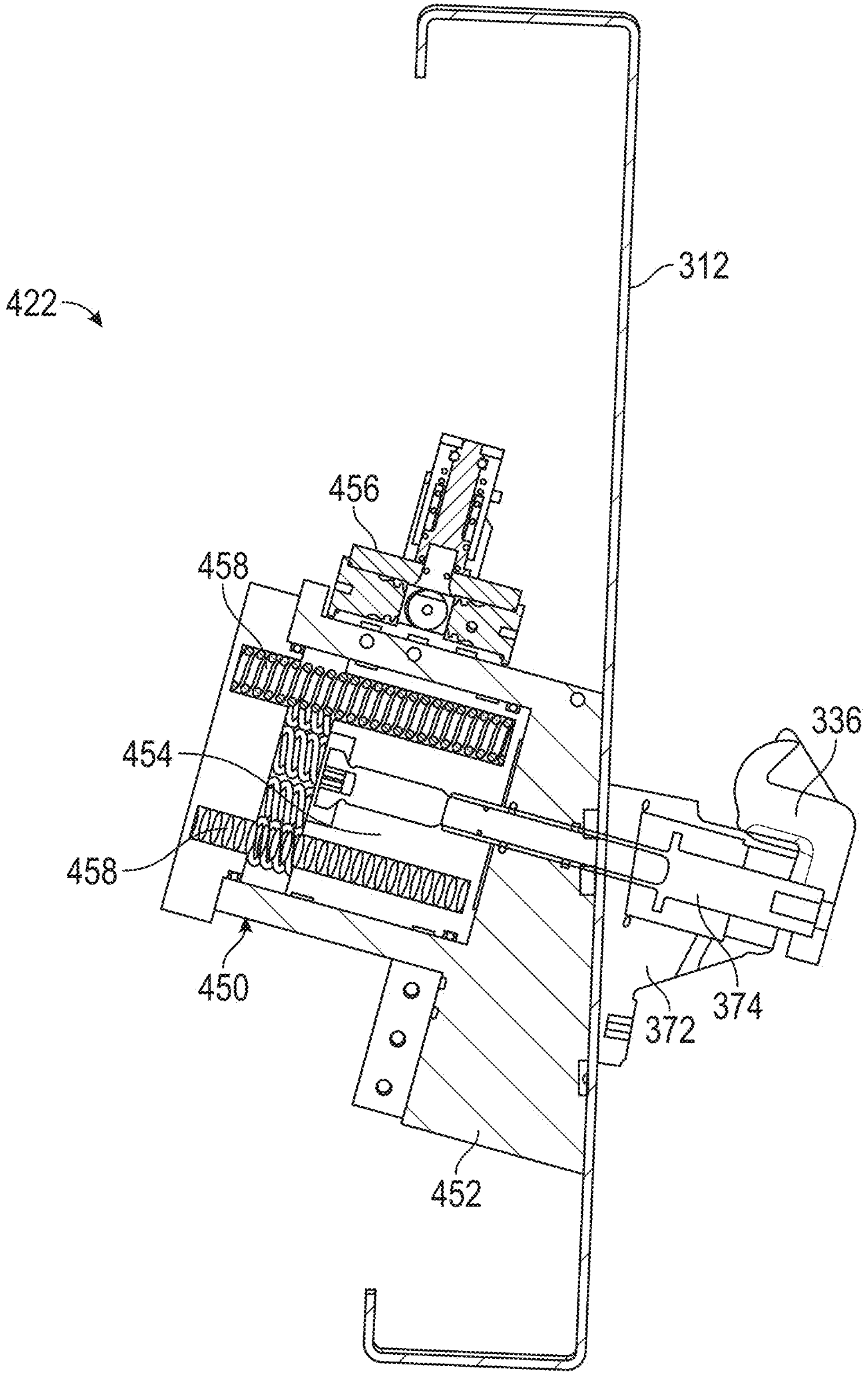
FIG. 21G illustrates a cross-sectional view of the pneumatic compression assembly of FIG. 21F, in an embodiment.

FIGS. 21F and 21G illustrates another embodiment of a compression assembly 422, which may be used with any of the screening machines disclosed herein. The compression assembly 422 is a fluid operated compression assembly (pneumatic or hydraulic). The assembly 422 shares common inner wall components with the compression assembly disclosed in relation to FIGS. 13A-13D. Along these lines a pawl 336 is attached to the end of an actuator rod 374 which passes through an inner housing bracket 372 attached to the inner surface of a wall 312 of a screening machine. Rather than having a manually operated bracket on the outer surface of the wall, the compression assembly 422 includes a pneumatic/hydraulic actuator 450 (hereafter pneumatic actuator) that engages a rearward end of the actuator rod 374 and selectively advances and retracts the same. The pneumatic actuator 450 includes a housing 452, which engages the outside surface of the wall 312. The pneumatic actuator housing 452 may bolt through the wall 312 to the inner housing bracket 372. The housing 452 may include various seals (e.g., o-rings) to seal an interface between the actuator rod and a journal in the housing through which the actuator rod passes. The housing 452 includes an internal cylinder bore that houses a piston 454, which engages a rearward end of the actuator rod 374. The piston 454 is configured to move along the length of the cylinder bore to advance or retract the actuator rod 374 and attached pawl 336. More specifically, a valve 456 may selectively pressurize an area of the cylinder bore in front of the piston 454 to retract the piston, actuator rod 374 and pawl 336. Technicians may then insert panels into a screening machine. The valve 456 (e.g., three-way valve) may then release the pressure within the cylinder bore. In the present embodiment, a plurality of biasing springs 458 are compressed between a rearward surface of the piston and an end cap of the cylinder bore. The biasing springs maintain the actuator rod 374 and pawl 336 in an extended position (e.g., locking a screening assembly to a bed of a screening machine) in the absence of applied pneumatic pressure, which retracts the actuator assembly 422. That is, in an extended position, spring force alone without pneumatic pressure may maintain the actuator rod 374 and pawl 336 in the extended position. The size and number of springs 458 may be selected to maintain a desired compression force on a screen assembly. However, it will be appreciated that variations are possible. For instance, a similar pneumatic or hydraulic compression assembly may utilize pneumatic or hydraulic pressure to extend the actuator rod 374 and pawl 336. In such arrangements, the pressure may be continuously maintained or a mechanical lock may lock the actuator rod 374 and pawl 336 in the actuated position.

Figure 22A:
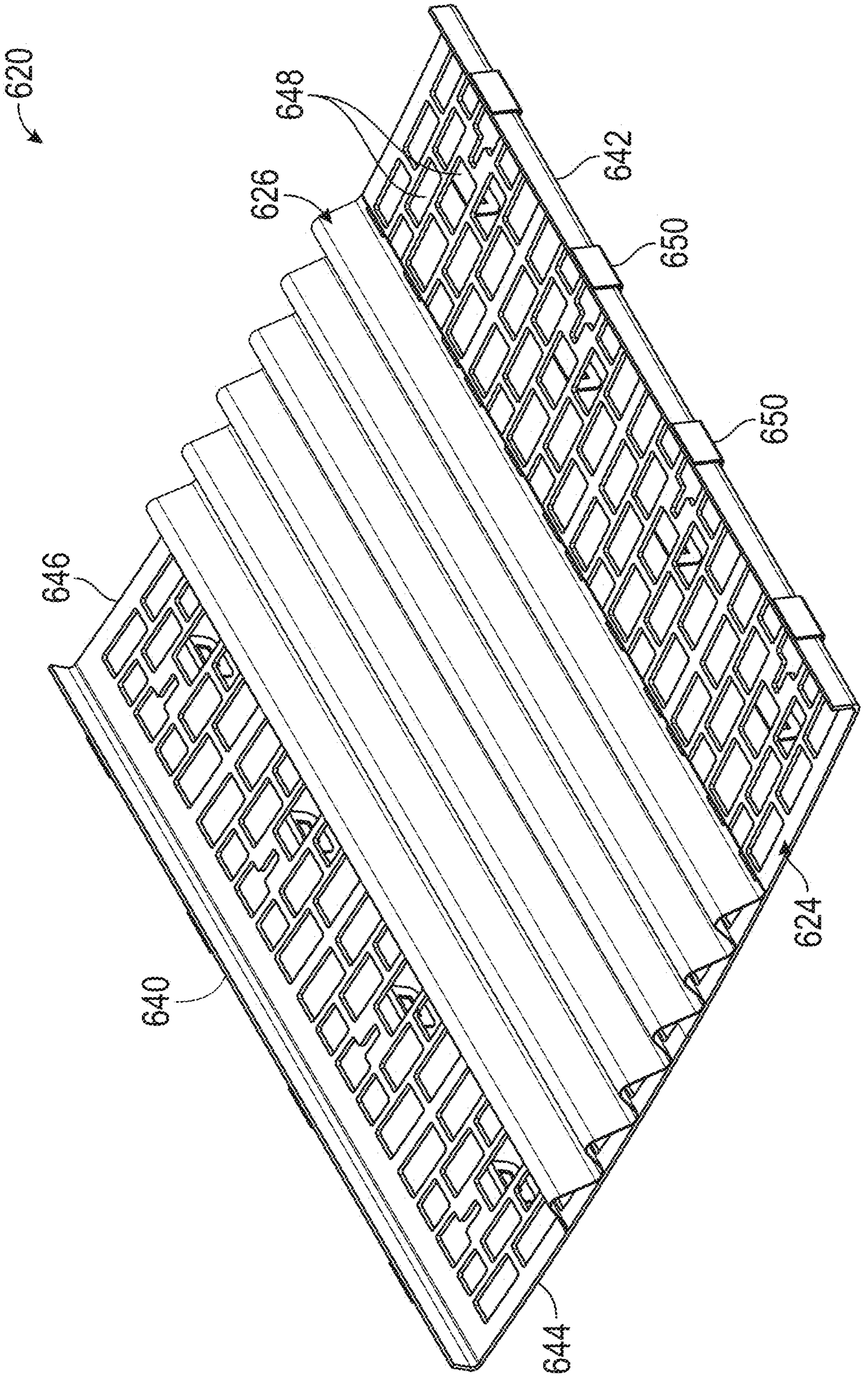
FIGS. 22A and 22B illustrate top and bottom perspective views, respectively, of another embodiment of an under-compression screening assembly, in an embodiment.
Figure 22B:
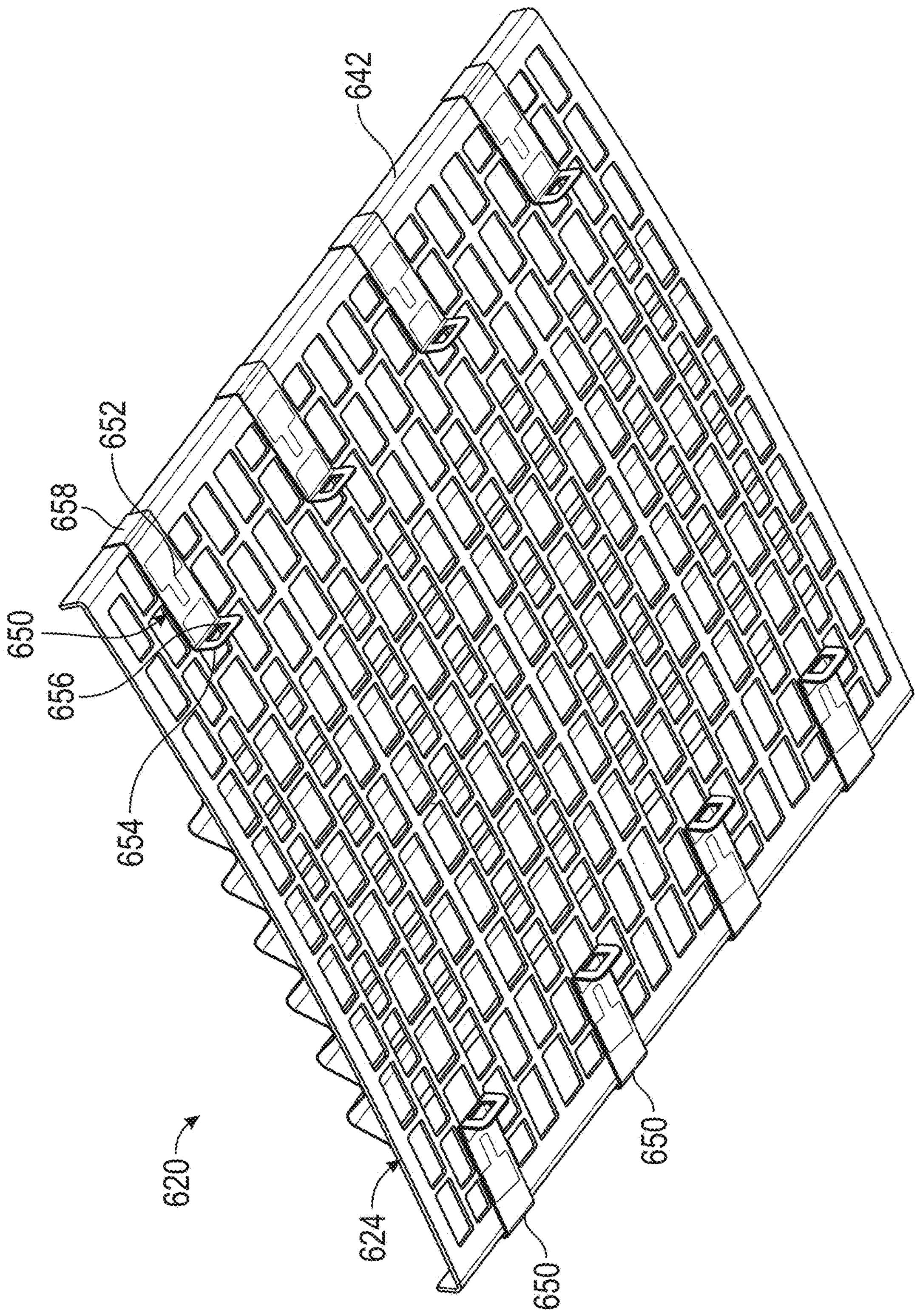

FIGS. 22A and 22B illustrate another embodiment of an under-compression screening assembly 620. More specifically, FIG. 22A illustrates a top perspective view of the screening assembly 620 and FIG. 22B illustrates a bottom perspective view of the screening assembly 620, each with a portion of a screening surface 626 removed for purposes of illustration. As illustrated, the screening assembly includes a support plate 624 that is generally rectangular having a first edge 640, a second edge 642, a first end 644 and a second end 646. The support plate 624 includes a plurality of flow-through apertures 648 extending through a body of the support plate 624 within its interior. However, in contrast to the under-compression support plates discussed above in relation to FIGS. 12A-12C and 19A-19C, the screening assembly 620 does not require pass-through compression points though they may be present. Rather, the screening assembly 620 includes a plurality of brackets 650 that engage the support plate 624 of the screening assembly 620 and allow attachment to an underlying compression assembly. In an embodiment, each bracket 650 includes a flat portion 652 that may be attached (e.g., adhered, welded etc.) to a bottom surface of the support plate 624. The brackets 650 also include a downward extending tab 654 having an aperture 656 configured to engage a hook member of a movable or stationary pawl. In an embodiment, each bracket 650 may optionally include an upward tab 658 that may engage an edge surface (e.g., 640 or 642) of the support plate 624. In an embodiment, the upward tabs 658 may have a length that allows these tabs to engage upward flanges formed along the length of the support plate edges 640, 642.

Figure 22C:
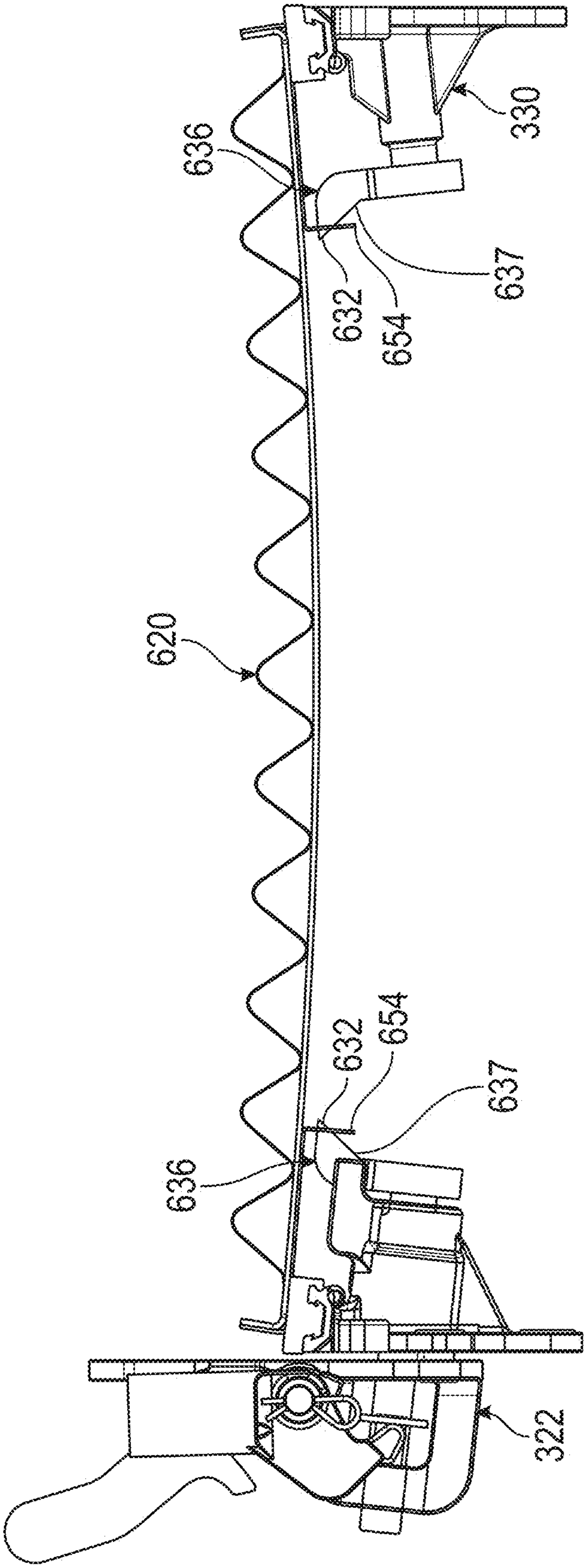
FIG. 22C illustrates a compression assembly and stationary hook assembly compressing a screening assembly of FIGS. 22A and 22B, in an embodiment.

FIG. 22C illustrates the screen assembly 620 disposed and compressed between a compression assembly 322 and a stationary hook assembly 330. The compression assembly 322 and stationary hook assembly 330 are substantially similar to the compression assemblies described above in relation to FIGS. 13A-13F, with the exception that these components may utilize a modified pawl 636. As shown, the modified pawls 636 do not extend as far above the assemblies 322 and 330. That is, as the modified pawls 636 do not need to pass through the support plate 624, the modified pawls 636 may have a different upward dimension. However, each modified pawl 636 may include a hook 632 and angled contact surface 637. As shown, the tip of each hook 632 passes through the aperture 656 in its corresponding mounting bracket 650. Advancement of the movable pawl 636 of the compression assembly 322 moves the screen assembly 620 until a periphery of the bracket apertures 656 contact the contact surfaces 637 of the opposing pawls 636. Continued advancement of the moveable pawl 636 of the compression assembly 322 results in the deformation of the screen assembly 620 substantially similar to the screen assembly discussed in FIGS. 15A and 15B. Of note, use of the brackets 650 and modified pawls 636 may permit use of existing screening assemblies (e.g., having edge flanges) with the under-compression systems of the present disclosure.

Figure 23A:
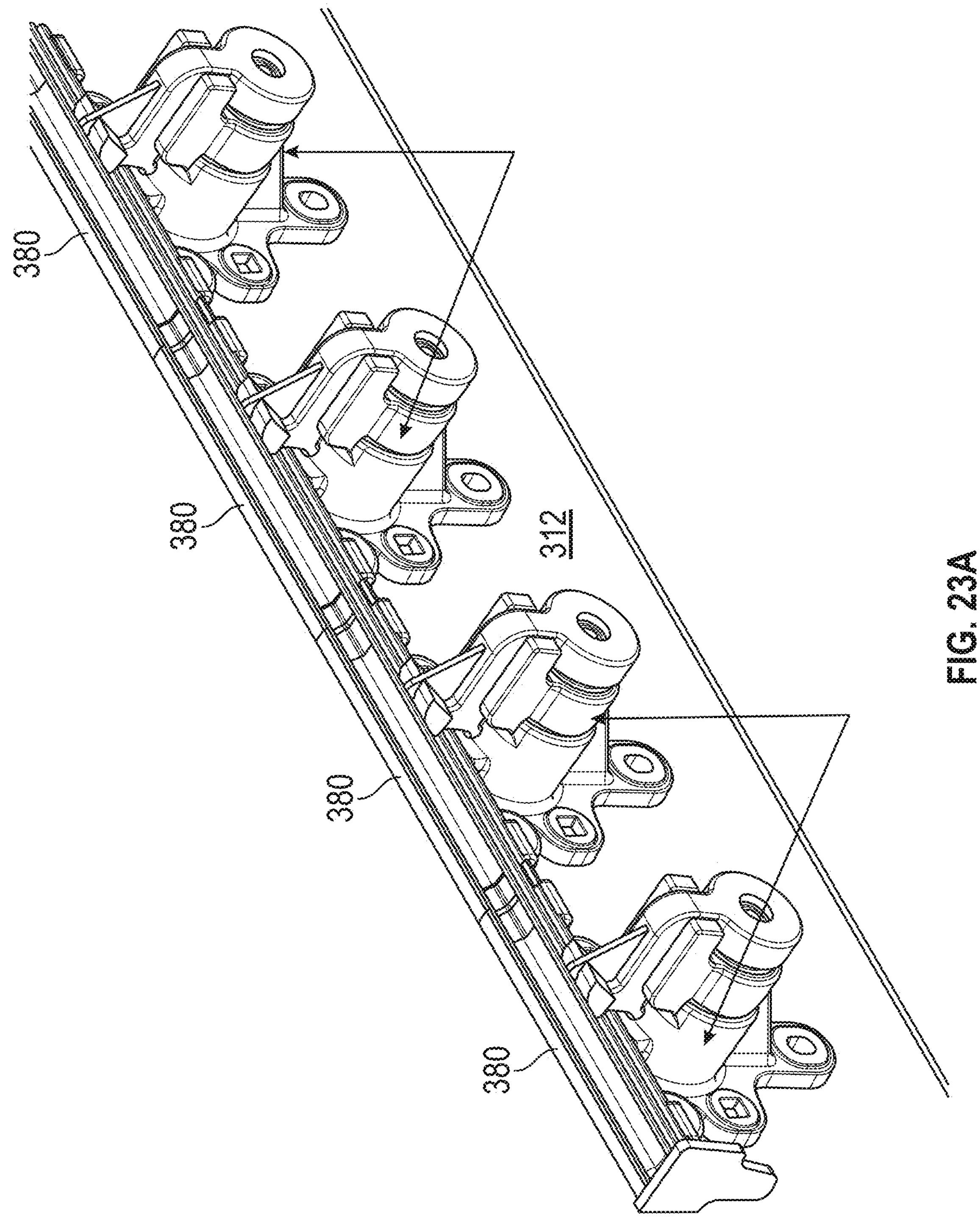
FIG. 23A illustrates a plurality of sectional bed supports forming a support rail along a wall of a screening machine, in an embodiment.
Figure 23B:
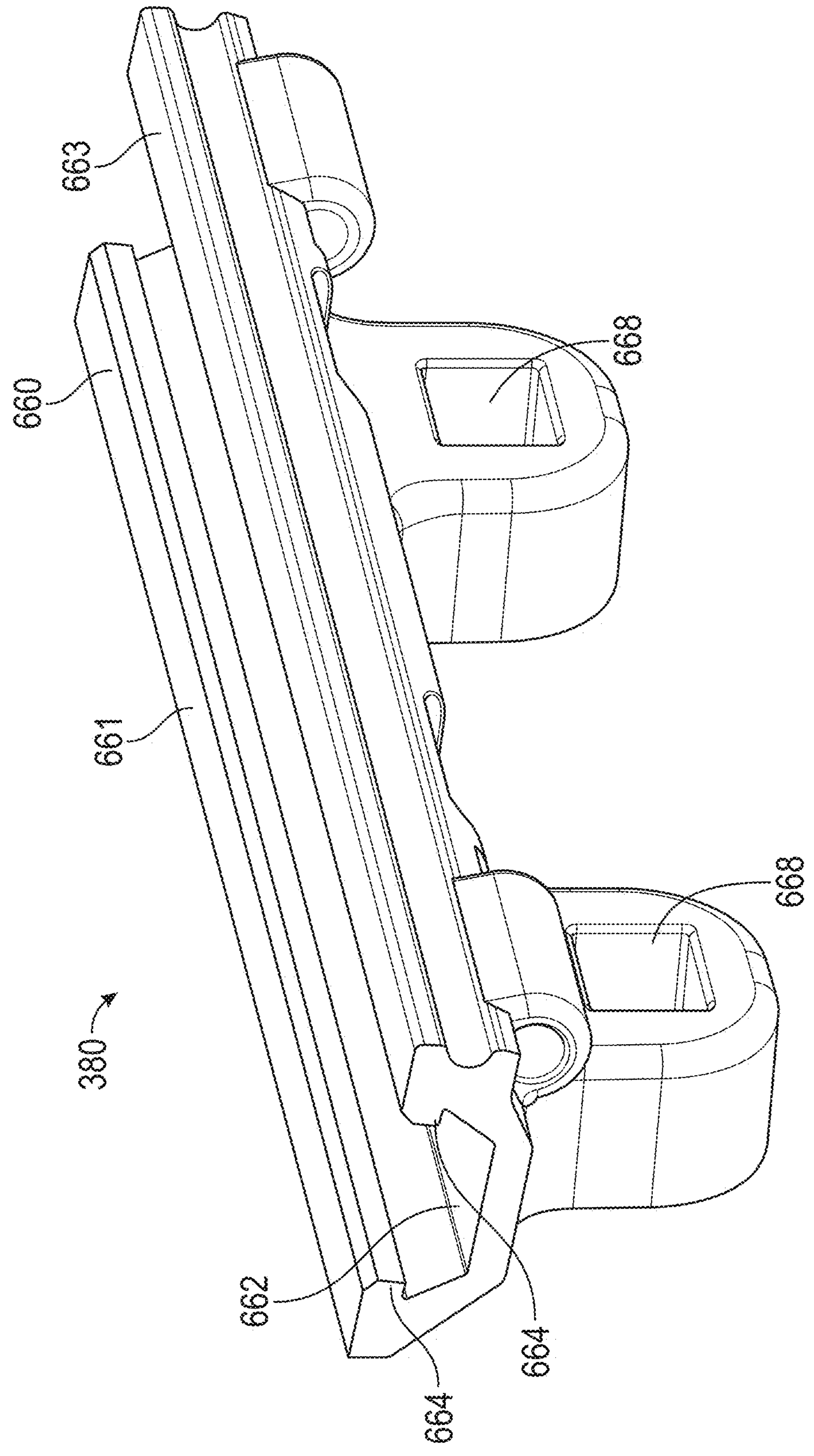
FIG. 23B illustrates a sectional bed support, in an embodiment.

FIGS. 23A and 23B illustrate another component that may be incorporated into any of the screening machines discussed in the present disclosure. More specifically, these figures illustrate sectional bed supports 380 that support bed rubber/gaskets along the edges of the screening assemblies as well as the edges of the screening assemblies themselves. Referring briefly to FIGS. 15A and 15B, the edges 340, 342 of the support plate 324 are supported above first and second gaskets 319, 329, which are themselves supported by sectional bed supports 380, in an embodiment. In prior screening machines, the edges of the screening assemblies and interposed rubber/gaskets are typically supported by a single ledge or rail (e.g., angle iron) that runs the length of the screening machine along its sidewalls and/or central member. Such prior rail-type supports tend to be welded to the machine. Accordingly, if a portion of the rail becomes compromised (e.g., bent or otherwise worn) the entire rail must be replaced.

As illustrated in FIG. 23A, a plurality of sectional bed supports 380 may be attached to the inside surface of a sidewall 312 of a screening machine. Likewise, a plurality of bed supports 380 may be attached to the central member (e.g., in a dual-trough machine) or a second wall of the screening machine (e.g., in a single-trough machine). In the present embodiment, the sectional bed supports 380 are each disposed above one of the compression assemblies 322. However, it will be appreciated that the sectional bed supports 380 may have other dimensions. For instance, a single bed support 380 could span over multiple compression assemblies 332, or stationary hook assemblies on an opposing wall/central member.

As illustrated in FIG. 23B, the sectional bed support 380 includes an upper surface 660 that, when aligned with adjacent sectional bed supports 380 may form a continuous ledge or rail along a sidewall and/or central members of a screening machine when attached thereto. A body of the bed support 380 may include one or more apertures 668 for use in bolting the bed support 380 to a sidewall or central member of a screening machine. Due to the sectional nature of the bed supports 380, if one of a plurality of bed supports 380 forming a rail becomes damaged, the damaged bed support 380 may be removed and replaced individually.

In the illustrated embodiment, the upper surface 660 of the bed support 380 includes an optional recessed press-fit channel 662 for receiving correspondingly shaped tab 672 formed on a bottom surface of a gasket 670 supported on the upper surface 660 of the bed support. See, e.g., FIGS. 24A and 24B. In such an arrangement, the top surface is divided by the recessed channel 662 and includes a rearward surface/ledge 661 that will abut against a wall surface of a screening machine and forward surface/ledge 663 that extends toward and interior of the screening machine. The press fit channel 662 may include first and second opposing retention ridges 664 to engage side edges of the tab on the bottom of the gasket. Once the gasket is press-fit into the channel 662, the resulting interference fit provides an improved seal at the walls/central member of the screening machine.

Figure 24B:
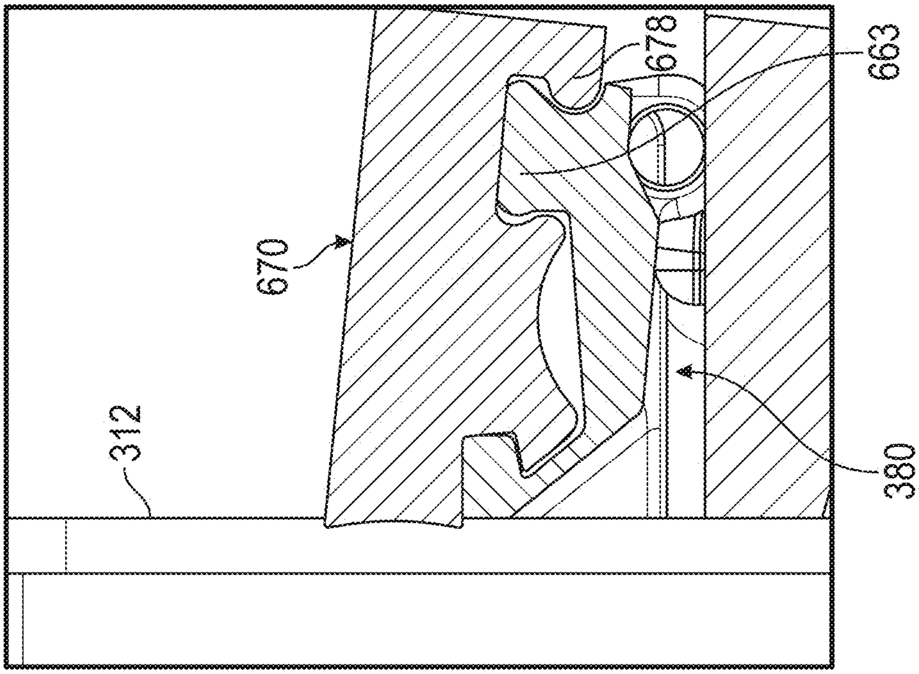
FIGS. 24A and 24B illustrate installation of a bed rubber or gasket into a bed support, in an embodiment.
Figure 24A:
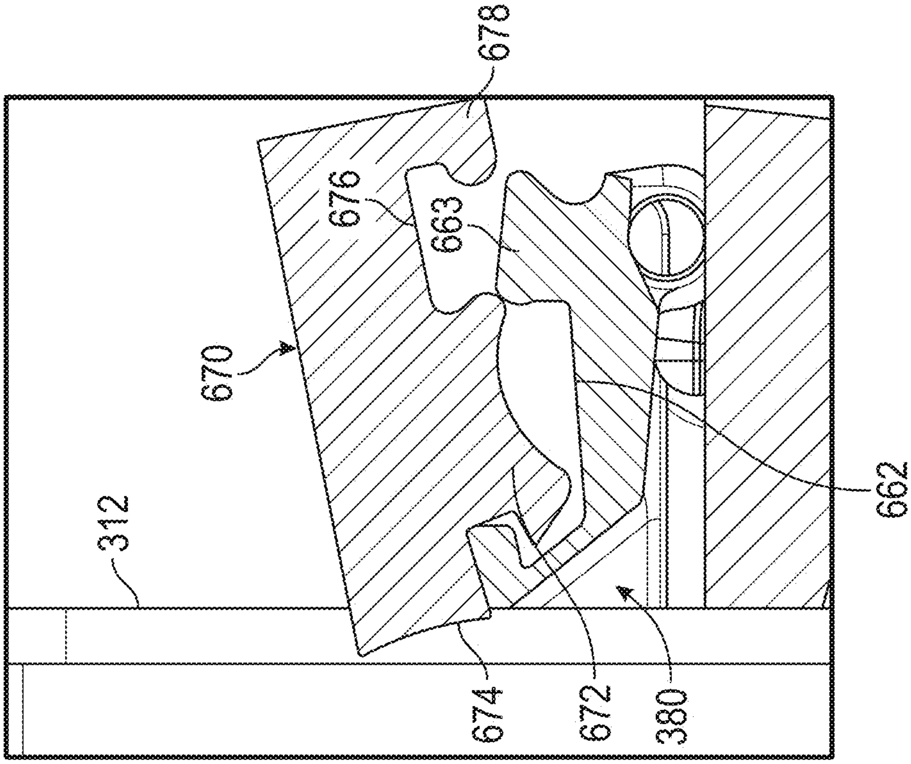

FIGS. 24A and 24B illustrate engagement of a piece of bed rubber or gasket 670 with the bed support 380 as bolted to a wall 312 of a screening machine. A single or plurality of bed supports may extend along the entire length of the wall of the machine. The gasket 670 has a generally flat upper surface for engagement with a bottom surface of an overlying support plate when a screening assembly is compressed to the machine. See also gaskets 319 and 329 and overlying plate 324 in FIGS. 15A and 15B. In the illustrated embodiment, the gasket 670 also includes the tab 672 formed on its bottom surface, which is configured for receipt within the recessed press-fit channel 662 of the bed support 380. A rearward or tail edge 674 of the gasket is configured to engage the wall 312 of the screening machine. Initially, the gasket 670 is inserted tail first (FIG. 24A) is tilted to allow tail edge to engage and compress against the sidewall 312. The gasket 670 is then snapped into place placing a recess 676 in the bottom of the gasket over the forward ledge 663 of the bed support such that a forward lip 678 of the gasket covers the bed supports forward edge/lip.

Figure 24D:
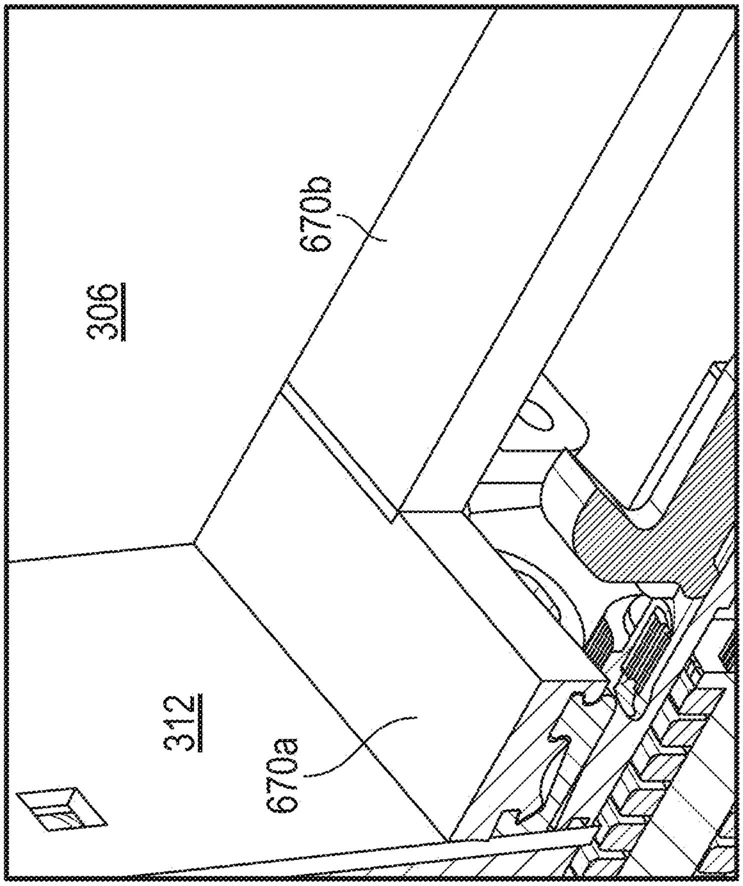
FIG. 24D illustrates two pieces of bed rubber or gaskets forming a corner seal, in an embodiment.
Figure 24C:
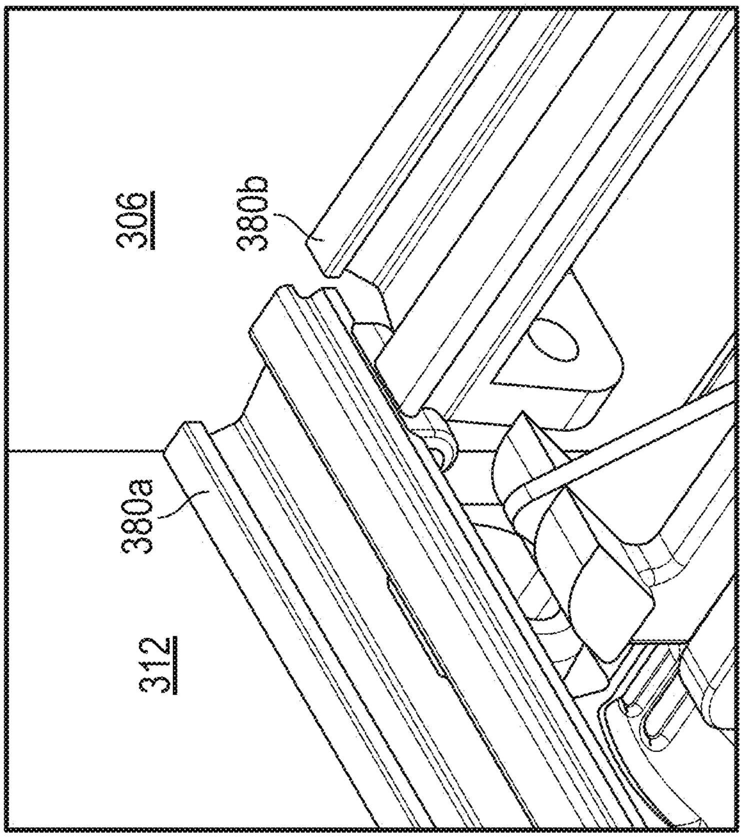
FIG. 24C illustrates two bed supports forming a corner interface.

FIGS. 24C and 24D illustrate use of first and second bed supports 380*a*, 380*b* to form a corner seal improving on prior designs. More specifically the first bed support 380*a* may bolt to the sidewall 312 of the machine continuously to a corner where the sidewall 312 meets an end wall 306. A first bed rubber or gasket 670*a* may be press-fit into the first bed support 380*a*. The second bed support 380*b* may be attached to the end wall 306. A bed rubber or gasket 670*b* may be disposed in this support and may terminate against the first gasket 670*a*. In any case, the corner between the sidewall 312 and end wall 306 may be fully sealed, which was problematic with prior designs.

FIGS. 25A-25E further illustrate an embodiment of the screen assembly 320. As illustrated, the screen assembly 320 includes a screening surface 326 attached to a perforated metal support plate 324, such as steel or any other suitable metal, having a first pair of opposite side edges 340 and 342 and a second pair edges/ends 344 and 346 and an upper surface and a lower surface. The support plate 324 includes apertures 348 which are bordered by elongated metal strip-like portions or members 347 which extend between edges 340, 342 and by shorter strip-like portions 349 which extend lengthwise between the ends 344, 346. The apertures 348 may be formed by a punching operation and are quadrangles of approximately 1 inch square with rounded corners but they may be of any other desired shape or size. Strip-like portions 347 and 349 are approximately 1/10 of an inch wide, but they may be of any desired width. The length of the support plate 324 may have a width of approximately 2.5 feet and a length of approximately 3.5 feet, and it may have a thickness of about 1⁄16 of an inch. However, it will be appreciated that the size of support plate 324 may vary as required to fit different screening machines. The width of each aperture 348 is a small fraction of the width of the support plate 324 between edges 340 and 342. The same is true of the relationship between the height of apertures and the length the plate between ends 346 and 348. Though not illustrated, channel-shaped members may be formed with or attached to one or both edges 340, 342 for use in attaching the support plate 324 to a screening machine. However, embodiments omitting such channel-shaped members may provide more screening area on the support plate 324 as an area that would otherwise be covered by a channel member may be covered with additional screening surface.

Figure 25A:
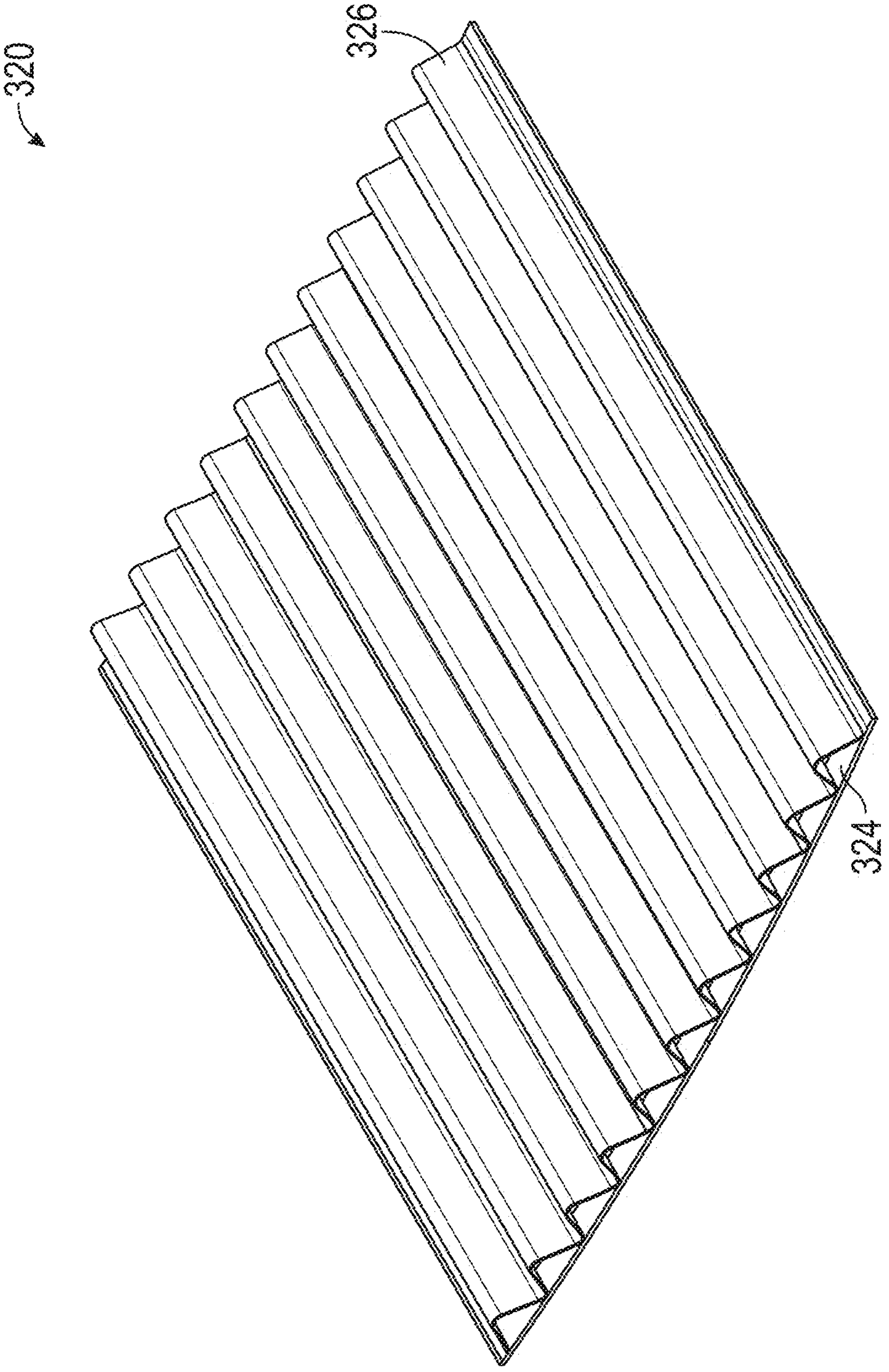
FIG. 25A illustrates a screening assembly, in an embodiment.
Figure 25B:
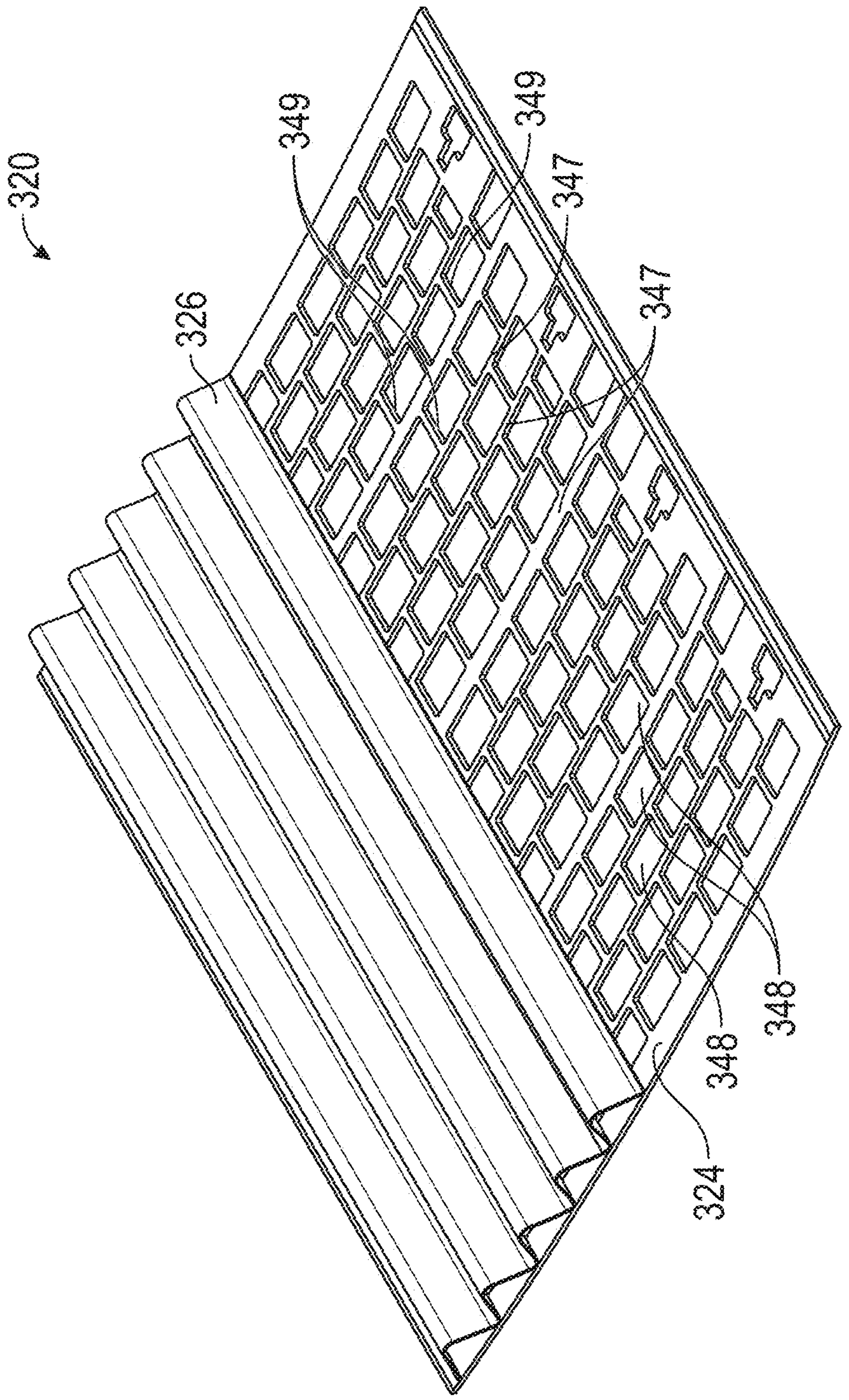
FIG. 25B illustrates a screening assembly with a portion of a screening surface removed, in an embodiment.
Figure 25C:
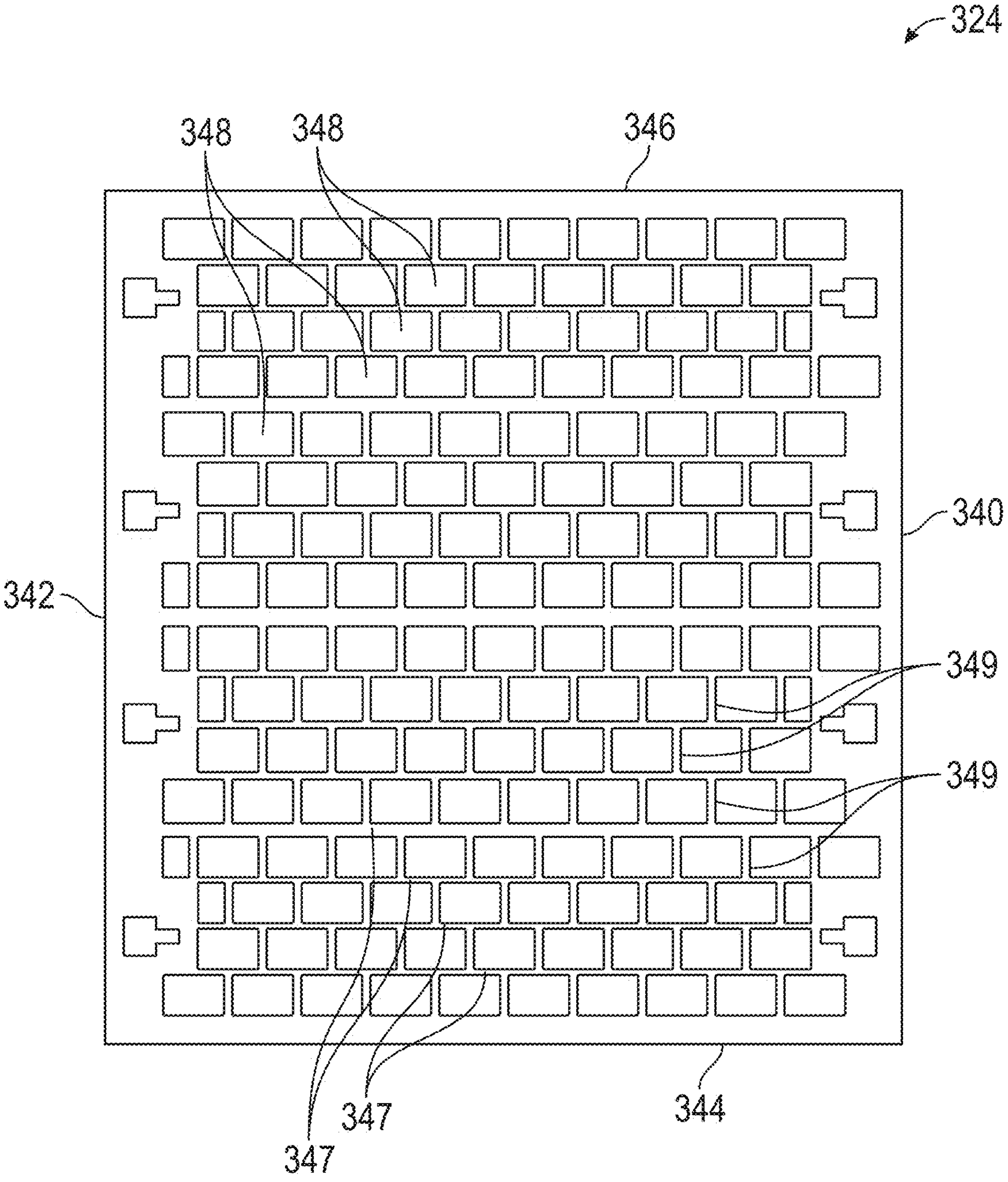
FIG. 25C shows a top view of a support plate of a screen assembly, in an embodiment.
Figure 25D:
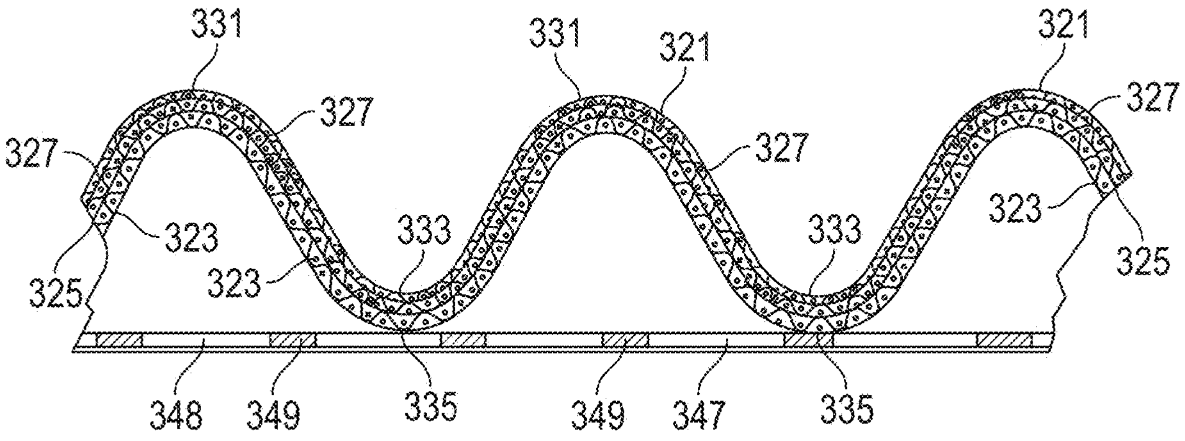
FIG. 25D shows a cross-sectional side view of a portion of screen assembly having a multi-layered screen surface, in an embodiment.
Figure 25E:
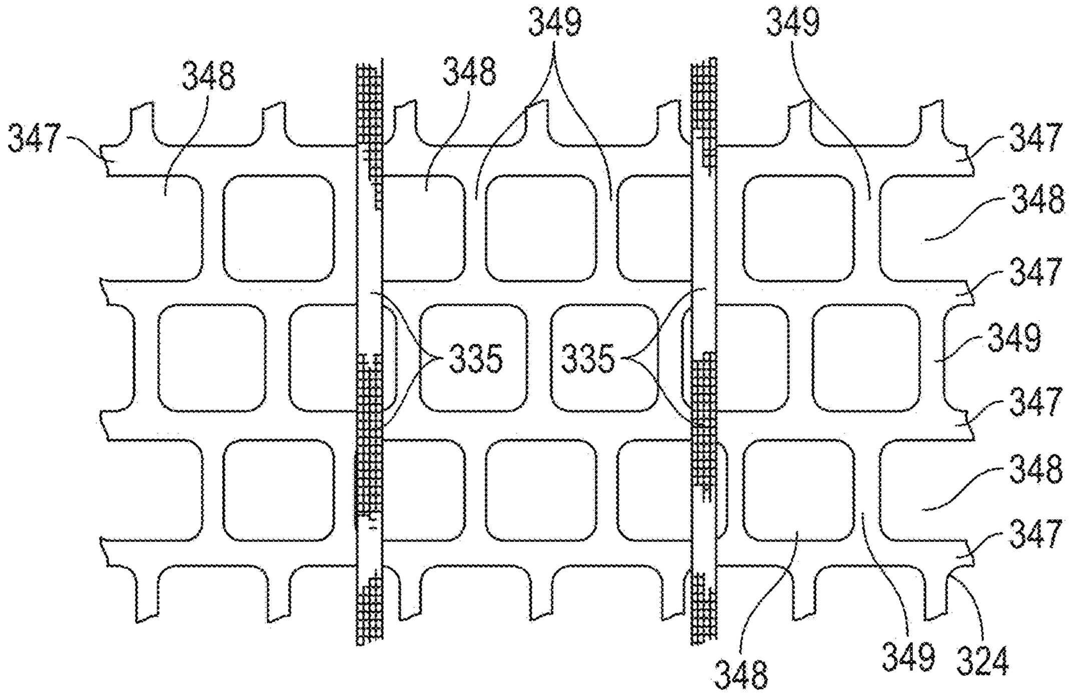
FIG. 25E shows how portions of a screen surface connect to or contact a support plate, in an embodiment.

As illustrated in FIG. 25D, the screening surface 326 is formed from a plurality of screens bonded face-to-face. Thus, the screening surface 326 includes a coarse screen 323 which serves a supporting function and may have a size of between 6 mesh and 20 mesh or any other suitable size. A fine screening screen 325 is bonded to the coarse supporting screen 323 and it may have a mesh size of between 30 mesh and 325 mesh, or any other suitable size. A still finer screening screen 327 is bonded to the fine screening screen 325 and it may have a mesh size of between 40 mesh and 400 mesh, or any other suitable size. Preferably the intermediate fine screen 325 should be two U.S. sieve sizes more coarse than the finer uppermost screen 327. The three screens 323, 325 and 327 are bonded to each other by a fused plastic grid 321 which permeates all three screens. The screening surface 326 is formed in undulating curved shape, as depicted in FIG. 25D, and it has ridges 331 and troughs 333. The undersides of troughs 333 at 335 are bonded to the support plate 324 by a suitable adhesive such as epoxy. This bonding at 335 occurs at all areas where the undersides of the troughs 333 contact strips 347 and 349, as depicted in FIG. 25E. The open ends of the ridges 331 may be sealed or blocked by caps which may be molded into place. The caps could be formed of polyurethane or other plastic or synthetic materials.

In the foregoing descriptions, the screen assemblies included a screening surface that is attached to the top surface of a support plate. The support plate includes pass-through compression points that are engaged by the pawls of compression mechanisms to attach the screen assembly to a vibratory screening machine. In many cases, the screening surface is formed of metal wire mesh assemblies that can include multiple layers of wire mesh and/or synthetic mesh, as well as adhesives or binders.

In alternate embodiments, the screen assemblies could be configured quite differently. Instead of attaching a screening surface to a top of a support plate, a screen assembly could be formed by connecting together a plurality of screen units formed of synthetic or plastic materials to form a screening panel. Endbars are then affixed to opposite ends of the screening panel, and the endbars have pass-through compression points similar to the support plate of the previously described embodiments.

Various embodiments of synthetic or plastic screen units that are connected together to form a screening panel are described in U.S. Pat. Nos. 9,409,209; 9,884,344; 10,046,363; 10,259,013; 10,576,502; 10,835,926; 10,843,230; 10,933,444; 10,960,438; 10,967,401; 10,974,281; 10,981,197; 10,994,306; 11,000,882; 11,161,150; 11,198,155; 11,413,656; 11,426,766; 11,446,704; 11,471,913; and 11,471,914, the contents of all of which are incorporated herein by reference.

The above-listed patents disclose screening assemblies that are formed by connecting together a plurality of individual screen units. Each screen unit can include a screen element with a screening surface that is attached to a supporting subgrid. The subgrids of each screen unit can include attachment members that are configured to attach the subgrids together. By attaching the subgrids of a plurality of screen units together, one can form a larger screening panel. Endbars are then attached to ends of the screening panel to form a screening assembly.

In some embodiments, the screen elements are formed by injection molding a plastic or synthetic material, such as a thermoplastic. Each screen element includes a plurality of elongated apertures formed between adjacent elongated screen surface elements. The subgrids can also be formed by injection molding a plastic or synthetic material, such as a thermoplastic. However, the subgrids may be formed from different material or materials than the screen elements.

As mentioned above, each screen unit is formed by attaching a screen element to a subgrid. Attachment members on the screen elements and the subgrids can be used to attach a screen element to a subgrid. For example, apertures on the screen elements can receive corresponding protrusions on the subgrids, or vice versa. A screen element can then be secured to a subgrid by fusing together the protrusions and recesses. This can be accomplished by via laser welding or other similar means. Of course, screen elements can be attached to subgrids in other ways, such as by adhesives or a mechanical attachment mechanism. In some embodiments, multiple screen elements may be mounted on a single subgrid to form a screen unit.

The attachment members on the subgrids that are configured to attach subgrids together can include clips and clip apertures. A clip on one subgrid is received in a clip aperture on an adjacent subgrid to attach two screen units together. Of course, various other means for attaching the screen units together could also be employed to assemble a larger screening assembly from a plurality of screen units.

The screen units could have a variety of different shapes. In some instances, each screen unit could have a flat, planer shape. In other instances, the screen elements could be attached to pyramid-shaped subgrids to form pyramid-shaped screen units. A screening assembly comprising a plurality of screen units could all be formed from the same type of screen units. Alternatively, a screening assembly could be formed by combinations of flat screen units and pyramidal-shaped screen units.

Figure 26:
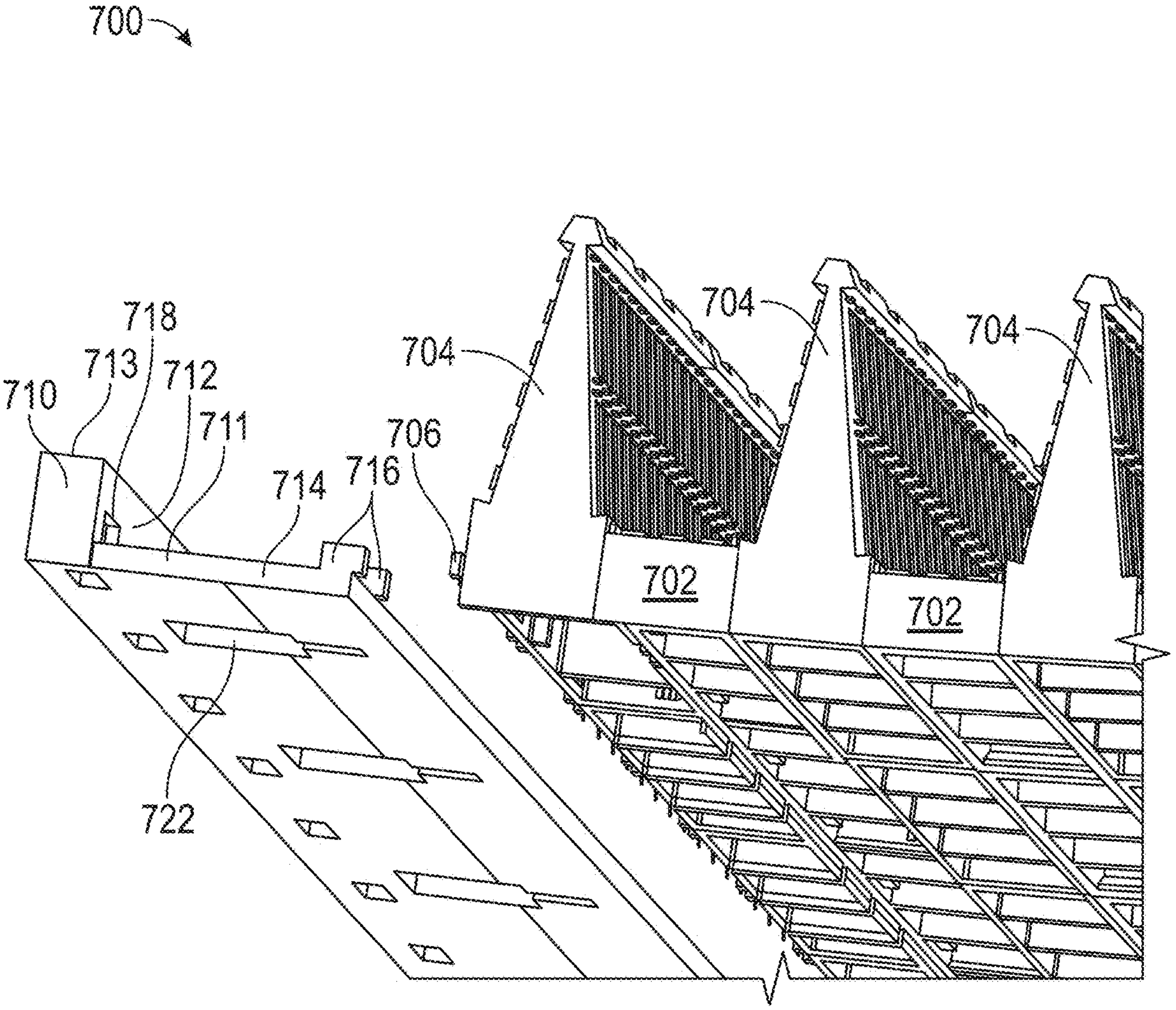
FIG. 26 is a perspective view of a first embodiment of a synthetic screen assembly having an endbar with pass-through compression points.

FIG. 26 illustrates a screening assembly 700 formed from a combination of flat screen units 702 and pyramid-shaped screen units 704*s*. FIG. 26 illustrates only a corner of the screen assembly 700. The larger screen assembly 700 would include multiple rows of flat screen units 702 positioned between rows of pyramid-shaped screen units 704. Each row of flat screen units is formed of a plurality of flat screen units 702 arranged end-to-end. Likewise, row of pyramid-shaped screen units is formed of a plurality of pyramid-shaped screen units 704 arranged end-to-end. The subgrids of the individual screen units 702, 704 are attached to one another with attachment mechanisms, such as clips and clip apertures, to form the larger screening assembly.

Endbars 710 are attached to opposite ends of the assembled flat and pyramid-shaped screen units 72, 704. Each endbar includes a plurality of pass-through compression points 712, similar to the pass-through compression points of the support plates of the previously described embodiments.

In the embodiment illustrated in FIG. 26, the last row of flat screen units 702 and the last row of pyramidal-shaped screen units 704 are mounted to the top surface 714 of a receiving base 711 of the endbar 710. The endbar 710 has attachment mechanisms that are configured to mate with corresponding attachment mechanisms of the flat screen units 702 and pyramid-shaped screen units 704. For example, attachment protrusions 716 on a distal end of the receiving base 711 are configured to mate with corresponding apertures in the flat screen units 702 and/or pyramid-shaped screen units 704. Likewise, clip apertures 718 are formed in the inner surface 712 of the end rail 713 of the endbar 710. The clip apertures 718 are similar to the clip apertures on the subgrids of the flat screen units 702 and pyramid-shaped screen units 704. Thus, the clip apertures 718 are configured to mate with the existing protrusions that are already provided on the screen units 702/704.

Figure 27:
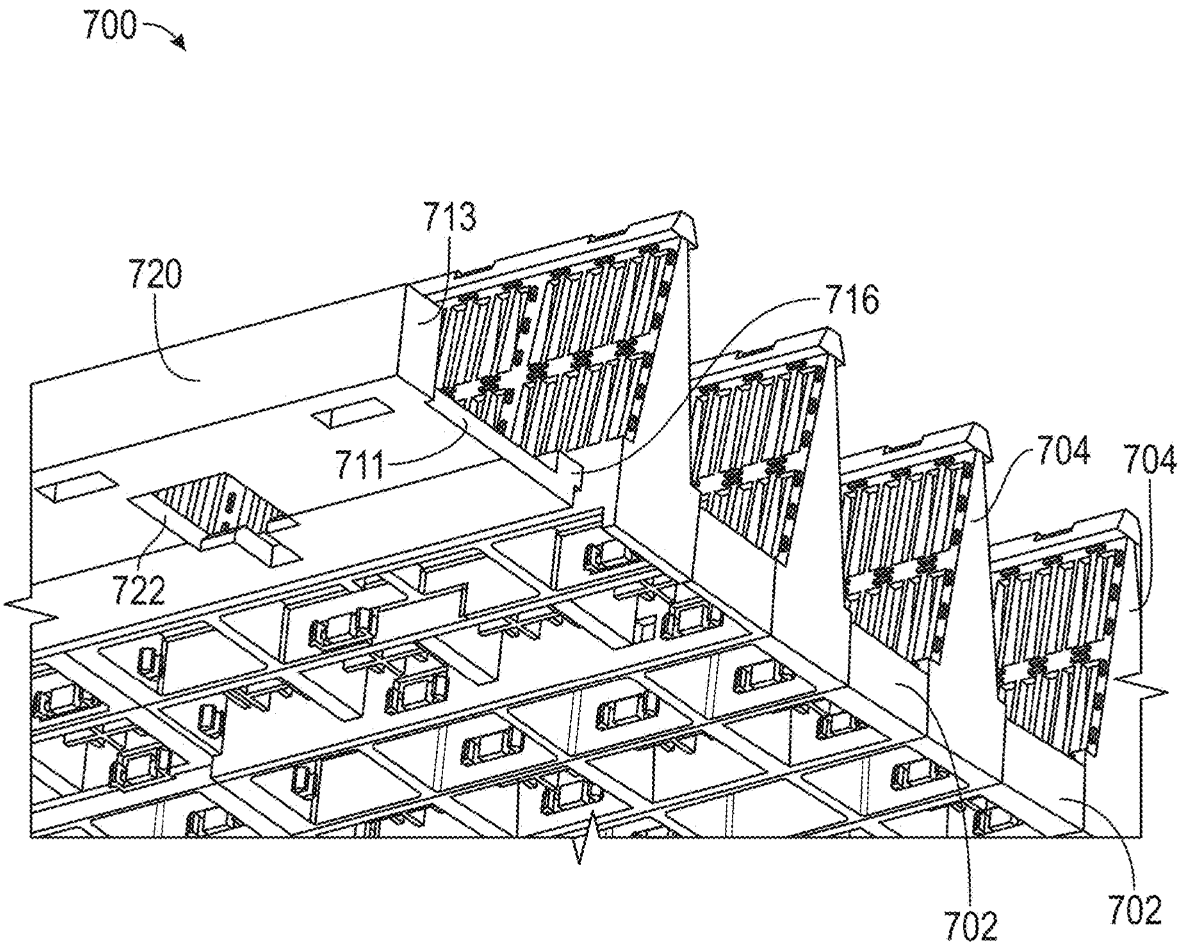
FIG. 27 is a perspective view of the synthetic screen assembly of FIG. 17 showing how the endbar is attached to the screen units.
Figure 28:
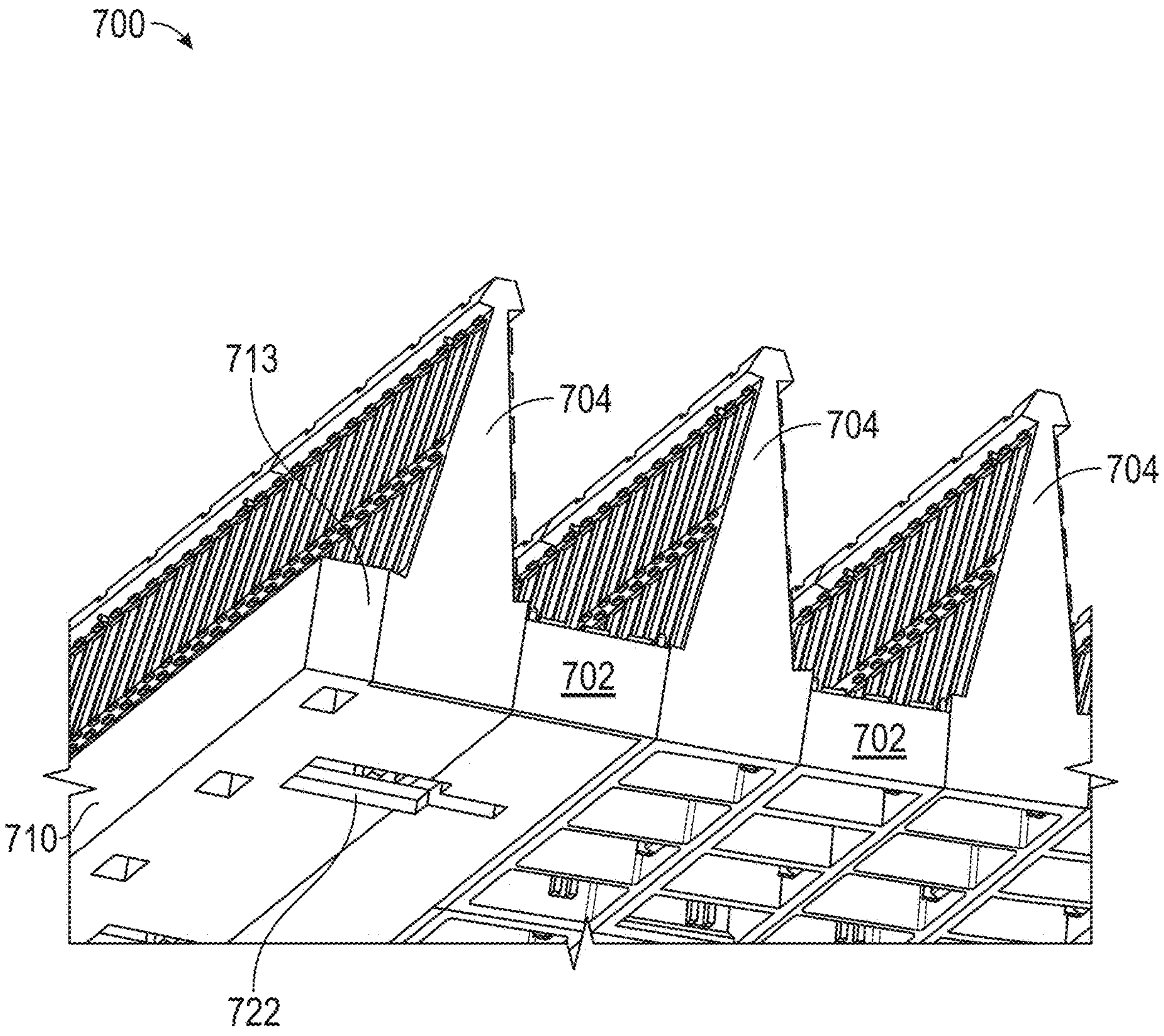
FIG. 28 is a perspective view the synthetic screen assembly illustrated in FIGS. 17 and 18 after the endbar has been coupled to the screen units.

FIG. 27 shows the endbar 710 being brought adjacent the side edge of an assembly of flat screen units 702 and pyramid-shaped screen units 704. FIG. 28 shows the screening assembly after the endbar 710 has been secured to the screen units 702, 704. A similar endbar 710 would be mounted to the opposite side of the assembly of screen units 702, 704. The resulting screen assembly 700 can then be mounted onto a vibratory screening machine having the previously described compression mechanisms in essentially the same way that a screening assembly formed from a support plate and screening surface would.

The compression mechanisms would apply a compressive forces to inner edges of the pass-through compression points 722 of the endbars. These compressive forces would push the endbars 710 on opposite ends of the screening assembly 700 together. Thus, the same compressive forces used to secure the screening assembly 700 to the vibratory screening machine also would server to push the individual screen units 702, 704 together, helping the screening assembly 700 to maintain structural integrity.

The endbars 710 could be formed from metal or synthetic materials. Each endbar 710 also could have a composite structure that include stiffening elements such as carbon or glass fibers.

In the foregoing embodiment, the endbars 710 are attached to the screen units 702, 704 using at least some of the attachment mechanisms on the screen units 702, 704 that are used to attach the screen units 702, 704 to each other. However, alternate or additional attachment means could be used to secure the endbars 710 to an assembly of screen units 702, 704. For example, the endbars 710 could be attached to the screen units 702, 704 via adhesives, welding, fusing, using various different fasteners, or combinations of these attachment means.

A vibratory screening machine typically has an elongated screening area with an inlet end and an outlet end. Multiple screen assemblies are mounted along the length of the screening area. In a single trough embodiment, each screen assembly extends across the full width of an interior of the screening machine and the multiple screen assemblies are arranged along the length of the screening area. In a dual trough embodiment, each screen assembly extends across a portion of the width (e.g., half) of the screening machine. In such an embodiment, parallel sets of screening assemblies are arranged along the length of the screening area.

Material to be screened is deposited at the input end of the screening area and the screen assemblies are vibrated to cause the material to travel along the length of the screening area to the outlet end. The screen assemblies mounted on the screening area may be mounted to form a continuous screening surface that is oriented at an angle to the horizontal, for example, with the inlet end being higher than then outlet end. A tilted screening surface may help to cause the material to travel under the force of gravity from the input end to the output end. Other configurations are possible.

The screen assemblies can be made of multiple different types of materials. Those differing materials can give the screen assemblies different characteristics. Typically screen assemblies made of plastic or synthetic materials may be better at standing up to the wear associated with screening operations than screen assemblies made of woven metal wire mesh. On the other hand, screen assemblies made of metal wire mesh may have better screening and dewatering characteristics than screen assemblies made of plastic or synthetic materials.

The conditions that exist in the screening area of a vibratory screening machine vary along the length of the screening area. The full amount and weight of the material to be screened is deposited at the inlet end of the screening area. As a result, the screen assembly or assemblies at the inlet end, which experience the full weight of all the input material to be screened, is subjected to the greatest wear. As material travels along the length of the screening area fluid and the smaller particles fall through the screen assemblies. As a result, the amount and weight of material that travels along a downstream portion (e.g., second half) of the screening area is not as great as the amount and weight of the material that travels along the upstream portion (e.g., first half) of the screening area. For that reason, the screen assemblies mounted along the downstream portion of the screening area are subjected to lesser wear than the screen units mounted along the upstream portion of the screening area.

Embodiments of the present disclosure relate to systems, apparatuses, and methods of minimizing overall wear of a set of screening assemblies mounted along the length of a vibratory screening machine while maintaining desired screening and dewatering characteristics of the vibratory screening machine. In an embodiment, a screening system, screening machine and method for screening is provided where different types of screen assemblies are mounted along the length of a screening area of a screening machine. In an embodiment, a plastic or synthetic screen assembly is mounted at the inlet end of the screening area and along an initial portion (e.g., first half) of the length of the screening area. Such plastic or synthetic screen assemblies are better able to stand up to the greater load experienced by the screen assemblies located along the initial or inlet portion of the screening area than screen assemblies made of woven metal wire mesh. Additionally, woven metal wire mesh screen assemblies are mounted along a latter portion (e.g., second half) of the length of the screening area. As noted, the screen assemblies mounted along an outlet portion of the screening area are not subjected to as much wear as the screen assemblies mounted on the inlet portion of the screening area. Thus, wear of the woven metal wire mesh screen elements is not as much of a factor when they are located on the outlet portion of the screening area.

Figure 29A:
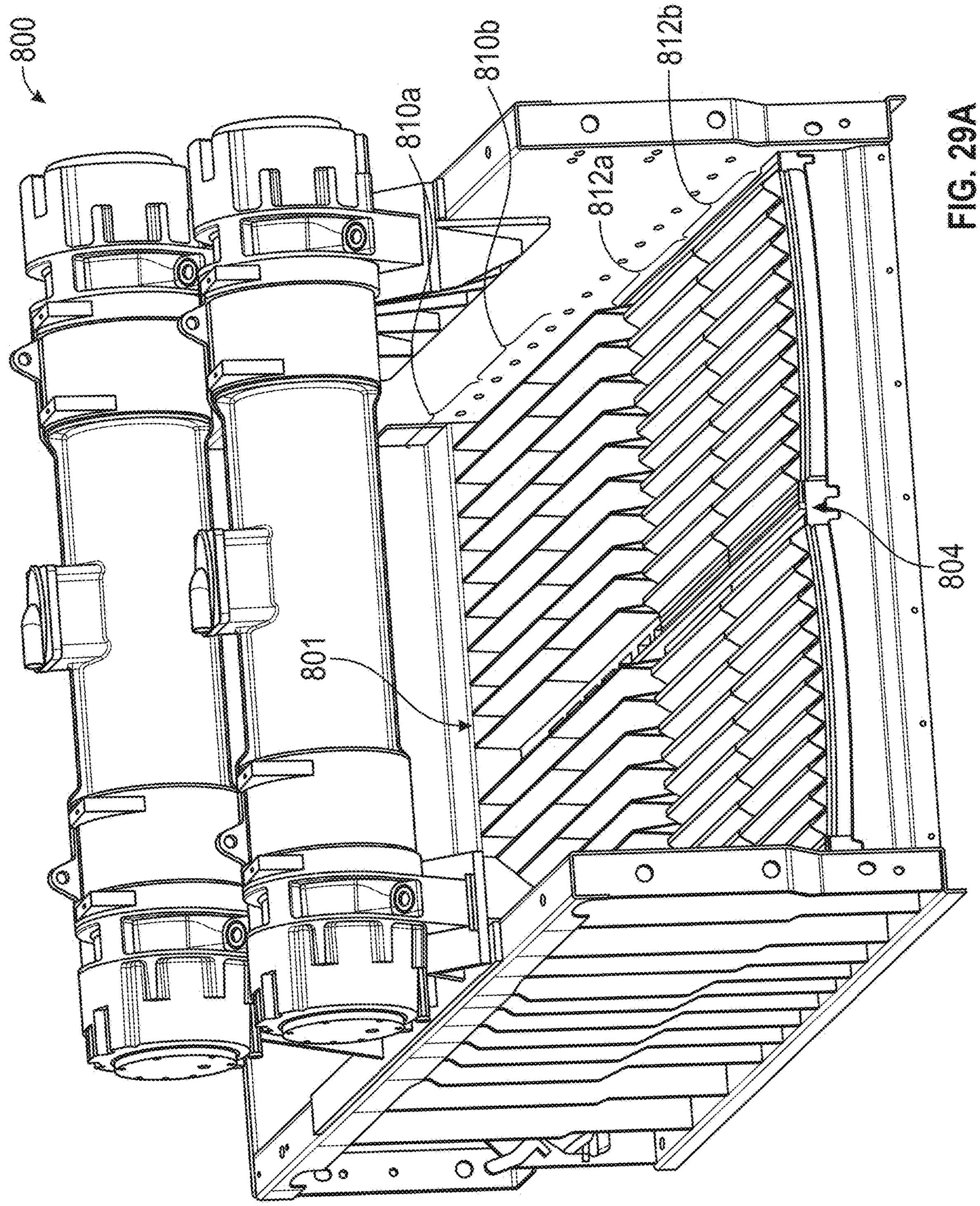
FIGS. 29A-29D illustrate a dual trough vibratory screening machine that includes multiple different types of screen assemblies.
Figure 29B:
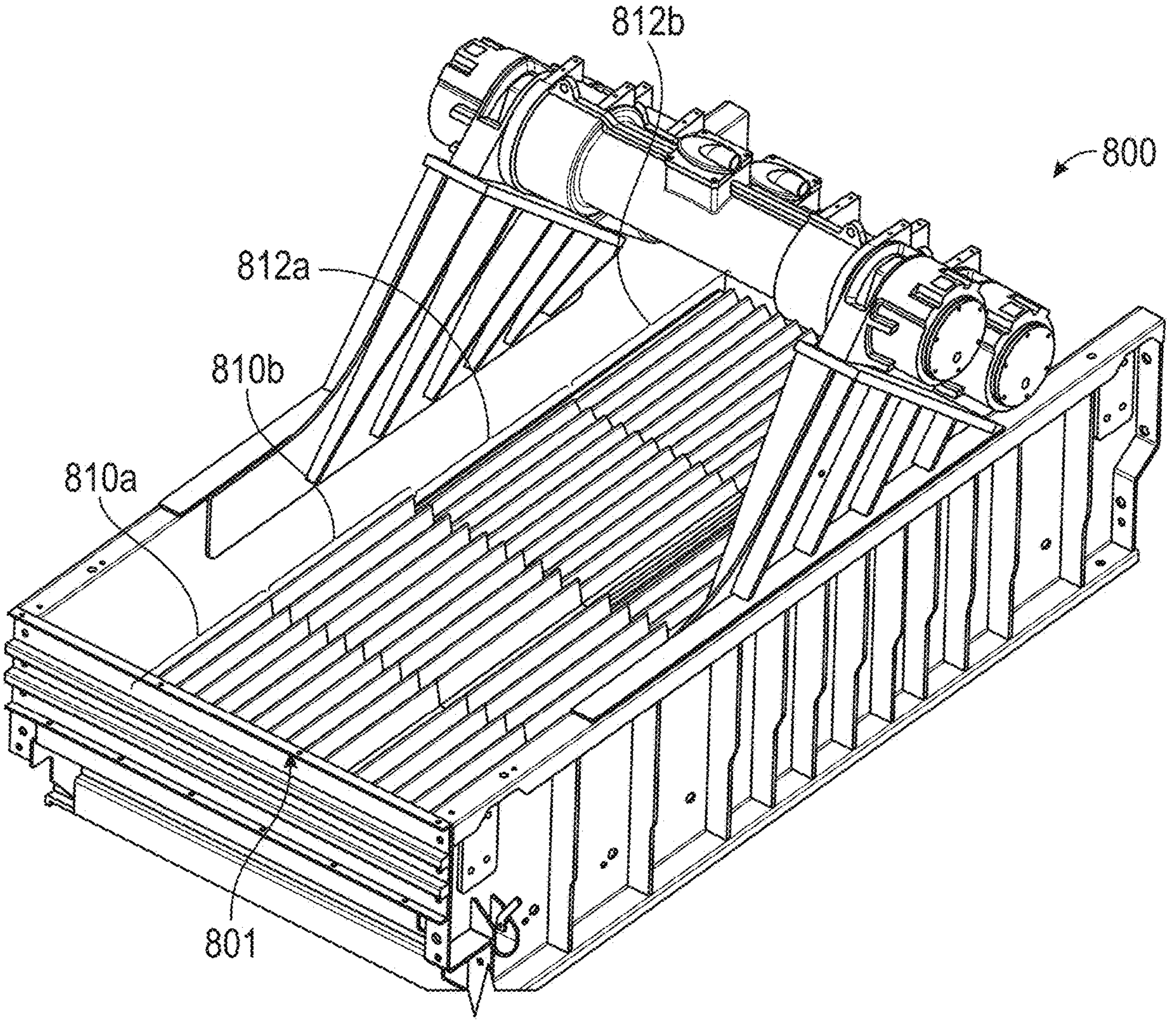

FIGS. 29A and 29B illustrate front and rear perspective views of a screening machine 300 where different types of screen assemblies are mounted along the length of a screening area of the screening machine. In the illustrated embodiment, the screening machine has two parallel sets of screening assemblies disposed along the length of the screening machine. For purposes of discussion, only one set of screening assemblies is described. The parallel set may be substantially identical. Further, such description is also applicable to a single trough screening machine (e.g., FIG. 1D) where a single set of screen assemblies extend along the screening area of the machine.

As shown in FIGS. 29A and 29B, the screening machine 800 utilizes first and second plastic or synthetic screen assemblies 810*a*, 810*b* (hereafter 810 unless specifically referenced) mounted to the machine disposed between the inlet end 801 of the screening area and extending over the first half of the screening area. Additionally, the screening machine 800 utilizes first and second wire mesh screen assemblies 812*a*, 812*b* (hereafter 812 unless specifically referenced) disposed between the outlet end 4 of the screening area and the center of the screening area. In this embodiment, the four screening assemblies 810*a*, 810*b*, 812*a*, 812*b* collectively cover the screening area of each trough of the screening machine. In use, materials to be screened are input to the inlet end 801 of the machine onto the upper surface of the first plastic/synthetic screen assembly 812*a*. Due to the vibration of the machine 800, the material passes over the surface of the first plastic/synthetic screen assembly 810*a*, over the surface of the second plastic/synthetic screen assembly 810*b*, over the surface of the first wire mesh screen 812*a*, over the surface of the second wire mesh screen assembly 812*b* and out of the outlet end 804 of the machine 800. As previously noted, the plastic/synthetic screen assemblies 810 are better able to stand up to the wear experienced at the inlet end of the screening area than the wire mesh screen assemblies 812. Further, as the material to be screened passes along the screening area, a first portion of the fluid of the material passes through the plastic/synthetic screen assemblies 810 while the material to be screened travels along the plastic/synthetic screen assemblies 810. A second portion of the fluid in the material passes through the wire mesh screen assemblies 812 as the material travels over the wire mesh screen assemblies 812.

A screening machine 800 utilizing a combination of plastic/synthetic screen assemblies 810 and wire mesh screen assemblies 812 (e.g., hybrid machine 800) achieves screening and dewatering that is at least as efficient as a screening machine utilizing a full set of wire mesh screen assemblies. Further, the wear rate of the wire mesh screening assemblies 812 of the hybrid screening machine 800 is reduced compared to a screening machine utilizing a full set of wire mesh screen assemblies. Accordingly, the wire mesh screen assemblies 812 of the hybrid machine require less frequent replacement further reducing down time of the machine and increasing its overall efficiency. Also, the average screen life increases.

Figure 29C:
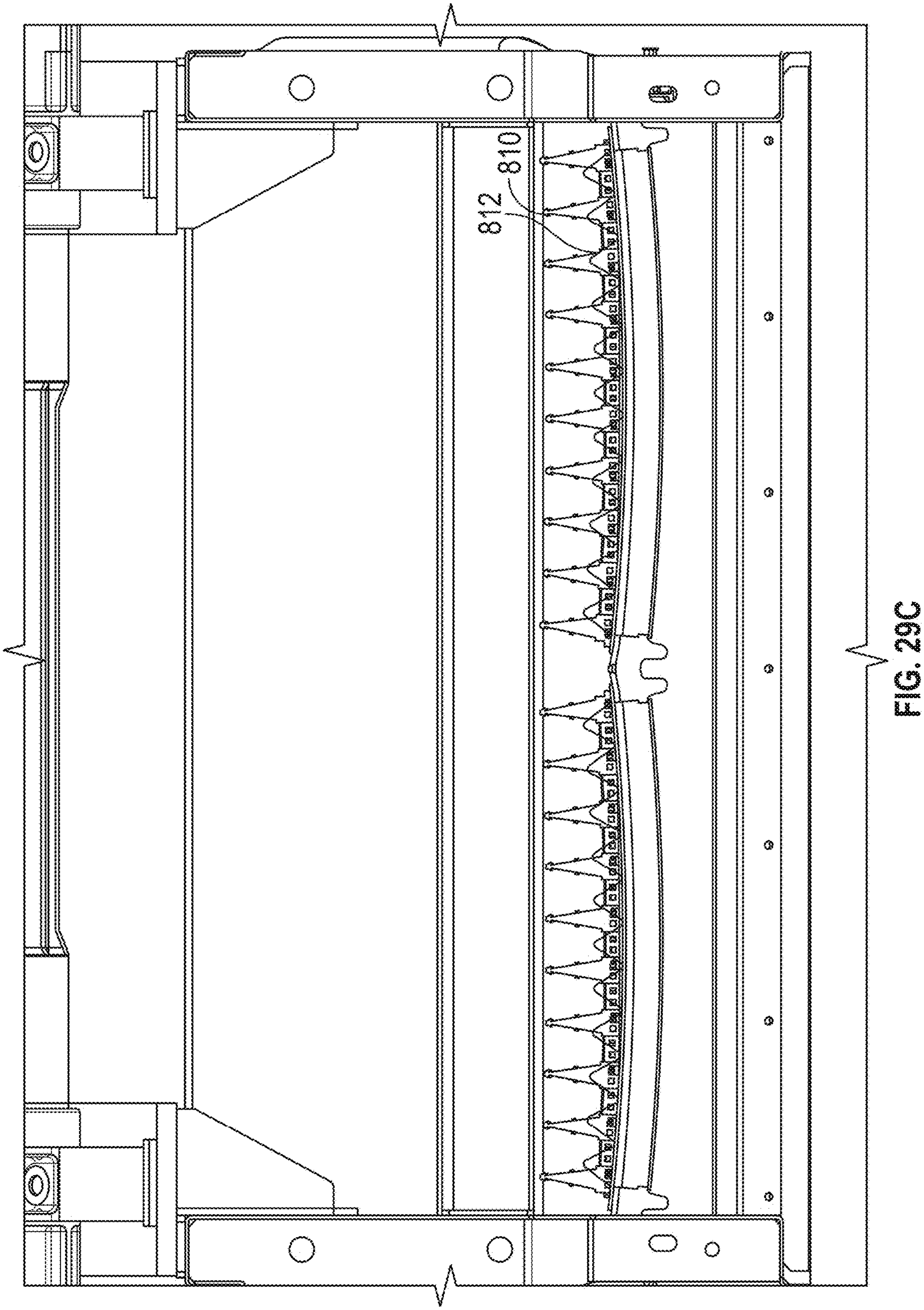
Figure 29D:
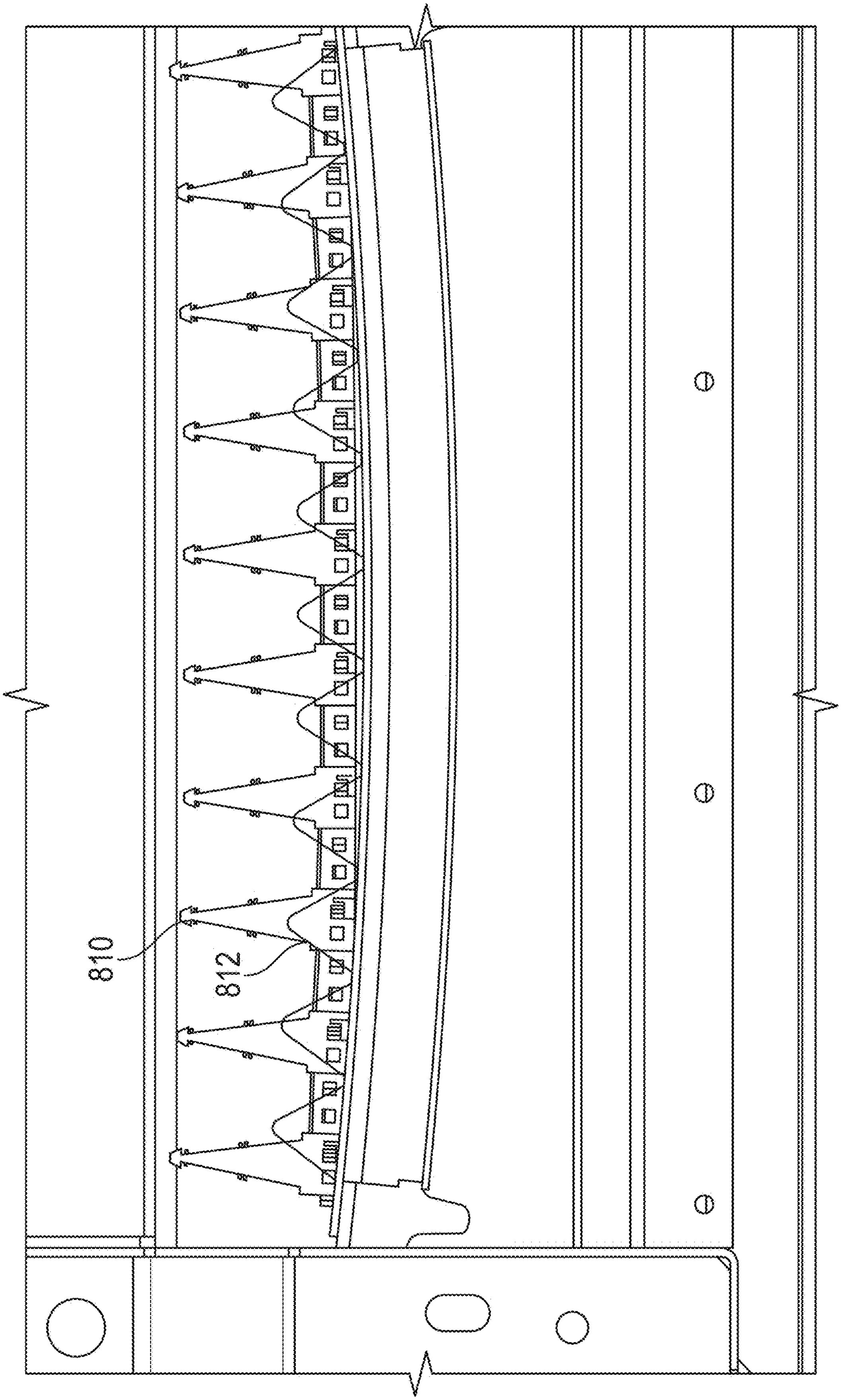

FIGS. 29C and 29D show an end view and a partial end view, respectively, of the screening machine 800 of FIGS. 29A and 29B. As illustrated in these figures, the plastic/synthetic screen assemblies 810 and the wire mesh screen assemblies 812 may additionally have different physical configurations. As shown, the plastic/synthetic screen assemblies 810 and the wire mesh screen assemblies 812 may, in an embodiment, each utilize an undulating or corrugated screen surface where the screen surface has alternating peaks and valleys. In the illustrated embodiment, the height of the peaks of the plastic/synthetic screen assemblies 810 are larger than the peaks of the wire mesh screen assemblies 812. However, it will be appreciated the screen assemblies may be commonly configured. Further, while the screen surfaces of the screen assemblies 810, 812 are each illustrated as an undulating or corrugated surfaces, it will be appreciated that the screen surface may have other configurations (e.g., substantially flat).

The plastic/synthetic screen assemblies 810 may have screen surfaces made of, without limitation, synthetic materials such as a polyurethane, thermoplastic polymers (e.g., polyurethane) and thermosetting polymers. Molded polyurethane screens are described, for example, in U.S. Pat. No. 9,908,150, the disclosure of which is incorporated herein by reference. Thermosetting and thermoplastic polymer screens are described, for example, in the U.S. Patent Publication No. US-20210354173, the disclosure of which is incorporated herein by reference.

The wire mesh screen assemblies 812 may include one or multiple layers of woven mesh material. Such woven mesh material may be attached to an underlying support plate by means of gluing, welding, and mechanical fastening. Exemplary wire mesh screen assemblies are described, for example, in U.S. Pat. No. 7,228,971 the disclosure of which is incorporated herein by reference.

Figure 30A:
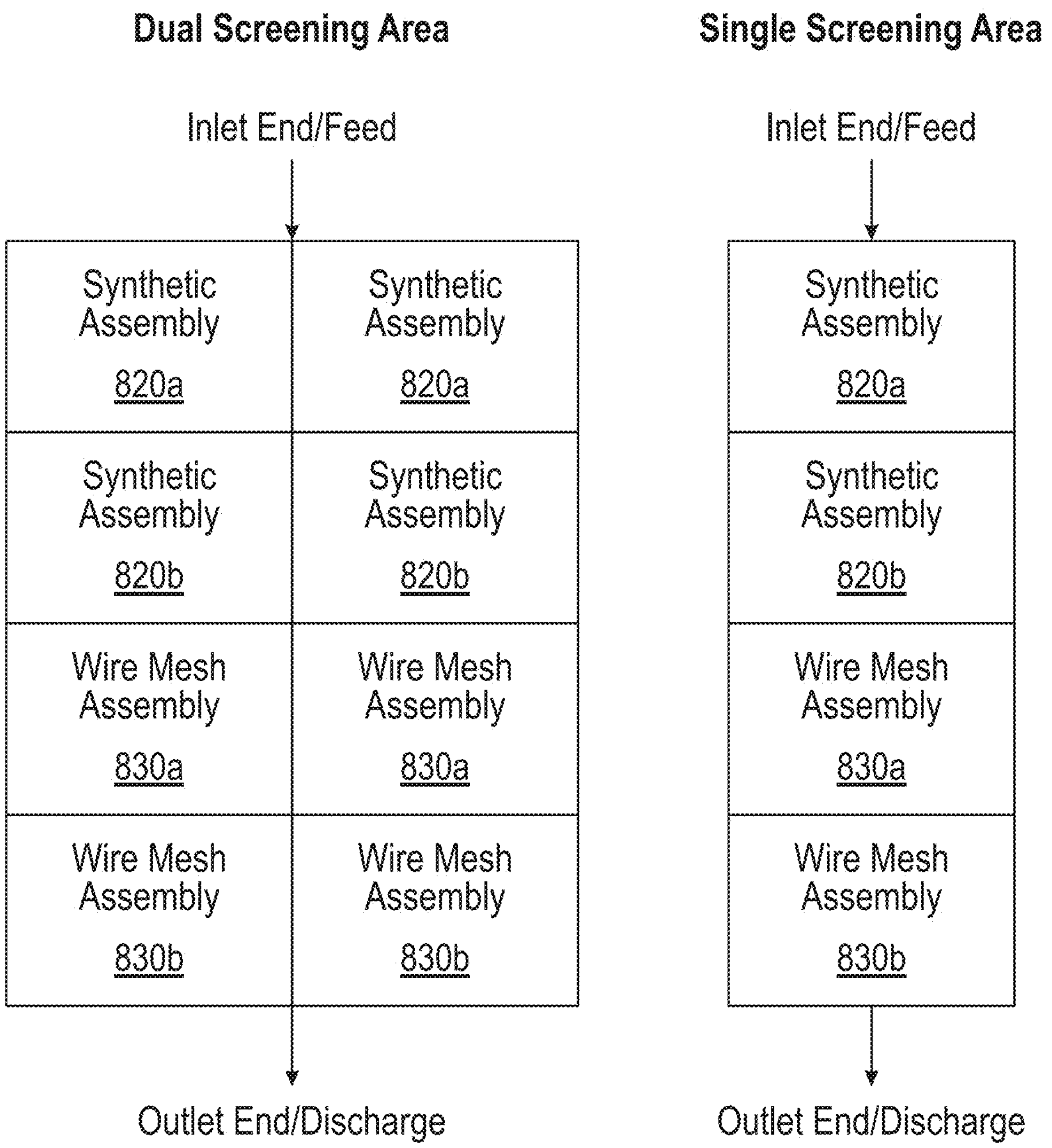
FIGS. 30A-30C illustrate how different combinations of different types of screen assemblies can be mounted together onto a vibratory screening machine.

FIG. 30A graphically illustrates one arrangement of the plastic/synthetic screen assemblies 820 and wire mesh screen assemblies 830 on a dual screening area screening machine, as well as the arrangement of a single screening area machine. In this arrangement, the machines each include first synthetic screening assembly 820*a* disposed at the inlet/feed end of the machine and a second synthetic screening assembly 820*b* disposed immediately downstream of the first synthetic screening assembly 820*a*. A first wire mesh screen assembly 830*a* is disposed downstream of the second synthetic screening assembly 820*b*. Finally a second wire mesh screen assembly 830*b* is disposed downstream of the first wire mesh screen assembly 830*a* and adjacent to the outlet end/discharge. In this arrangement, the dual screening area machine machines utilize two sets of parallel synthetic screen assemblies 820*a*, 820*b* and two sets of parallel wire mesh screen assemblies 830*a*, 830*b* while the single screening area machine utilizes two synthetic screen assemblies 820*a*, 820*b* and two wire mesh screen assemblies 830*a*, 830*b*. In this regard, one-half (i.e., inlet/upstream half) of the screening area is covered by synthetic screen assemblies and one-half (i.e., outlet/downstream half) of the screening area is covered by the wire mesh screen assemblies.

Figure 30B:
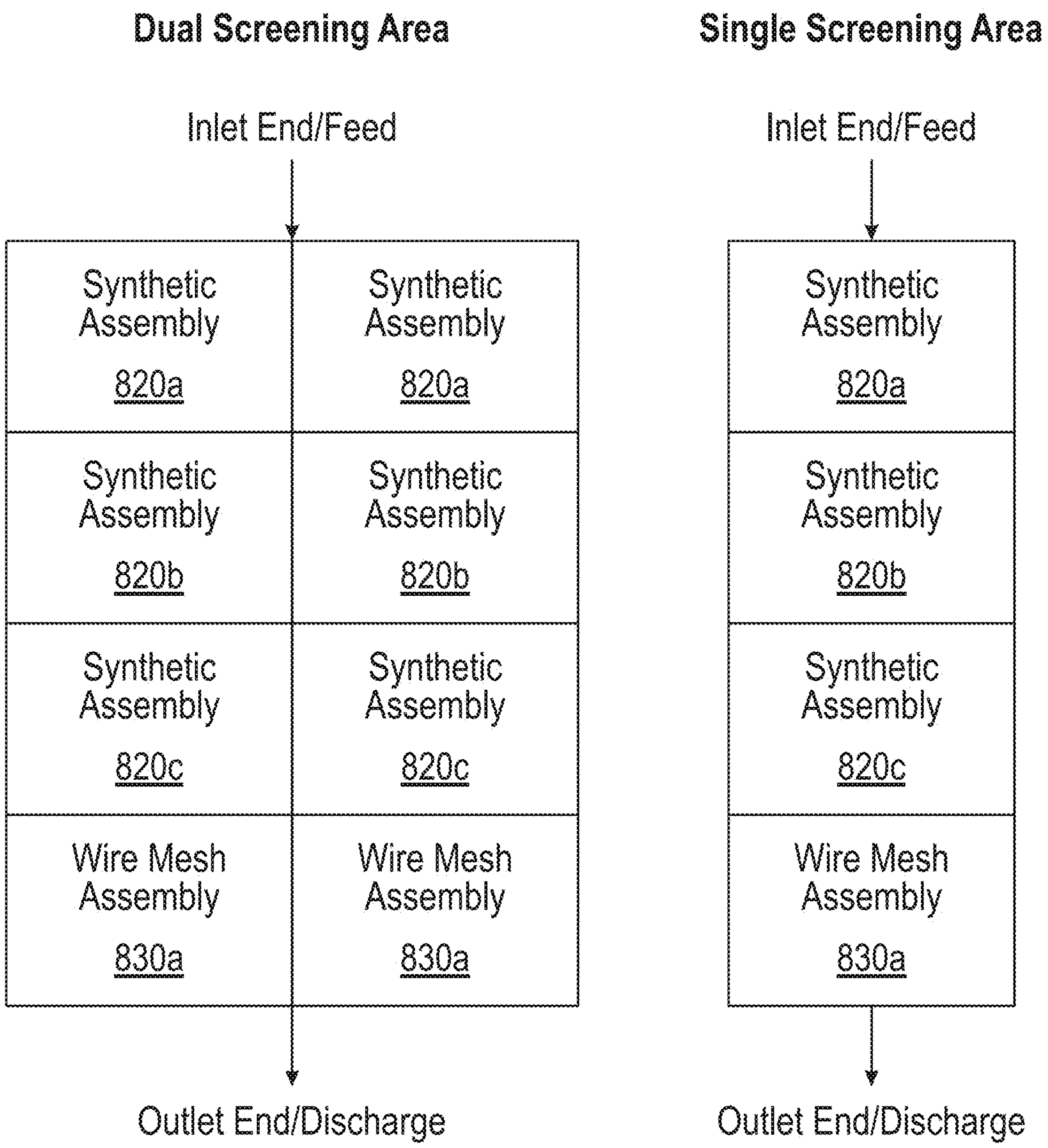
Figure 30C:
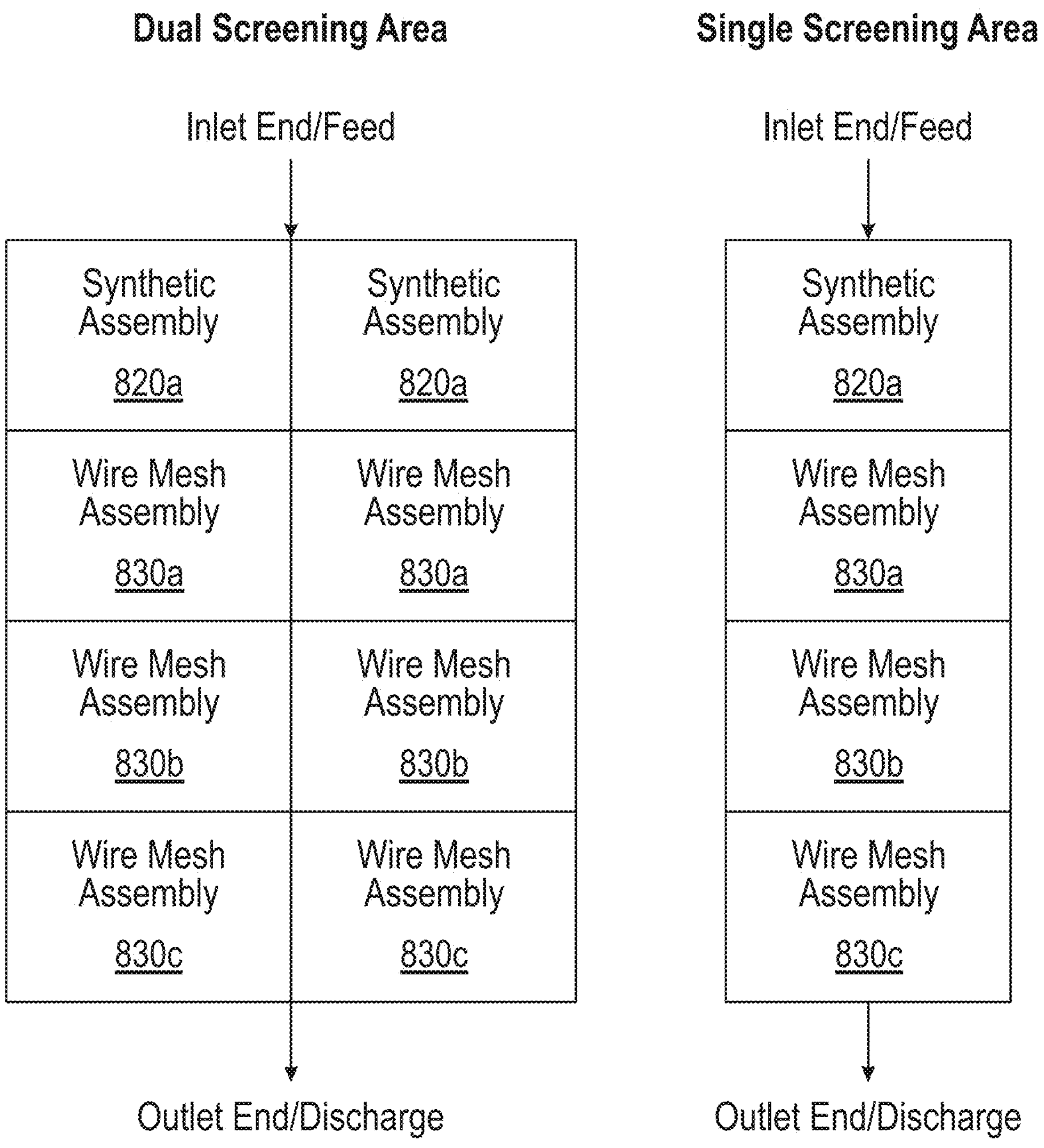

FIGS. 30B and 30C illustrate alternate screen assembly arrangements. More specifically, FIG. 30B illustrates an arrangement where the screening machines utilize three synthetic screen assemblies 820*a*, 820*b* and 820*c* and a single wire mesh screen assembly 830*a* positioned at the outlet end. FIG. 30C illustrates an arrangement where the screening machines utilize one synthetic screen assembly 820*a* at the inlet end, and three wire mesh screen assemblies 830*a*, 830*b* and 830*c*. For machines with differing numbers of screen assemblies, other variations are possible.

Though discussed above primarily in conjunction with screening machines having concave support surfaces (e.g., stringers or bulkheads) where a screen assembly is compressed into a concave shape, it will be noted that aspects of the various compression apparatuses may be utilized with differently configured screening machines. For instance, the compression apparatuses may be utilized with screening machines having a flatter bed section (e.g., less concave or even flat).

All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure. As used herein, the phrased "configured to," "configured for,"

and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the scope of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A screen assembly, comprising:

a flangeless substantially planar support plate including:

a flow through area surrounded by a front edge, a rear edge and first and second side edges, wherein the first and second sides edges have side edge surfaces formed by a thickness of the support plate; and a first compression surface located on the first side edge surface, the first compression surface being configured to receive a compression force that deforms the support plate and secures the screen assembly to a screening machine; and a screening surface attached to a top surface of the flow through area.

2. The screen assembly of claim 1, wherein the first compression surface is configured to receive a compression force that includes a first component orientated vertically downward and a second component that is oriented horizontally.

3. The screen assembly of claim 1, wherein the first compression surface is located adjacent an alignment slot, the alignment slot extending from the first compression surface inward toward a centerline of the support plate.

4. The screen assembly of claim 3, wherein the first compression surface is located adjacent a first side of the alignment slot, and where the support plate further comprises a second compression surface located on the first side edge surface, the second compression surface being located adjacent a second side of the alignment slot.

5. The screen assembly of claim 1, wherein a plurality of first compression surfaces are located along the first side edge.

6. The screen assembly of claim 5, wherein a plurality of alignment slots are provided along the first side edge of the support plate, each alignment slot extending from the first side edge inward toward a centerline of the support plate, wherein each of the plurality of alignment slots is located adjacent a corresponding one of the plurality of first compression surfaces.

7. The screen assembly of claim 1, wherein the support plate further comprises a second compression surface located on the second side edge surface, the second compression surface being configured to receive a compression force that secures the screen assembly to a screening machine.

8. The screen assembly of claim 7, wherein the first compression surface is located on a recessed portion of the first side edge surface that forms a first mounting aperture and wherein the second compression surface is located on a recessed portion of the second side edge surface that forms a second mounting aperture.

9. The screen assembly of claim 7, wherein a plurality of first compression surfaces are located along the first side edge surface and wherein a plurality of second compression surfaces are located along the second side edge surface.

10. The screen assembly of claim 7, wherein the support plate is configured such that when compression forces are applied to the first compression surface and the second compression surface, the support plate deforms such that a center portion of the support plate is positioned lower than the first and second side edges.

11. A method of securing a screen assembly to a screening machine, comprising:

placing a screen assembly on a screen receiving portion of a screening machine, where the screen assembly comprises a flangeless substantially planar support plate and a screening surface attached to a top surface of the support plate, the support plate having a front edge, a rear edge, first and second side edges, wherein the first and second side edges have side edge surfaces formed by a thickness of the support plate, where a first compression surface is located on the first side edge surface, and wherein placing the screen assembly on the screen receiving portion of the screening machine comprises locating the screen assembly such that a compression piston of a first compression mechanism of the screening machine is aligned with the first compression surface; and causing the compression piston to advance toward a centerline of the support plate, the compression piston being configured to bear against the first compression surface of the support plate such that when the compression piston advances toward the centerline of the support plate, a compressive force is applied to the first compression surface, the compression force including a first component that is oriented horizontally toward the centerline of the support plate and a second component that is oriented vertically downward, wherein the compressive force causes the screening assembly to flex into a concave shape where a center of the support plate is lower than the first and second side edges of the support plate, and wherein the compressive force causes the support plate to be pushed into engagement with underlying concave support surfaces of the screening machine.

12. The method of claim 11, wherein a plurality of first compression surfaces are located along the first side edge surface of the support plate, wherein placing the screen assembly on the screen receiving portion of the screening machine comprises locating the screen assembly such that compression pistons of a plurality of first compression mechanisms of the screening machine are aligned with corresponding ones of the plurality of first compression surfaces.

13. The method of claim 12, wherein causing the compression piston to advance comprises causing the compression pistons of the plurality of first compression mechanisms to advance toward a centerline of the support plate such that the compression pistons apply compressive forces to the first compression surfaces of the support plate that push the screen assembly into engagement with concave support surfaces of the screening machine.

14. The method of claim 13, wherein a plurality of second compression surfaces are provided on the second side edge surface of the support plate, wherein a plurality of second compression mechanisms are located on the screening machine, and wherein when the compression pistons of the plurality of first compression mechanisms advance toward a centerline of the support plate the second compression surfaces of the support plate are pushed into engagement with corresponding compression pistons of the plurality of second compression mechanisms.

15. The method of claim 11, wherein causing the compression piston to advance toward the centerline of the support plate comprises causing the compression piston to move both inward toward the centerline of the support plate and vertically downward.

16. The method of claim 11, wherein the support plate includes an alignment slot located adjacent the first compression surface, the alignment slot extending from the first side edge of the support plate inward toward the centerline of the support plate, wherein an end portion of the compression piston includes an alignment finger, and wherein when the compression piston advances toward a centerline of the support plate the alignment finger of the compression piston is received in the alignment slot.

17. The method of claim 16, wherein the first compression surface is located adjacent a first side of the alignment slot, wherein a second compression surface is provided on the first side edge surface of the support plate adjacent a second side of the alignment slot, and wherein when the compression piston advances towards a centerline of the support plate and the alignment finger of the compression piston is received in the alignment slot, an end of the compression piston bears against the first and second compression surfaces on the first side edge surface of the support plate.

18. The method of claim 11, wherein a second compression surface is provided on the second side edge surface of the support plate, wherein a second compression mechanism having a compression piston is provided on the screening machine, the compression piston of the second compression mechanism being configured such it does not move inward toward the centerline of the support plate, and wherein advancement of the compression piston of the first compression mechanism toward the centerline of the support plate causes the second compression surface on the second side edge surface of the support plate to be pushed into engagement with the compression piston of the second compression mechanism such that a resultant compressive force is applied to the second compression surface, the resultant compressive force applied to the second compression surface including a first component that is oriented horizontally toward the centerline of the support plate and a second component that is oriented vertically downward.

19. The method of claim 18, wherein the compression piston of the second compression mechanism is movably mounted on the second compression mechanism such that when the second compression surface of the support plate is pushed into engagement with the compression piston of the second compression mechanism, the compression piston of the second compression mechanism moves relative to the screening machine in a direction away from a center of the screen receiving portion of the screening machine.

20. The method of claim 11, wherein the first compression surface is located on a recessed portion of the first side edge surface of the support plate that forms a mounting aperture.

21. A screen assembly, comprising:

a substantially flat support plate including:

a flow through area surrounded by a front edge, a rear edge and first and second side edges, wherein the first side edge has a first side edge surface formed by a thickness of the support plate and wherein the second side edge has a second side edge surface formed by a thickness of the support plate; and a plurality of first compression areas located along the first side edge surface of the support plate, each of the plurality of first compression areas including at least one compression surface on the first side edge surface, each at least one compression surface being configured to receive a compression force that secures the screen assembly to a screening machine; and a screening surface attached to a top surface of the flow through area.

22. The screen assembly of claim 21, wherein each at least one compression surface is configured to receive a compression force that includes a first component orientated vertically downward and a second component that is oriented horizontally.

23. The screen assembly of claim 21, wherein the support plate is configured such that when compression forces are applied to the compression surfaces of the plurality of first compression areas, the support plate flexes into a concave shape in which the center of the support plate is lower than the first and second side edges.

24. The screen assembly of claim 21, wherein each of the plurality of compression areas further includes an alignment slot that extends from the first side edge surface inward toward a centerline of the support plate.

25. The screen assembly of claim 21, wherein each of the plurality of compression areas includes first and second compression surfaces and an alignment slot that extends from the first side edge surface inward toward a centerline of the support plate, the first and second compression surfaces being located on opposite sides of the alignment slot.

26. The screen assembly of claim 21, wherein the support plate further comprises a plurality of second compression areas located along the second side edge of the support plate, each of the plurality of second compression areas including at least one compression surface on the second side edge surface, each at least one compression surface of the plurality of second compression surfaces being configured to receive a compression force that secures the screen assembly to a screening machine.

27. The screen assembly of claim 26, wherein the support plate is configured such that when compression forces are applied to the compression surfaces of the plurality of first and second compression areas, the support plate flexes into a concave shape in which the center of the support plate is lower than the first and second side edges.

28. A method of securing a screen assembly to a screening machine, comprising:

placing a screen assembly on a screen receiving portion of a screening machine, where the screen assembly comprises a substantially flat support plate and a screening surface attached to a top surface of the support plate, the support plate having a front edge, a rear edge and first and second side edges, wherein the first side edge has a first side edge surface formed by a thickness of the support plate, wherein the second side edge has a second side edge surface formed by a thickness of the support plate, where a plurality of first compression areas are located along on the first side edge of the support plate, each of the first compression areas including at least one compression surface, and wherein placing the screen assembly on the screen receiving portion of the screening machine comprises locating the screen assembly such that compression pistons of a plurality of first compression mechanisms of the screening machine are aligned with corresponding ones of the first compression areas; and causing the compression pistons of the first plurality of compression mechanisms to advance toward a centerline of the support plate, the compression pistons being configured to bear against the compression surfaces of the plurality of first compression areas of the support plate such that when the compression pistons advance toward the centerline of the support plate, compressive forces are applied to the compression surfaces of the plurality of first compression areas, the compression forces including a first component that is oriented horizontally toward the centerline of the support plate and a second component that is oriented vertically downward, wherein the compressive forces causes the screening assembly to flex into a concave shape where a center of the support plate is lower than the first and second side edges of the support plate, and wherein the compressive forces causes the support plate to be pushed into engagement with underlying concave support surfaces of the screening machine.

29. The method of claim 28, wherein each of the plurality of first compression areas further includes an alignment slot, the alignment slot extending from the first side edge of the support plate inward toward the centerline of the support plate, wherein ends each of the compression pistons include an alignment finger, and wherein when the compression pistons advance toward a centerline of the support plate the alignment fingers of the compression pistons are received in the alignment slots of the first plurality of compression areas.

30. The method of claim 28, wherein the support plate includes a plurality of second compression areas along the second side edge of the support plate, each of the second compression areas including at least one compression surface, wherein a plurality of second compression mechanisms are located on the screening machine, and wherein when the compression pistons of the plurality of first compression mechanisms advance toward a centerline of the support plate the compression surfaces of the plurality of second compression areas of the support plate are pushed into engagement with corresponding ones of the plurality of second compression mechanisms.

* * * * *